(12) United States Patent
Inoue et al.

(10) Patent No.: US 6,591,923 B2
(45) Date of Patent: Jul. 15, 2003

(54) ROBOT

(75) Inventors: Makoto Inoue, Kanagawa (JP); Emi Kato, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/255,301

(22) Filed: Sep. 26, 2002

(65) Prior Publication Data

US 2003/0019671 A1 Jan. 30, 2003

Related U.S. Application Data

(63) Continuation of application No. 09/743,245, filed as application No. PCT/JP00/02991 on May 10, 2000, now Pat. No. 6,458,011.

(30) Foreign Application Priority Data

May 10, 1999 (JP) .............................................. 11-129279

(51) Int. Cl.[7] ................................................ A63H 11/20
(52) U.S. Cl. ............................. 180/8.1; 446/376; 901/1
(58) Field of Search .................. 180/8.1, 8.6; 446/268, 446/376, 377, 383, 384; 901/1

(56) References Cited

U.S. PATENT DOCUMENTS

| | | | |
|---|---|---|---|
| 5,929,585 A | 7/1999 | Fujita | |
| 6,095,887 A | 8/2000 | Llorens | |
| 6,321,140 B1 | 11/2001 | Fujita et al. | |
| 6,330,494 B1 | 12/2001 | Yamamoto | |
| 6,337,552 B1 | 1/2002 | Inoue et al. | |
| 6,462,498 B1 * | 10/2002 | Filo | 318/568.12 |
| 2001/0030523 A1 | 10/2001 | Mori et al. | |
| 2002/0111113 A1 * | 8/2002 | Filo | 446/355 |

FOREIGN PATENT DOCUMENTS

| | | | | |
|---|---|---|---|---|
| JP | 2000 317876 | | 11/2000 | |
| JP | 2000317876 A | * | 11/2000 | B25J/19/00 |

OTHER PUBLICATIONS

Monthly Electronics Magazine, ISSN 0421–9513, Mar. 3, 1998, pp. 34, 35 and 96.

Database Inspection on STN, Institute of Electrical Engineers, Abstract No. C9809–7810–026, Wei–Min, Shen. et al., 3–7, Jul. 1998, pp. 465–466.

Hiroki Kitano et al., 1998 IEEE International Conference on Robotics and Automation, May 16–20, 1998, vol. 3, pp. 2605–2612.

* cited by examiner

*Primary Examiner*—Kevin Hurley
(74) *Attorney, Agent, or Firm*—Frommer Lawrence & Haug LLP; William S. Frommer

(57) ABSTRACT

A walking-on-four-legs type robot whose body is connected at the front right, front left, rear right, and rear left with legs is adapted so that its action saves the user trouble and increases the user's affection for, and curiosity about, the robot.

5 Claims, 177 Drawing Sheets

FIG. 5

| node 100 | | | INPUT EVENT | | PROBABILITY OF TRANSITION TO OTHER NODES | | | | | |
|---|---|---|---|---|---|---|---|---|---|---|
| | | NAME | DATA NAME | DATA RANGE | A | B | C | D | ... | n |
| DESTINATION NODE | | | | | node 120 | node120 | node 1000 | | | node 600 |
| OUTPUT ACTION | | | | | ACTION 1 | ACTION 2 | MOVE BACK | | | ACTION 4 |
| | 1 | BALL | SIZE | 0,1000 | 30% | | | | | |
| | 2 | PAT | | | | 40% | | | | |
| | 3 | HIT | | | | 20% | | | | |
| | 4 | MOTION | | | | | | | | |
| | 5 | OBSTACLE | DISTANCE | 0,100 | | | 50% | | | |
| | 6 | | JOY | 50,100 | | | 100% | | | |
| | 7 | | SUPRISE | 50,100 | | | | | | |
| | 8 | | SADNESS | 50,100 | | | | | | |

40

ROBOT

This is a continuation of application Ser. No. 09/743,245 filed Mar. 6, 2001, now U.S. Pat. No. 6,458,011, which is 371 of PCT/JP00/02991, May 10, 2000.

TECHNICAL FIELD

The present invention relates to a robot, and is preferably applied to, for example, a walking-on-four-legs type pet robot.

BACKGROUND ART

The inventor recently developed a walking-on-four-legs type pet robot. The pet robot spontaneously acts in response to an ambient environment, the user's action, etc.

Making such a robot be able to recover from a tumble by itself saves the user the work of standing it up and enhances its touch of a living thing and entertaining characteristics.

Appealing the loveliness and interest of such a pet robot using its action increases the user's affection for, and curiosity about, the robot and further enhances its entertaining characteristics.

DISCLOSURE OF THE INVENTION

The present invention, made in the light of the foregoing, proposes a robot which can enhance entertaining characteristics.

To solve this problem, a walking-on-four-legs type robot of the present invention whose body is connected at the front right, front left, rear right, and rear left with legs is provided with driving means for driving the legs separately from each other and controlling means for controlling the driving means, the controlling means being adapted to control the driving means so that when the robot tumbles sideward, the driving means turns the forelegs and hind legs under the body in such directions that the legs open apart from each other and then turns the legs in such directions that they move away from the body. Thus because the robot can stand up by itself after it falls down, the user's work of standing it up is eliminated, and its touch of a living thing is increased, so that entertaining characteristics can be enhanced.

A walking-on-four-legs type robot of the present invention whose body is connected at the front right, front left, rear right, and rear left with legs is provided with driving means for driving the legs separately from each other and controlling means for controlling the driving means, the controlling means being adapted to control the driving means so that when the robot tumbles forward, the driving means turns the legs at the front of the body until they are almost parallel in front of the body and then turns the legs toward the rear of the body. Thus because the robot can stand up by itself after it falls down, the user's work of standing it up is eliminated, and its touch of a living thing is increased, so that entertaining characteristics can be enhanced.

A walking-on-four-legs type robot of the present invention whose body is connected at the front right, front left, rear right, and rear left with legs is provided with driving means for driving the legs separately from each other and controlling means for controlling the driving means, the controlling means being adapted to control the driving means so that when the robot tumbles backward, the driving means turns the legs at the rear of the body in such directions that the legs move away from the body until they are almost straight and then turns the legs toward the front of the body. Thus because the robot can stand up by itself after it falls down, the user's work of standing it up is eliminated, and its touch of a living thing is increased, so that entertaining characteristics can be enhanced.

A walking-on-four-legs type robot of the present invention whose body is connected at the front right, front left, rear right, and rear left with legs is provided with driving means for driving the legs separately from each other and controlling means for controlling the driving means, the controlling means being adapted to control the driving means so that the driving means opens the legs radially and then bends the legs above the body. The resulting motion represents a touch of a robot, thus enhancing entertaining characteristics.

A walking-on-four-legs type robot of the present invention whose body is connected at the front right, front left, rear right, and rear left with legs and provided at the front with a head is provided with driving means for driving the legs and head separately from each other and controlling means for controlling the driving means, the controlling means being adapted to control the driving means so that the end of a leg under the body moves up and down at the back of the head. The resulting motion allows the robot to appear to scratch the back of its head, thus appealing a touch of a living thing and enhancing entertaining characteristics.

BRIEF DESCRIPTION OF THE DRAWINGS

FIG. 5 is a conceptual view illustrating a condition transition table.

FIG. 120 is a schematic diagram illustrating the pet robot motion.

FIG. 121 is a schematic diagram illustrating the pet robot motion.

FIG. 122 is a schematic diagram illustrating the pet robot motion.

FIG. 123 is a schematic diagram illustrating the pet robot motion.

FIG. 124 is a schematic diagram illustrating the pet robot motion.

FIG. 125 is a schematic diagram illustrating the pet robot motion.

FIG. 126 is a schematic diagram illustrating the pet robot motion.

FIG. 127 is a schematic diagram illustrating the pet robot motion.

FIG. 128 is a schematic diagram illustrating the pet robot motion.

FIG. 129 is a schematic diagram illustrating the pet robot motion.

FIG. 130 is a schematic diagram illustrating the pet robot motion.

FIG. 131 is a schematic diagram illustrating the pet robot motion.

Figure 132:
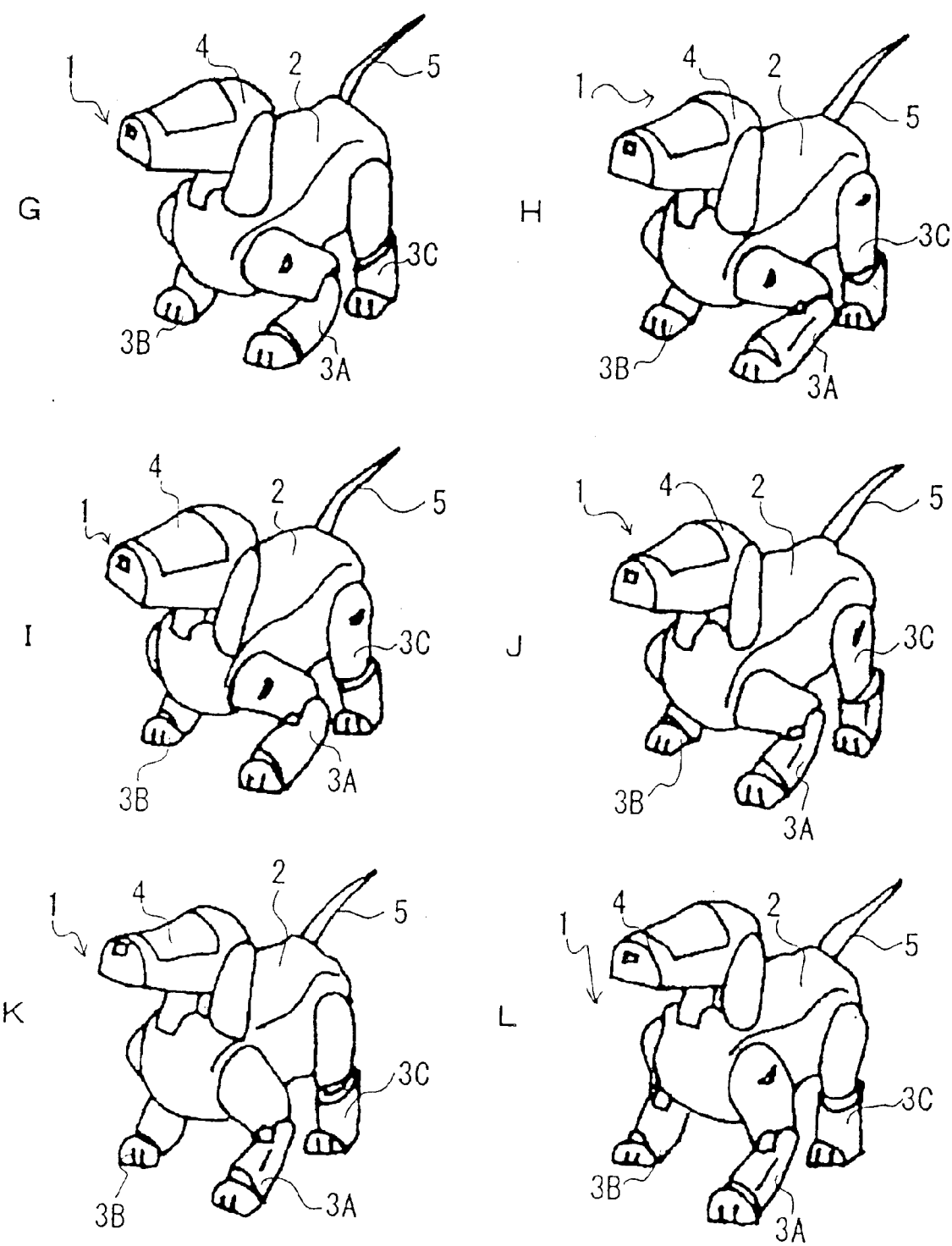

FIG. 132 is a schematic diagram illustrating the pet robot motion.

Figure 133:
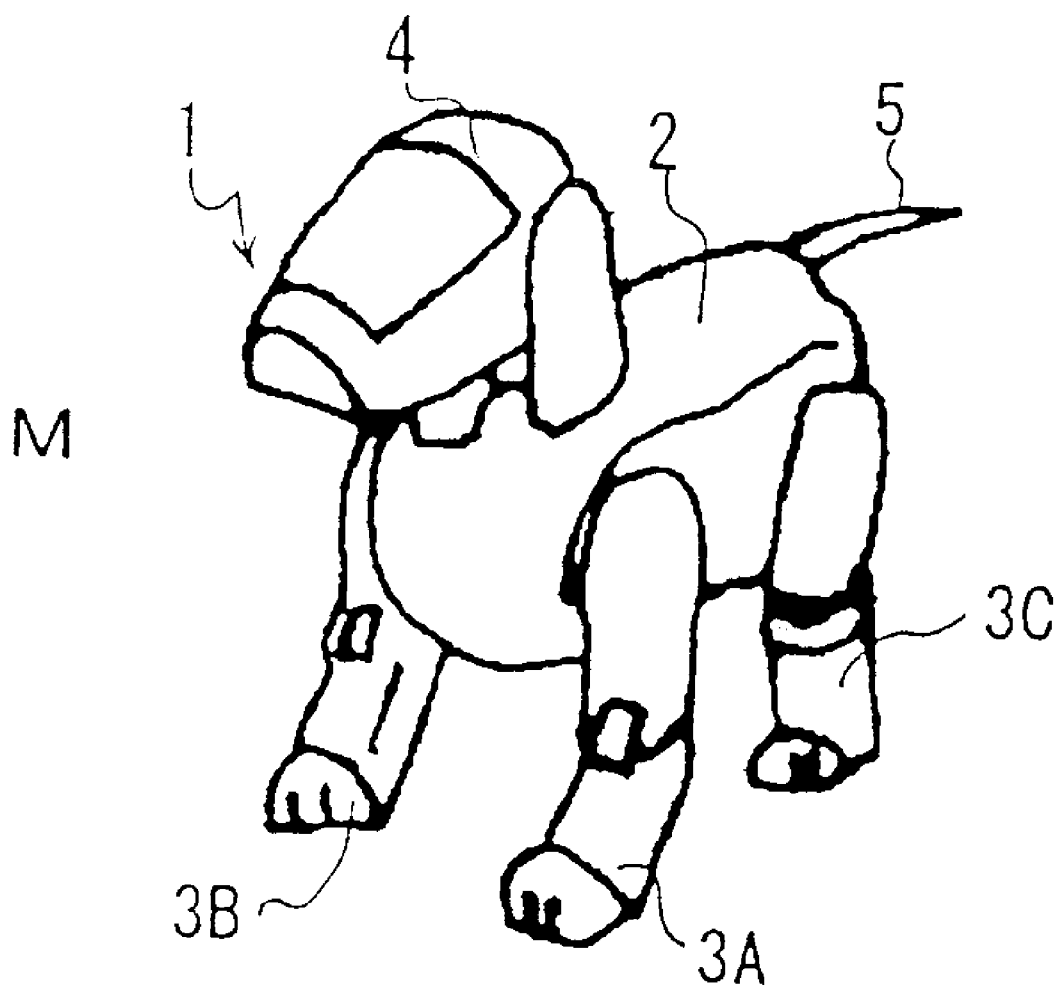

FIG. 133 is a schematic diagram illustrating the pet robot motion.

Figure 134:
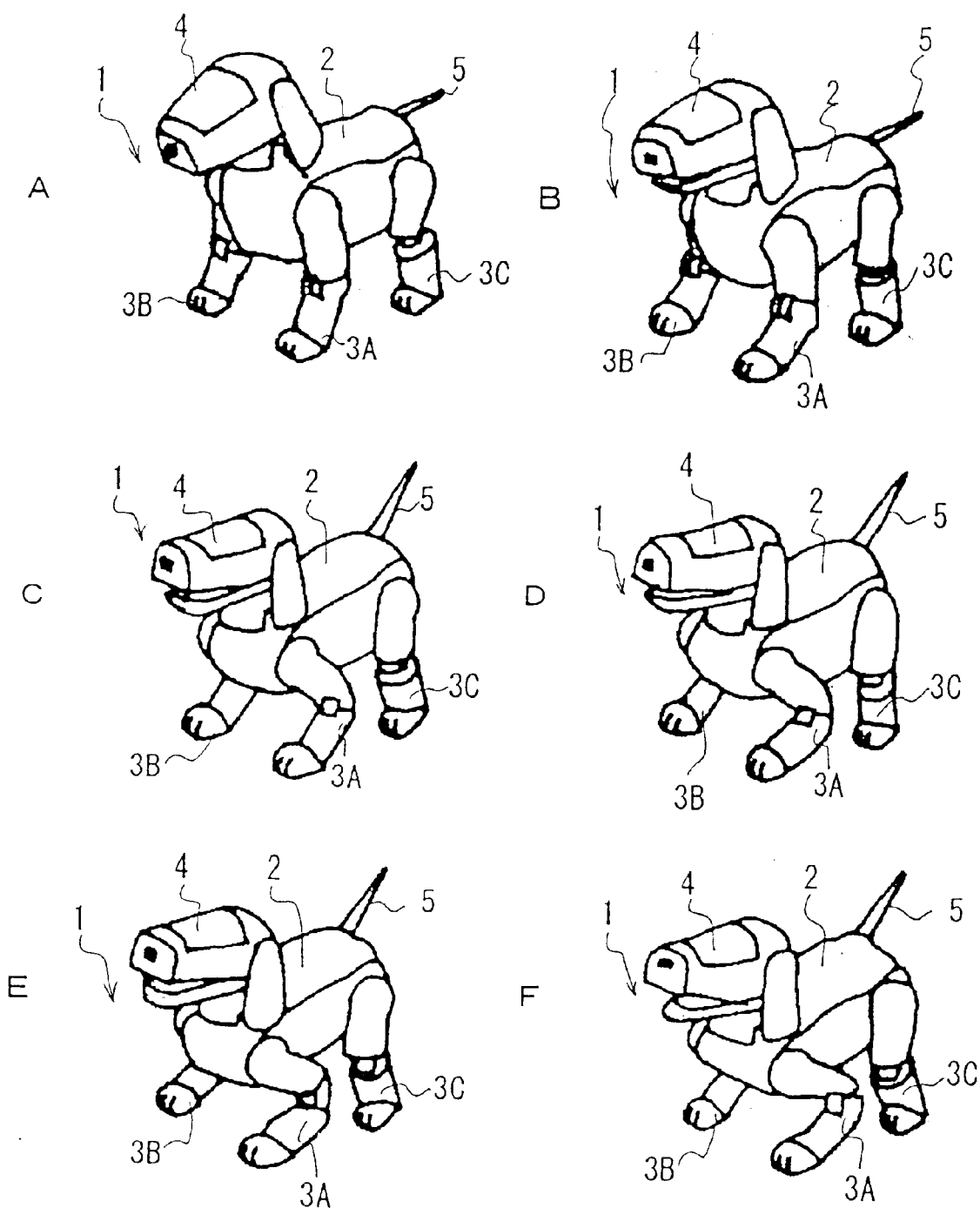

FIG. 134 is a schematic diagram illustrating the pet robot motion.

Figure 135:
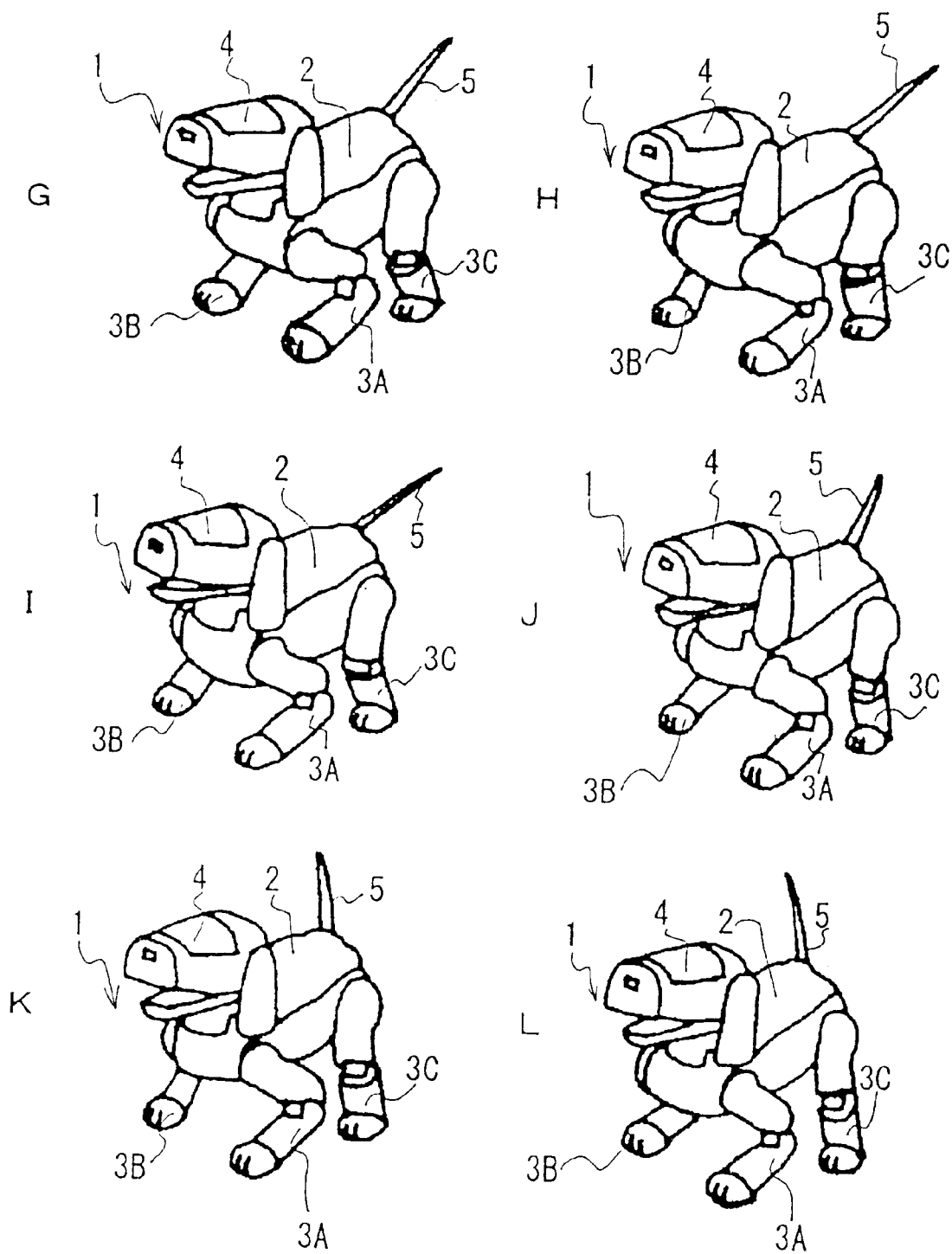

FIG. 135 is a schematic diagram illustrating the pet robot motion.

Figure 136:
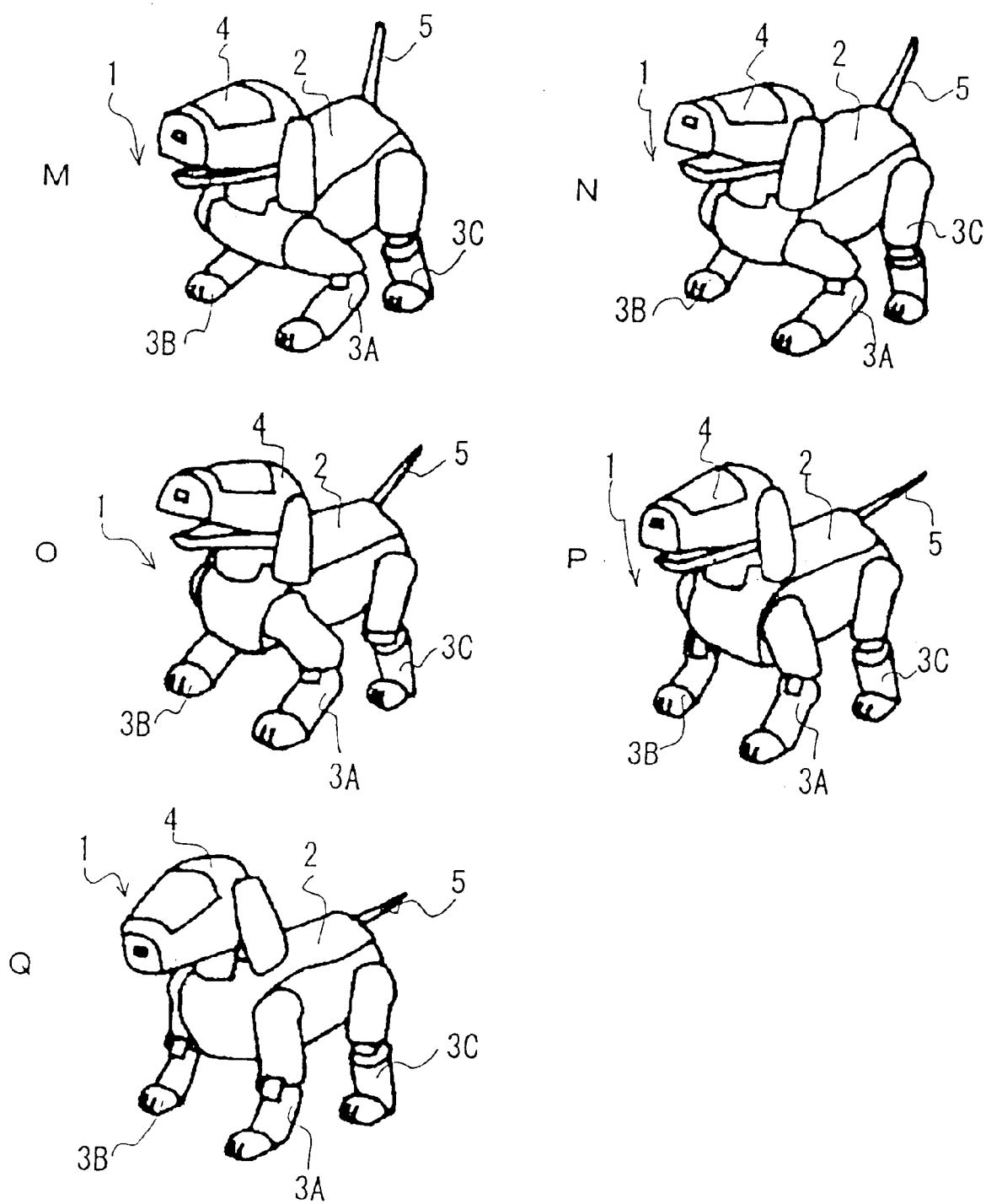

FIG. 136 is a schematic diagram illustrating the pet robot motion.

Figure 137:
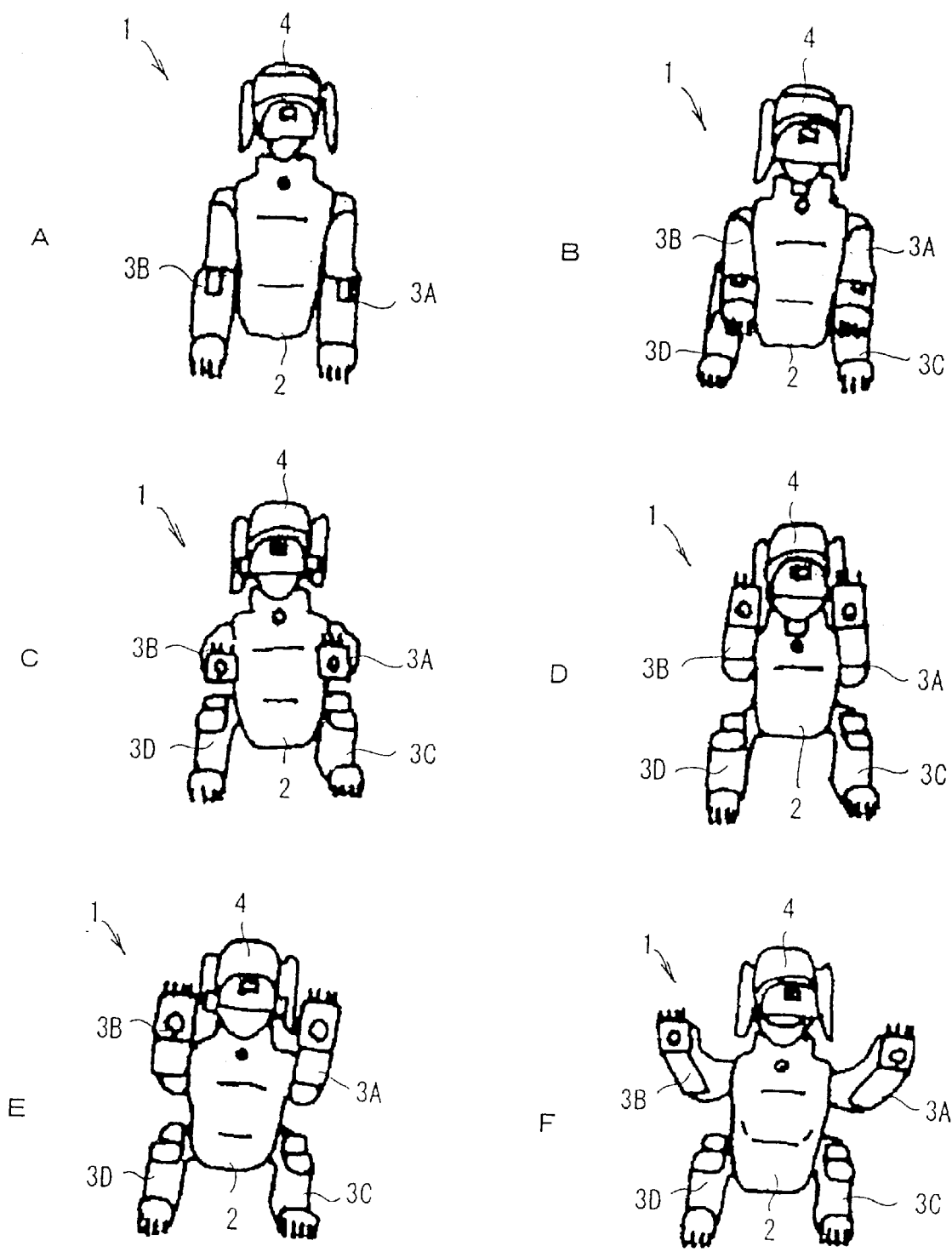

FIG. 137 is a schematic diagram illustrating the pet robot motion.

Figure 138:
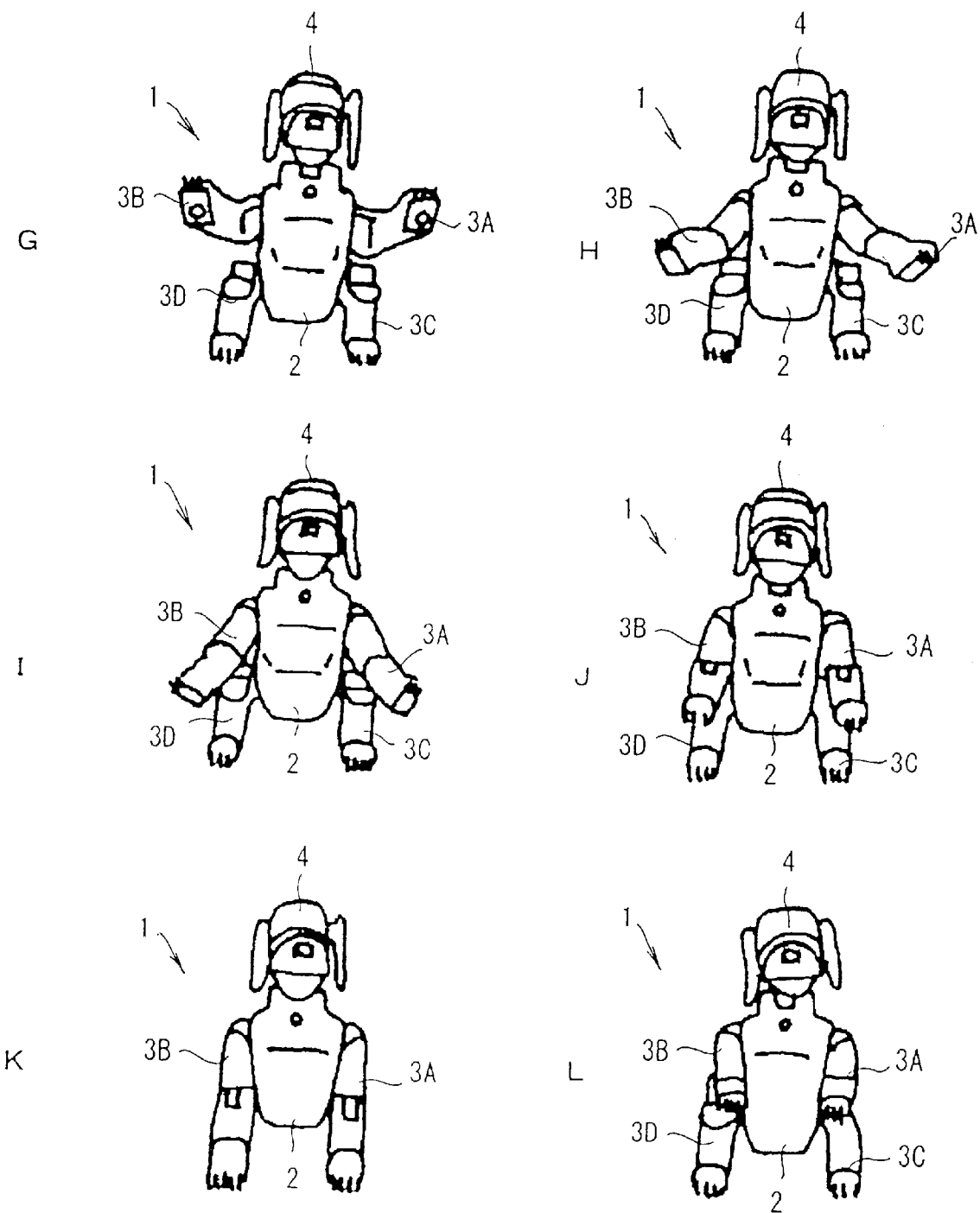

FIG. 138 is a schematic diagram illustrating the pet robot motion.

Figure 139:
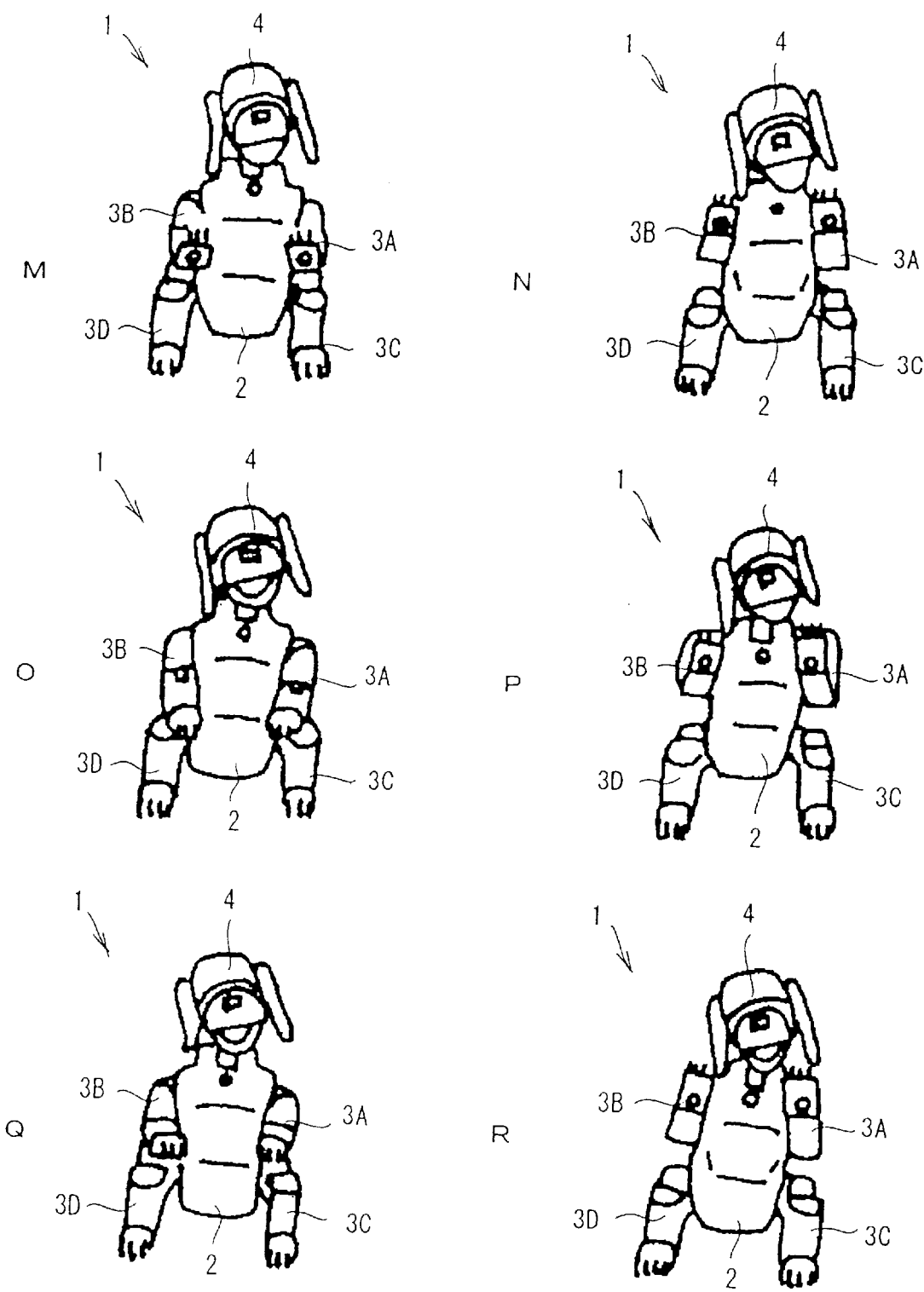

FIG. 139 is a schematic diagram illustrating the pet robot motion.

Figure 140:
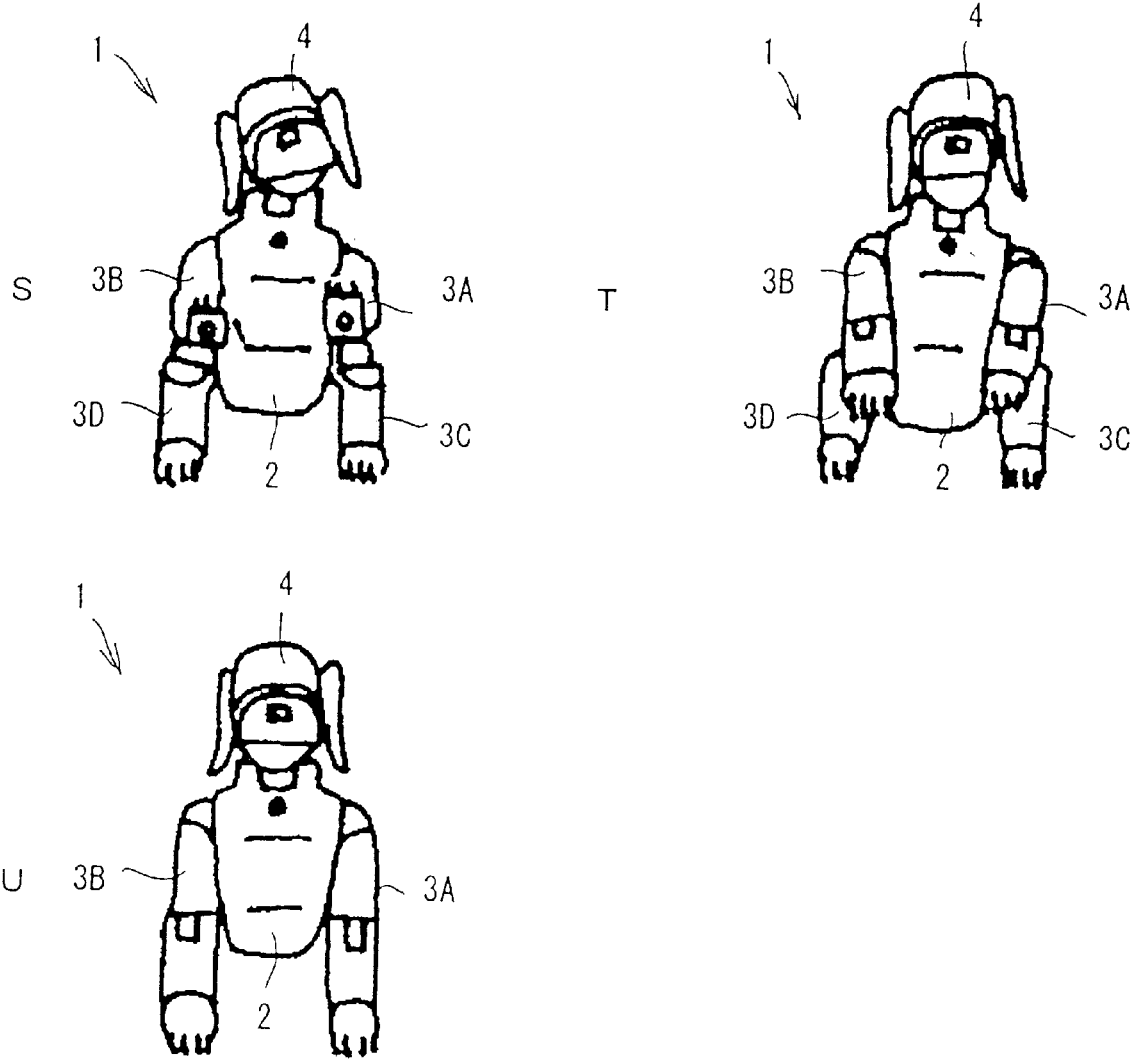

FIG. 140 is a schematic diagram illustrating the pet robot motion.

Figure 141:
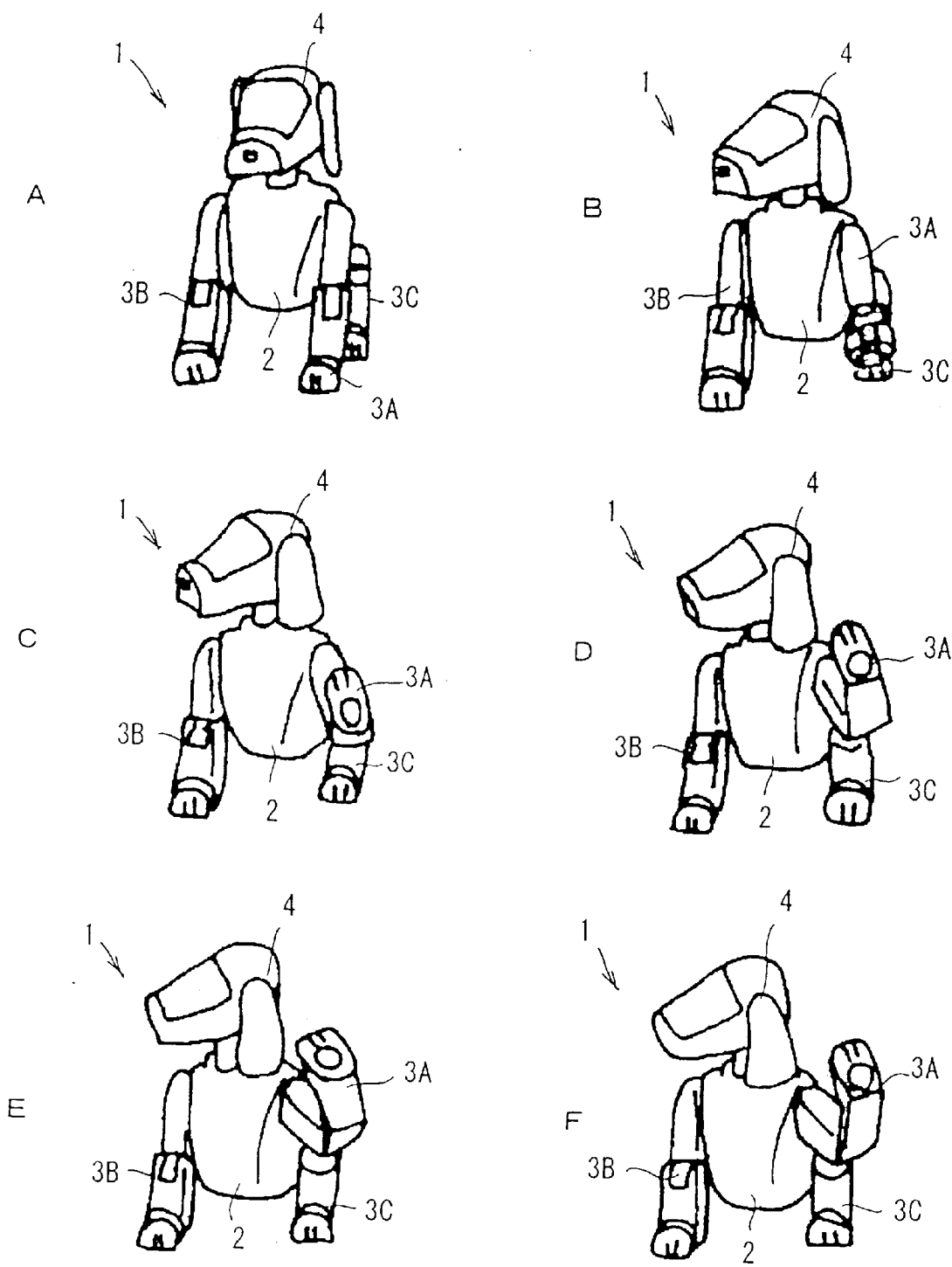

FIG. 141 is a schematic diagram illustrating the pet robot motion.

Figure 142:
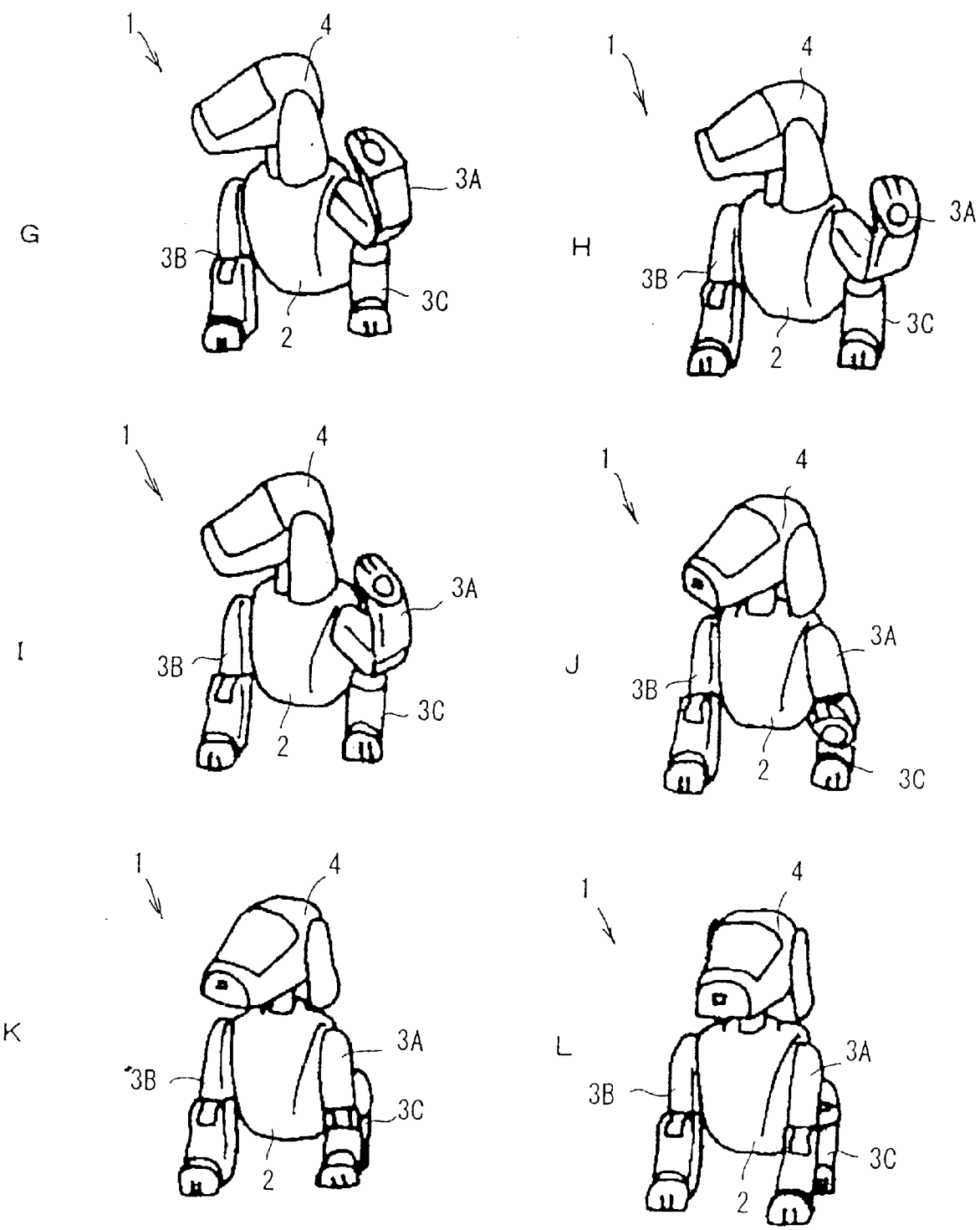

FIG. 142 is a schematic diagram illustrating the pet robot motion.

Figure 143:
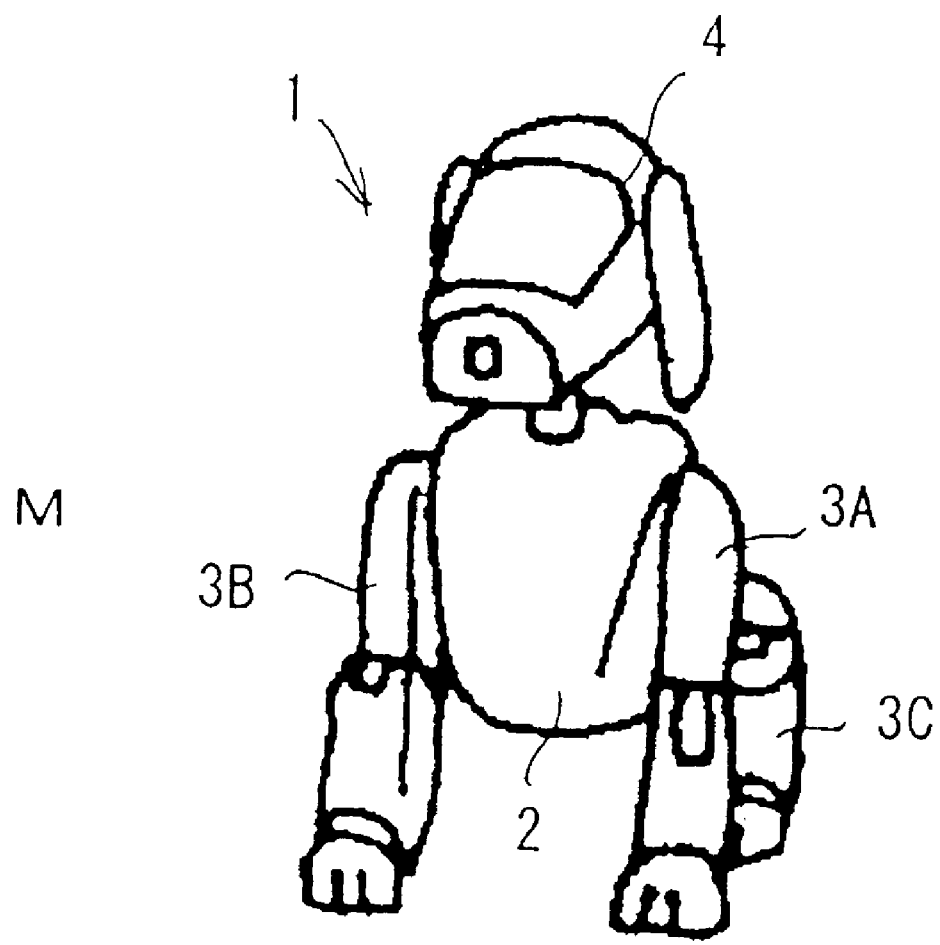

FIG. 143 is a schematic diagram illustrating the pet robot motion.

Figure 144:
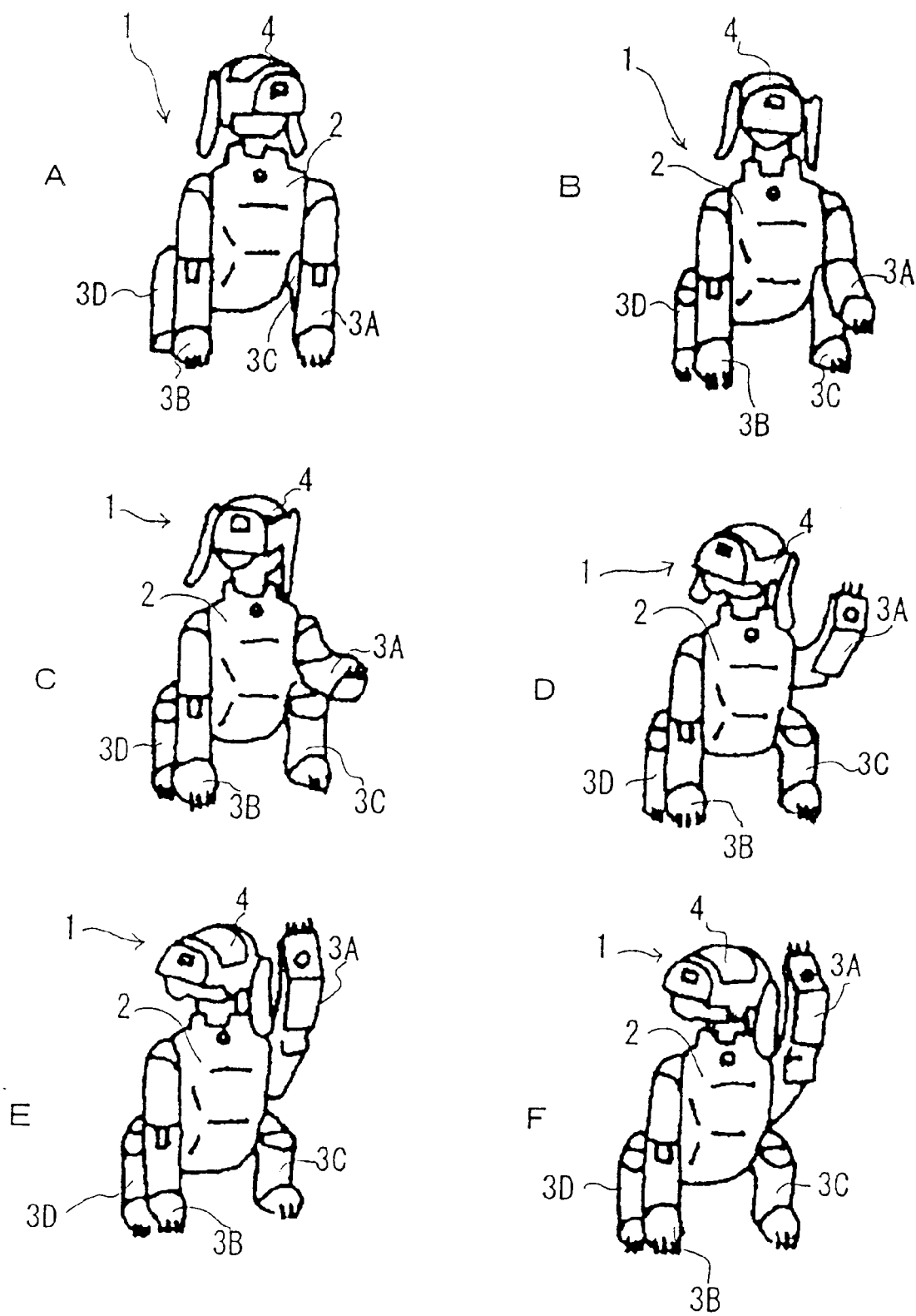

FIG. 144 is a schematic diagram illustrating the pet robot motion.

Figure 145:
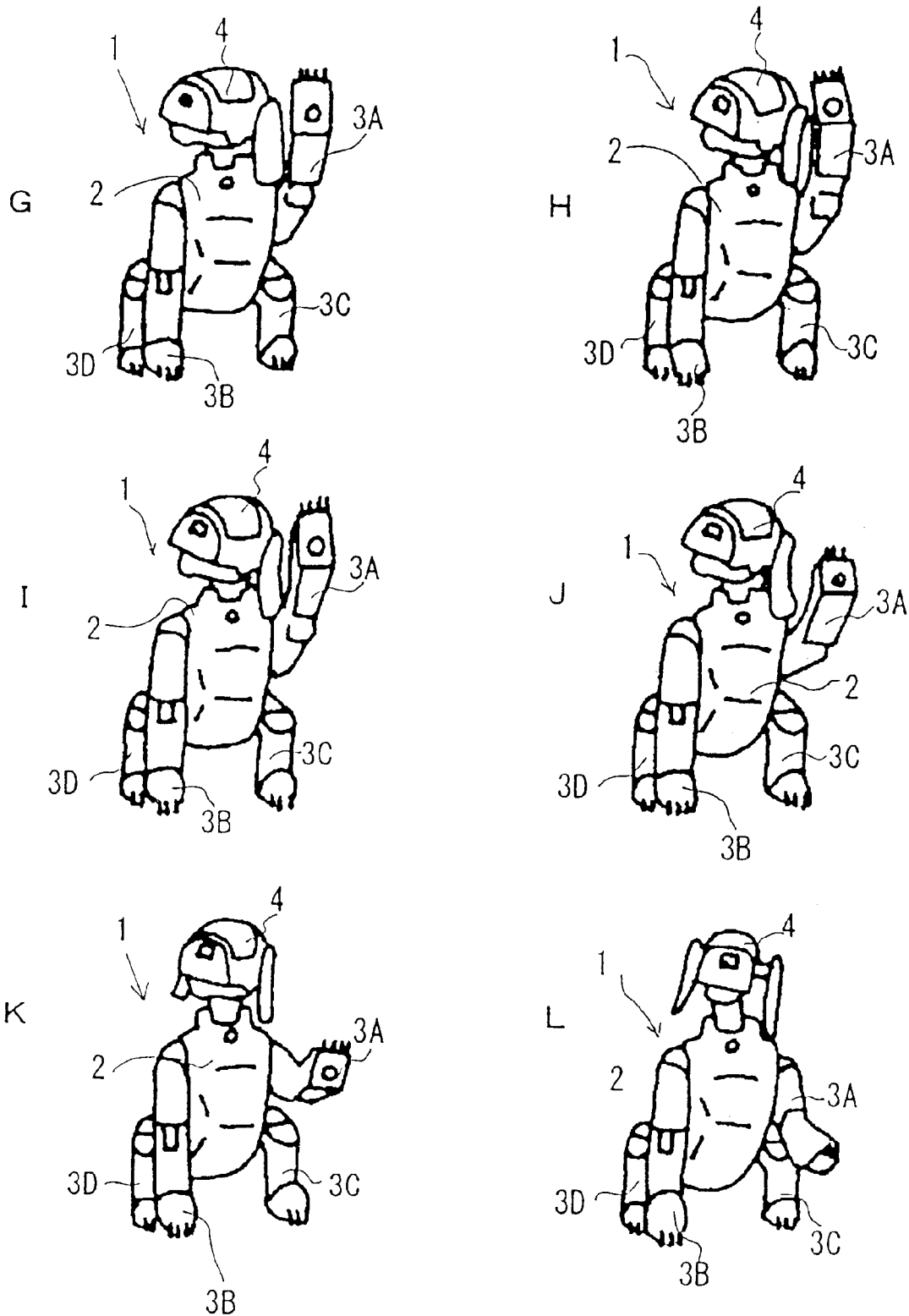

FIG. 145 is a schematic diagram illustrating the pet robot motion.

Figure 146:
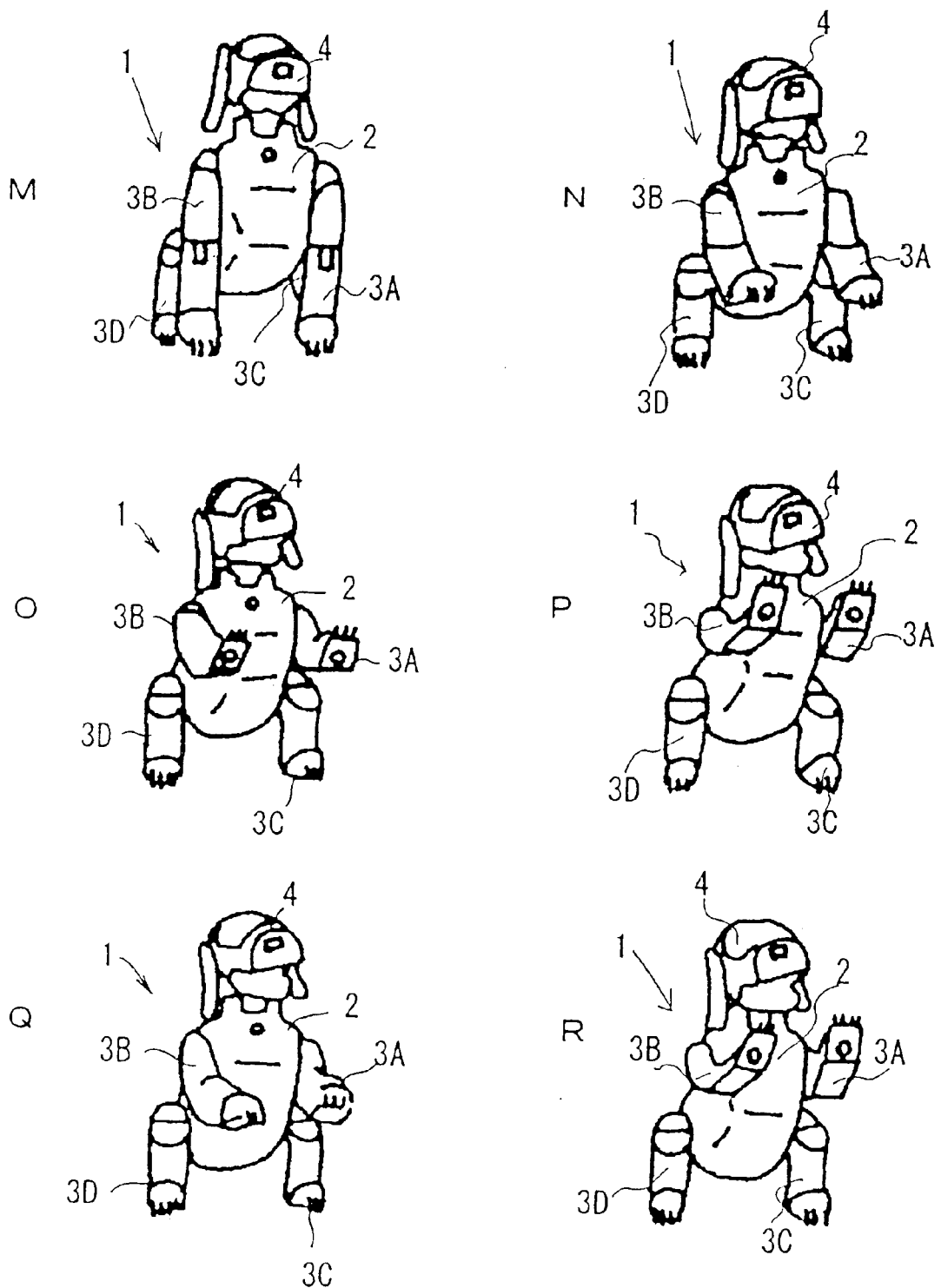

FIG. 146 is a schematic diagram illustrating the pet robot motion.

Figure 147:
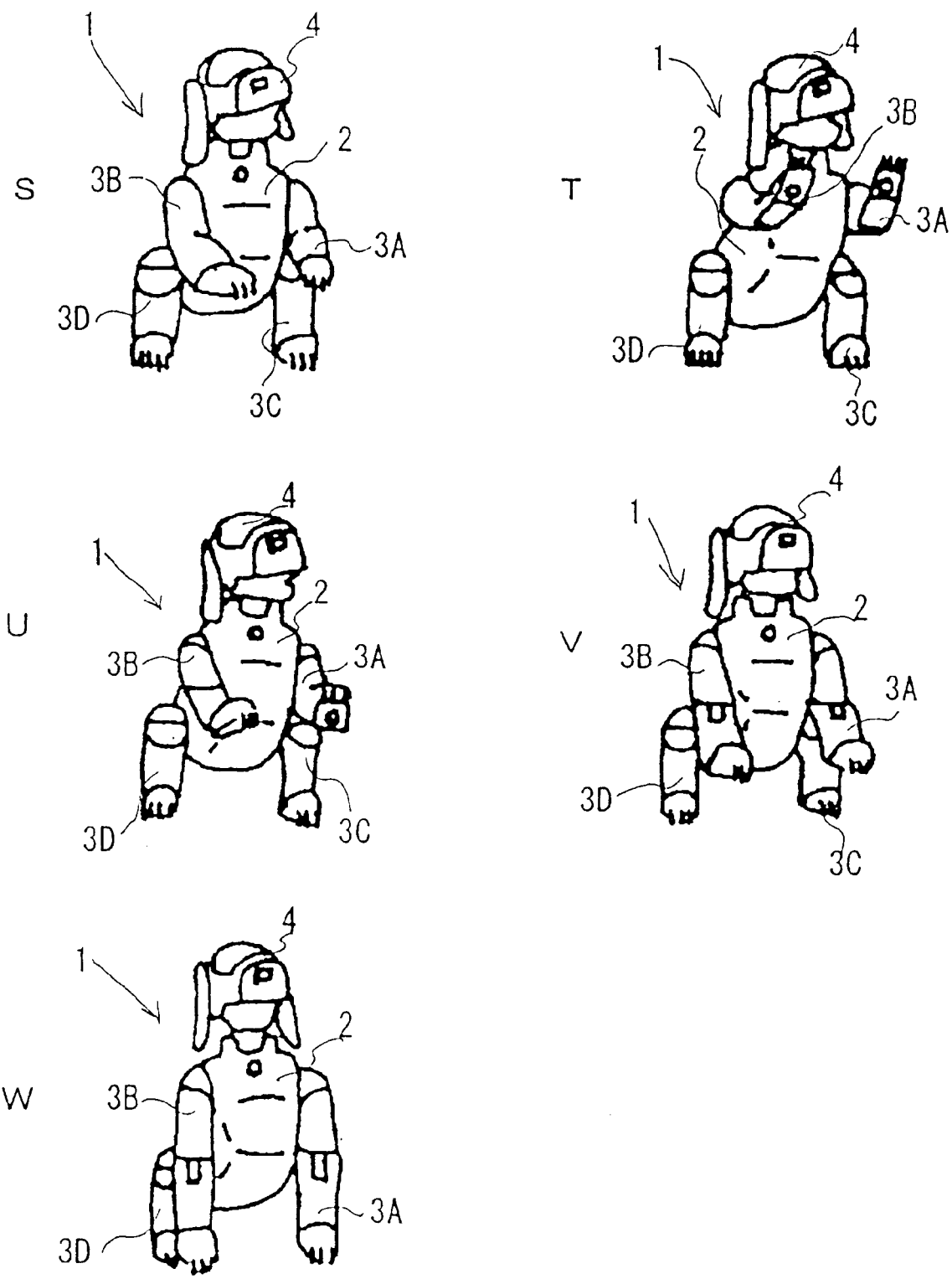

FIG. 147 is a schematic diagram illustrating the pet robot motion.

Figure 148:
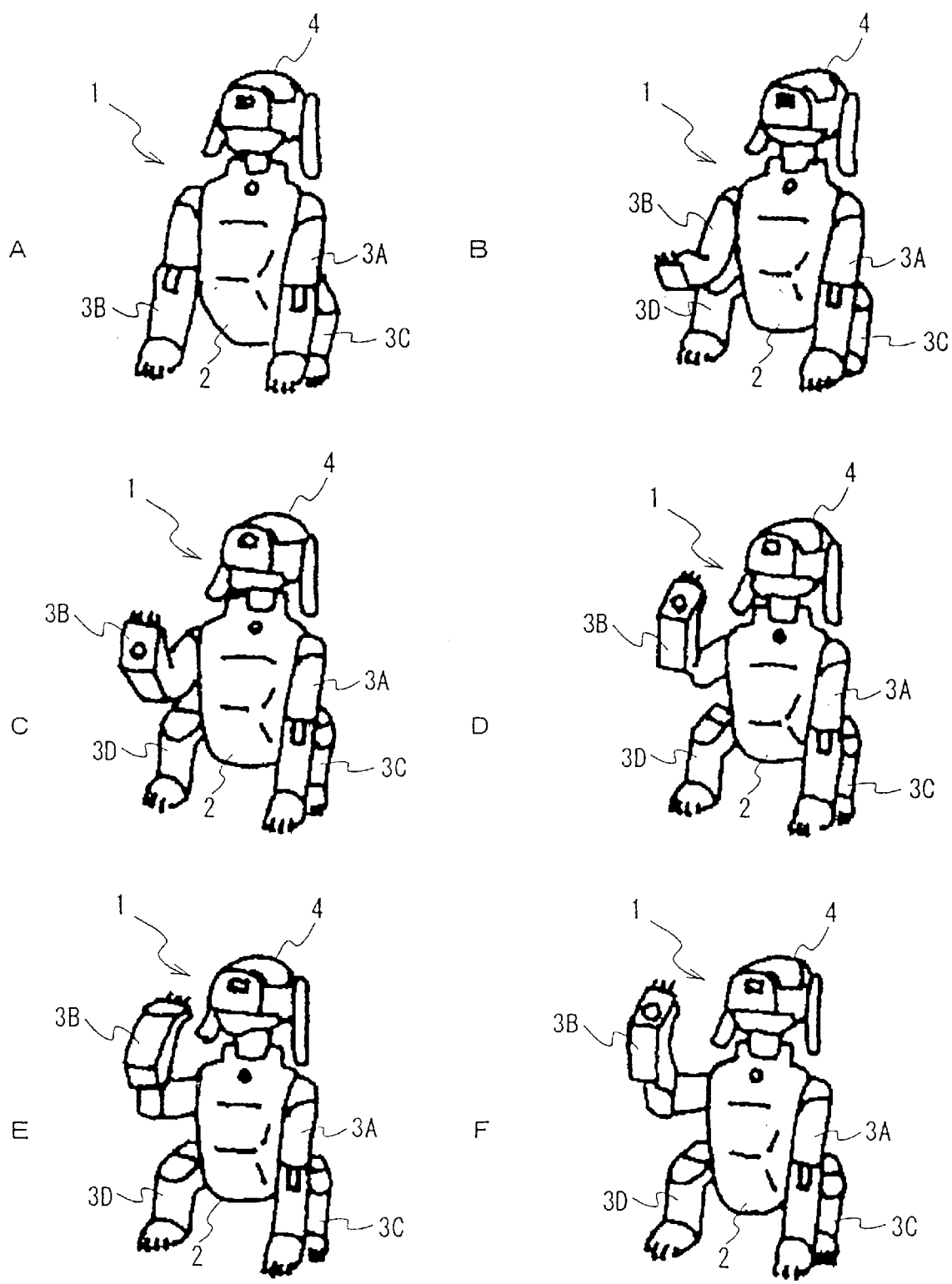

FIG. 148 is a schematic diagram illustrating the pet robot motion.

Figure 149:
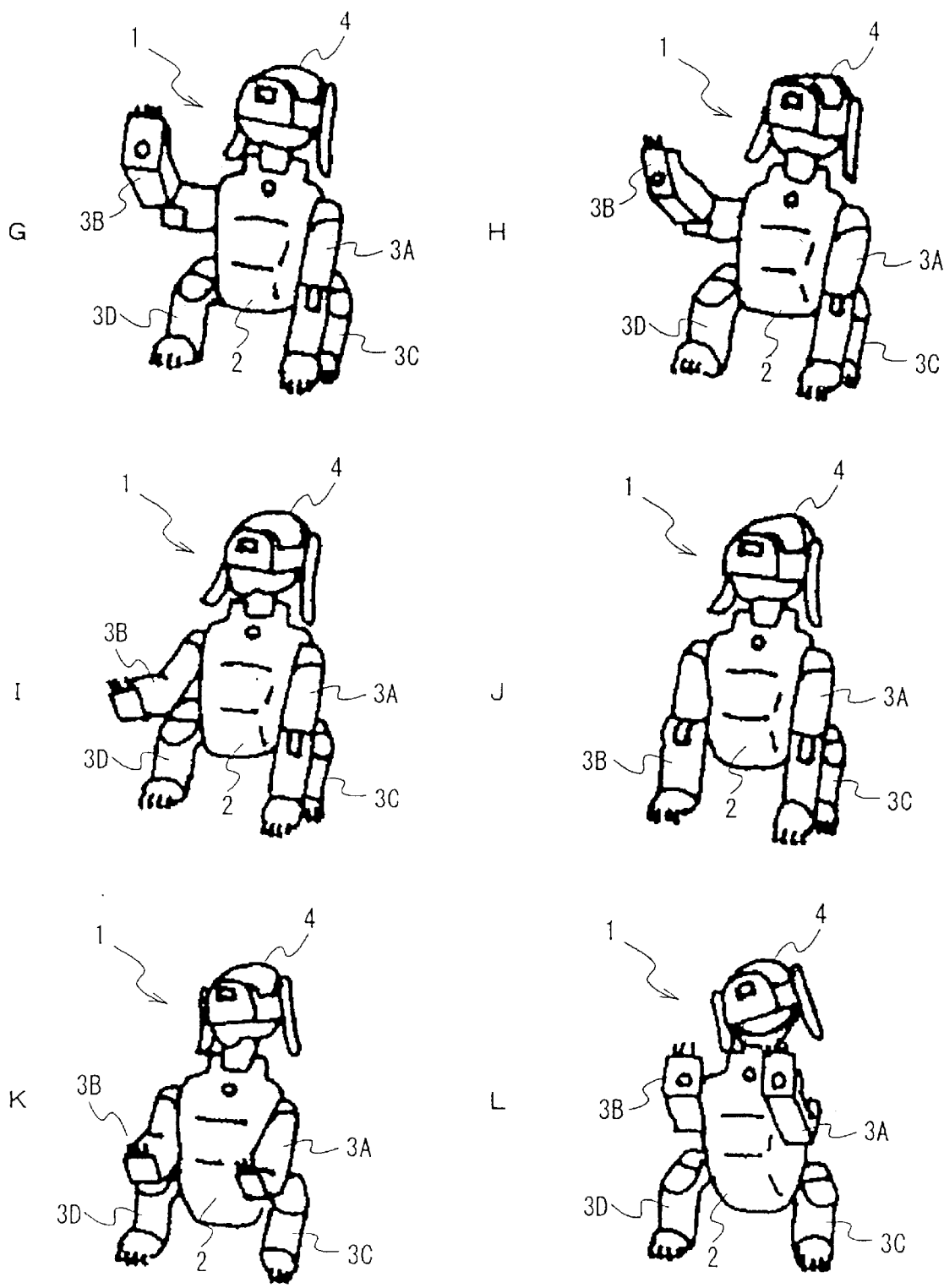

FIG. 149 is a schematic diagram illustrating the pet robot motion.

Figure 150:
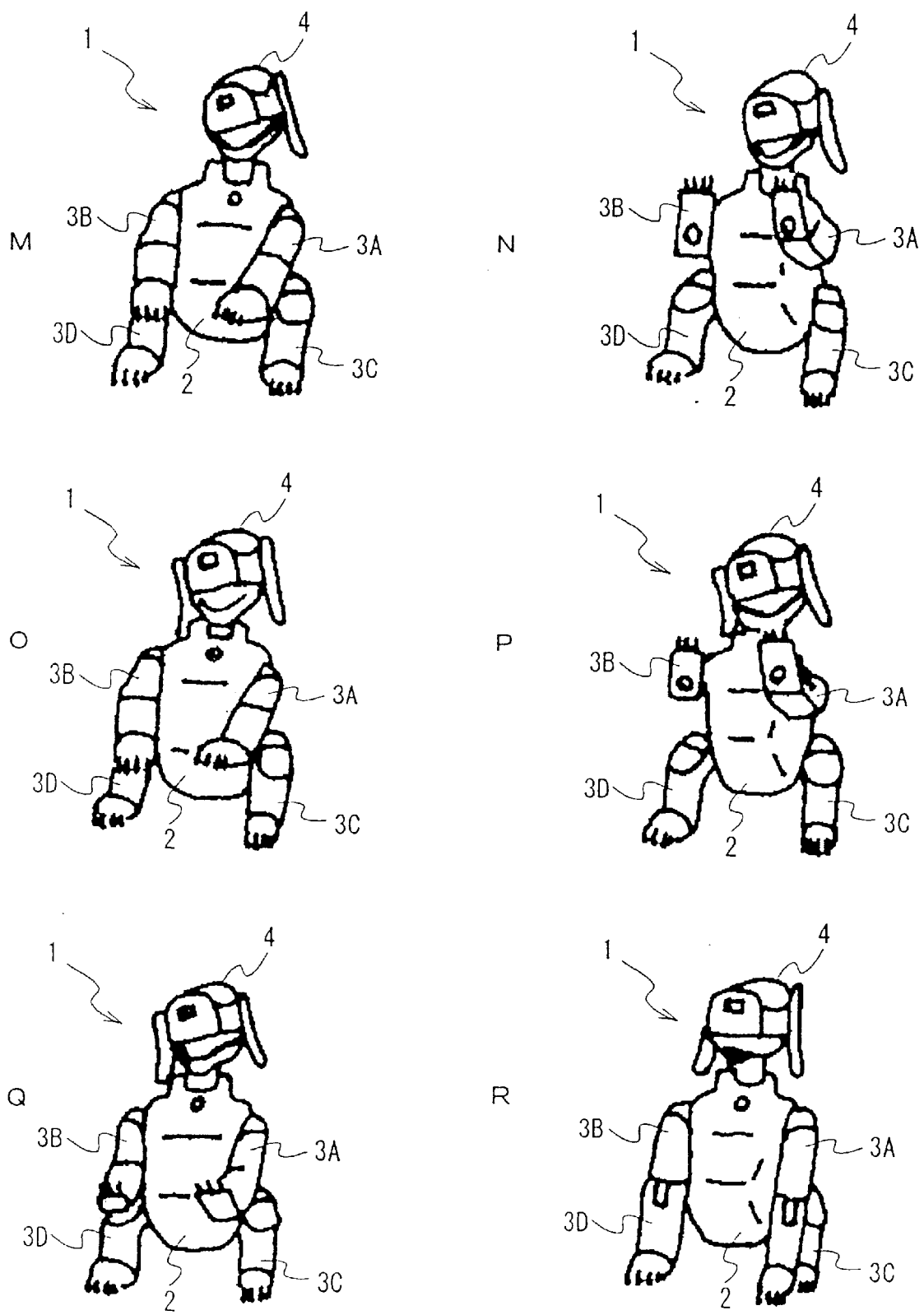

FIG. 150 is a schematic diagram illustrating the pet robot motion.

Figure 151:
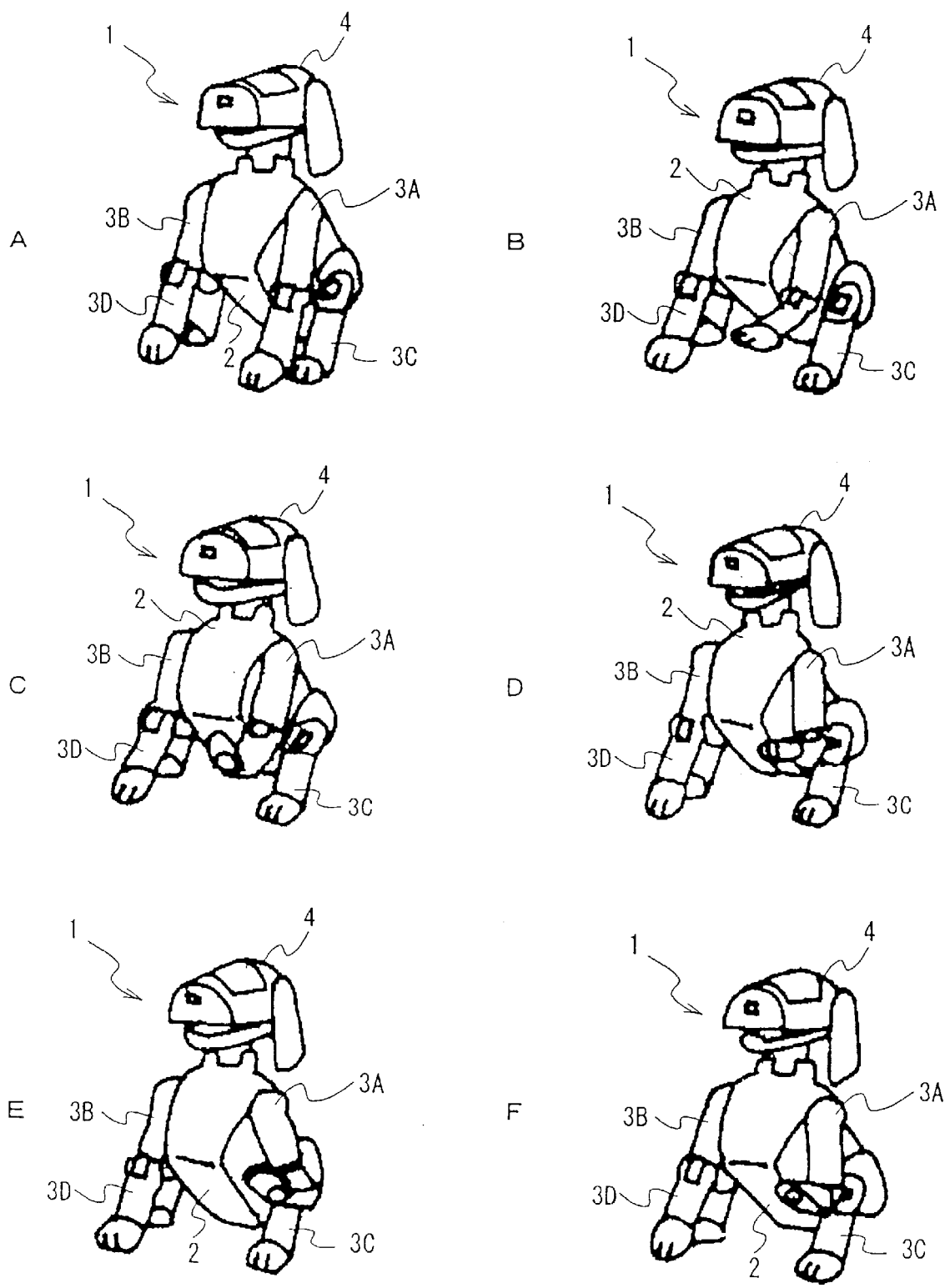

FIG. 151 is a schematic diagram illustrating the pet robot motion.

Figure 152:
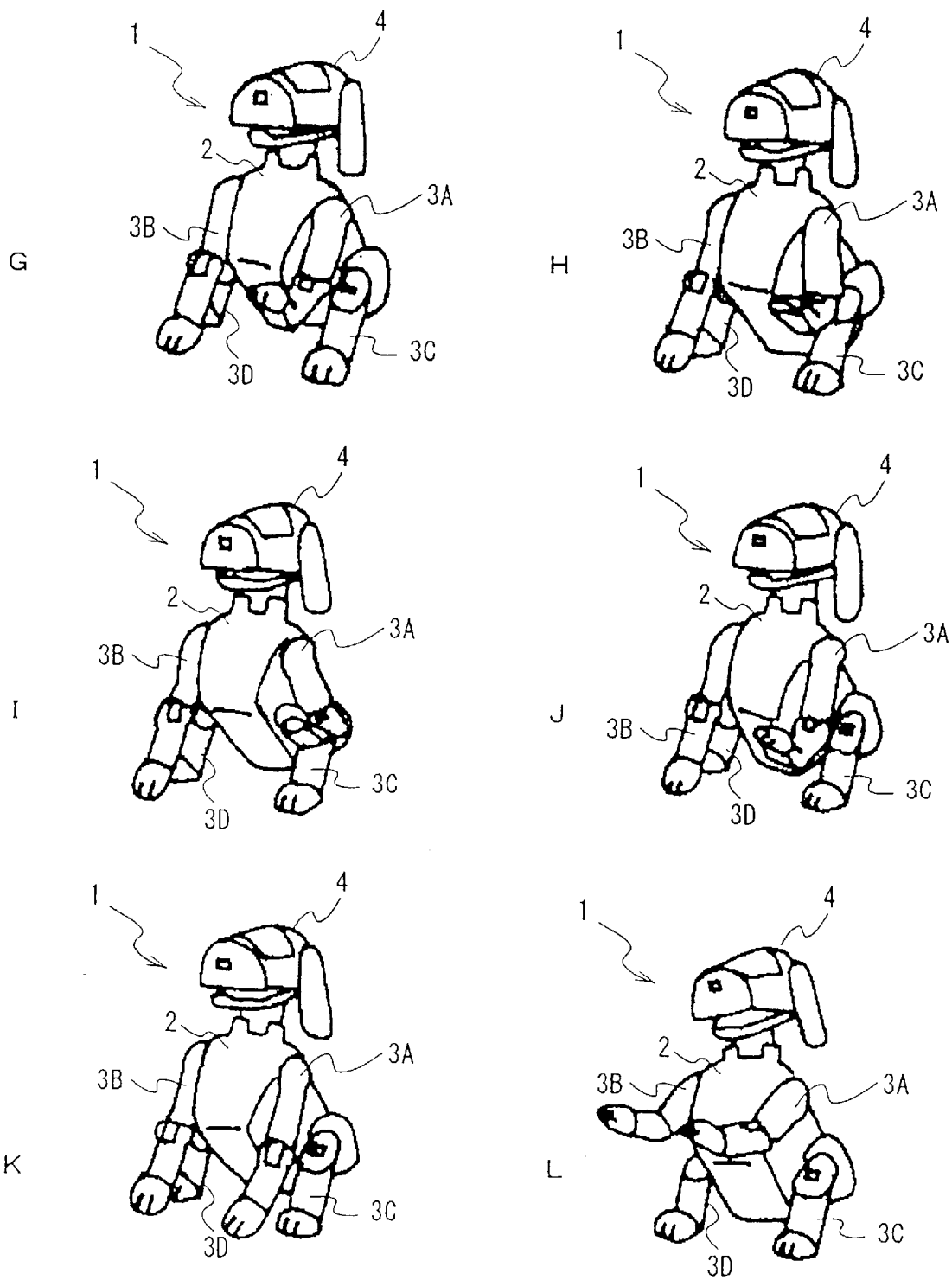

FIG. 152 is a schematic diagram illustrating the pet robot motion.

Figure 153:
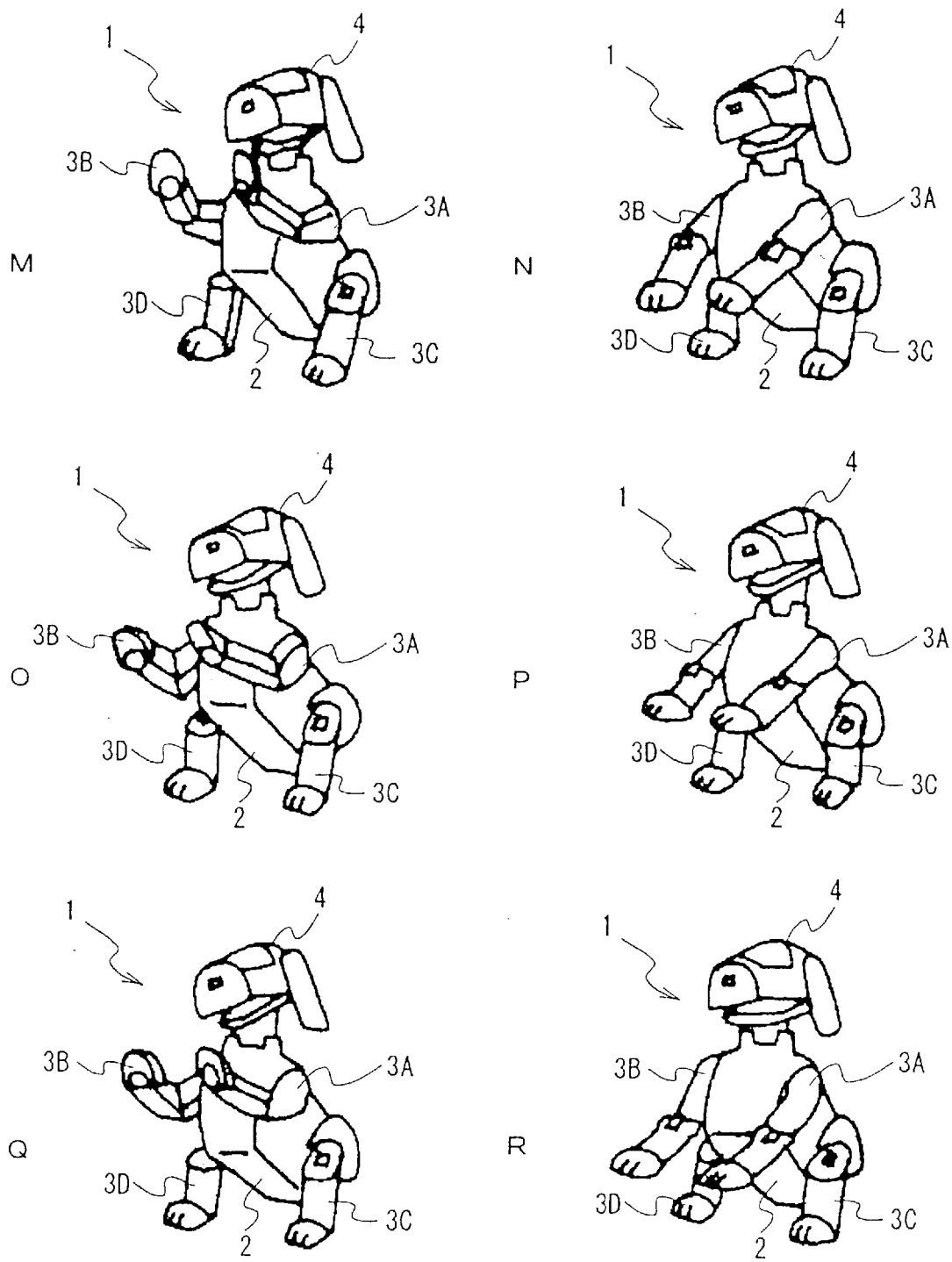

FIG. 153 is a schematic diagram illustrating the pet robot motion.

Figure 154:
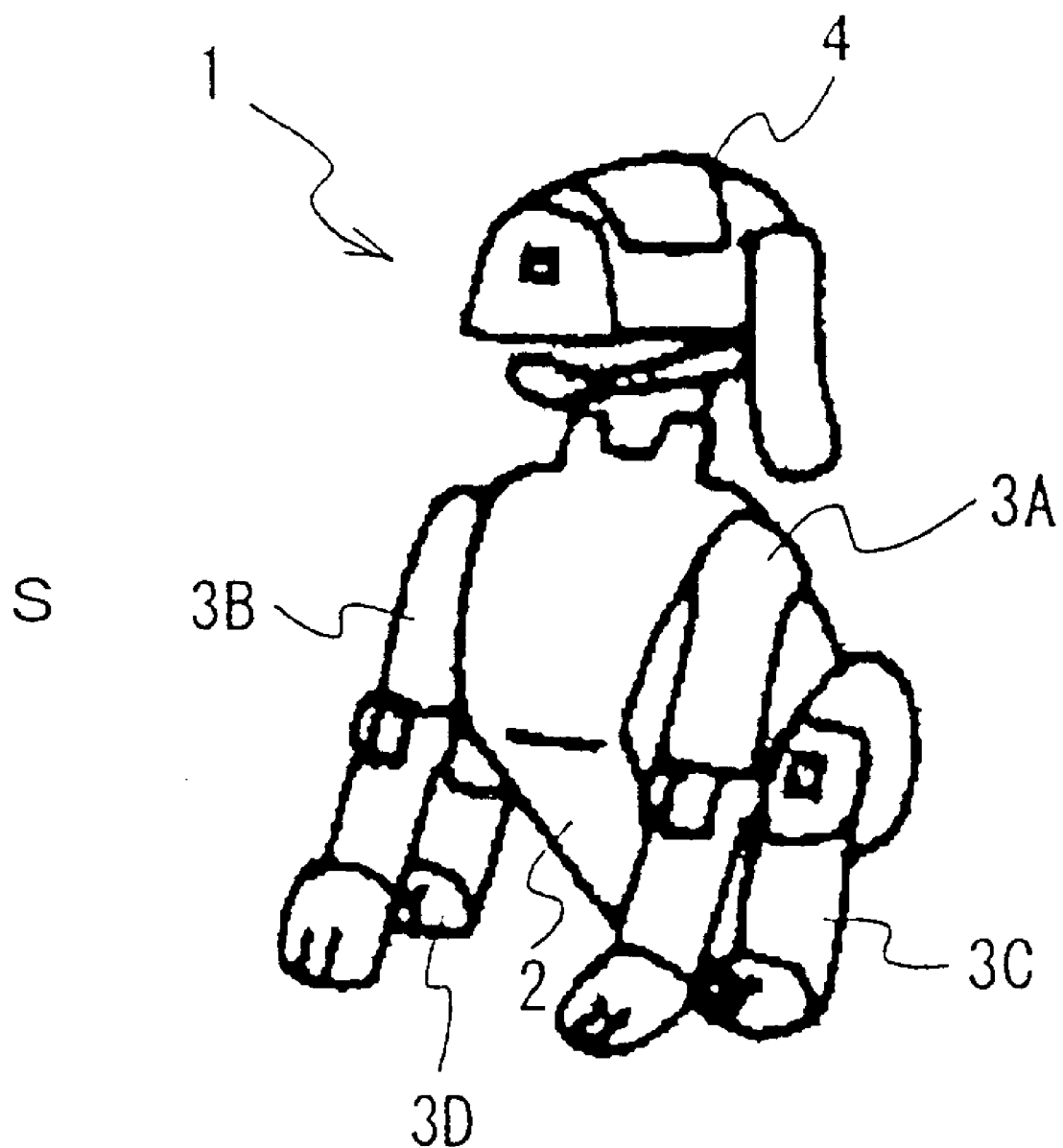

FIG. 154 is a schematic diagram illustrating the pet robot motion.

Figure 155:
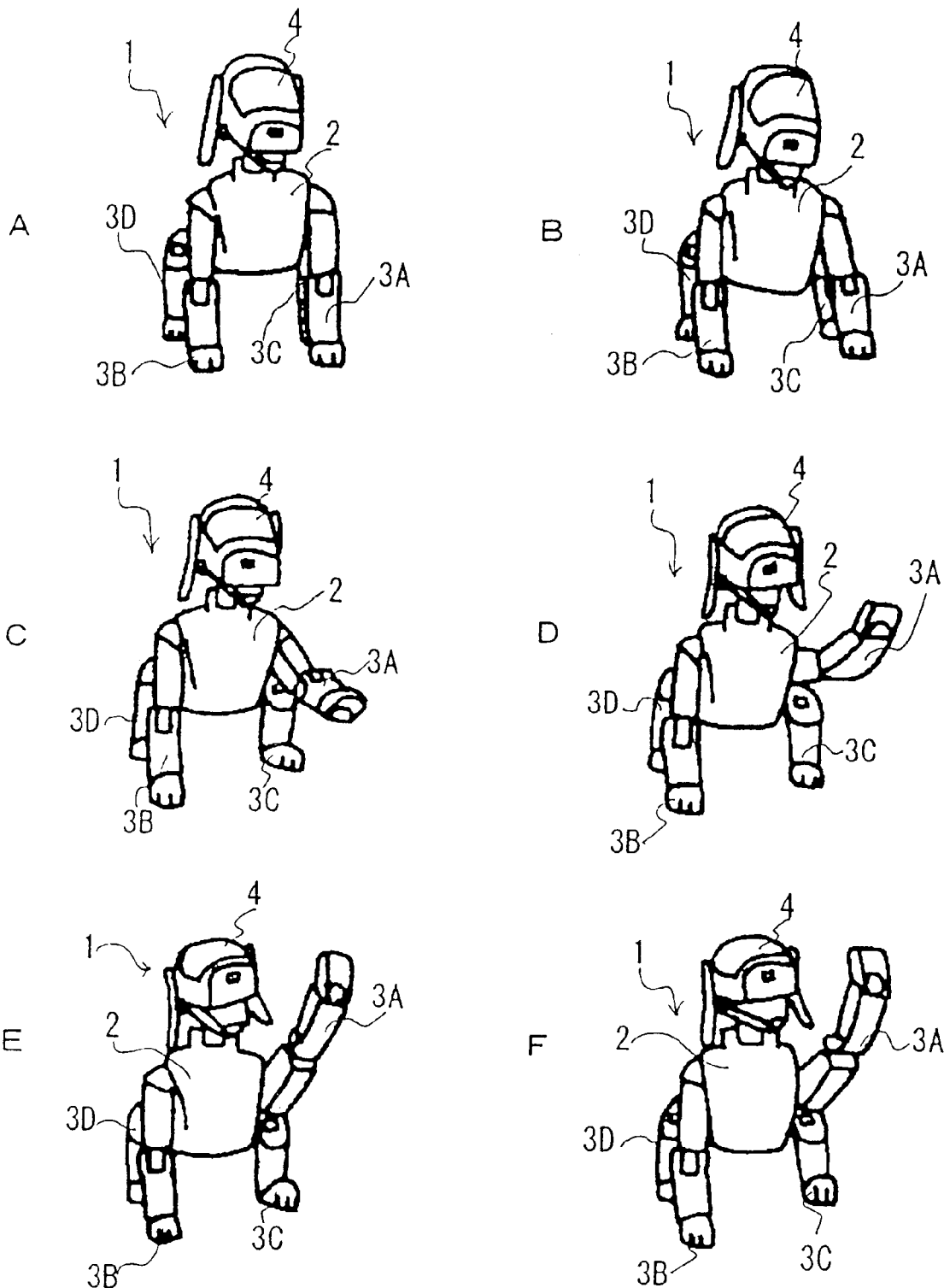

FIG. 155 is a schematic diagram illustrating the pet robot motion.

Figure 156:
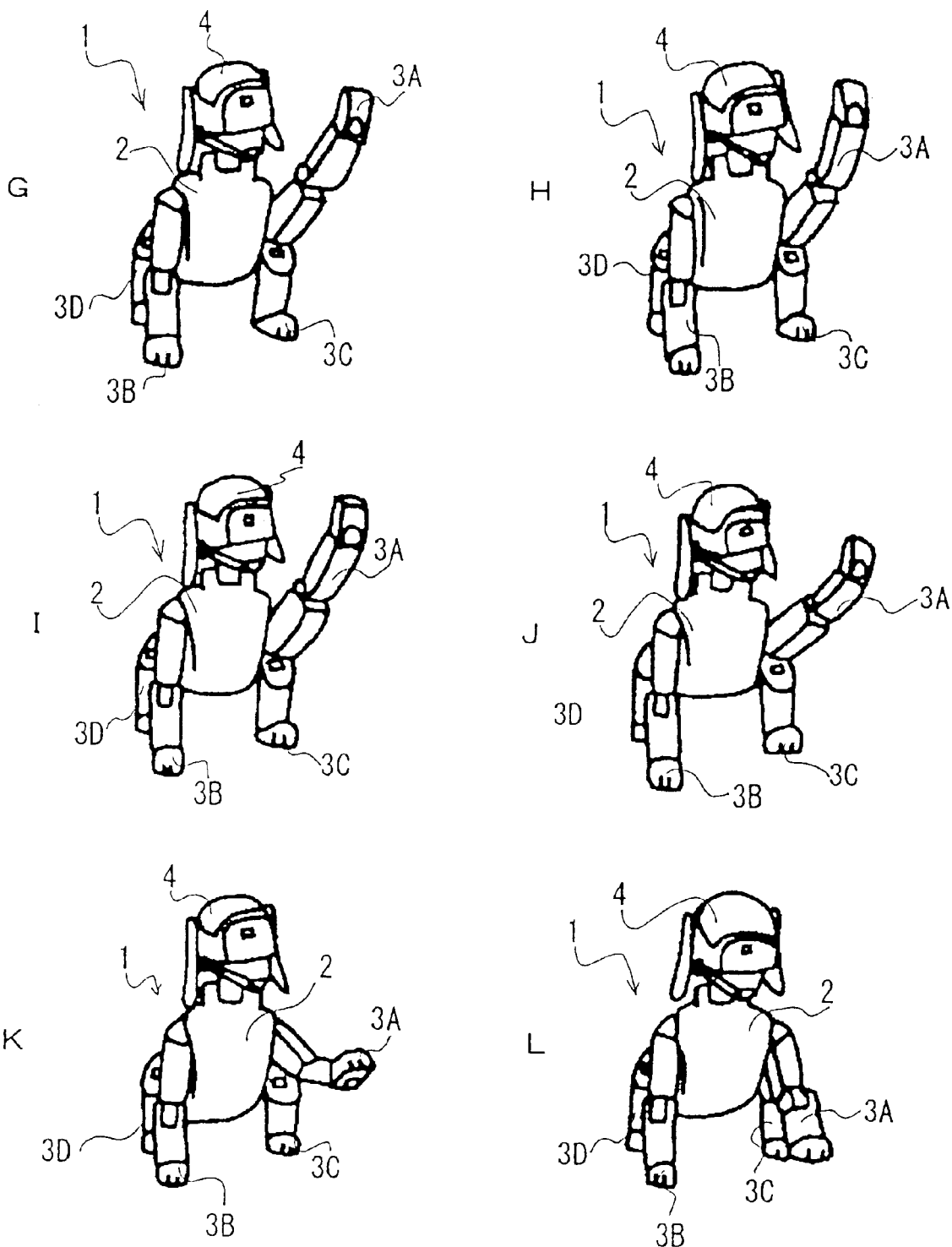

FIG. 156 is a schematic diagram illustrating the pet robot motion.

Figure 157:
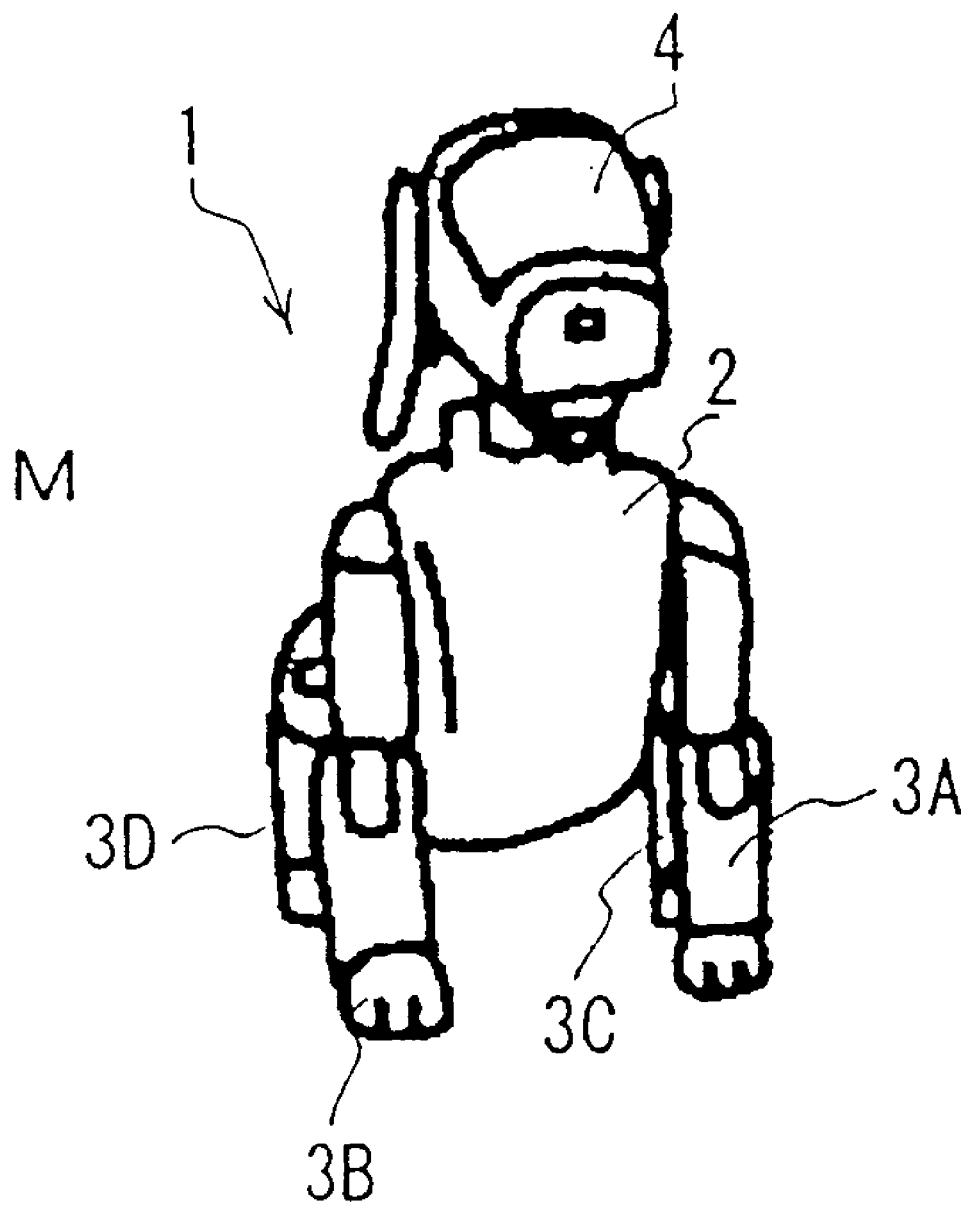

FIG. 157 is a schematic diagram illustrating the pet robot motion.

Figure 158:
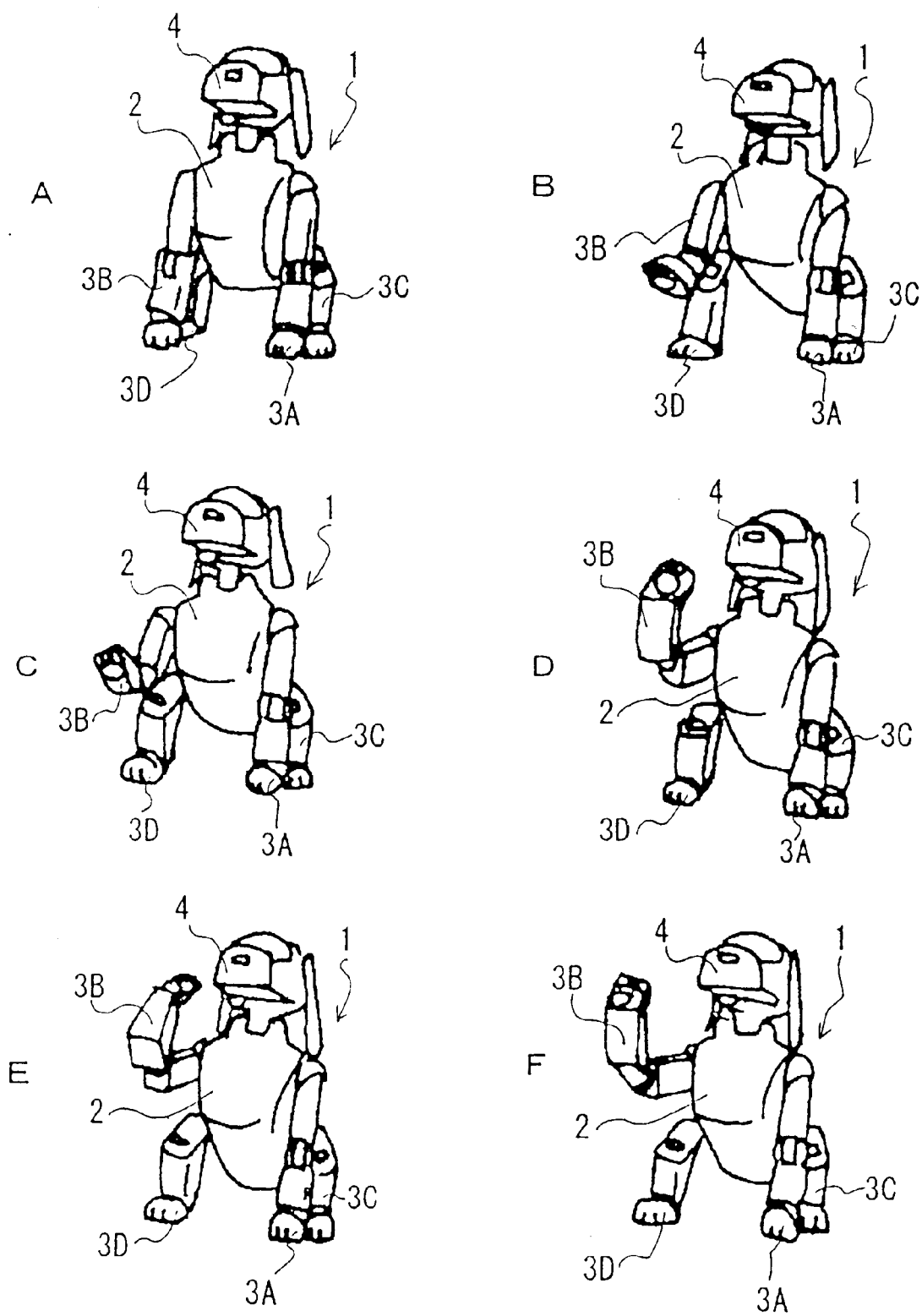

FIG. 158 is a schematic diagram illustrating the pet robot motion.

Figure 159:
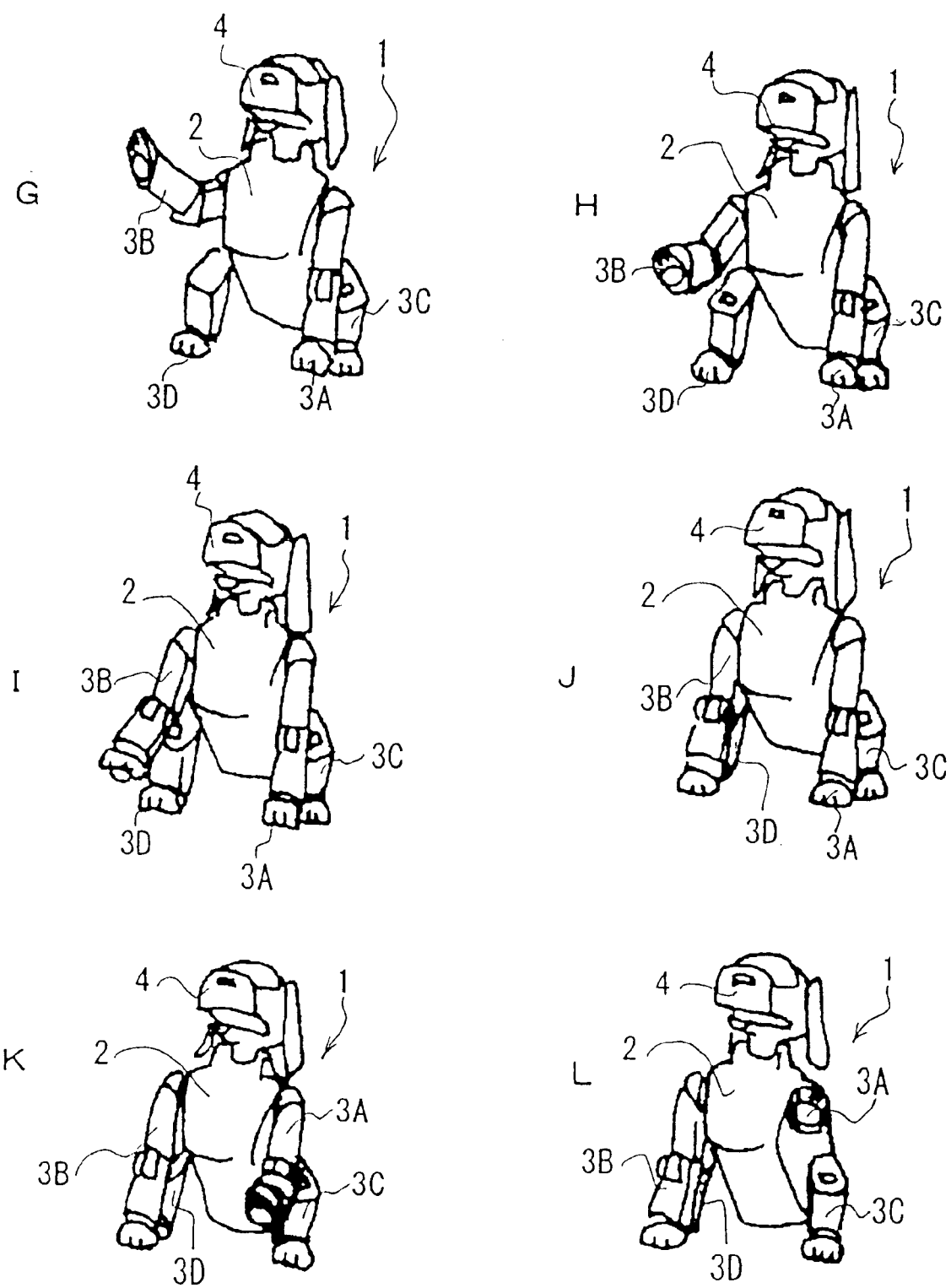

FIG. 159 is a schematic diagram illustrating the pet robot motion.

Figure 160:
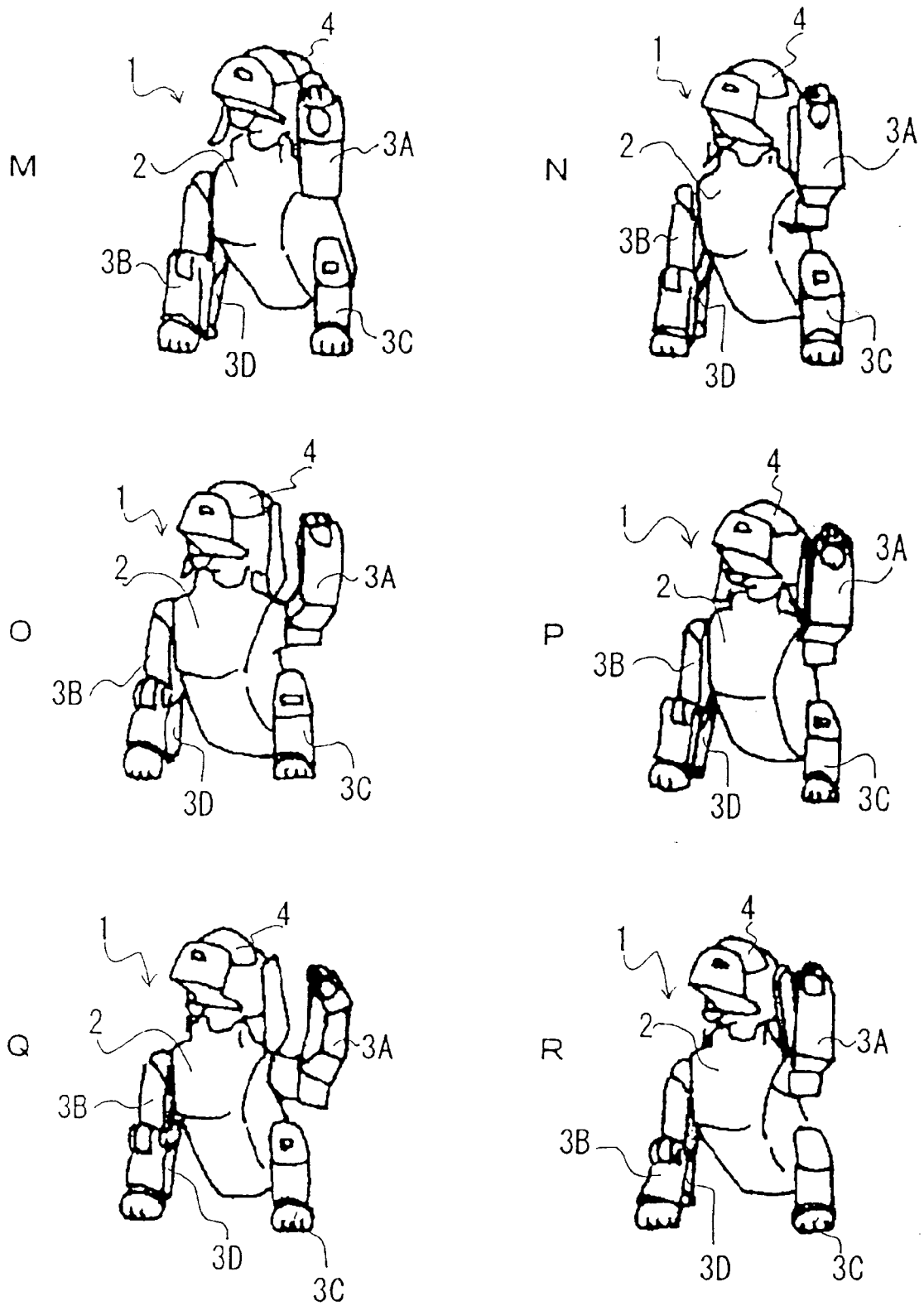

FIG. 160 is a schematic diagram illustrating the pet robot motion.

Figure 161:
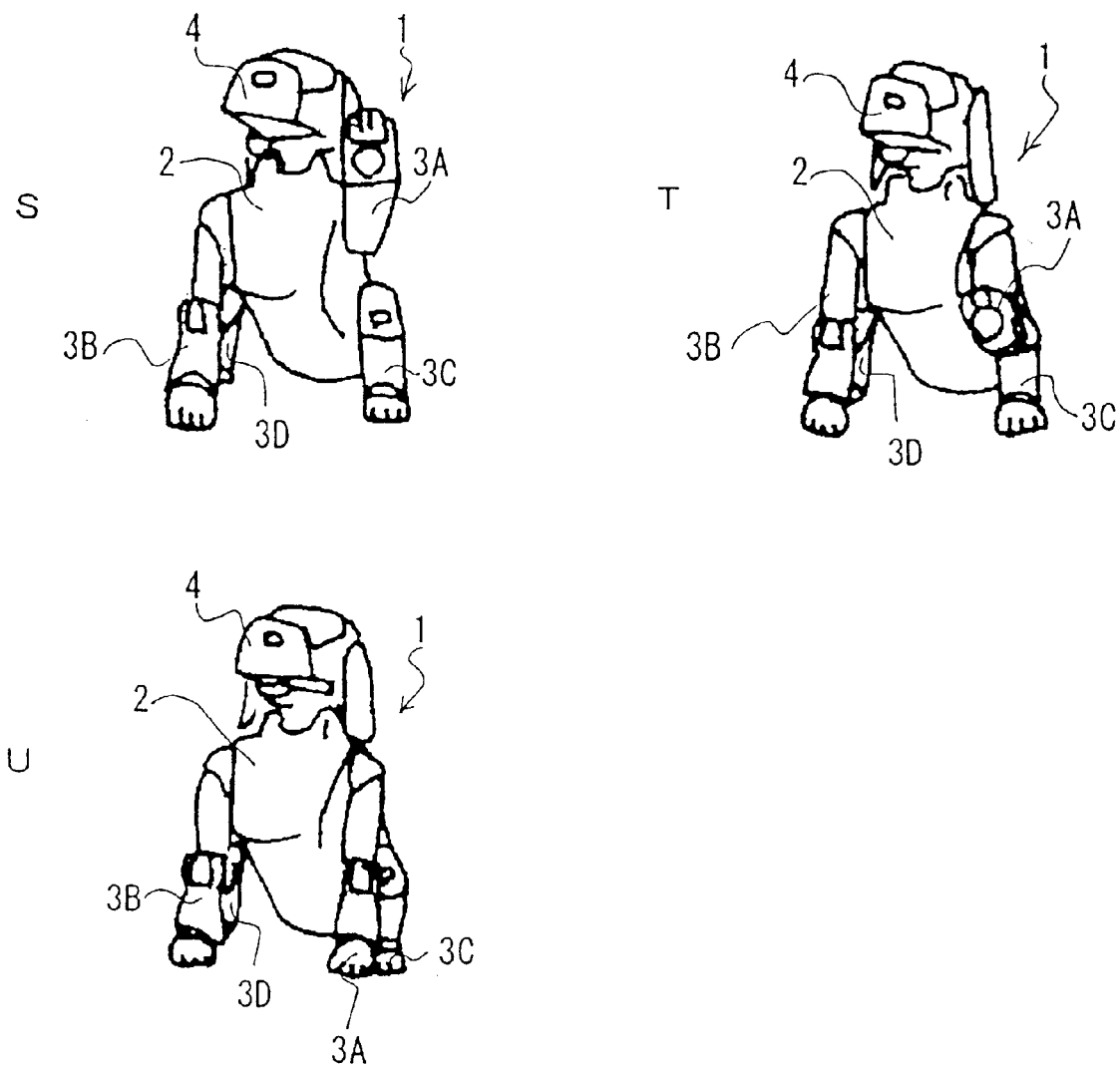

FIG. 161 is a schematic diagram illustrating the pet robot motion.

Figure 162:
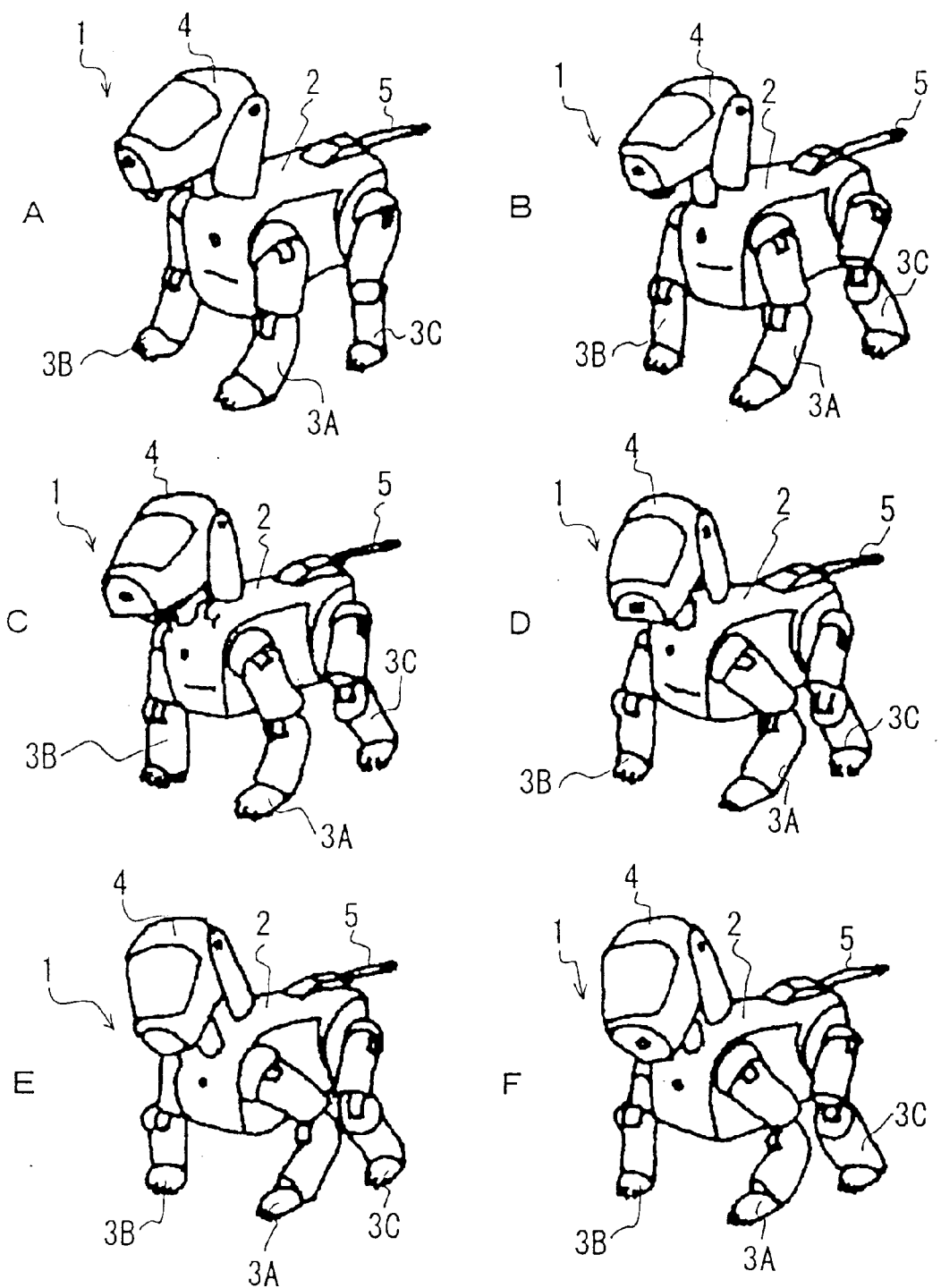

FIG. 162 is a schematic diagram illustrating the pet robot motion.

Figure 163:
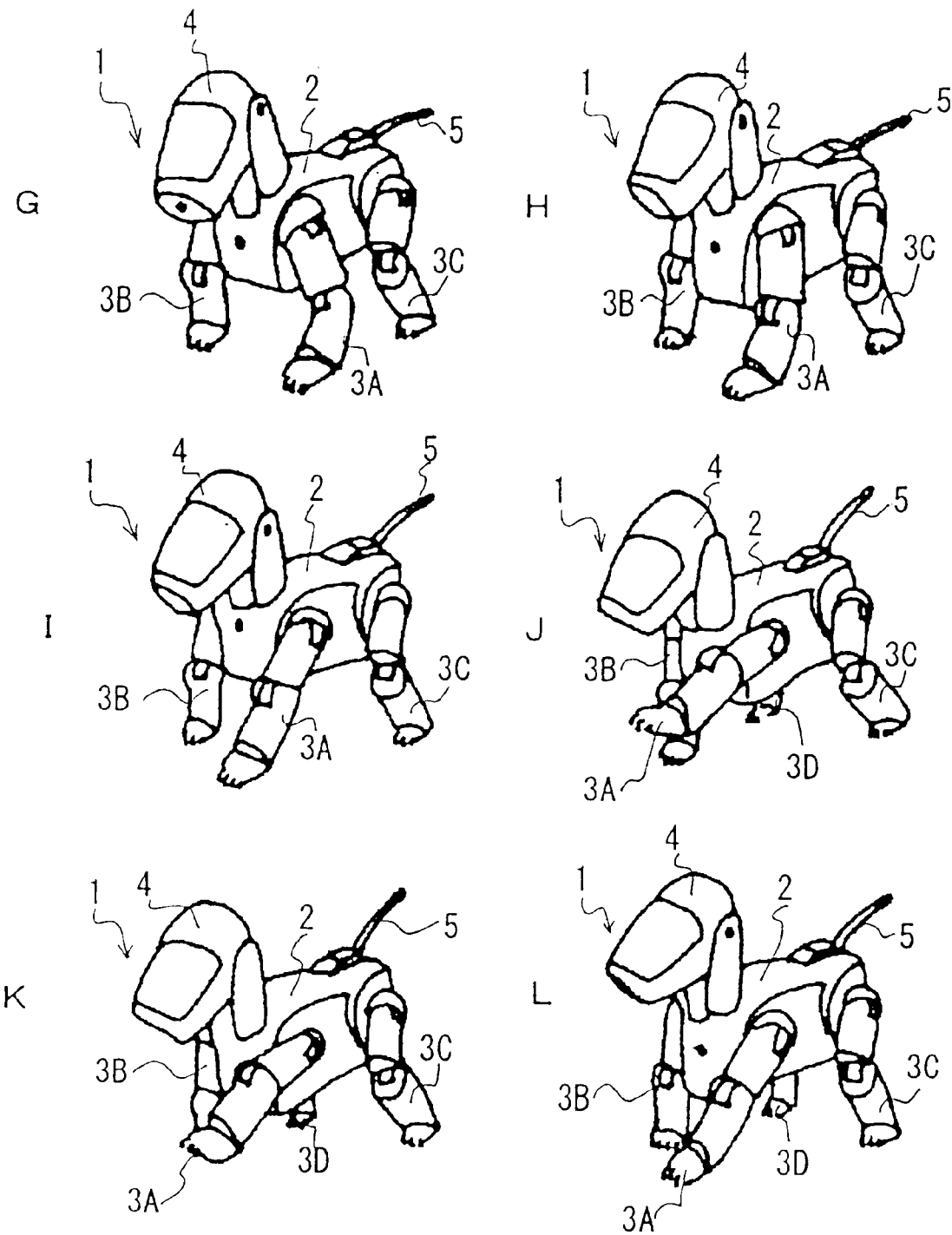

FIG. 163 is a schematic diagram illustrating the pet robot motion.

Figure 164:
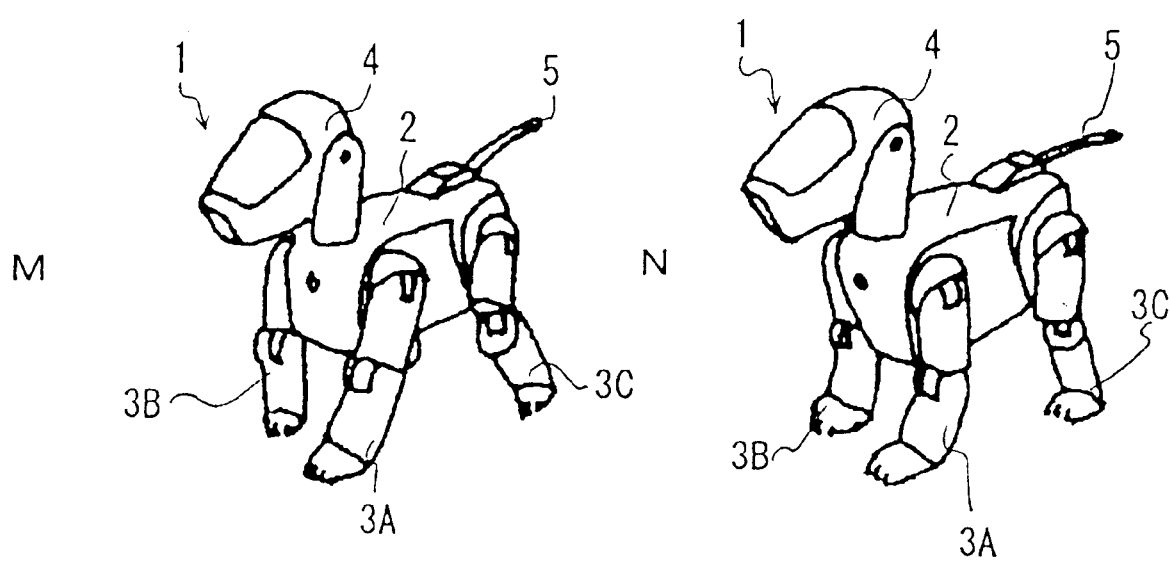

FIG. 164 is a schematic diagram illustrating the pet robot motion.

Figure 165:
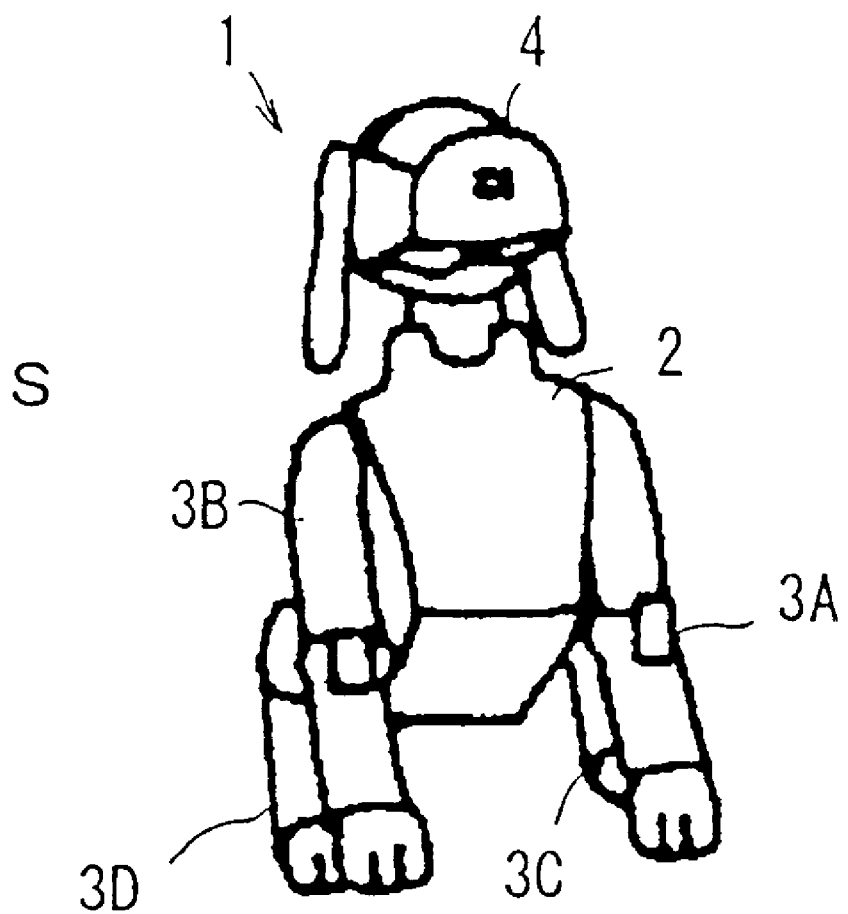

FIG. 165 is a schematic diagram illustrating the pet robot motion.

Figure 166:
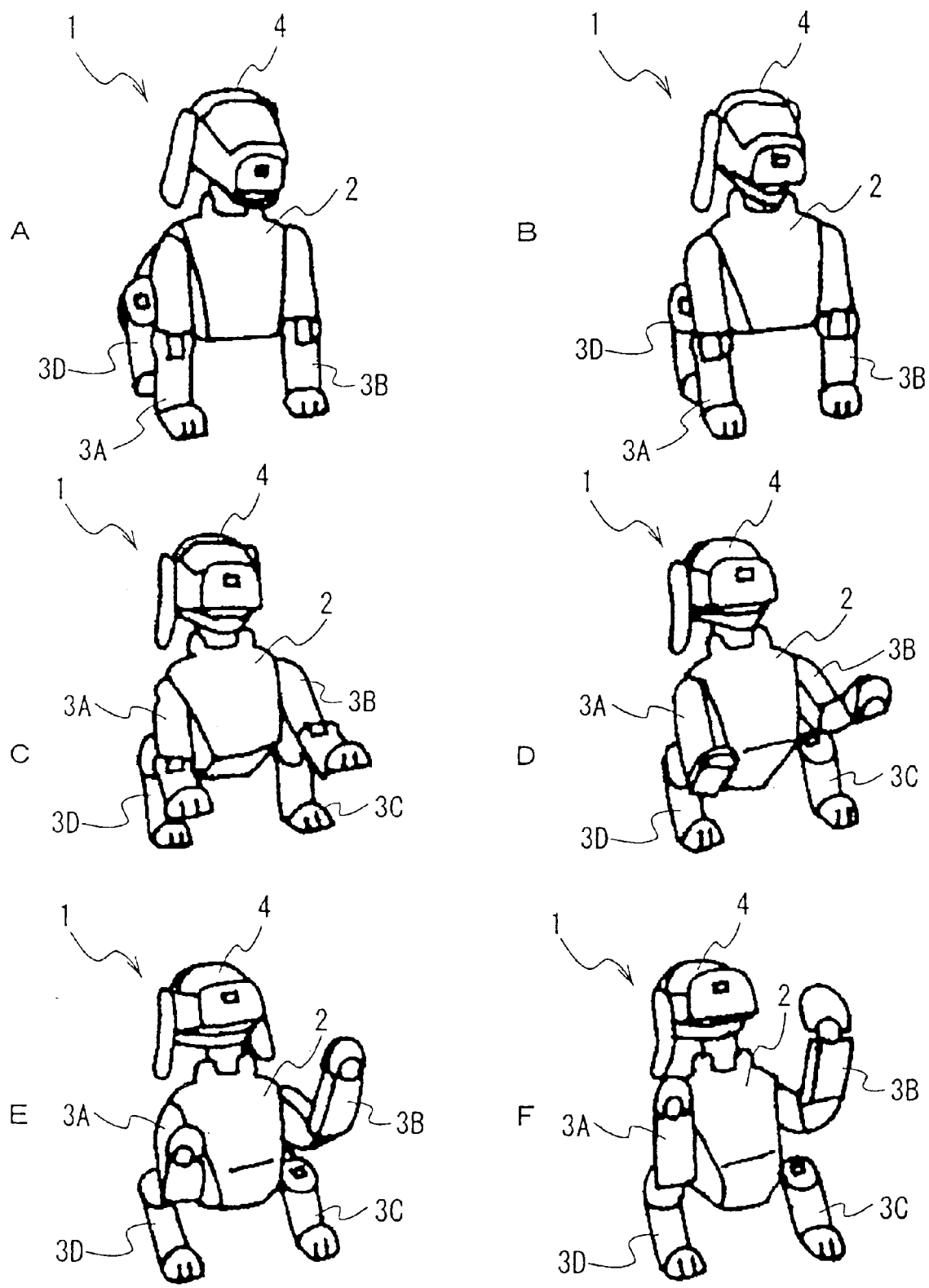

FIG. 166 is a schematic diagram illustrating the pet robot motion.

Figure 167:
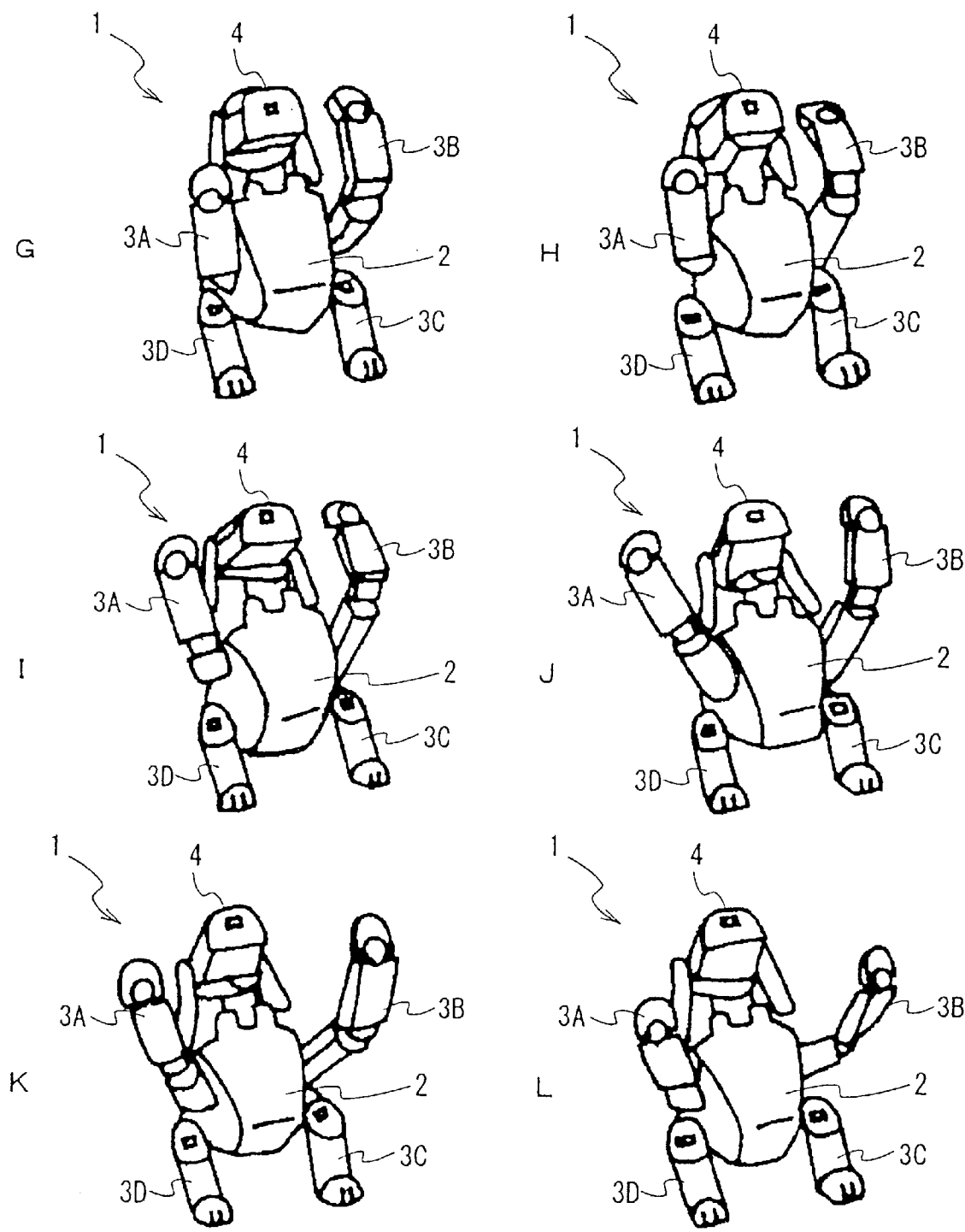

FIG. 167 is a schematic diagram illustrating the pet robot motion.

Figure 168:
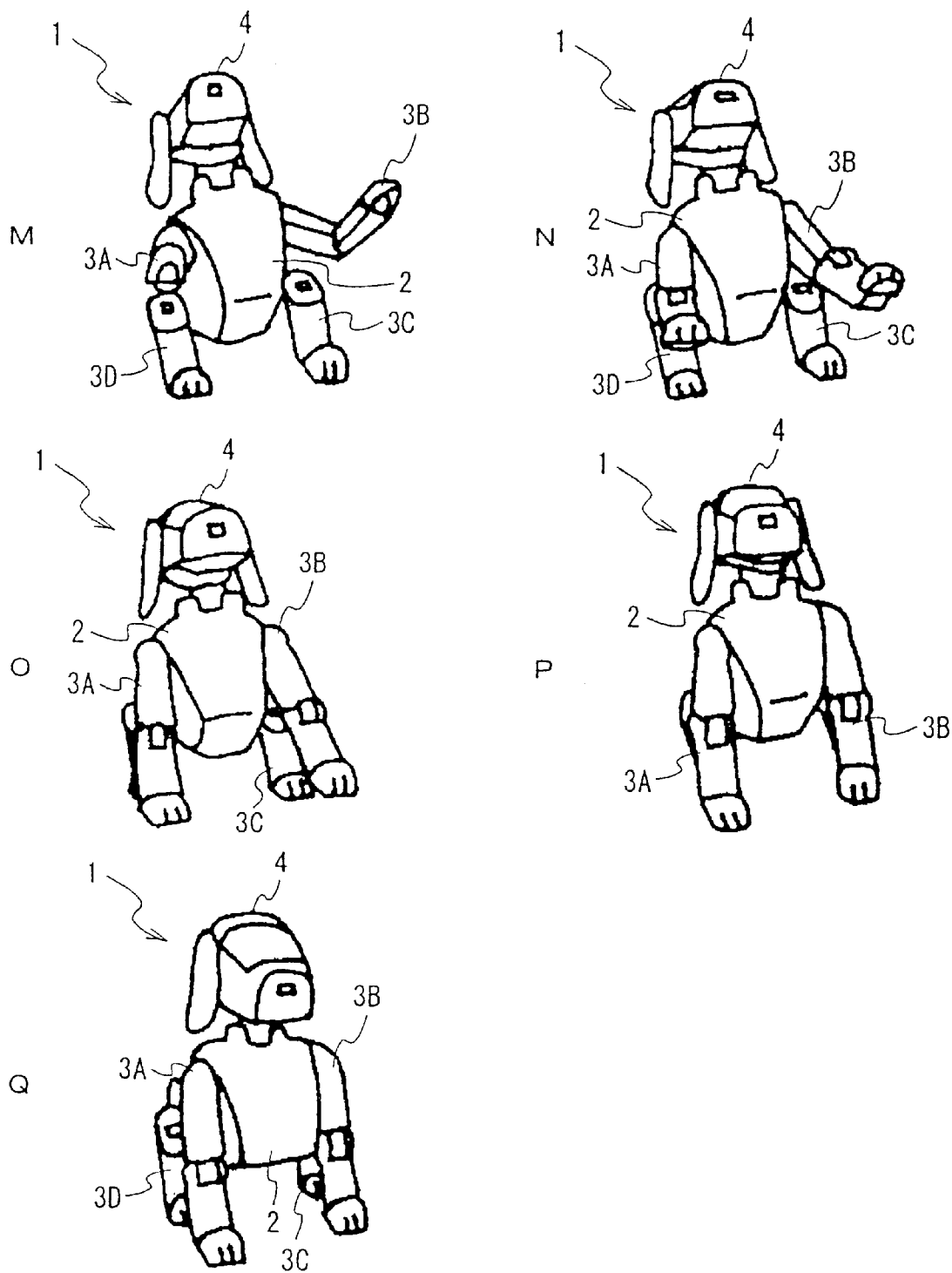

FIG. 168 is a schematic diagram illustrating the pet robot motion.

Figure 169:
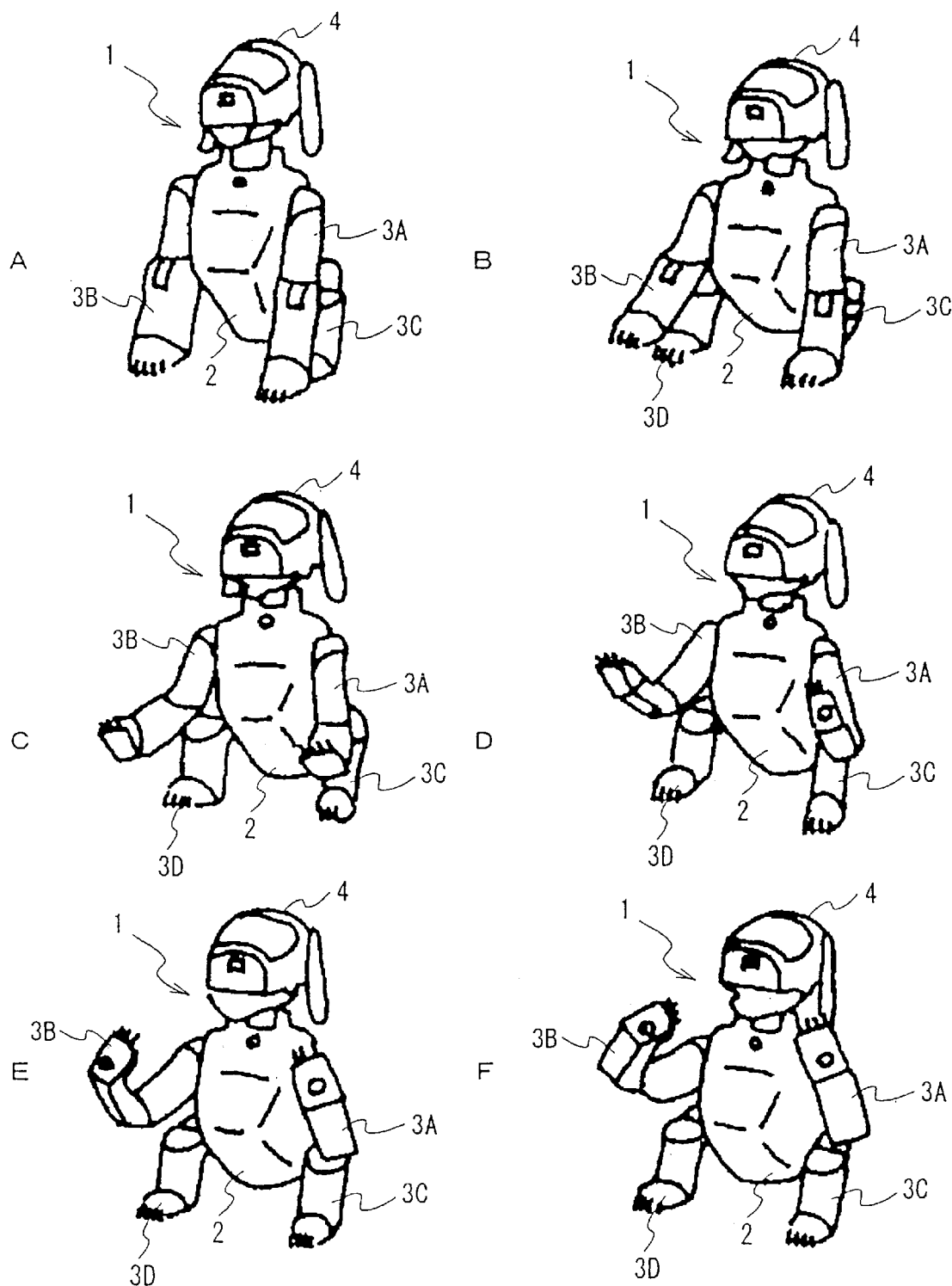

FIG. 169 is a schematic diagram illustrating the pet robot motion.

Figure 170:
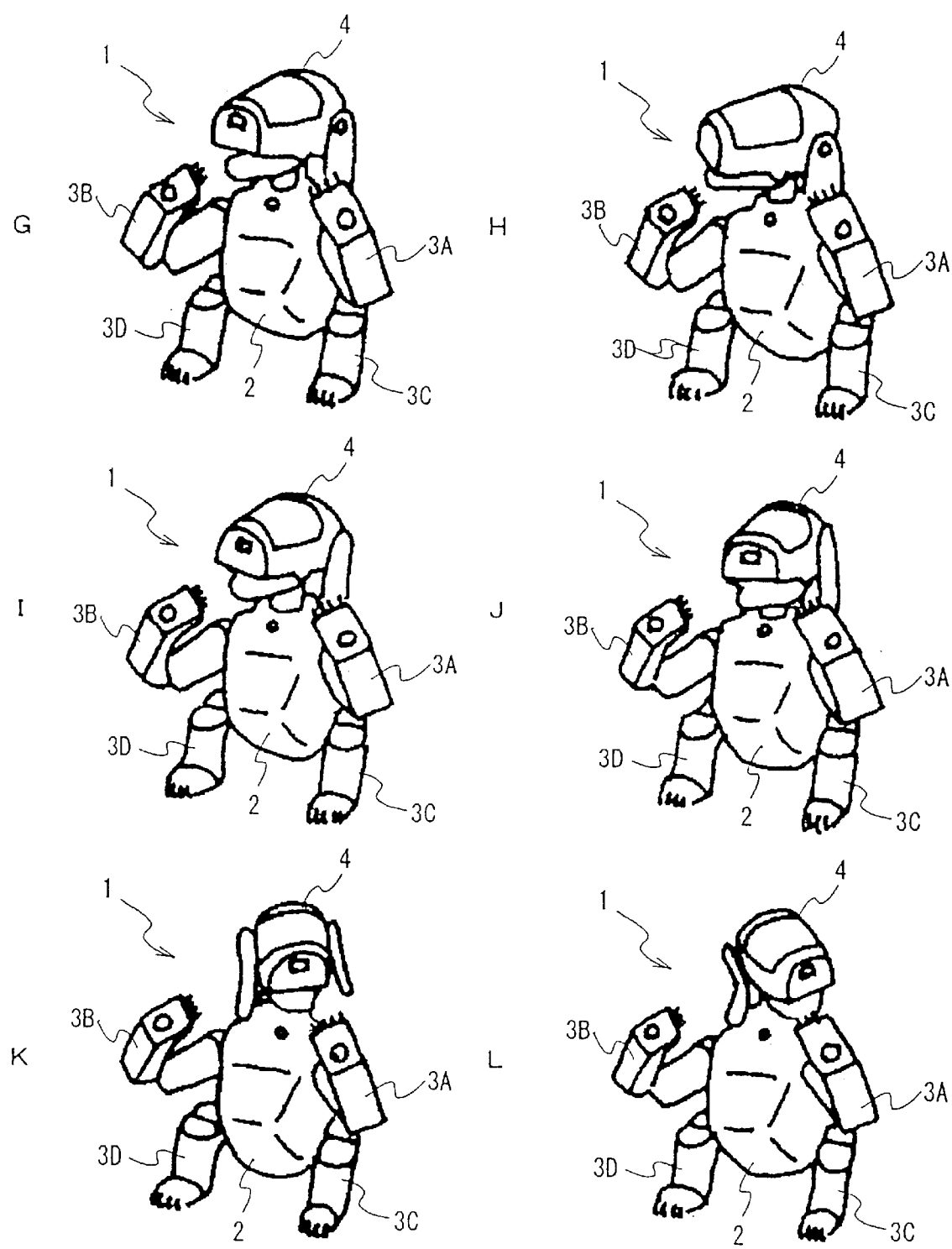

FIG. 170 is a schematic diagram illustrating the pet robot motion.

Figure 171:
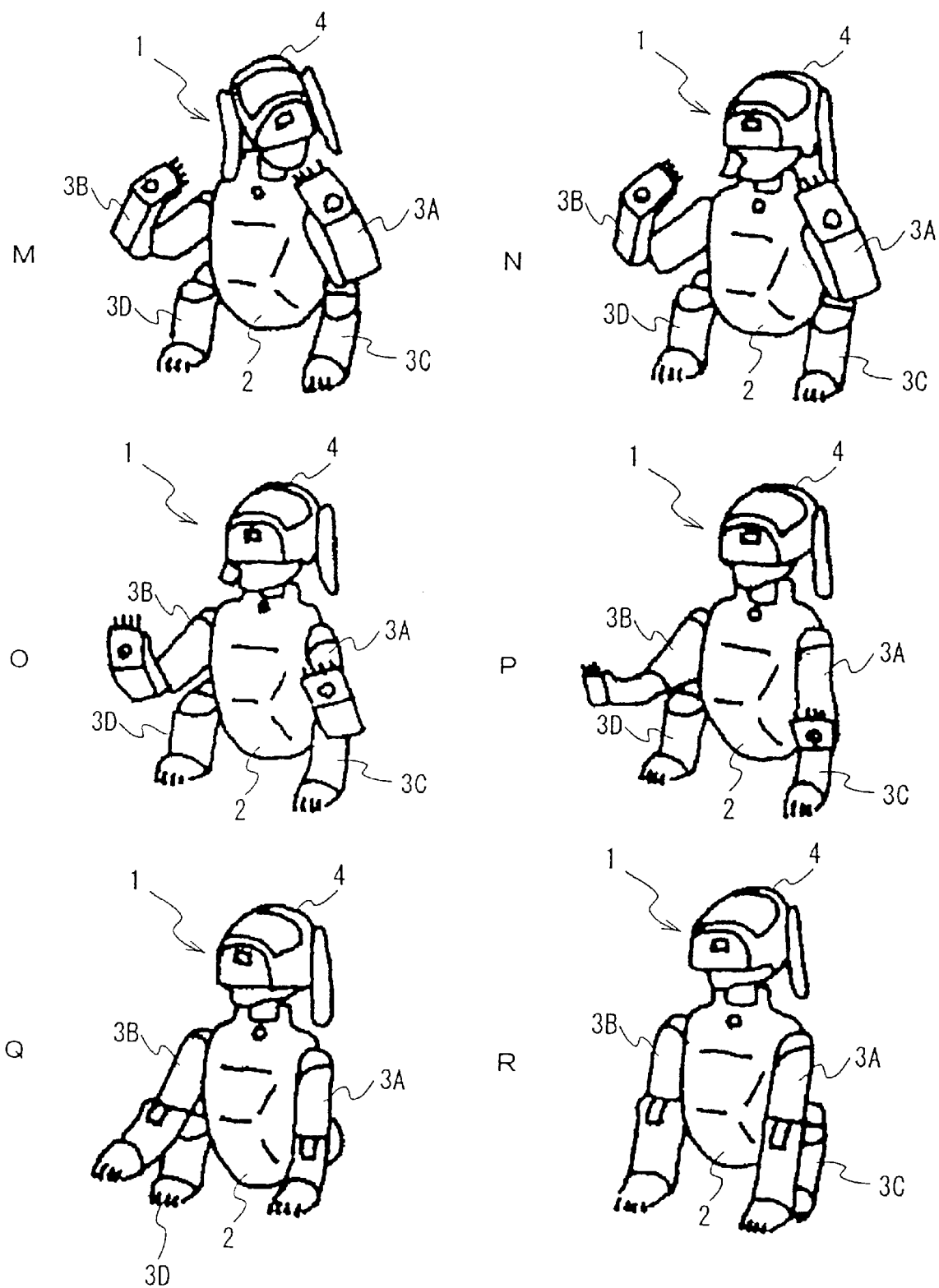

FIG. 171 is a schematic diagram illustrating the pet robot motion.

Figure 172:
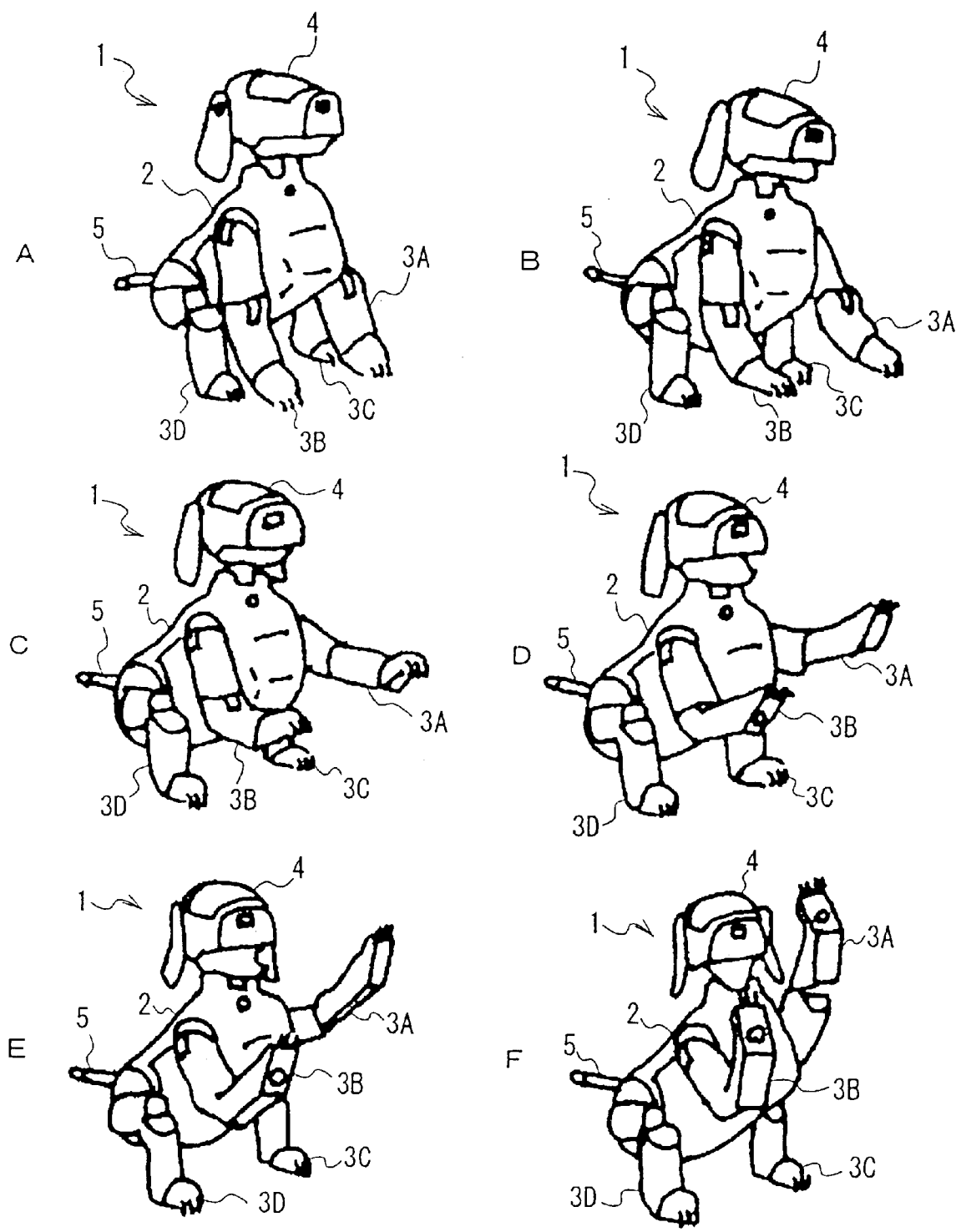

FIG. 172 is a schematic diagram illustrating the pet robot motion.

Figure 173:
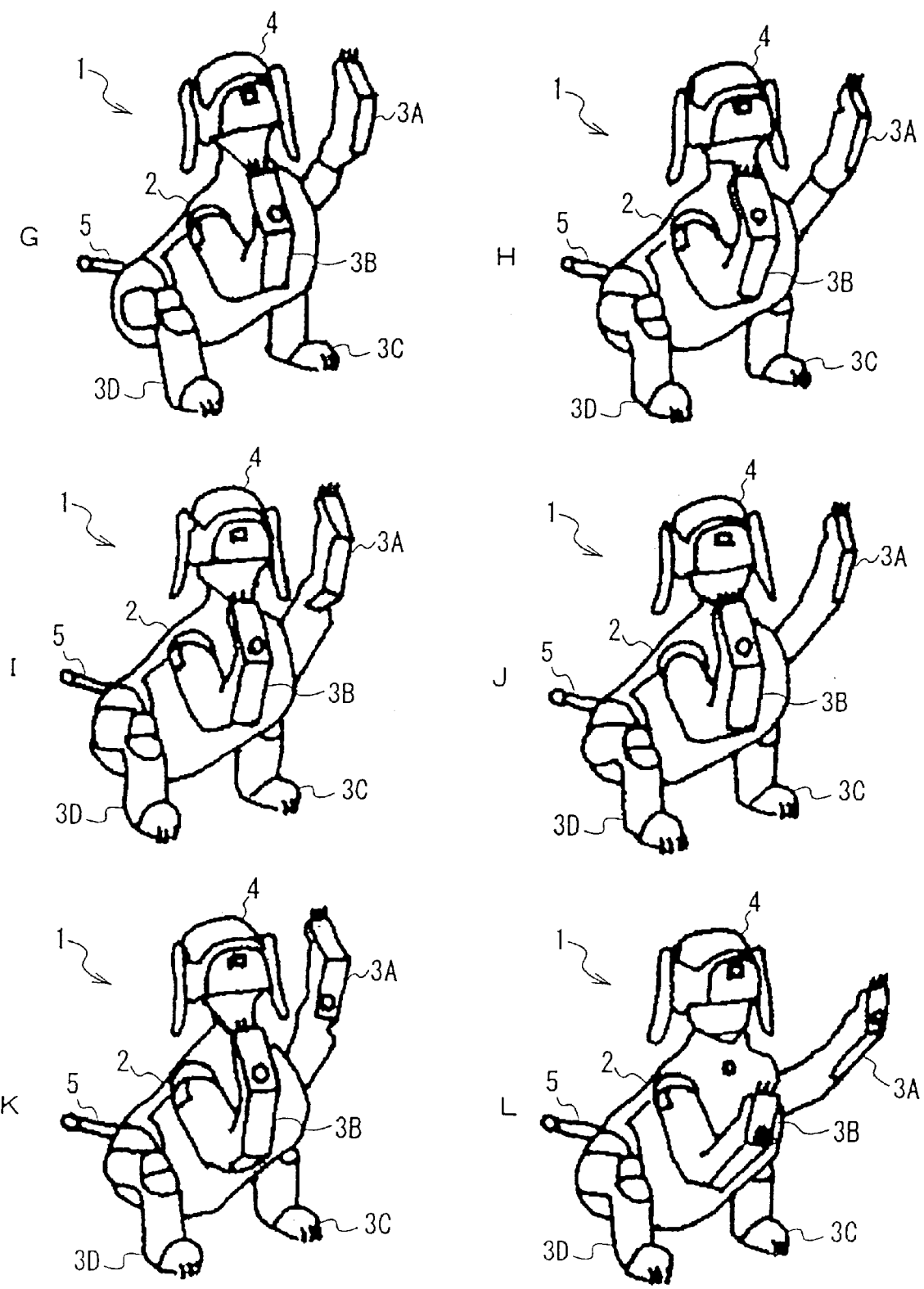

FIG. 173 is a schematic diagram illustrating the pet robot motion.

Figure 174:
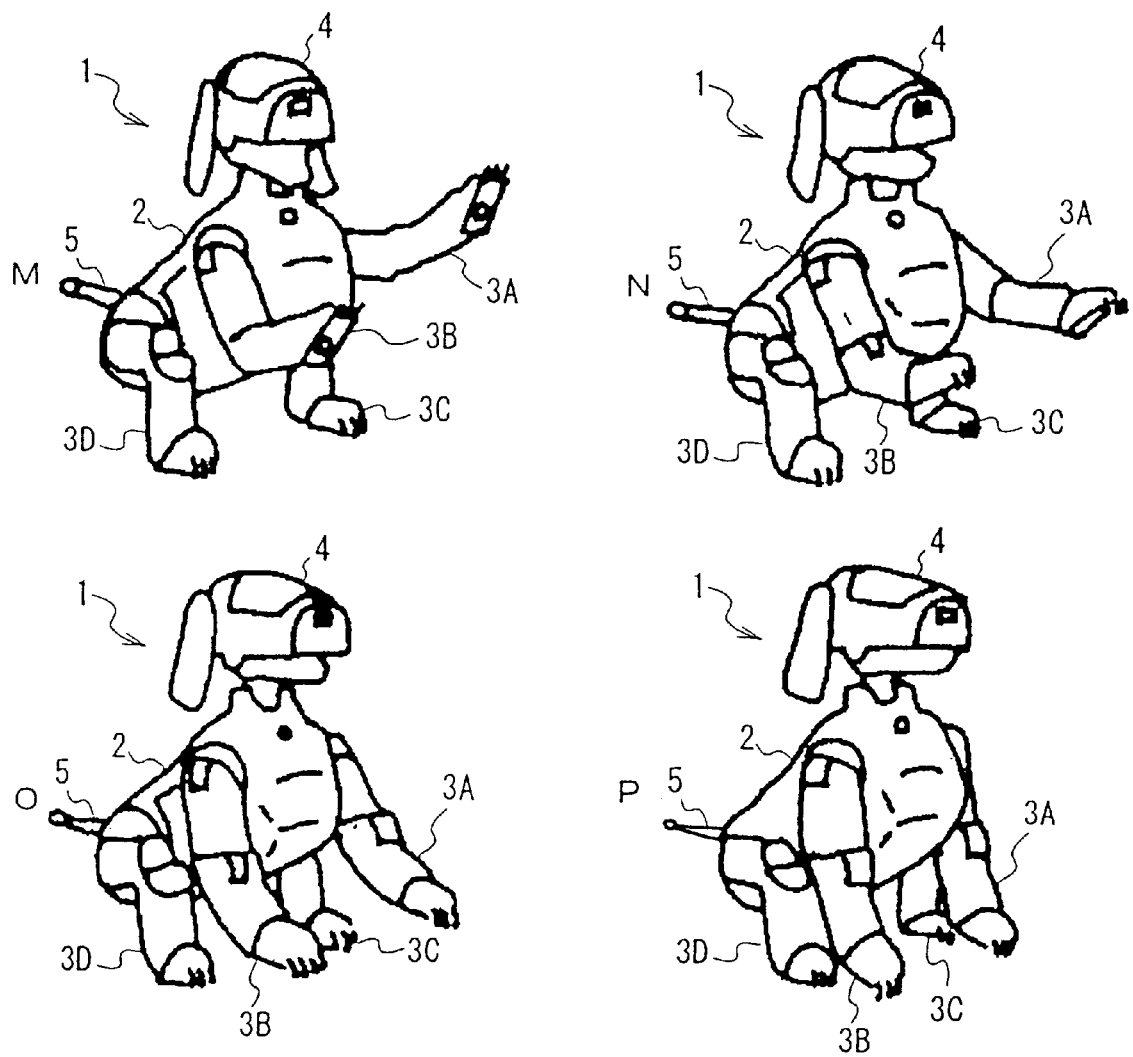

FIG. 174 is a schematic diagram illustrating the pet robot motion.

Figure 175:
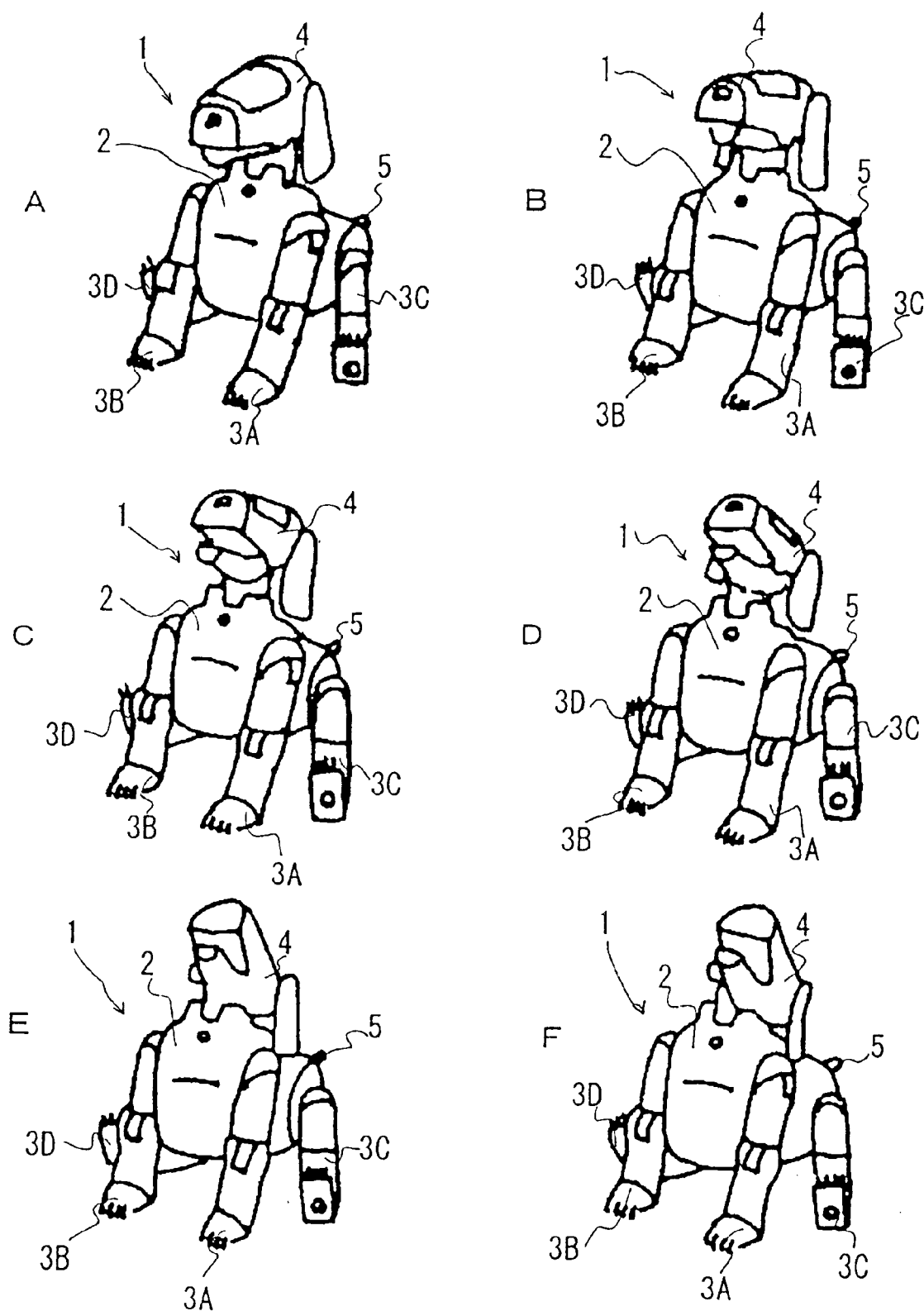

FIG. 175 is a schematic diagram illustrating the pet robot motion.

Figure 176:
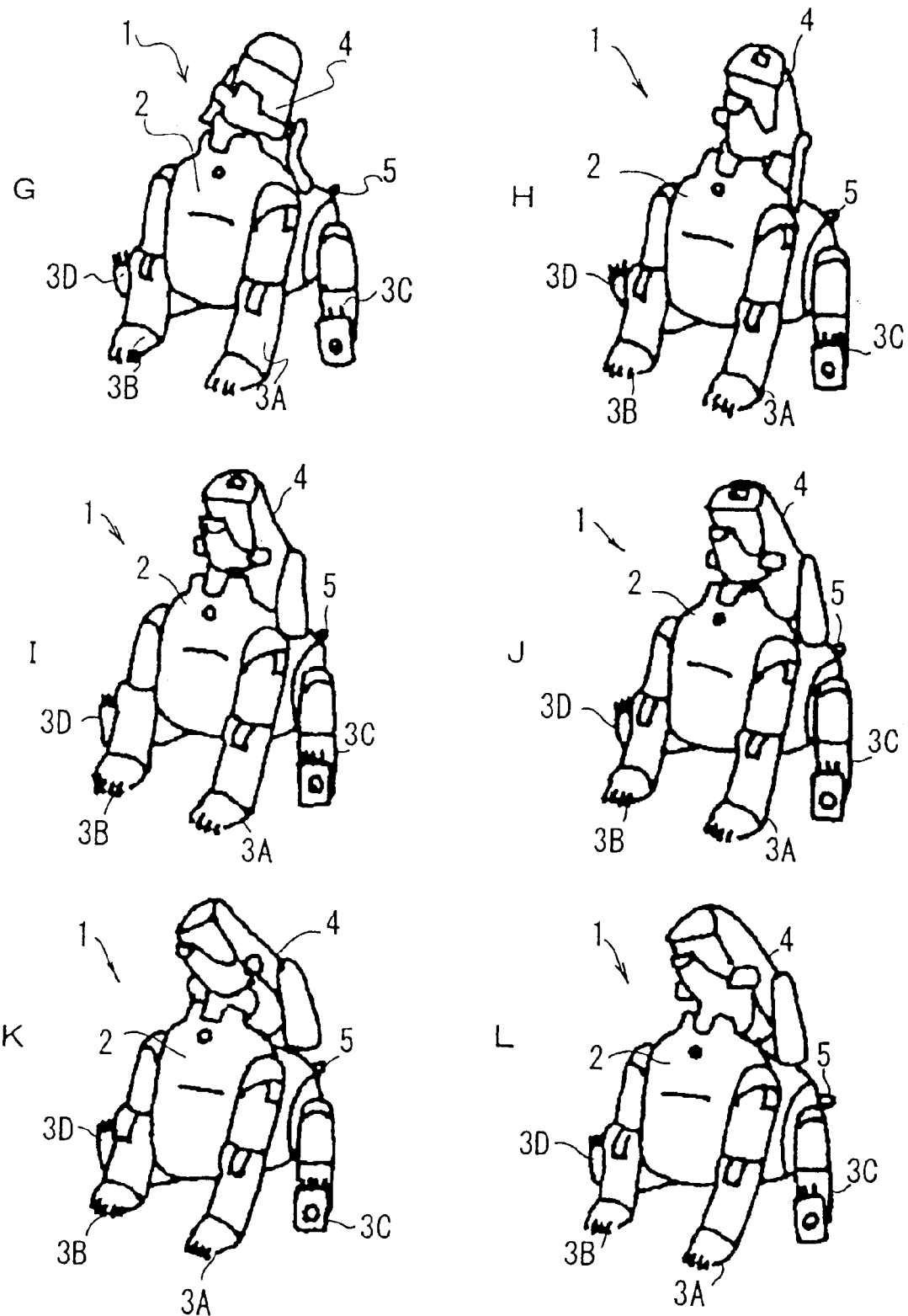

FIG. 176 is a schematic diagram illustrating the pet robot motion.

Figure 177:
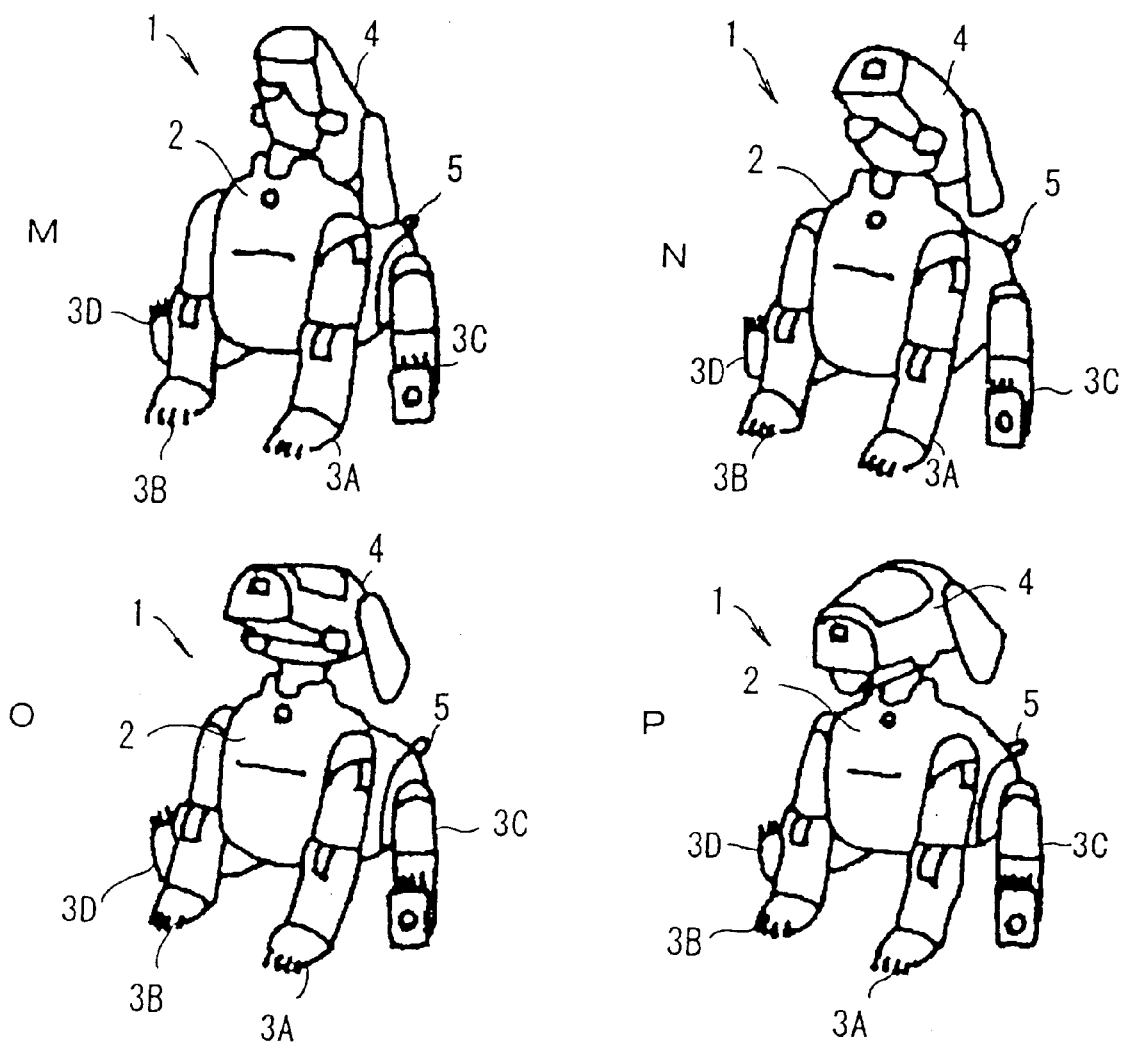

FIG. 177 is a schematic diagram illustrating the pet robot motion.

BEST MODE FOR CARRYING OUT THE INVENTION

Referring now to the drawings, an embodiment of the present invention will be described in detail below.

(1) Arrangement of Pet Robot 1 According to the Embodiment

Figure 1:
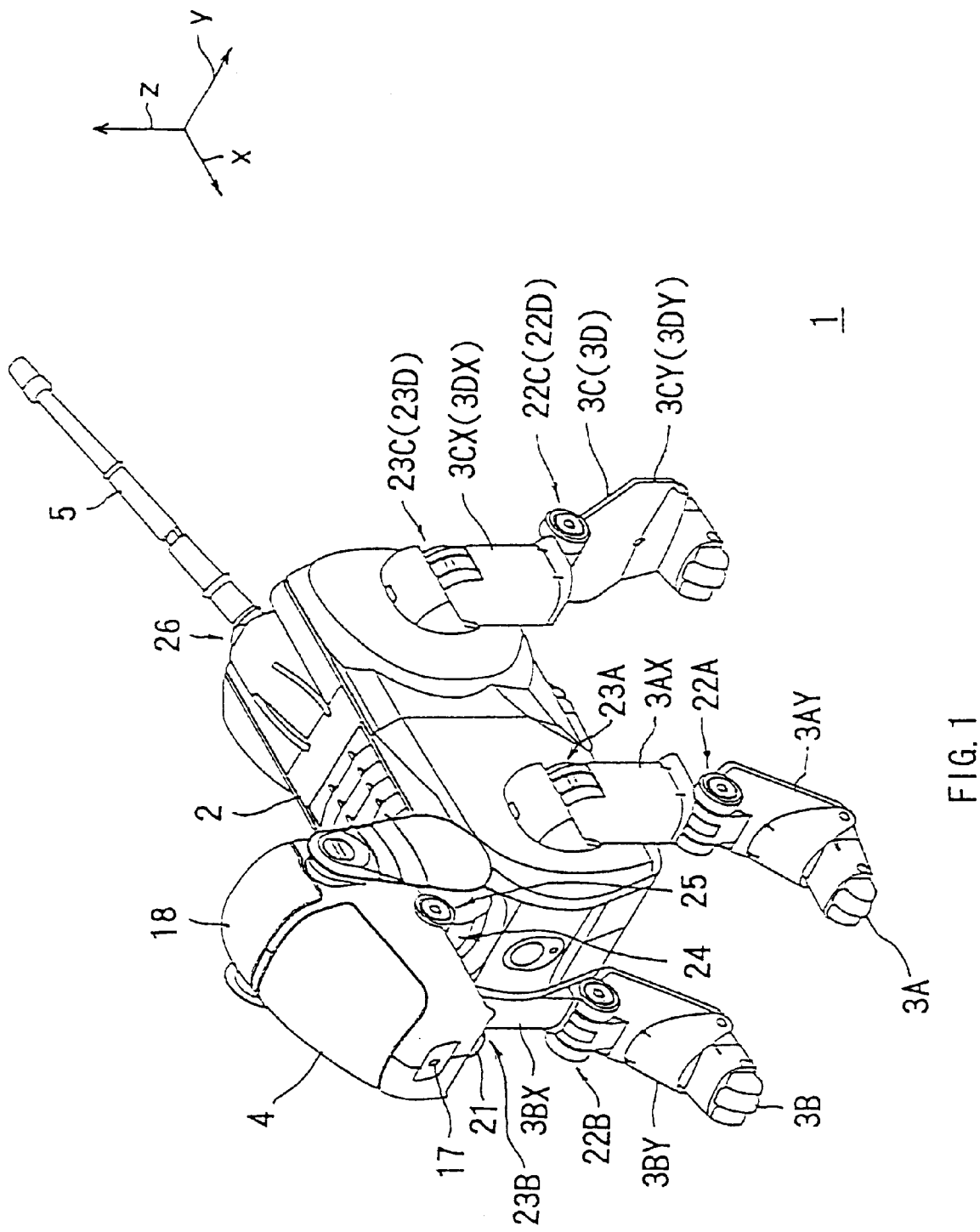
FIG. 1 is a perspective view showing an arrangement of a pet robot of the embodiment.

In FIG. 1, a reference numeral 1 generally indicates a pet robot according to the embodiment, which robot is arranged by connecting legs 3A through 3D to a body 2 at its front right, front left, rear right, and rear left, a head 4 to the front end of the body 2, and a tail 5 to the rear end of the body 2.

Figure 2:
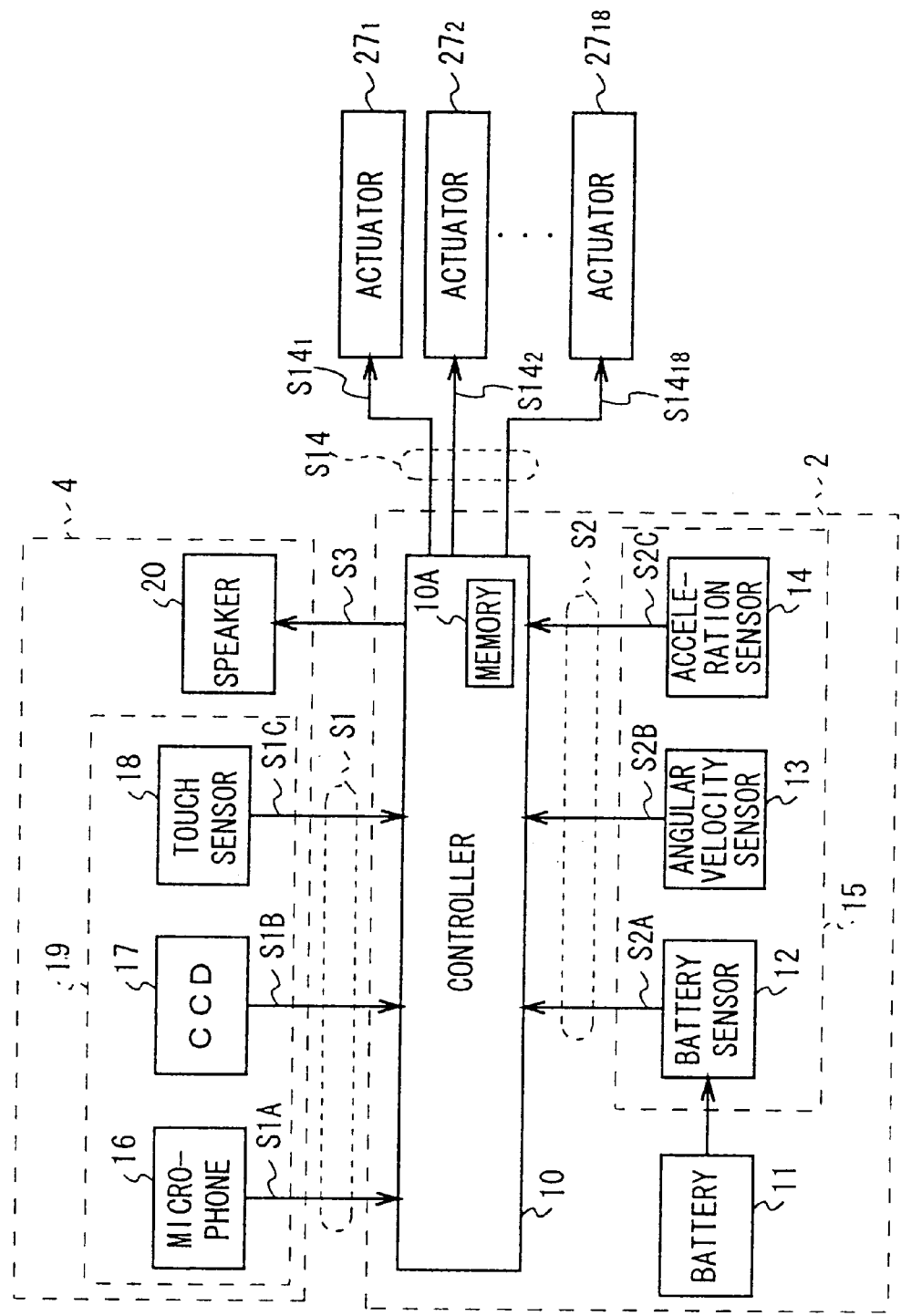
FIG. 2 is a perspective view showing an arrangement of a pet robot of the embodiment.

As shown in FIG. 2, the body 2 contains a controller 10 which controls all actions of the pet robot 1, a battery 11 serving as a power source for the pet robot 1, an internal sensor unit 14 consisting of a battery sensor 11, an angular velocity sensor 12, an acceleration sensor 13, etc., and the like.

The head 4 is provided in predetermined positions with a microphone 16 functioning as the ears of the pet robot 1, an external sensor unit 19 functioning as the eyes which consists of a CCD (charge coupled device) camera 17, a touch sensor 18, etc., a speaker 20 functioning as a mouth, a mouth member 21 functioning as the apparent mouth of the pet robot 1, LEDs (light-emitting diodes), not shown, functioning as the apparent eyes, and the like.

Lap joint mechanisms 22A through 22D which connect thighs 3AX through 3DX and shanks 3AY through 3DY together in the legs 3A through 3D, shoulder joint mechanisms 23A through 23D which connect the legs 3A through 3D and the body 2 together, a neck joint mechanism 24 which connects the body 2 and head 4 together, a chin joint mechanism 25 which opens or closes the mouth member 21, a tail joint mechanism 26 which connects the body 2 and tail 5 together are provided with as many actuators $27_1$ through $27_{18}$ as degrees of freedom required.

The microphone 16 in the external sensor unit 19 collects sound of the directions "Walk," "Lie down," "Follow the ball," etc. given as scales through a sound commander, not shown, by the user and transmits an audio signal S1A obtained to a controller 10. The CCD camera 17 shoots surrounding scenes and transmits a visual signal S1B obtained to the controller 10.

As is clear from FIG. 1, the touch sensor 18 is provided on top of the head 4. The sensor detects pressure due to the user's physical actions, such as stroking and patting, and transmits the result as a pressure detection signal S1C to the controller 10.

The battery sensor 12 in the internal sensor unit 15 detects the amount of residual charge in the battery 11 and transmits the result as a battery residual charge detection signal S2A to the controller 10. The angular velocity sensor 13 detects angular velocity for three axes (x, y, and z) and transmits the result as an angular velocity detection signal S2B to the controller 10. The acceleration sensor 14 detects acceleration for the three axes (x, y, and z) and transmits the result as an acceleration detection signal S2C to the controller 10.

Based on the audio signal S1A, visual signal S1B, and pressure detection signal S1C (these signals are hereinafter called external sensor signals S1 collectively) fed from the microphone 16, CCD camera 17, and touch sensor 18 in the external sensor unit 19, respectively, and the battery residual charge detection signal S2A, angular velocity detection signal S2B, and acceleration detection signal S2C (these signals are hereinafter called internal sensor signals S2 collectively) fed from the battery sensor 12, angular velocity sensor 13, and acceleration sensor 14 in the internal sensor unit 15, the controller 10 determines the situation around and in the pet robot 1 and whether the user acts toward the robot.

Based on the results of determination and a control program stored in memory 10A, the controller 10 determines an action which the robot is to perform and drives actuators $27_1$ through $27_n$ according to the action to make the robot perform actions, such as vertically and horizontally swinging the head 4, wagging the tail 5, walking on the legs 3A through 3D.

The controller 10 feeds a predetermined audio signal S3 to the speaker 20 as required to output sound based on the audio signal S3 and flash on and off the LEDs as the apparent eyes.

As described above, the pet robot 1 is adapted to independently act based on the surrounding environment, its own condition, and a direction from the user or his or her action.

The lap joint mechanisms 22A through 22D in the legs 3A through 3D of the pet robot 1 has a degree of freedom of rotation about a pitch axis parallel to an arrow y in FIG. 1, and the shoulder joint mechanisms 23A through 23D freely rotate about the pitch axis parallel to the arrow y in FIG. 1 and a roll axis parallel to an arrow x in FIG. 1.

This allows the pet robot 1 to move the laps in the legs 3A through 3D in forward and backward directions (the forward direction is indicated by the arrow x) within a predetermined range and the entire legs 3A through 3D in the forward and backward directions and rightward and leftward directions (the leftward direction is indicated by the arrow y) within predetermined ranges.

The neck joint mechanism 24 of the pet robot 1 freely rotates about the roll axis parallel to the arrow x, the pitch axis parallel to the arrow y, and a yaw axis parallel to an arrow z in FIG. 1. This allows the head 2 to move in the forward, backward, rightward, and leftward directions and an inclination direction within predetermined ranges.

The tail joint mechanism 26 of the pet robot 1 freely rotates about the roll axis parallel to the arrow x and the yaw axis parallel to the arrow z. This allows the tail 5 to move in the forward, backward, rightward, and leftward directions within predetermined ranges.

(2) Processing by the Controller 10

Processing by the controller 10, related to generation of action of the pet robot 1, will be specifically described below.

Figure 3:
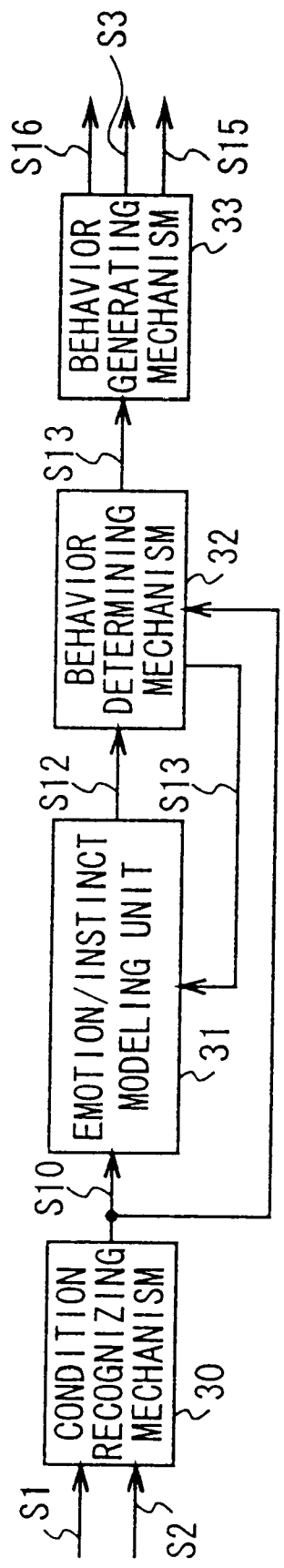
FIG. 3 is a block diagram illustrating processing by a controller.

As shown in FIG. 3, basic processing steps performed by the controller 10, which are related to generation of action of the pet robot 1, can be functionally assigned to a condition recognizing mechanism 30 which recognizes condition, an emotion/instinct modeling unit 31 which determines the emotional and instinctive condition of the pet robot 1 based on recognition by the condition recognizing mechanism 30, a behavior determining mechanism 32 which determines an action based on recognition by the condition recognizing mechanism 30 and emotion and instinct modeled by the emotion/instinct modeling unit 31, and a behavior generating mechanism 33 which makes the pet robot 1 behave or act based on determination by the behavior determining mechanism 32.

Based on the external information signals S1 from the external sensor unit 19 (FIG. 2) and the internal information signals S2 from the internal sensor unit 15, the condition recognizing mechanism 30 recognizes the condition of surroundings and the pet robot and a direction from the user or his or her action and informs the emotion/instinct modeling unit 31 and behavior determining mechanism 32 of the result of recognition as condition recognition information S10.

Specifically, when the condition recognizing mechanism 30, which keeps monitoring audio signals 1A from, for example, the microphone 16 in the external sensor unit 19, detects scale sound corresponding to a direction, such as "Walk," "Lie down," or "Follow the ball," it recognizes the direction and informs the emotion/instinct modeling unit 31 and behavior determining mechanism 32 of the recognition.

When the condition recognizing mechanism 30, which keeps monitoring an image signal S2A fed from the CCD camera 17, detects a red, round object or a vertical plane in an image based on the image signal S2A, the mechanism recognizes that there is a ball or that there is a wall and informs the emotion/instinct modeling unit 31 and behavior determining mechanism 32 of the recognition.

When the condition recognizing mechanism 30, which keeps monitoring a pressure detection signal S1B fed from the touch sensor 18, detects a pressure higher than a predetermined threshold value based on the pressure detection signal S1B for a short time (for example, less than two seconds), the mechanism recognizes that the pet robot has been slapped (or scolded) and informs the emotion/instinct modeling unit 31 and behavior determining mechanism 32 of the recognition. On the other hand, when the condition recognizing mechanism 30 detects a pressure less than the predetermined threshold value for a long time (for example, two seconds or more), the mechanism recognizes that the pet robot has been stroked (or praised) and informs the emotion/instinct modeling unit 31 and behavior determining mechanism 32 of the recognition.

When the condition recognizing mechanism 30, which keeps monitoring an angular velocity detection signal S2B fed from the angular velocity sensor 13 in the internal sensor unit 12, detects angular velocity in the direction of the x, y, and/or z axis based on the angular velocity detection signal S2B, the mechanism recognizes that the pet robot has rotated or inclined in the direction and informs the emotion/instinct modeling unit 31 and behavior determining mechanism 32 of the recognition.

When the condition recognizing mechanism 30, which keeps monitoring an acceleration detection signal S2C fed from the acceleration sensor 14, detects acceleration in the direction of the x, y, and/or z axis, the mechanism recognizes that the pet robot has moved in the direction and informs the emotion/instinct modeling unit 31 and behavior determining mechanism 32 of the recognition.

The emotion/instinct modeling unit 31 has parameters which represent the strength of six emotions, that is, joy, sadness, amazement, horror, disgust, and anger, one parameter for one emotion. The emotion/instinct modeling unit 31 changes the values of the parameters one after another, based on recognition results provided as condition recognition information S10 by the condition recognizing mechanism 30, behavior determining information S13, which represents determined output behavior provided by the behavior determining mechanism 32 as described later, elapsed time, etc.

Specifically, the emotion/instinct modeling unit 31 computes the value E[t+1] of a parameter of an emotion for the next period at predetermined time intervals, using the following equation:

$$E[t+1]=E[t]+k_e\times\Delta E[t] \quad (1)$$

where ΔE[t] is a change in the emotion computed from a predetermined equation, based on the degree of effect of a recognition result obtained based on the condition recognition information 10 and output behavior based on the behavior determining information S13 on the emotion (the degree is predetermined), the degree of restriction and stimulus by other emotions, elapsed time, etc., E[t] is the current value of the parameter of the emotion, and $k_e$ is a coefficient representing a rate at which the emotion is changed according to the recognition result and the like.

The emotion/instinct modeling unit 31 updates the current value E[t] of the parameter of the emotion by replacing it with the result of computation. The emotion of which parameter value should be updated for output behavior and a recognition result is predetermined. For example, when the emotion/instinct modeling unit recognizes that the pet robot has been slapped, the value of the parameter of anger increases while that of the parameter of joy decreases. When the modeling unit recognizes that the pet robot has been stroked, the value of the parameter of the joy increases while that of the value of sadness decreases.

Similarly, the emotion/instinct modeling unit 31 has parameters which represent the strength of desires independent of each other, that is, a desire for exercise, a desire for affection, appetite, and curiosity, one parameter for one desire. The emotion/instinct modeling unit 31 updates the values of the parameters of these desires one after another based on recognition by the condition recognizing mechanism 30, elapsed time, information from the behavior determining mechanism 32, and the like.

Specifically, the emotion/instinct modeling unit 31 computes the value I[k+1] of a parameter of a desire, that is, a desire for exercise, a desire for affection, or curiosity, for the next period at predetermined time intervals, using the following equation:

$$I[k+1]=I[k]+k_i\times\Delta I[k] \quad (2)$$

where ΔI[k] is a change in the desire computed from a predetermined equation, based on output behavior of the pet robot 1, elapsed time, the result of recognition, etc., I[k] is the current value of the parameter of the desire, and $k_i$ is a coefficient which represents the sensitivity of the desire. The emotion/instinct modeling unit 31 updates the current value I[k] of the parameter of the emotion by replacing it with the result of computation. The desire of which parameter value should be changed for a recognition result and output behavior is predetermined. For example, when the behavior determining mechanism 32 informs the modeling unit that some action has been taken, the value of the parameter of a desire for exercise decreases.

Based on a battery residual charge detection signal S2A (FIG. 2) provided through the condition recognizing mechanism 30, the emotion/instinct modeling unit 31 computes the value I[k+1] of the parameter of appetite from the following equation at a predetermined time interval:

$$I[k]=100-B_L \quad (3)$$

where $B_L$ is the amount of residual charge in the battery. The emotion/instinct modeling unit 31 updates the current value I[k] of the parameter of the apetite by replacing it with the result of computation.

In the embodiment, the values of the parameters of the emotions and desires are restricted to range from 0 to 100, and the values of $k_e$ and $k_i$ are set for each emotion and each desire.

The behavior determining mechanism 32 determines the next action, based on condition recognition information S10 fed from the condition recognizing mechanism 30, the values of the parameters of the emotions and desires computed by the emotion/instinct modeling unit 31, an action model stored in the memory 10A, elapsed time, etc. and outputs the result of determination as behavior determining information S12 to the emotion/instinct modeling unit 31 and behavior generating mechanism 33.

Figure 4:
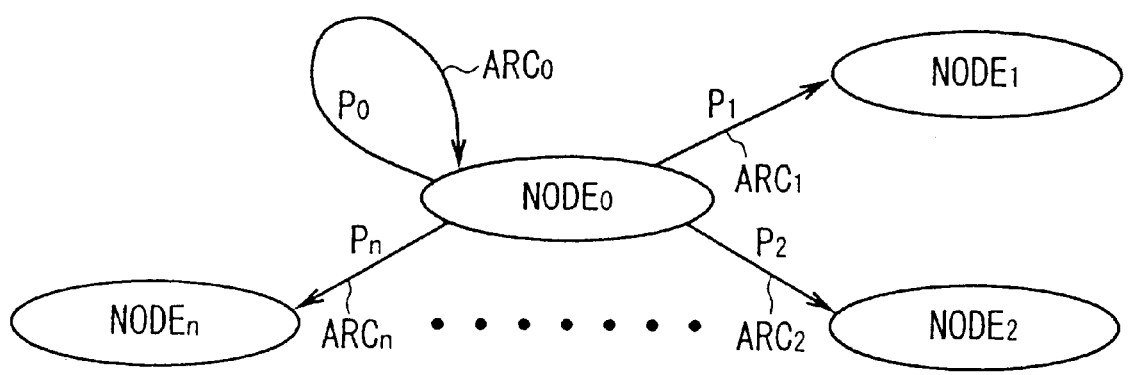
FIG. 4 is a conceptual view illustrating a probability automaton.

To determine the next action, the behavior determining mechanism 32 uses an algorithm, called probability automaton, which determines on a probability basis which of nodes $NODE_0$ through $NODE_n$ the pet robot transits from the node $NODE_0$ to as shown in FIG. 4, based on transition probabilities $P_0$ through $P_n$ set for arcs $ARC_0$ through $ARC_n$ connecting the nodes $NODE_0$ through $NODE_n$ with each other.

Specifically, the behavior determining mechanism 32 is intended to determine the next action based on a state transition table 40 which is stored as an action model for each of the nodes $NODE_0$ through $NODE_n$ in the memory 10A as shown in FIG. 5.

In the state transition table 40, input events (results of recognition by the condition recognizing mechanism 30), transition requirements for the nodes $NODE_0$ through $NODE_n$, are listed on an input event line in order of priority, and requirements accompanying the transition requirements are described in corresponding rows in data name and data range lines.

For the node $NODE_{100}$ defined in the state transition table 40 in FIG. 5, when a recognition is provided that a ball (BALL) has been detected, the size (SIZE) of the ball, provided together with the recognition, is required to range from 0 to 1000 (0, 1000), and when a recognition is provided that an obstacle (OBSTACLE) has been detected, the distance (DISTANCE) to the obstacle, provided together with the recognition, is required to range from 0 to 1000 (0, 1000) in order to transit to the node or other nodes.

For the node $NODE_{100}$ also, even when no recognition is input, it is possible to transit to the node or other nodes if any of the parameters of emotions of joy (JOY), surprise (SURPRISE), and sadness (SUDNESS) in the emotion/instinct modeling unit 31, which parameters are periodically referred to by the behavior determining mechanism 32, ranges in value from 50 to 1000 (50, 1000).

In the state transition table 40, the names of nodes to which the pet robot can transit from the nodes $NODE_0$ through $NODE_n$ are listed in the destination node row in the column under "Probability of transition to other nodes," and the probability of transition to the nodes $NODE_0$ through $NODE_n$ as provided when all requirements described on the input event name, data value, and data range lines are met is written on the lines for the nodes $NODE_0$ through $NODE_n$ in the column under "Probability of transition to other nodes," and behavior or action which is output at that time is described on the output behavior line. The sum of the probabilities written on the lines in the column under "Probability of transition to other nodes" is 100%.

Thus for the node $NODE_{100}$, when a recognition is provided that a ball (BALL) has been detected and that the size (SIZE) of the ball ranges from 0 to 1000 (0, 1000), the pet robot can transit to the node $NODE_{120}$ (node 120) with a probability of 30%. When the robot transits to the node, behavior or action ACTION 1 is output.

A behavior model is arranged so that the nodes $NODE_0$ through $NODE_n$ written in the form of the state transition table 40 succeed.

As described above, when the state recognition mechanism 30 provides the state recognition information S10, or a certain time has elapsed after the last behavior is exhibited, the behavior determining mechanism 32 determines the next behavior or action (behavior or action described on the output behavior line) on a probability basis, using the state transition table 40 for the nodes NODE$_0$ through NODE$_n$ which corresponds to a behavior model stored in the memory 10A and outputs the result of determination as the behavior determination information S12 to the emotion/instinct modeling unit 31 and behavior generating mechanism 33.

On the other hand, based on the behavior determination information S13 provided by the behavior determining mechanism 32, the behavior generating mechanism 33 transmits a driving signal S14 (S14$_1$ through S14$_{18}$) to necessary actuators 27$_1$ through 27$_{18}$ (FIG. 2), a necessary audio signal S3 to the speaker 20 (FIG. 2), or an LED driving signal S15 to the LEDs serving as the eyes.

As a result, the behavior generating mechanism 33 drives the necessary actuators 27$_1$ through 27$_{18}$ so that a predetermined condition is met, based on the driving signal S14; makes the speaker 20 output sound based on the audio signal S3, or flashes the LEDs on and off according to a flash-on and -off pattern based on the LED driving signal S15.

As described above, based on condition outside or inside the pet robot 1, whether the user acts toward the pet robot 1, etc., the controller 10 makes the pet robot 1 behave independently.

3) Motions of the Pet Robot 1

Motions of the pet robot 1 will be described below. The pet robot 1 is intended to present a touch of a living thing and a robot through its motions.

Motions of the pet robot 1 can be classified into the following types: tumble recovery, or standing up after a tumble; robot, or behaving like a robot; dog, or behaving like a dog; ball response, or behavior as observed when the robot finds a ball; emotion expression, or expressing emotion; idleness, or behavior as observed when the robot is idle; language, or conveying will to the user; and the like.

By example, these types of motions will be described below.

(3-1) Tumble Recovery Motions

Motions which the pet robot 1 makes to stand up when it tumbles (tumble recovery motion) and motions which the pet robot 1 makes after tumble recovery (post-tumble-recovery motion) will be described below.

(3-1-1) First Tumble Recovery Motion

Figure 6:
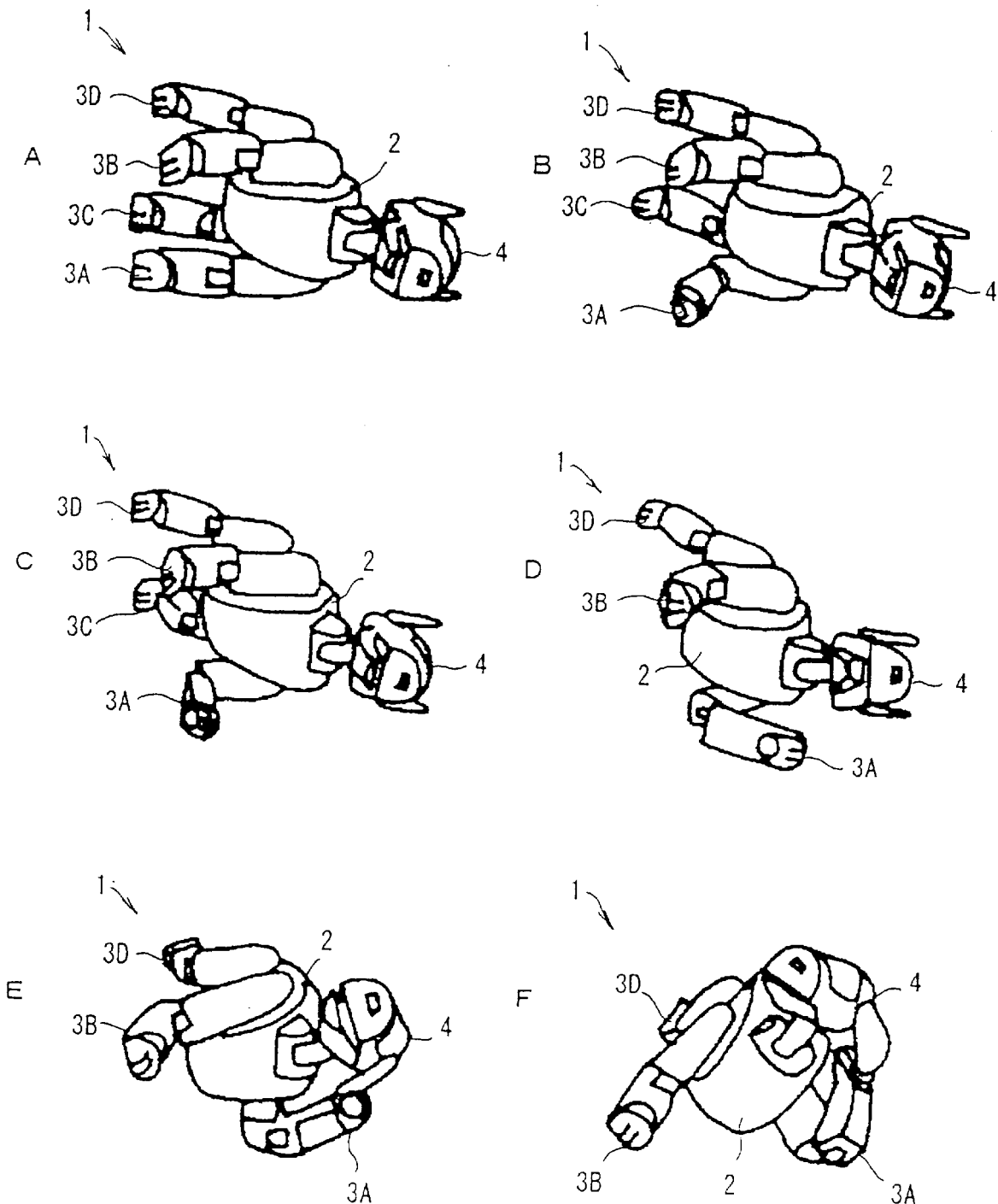
FIG. 6 is a schematic diagram illustrating a pet robot motion.

First, a tumble recovery motion which the pet robot 1 makes when it tumbles to the left as shown in FIG. 6A will be described below.

When it tumbles leftward, the pet robot 1 first straightens the left and right forelegs 3A and 3B and left and right hind legs 3C and 3D as shown in FIG. 6A to take a basic upright position and then turns the left foreleg 3A and left hind leg 3C, which are on the underside due to a tumble, in such directions that the legs open apart from each other, as shown in FIGS. 6B through 6D. In addition to this leg opening motion, the pet robot 1 turns the shank 3AY (FIG. 1) toward the rear to bend the left foreleg 3A backward and turns the shank 3CY (FIG. 1) toward the front to bend the left hind leg 3C forward.

When the pet robot 1 has opened the left foreleg 3A and left hind leg 3C apart to the extent that the thigh 3AX (FIG. 1) in the left foreleg 3A and the thigh 3CY (FIG. 1) in the left hind leg 3C are almost parallel to each other as shown in FIG. 6D, the robot turns the left foreleg 3A and left hind leg 3C outside. As a result, the pet robot 1 turns as a whole as shown in FIGS. 6E and 6F so that the stomach of the body 2 comes in contact with the floor, and the right foreleg 3B and right hind leg 3D, which are on the upside due to the fall, come in contact with the floor.

Figure 7:
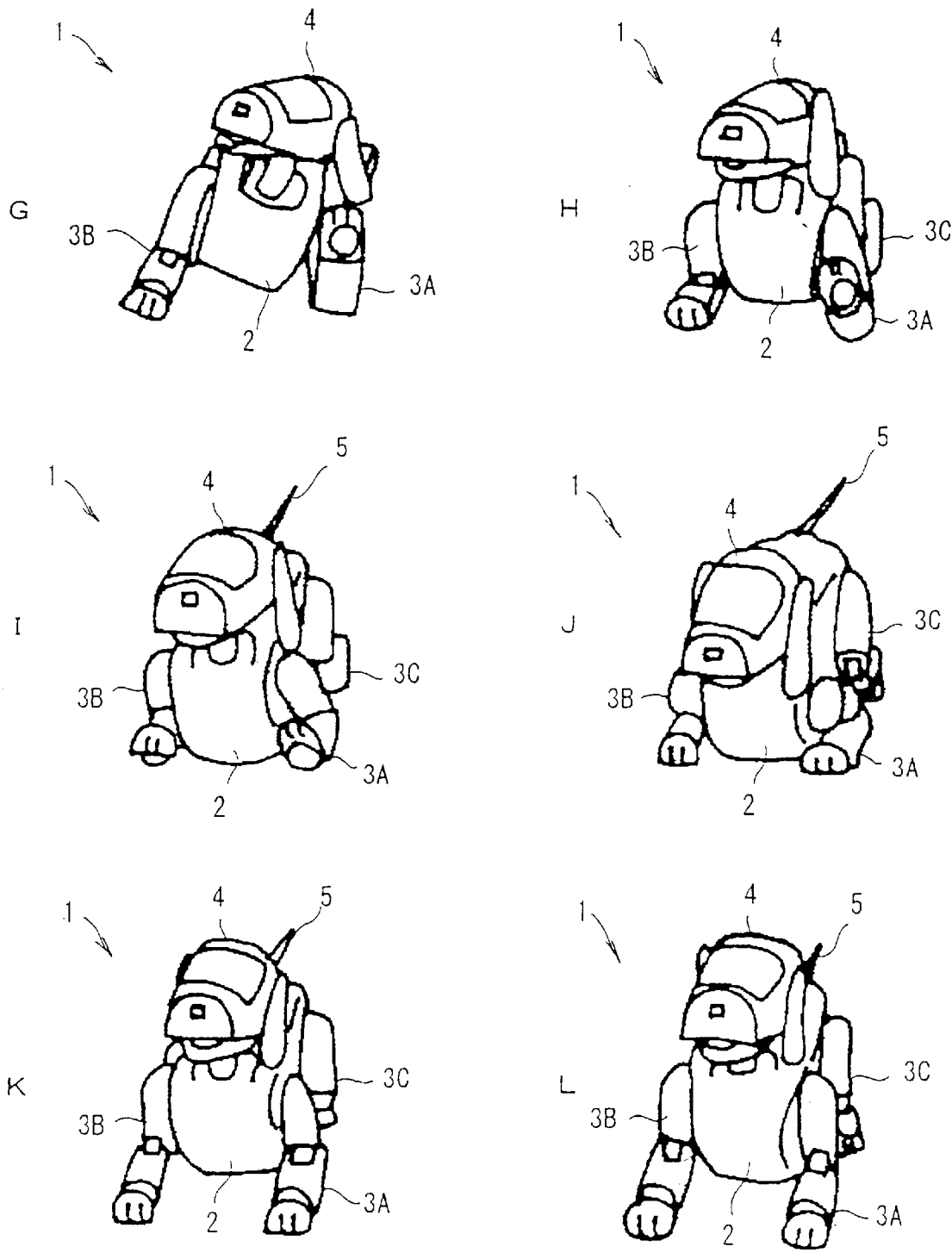
FIG. 7 is a schematic diagram illustrating the pet robot motion.

Then by turning the left foreleg 3A and left hind leg 3C in such directions that the legs close together, as shown in FIGS. 7B and 7C, the pet robot 1 brings the left foreleg 3A and left hind leg 3C close to the body 2 to take the basic upright position.

Figure 8:
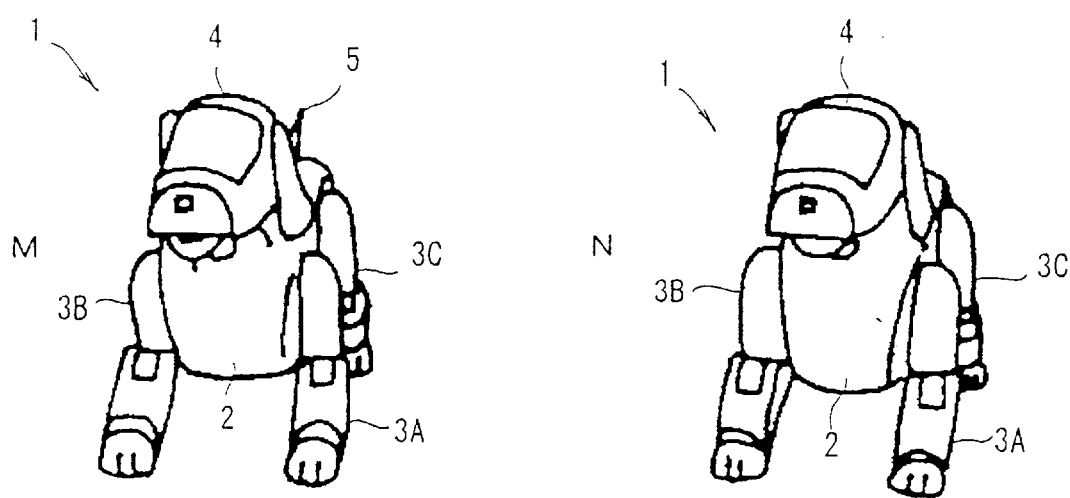
FIG. 8 is a schematic diagram illustrating the pet robot motion.

Then the pet robot 1 straightens the bent right and left forelegs 3B and 3A as shown in FIGS. 7D, 8A, and 8B to stand up in the basic upright position, while slightly moving the center of gravity forward by straightening the bent right and left hind legs 3D and 3C. This ends the motion.

(3-1-2) Second Tumble Recovery Motion

Figure 9:
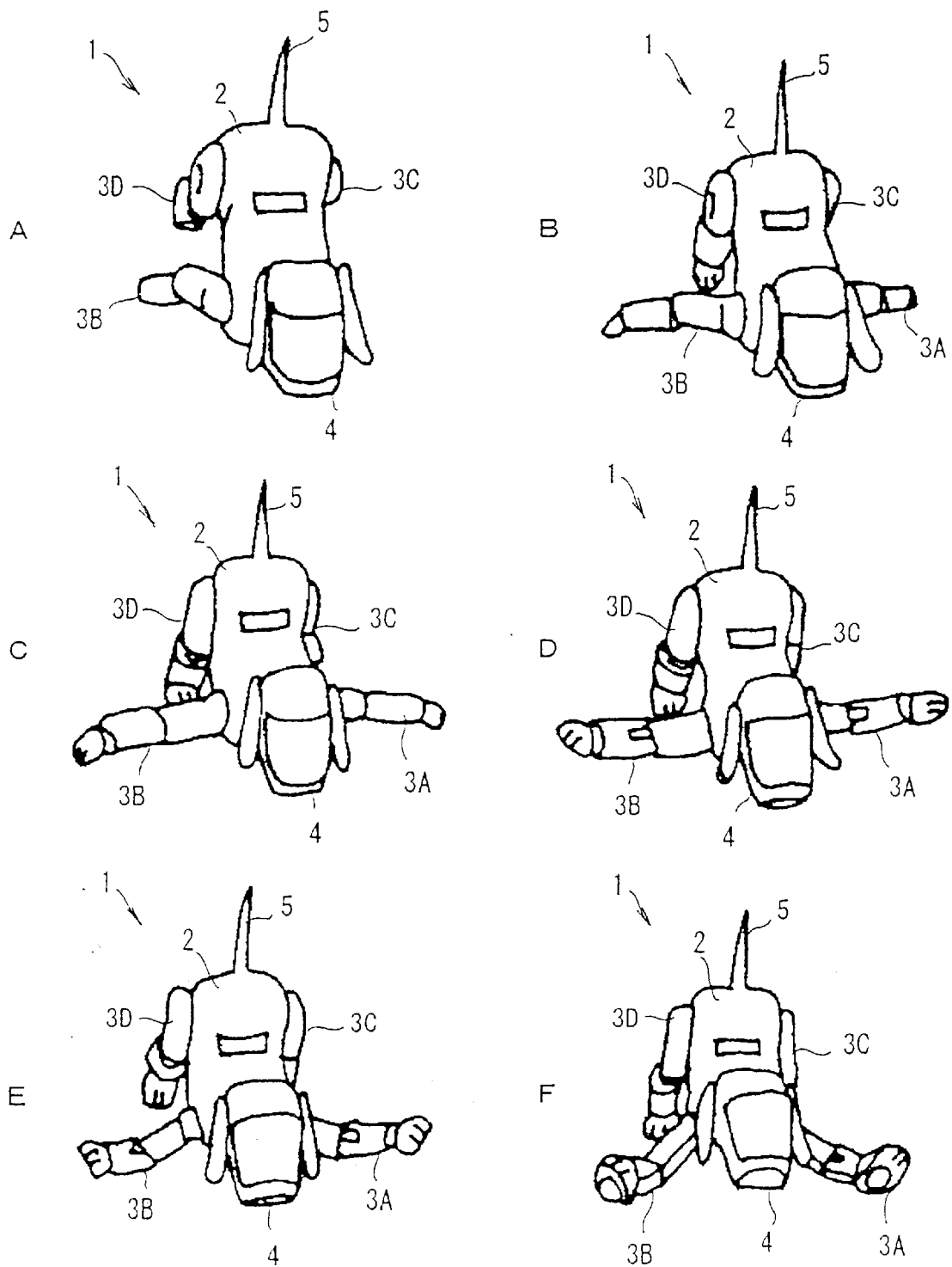
FIG. 9 is a schematic diagram illustrating the pet robot motion.

Next, a tumble recovery motion which the pet robot 1 makes when it tumbles forward as shown in FIG. 9A will be described below.

When it tumbles forward, the pet robot 1 turns the right and left forelegs 3B and 3A in such directions that the legs open apart, as shown in FIGS. 9B through 9D, and further turns the right and left forelegs 3B and 3A about their pitch axes to direct toward the floor the contact surfaces provided by the bottoms of the ends of the legs.

Figure 10:
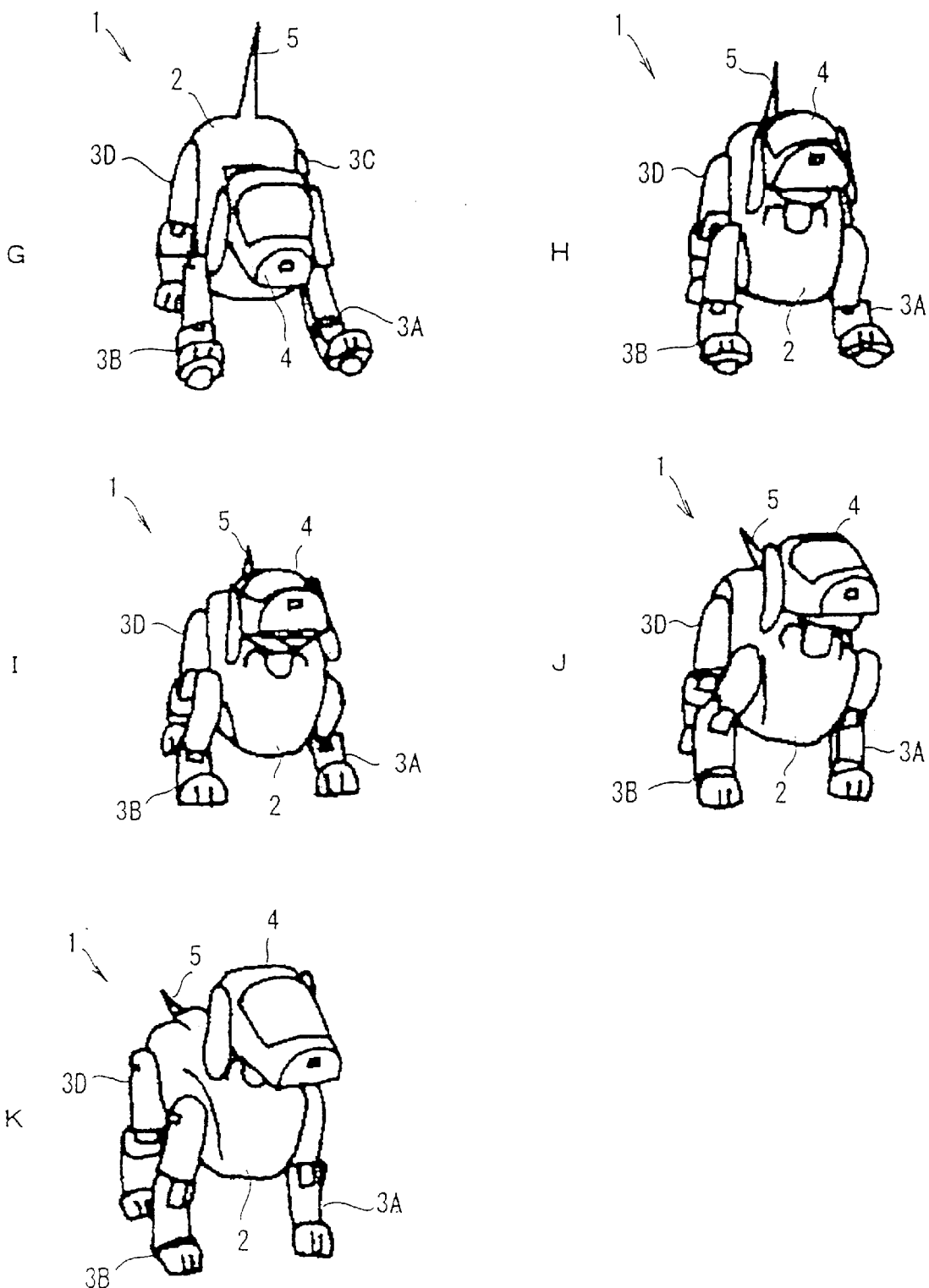
FIG. 10 is a schematic diagram illustrating the pet robot motion.

Next, as shown in FIGS. 9E, 9F, and 10A, the pet robot 1 turns the right and left forelegs 3B and 3A in such directions that the legs close together, while arching the right and left forelegs 3B and 3A so that their contact surfaces do not come in contact with the floor.

When this leg closing motion closes the hind right fore leg 3D and left foreleg 3A until the legs are almost parallel to each other as shown in FIG. 10A, the pet robot 1 brings the right and left forelegs 3B and 3A close to the body 2 by turning the right and left forelegs 3B and 3A in such directions that the right foreleg 3B and left foreleg 3A come close to the right and left hind legs 3D and 3C, respectively, while slightly bending the right and left hind legs 3 and 3C to take a lower position.

Then the pet robot 1 gradually straightens the bent right and left forelegs 3B and 3A and right and left hind legs 3D and 3C to stand up in the basic upright position. This ends the motion.

(3-1-3) Third Tumble Recovery Motion

Figure 11:
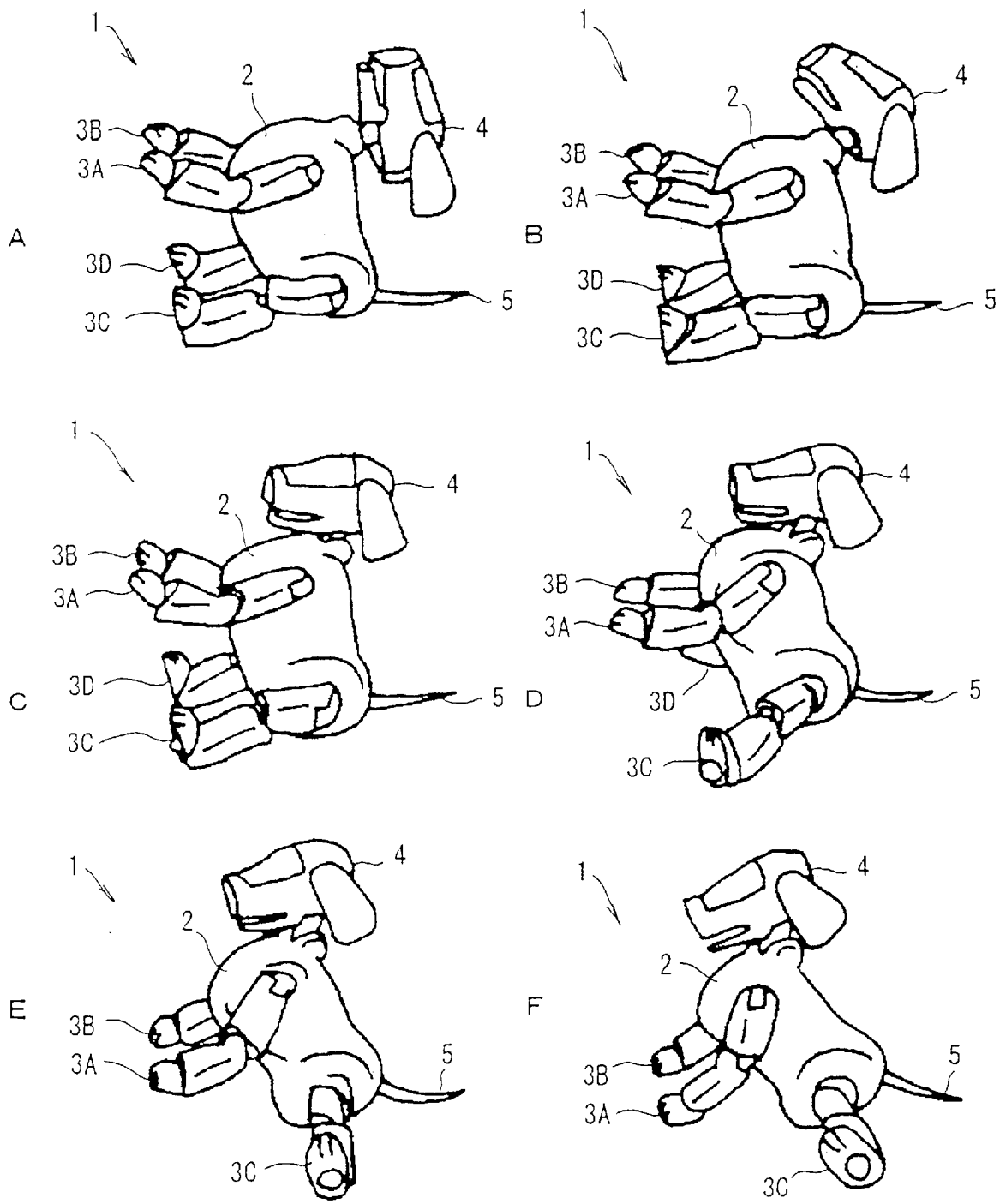
FIG. 11 is a schematic diagram illustrating the pet robot motion.

Next, a tumble recovery motion which the pet robot 1 makes when it tumbles backward as shown in FIG. 11A will be described below.

When it tumbles backward, the pet robot 1 straightens the right and left forelegs 3B and 3A and right and left hind legs 3D and 3C as shown in FIG. 11A to take the basic upright position and then lifts the head 4 (FIG. 2) forward as viewed from the pet robot 1, as shown in FIGS. 11B and 11C.

Next, as shown in FIGS. 11D through 11F, the pet robot 1 turns the right and left forelegs 3B and 3A about their pitch axes to make the thighs 3BX and 3AX in them parallel to the direction of gravity, while turning the right and left hind legs 3D and 3C in such directions that the legs open apart until they are almost parallel to each other. This causes the pet robot 1 to gradually tumble forward under the action of gravity.

Figure 12:
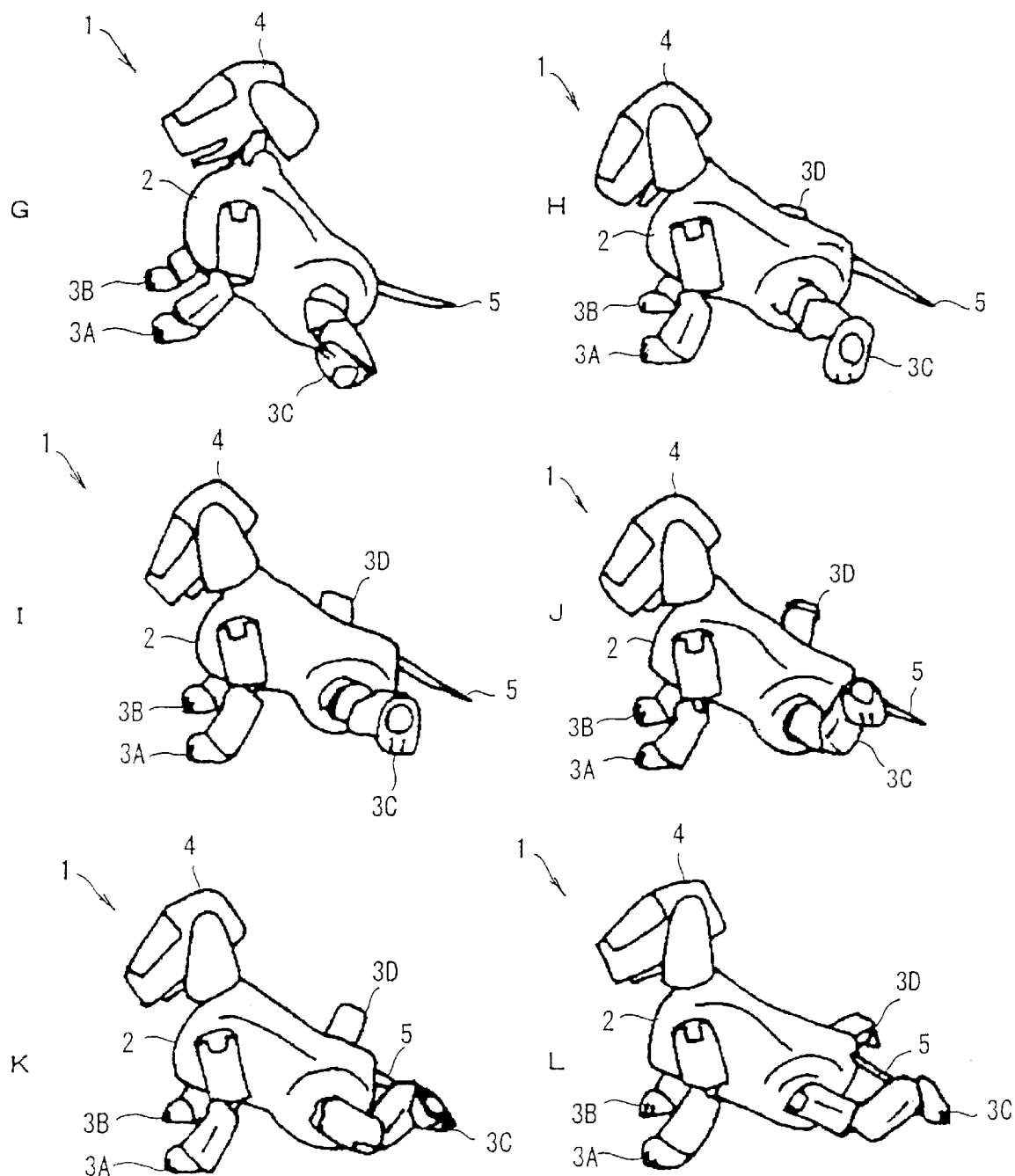
FIG. 12 is a schematic diagram illustrating the pet robot motion.

When the right and left hind legs 3D and 3C open apart until the legs are almost parallel to each other, as shown in FIG. 12A, and the right and left forelegs 3B and 3A come in contact with the floor, the pet robot 1 turns the right and left hind legs 3D and 3C in such directions that the legs close together, while bending them, as shown in FIGS. 12B through 12F.

Figure 13:
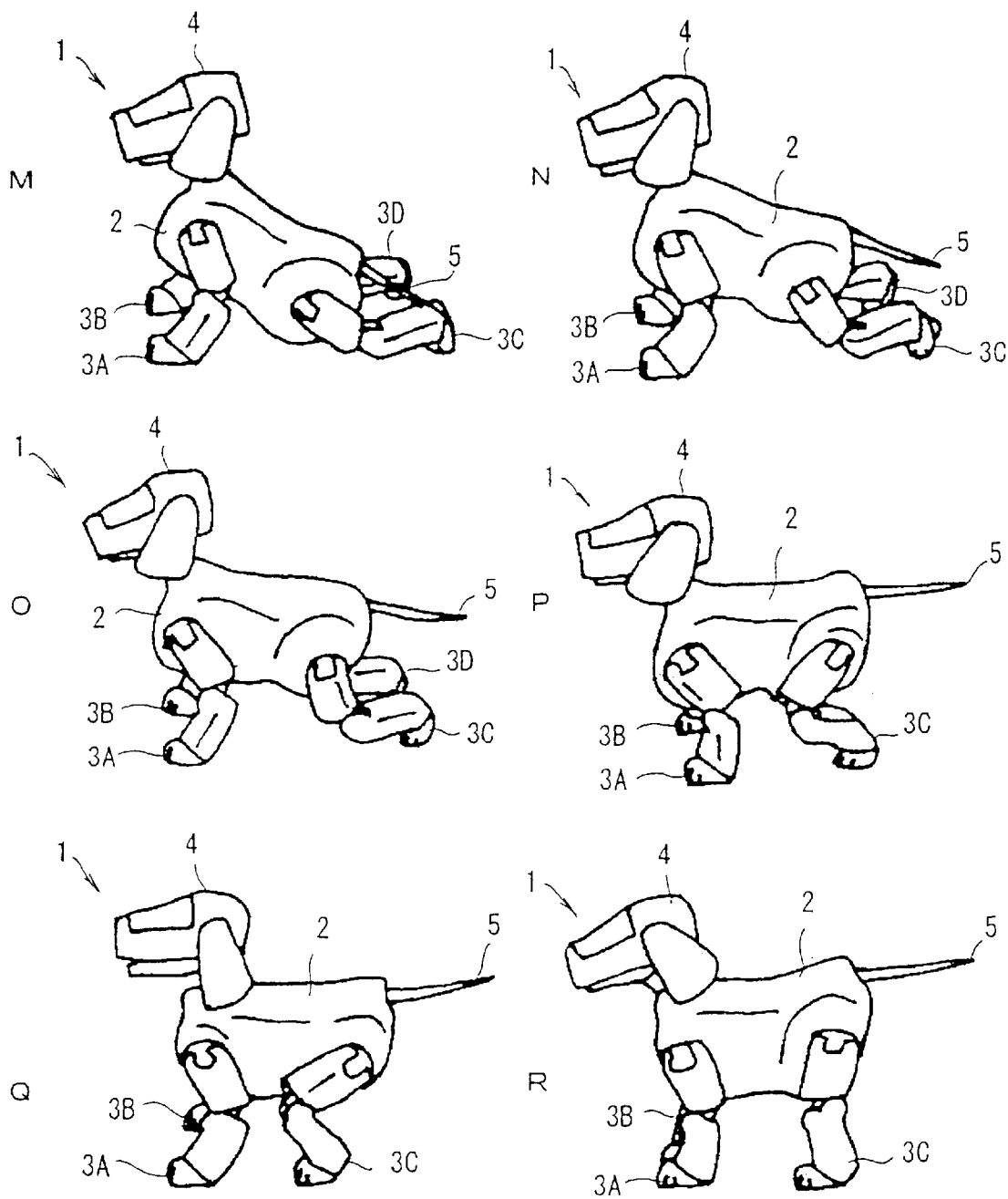
FIG. 13 is a schematic diagram illustrating the pet robot motion.
Figure 14:
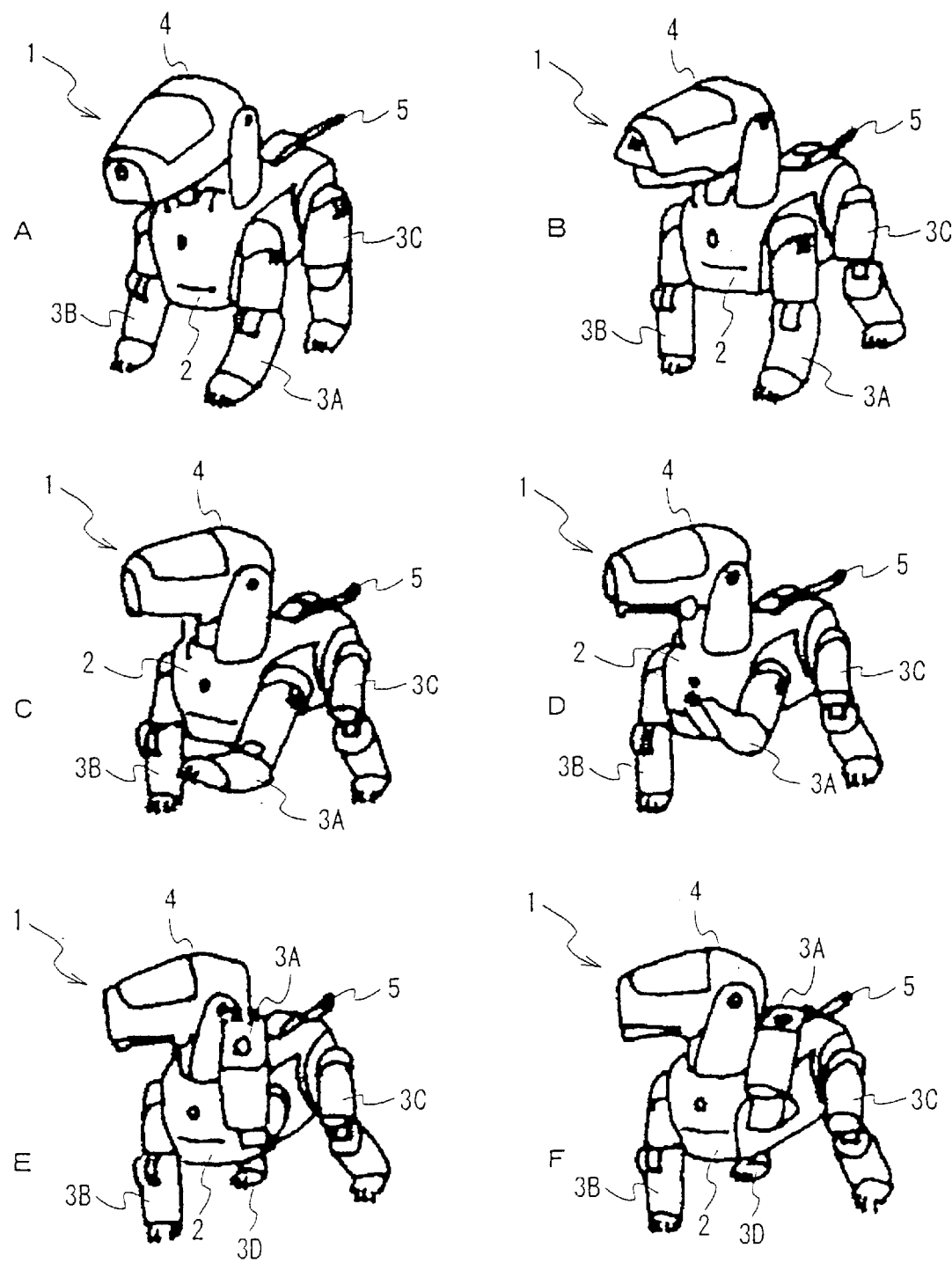
FIG. 14 is a schematic diagram illustrating the pet robot motion.

Then when the pet robot 1 closes the right and left hind legs 3D and 3C together until they are almost parallel to each other, as shown in FIG. 13A, the robot brings the right and left hind legs 3D and 3C close to the body 2 by turning these legs in such directions that the right and left hind legs 3D and 3C come close to the right foreleg 3B and left foreleg 3A, respectively and then straightens the bent right and left hind legs 3D and 3C to take the basic upright position. This ends the motion.

(3-1-4) First Post-Tumble-Recovery Motion

Next, a motion which the pet robot 1 makes will be described below.

When the pet robot 1 takes the basic upright position with the tumble recovery motion described above as shown in FIG. 14A, it moves the center of gravity to prevent its weight from acting on the left foreleg 3A (or the right foreleg 3B) and then lifts the left foreleg 3A (or the right foreleg 3B) by turning forward, as shown in FIGS. 14C through 14F. The pet robot 1 turns the thigh 3AY (3BY) in the left foreleg 3A (or the right foreleg 3B) toward the rear to bend the left foreleg 3A (or the right foreleg 3B). In addition, the pet robot 1 turns the head 4 through a predetermined angle to the right (or the left) as viewed from the pet robot 1.

Figure 15:
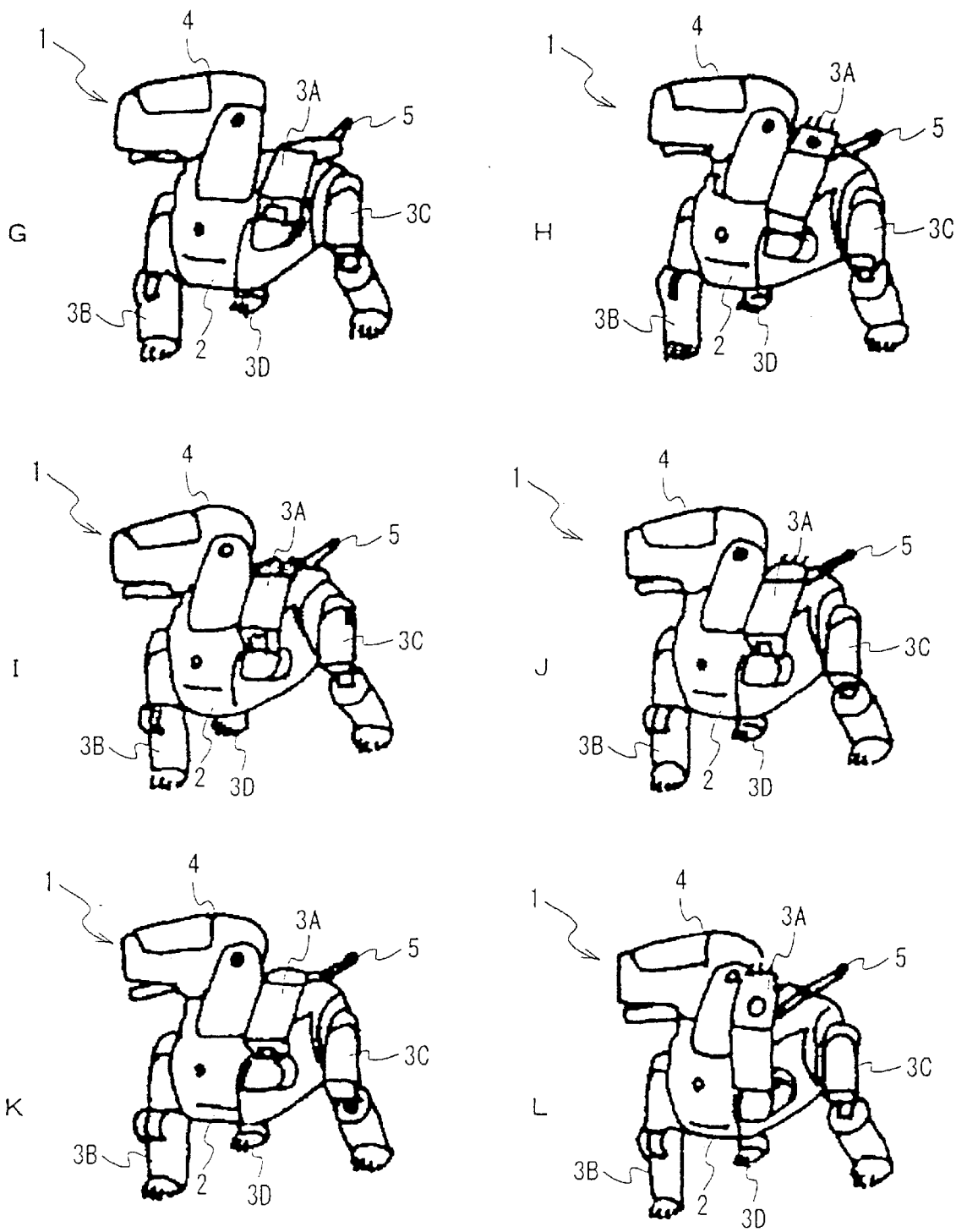
FIG. 15 is a schematic diagram illustrating the pet robot motion.
Figure 16:
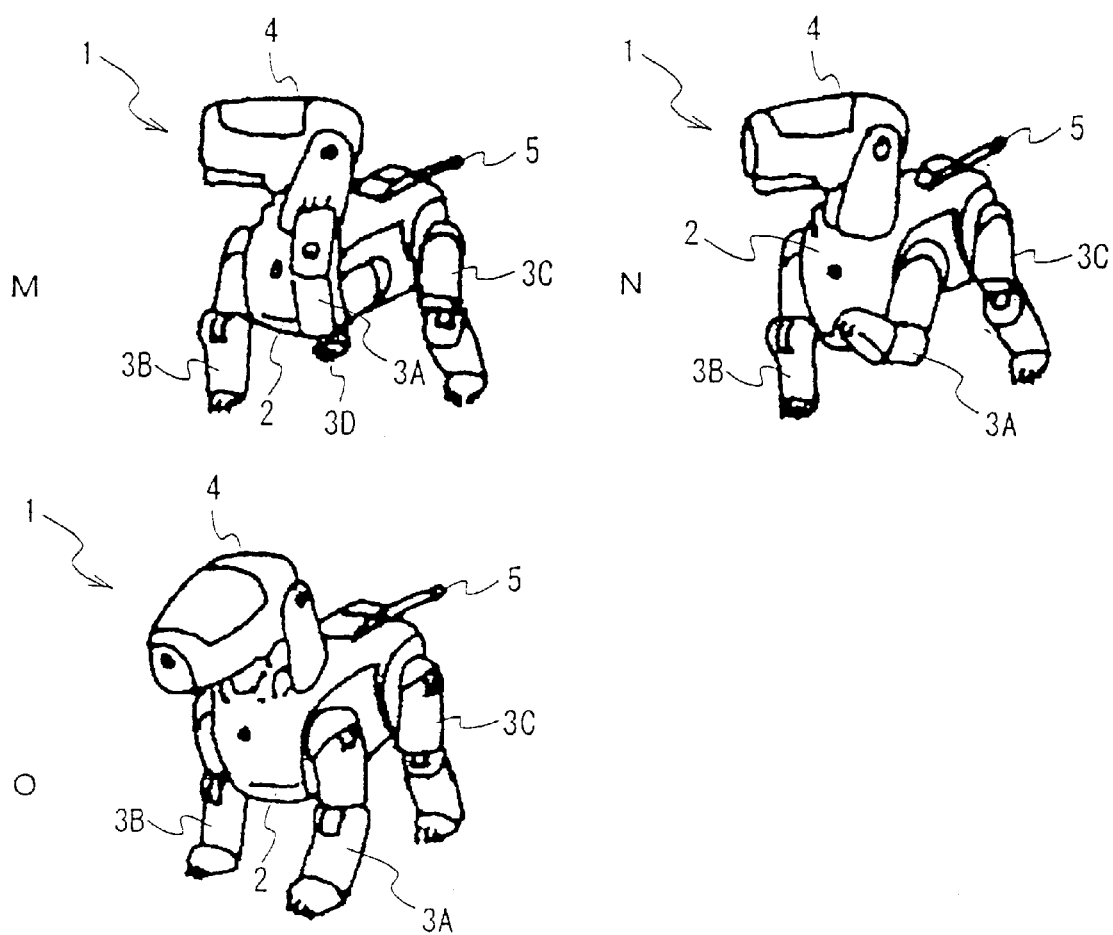
FIG. 16 is a schematic diagram illustrating the pet robot motion.

Then when the contact surface of the left foreleg 3A (or the right foreleg 3B) comes close to the back of the head 4 as shown in FIG. 15A, the pet robot 1 turns the shank 3AY (3BY) in the left foreleg 3A (or the right foreleg 3B) through a predetermined angle a few times toward the front and rear of the pet robot 1.

After this action is completed, the pet robot performs the reverse of the actions shown in FIGS. 14A through 14F to return to the upright position. This ends the motion.

Such a motion can produce a feeling that the pet robot 1 scratches the back of the head 4 in embarrassment because it tumbles, thus giving the user a lovely impression.

(3-1-5) Second Post-Tumble-Recovery Motion

Next, a second post-tumble-recovery motion which the pet robot 1 makes will be described below.

Figure 17:
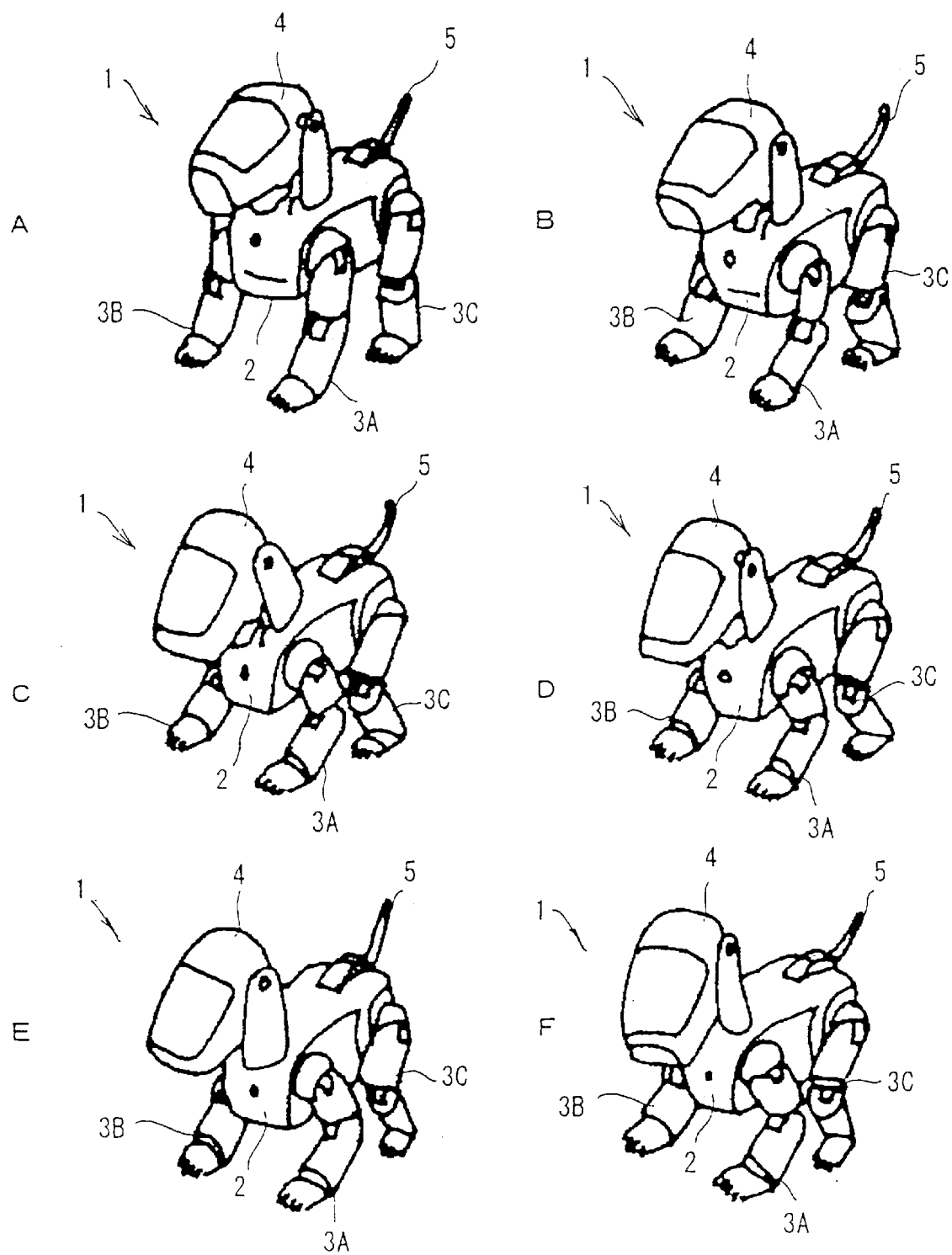
FIG. 17 is a schematic diagram illustrating the pet robot motion.
Figure 18:
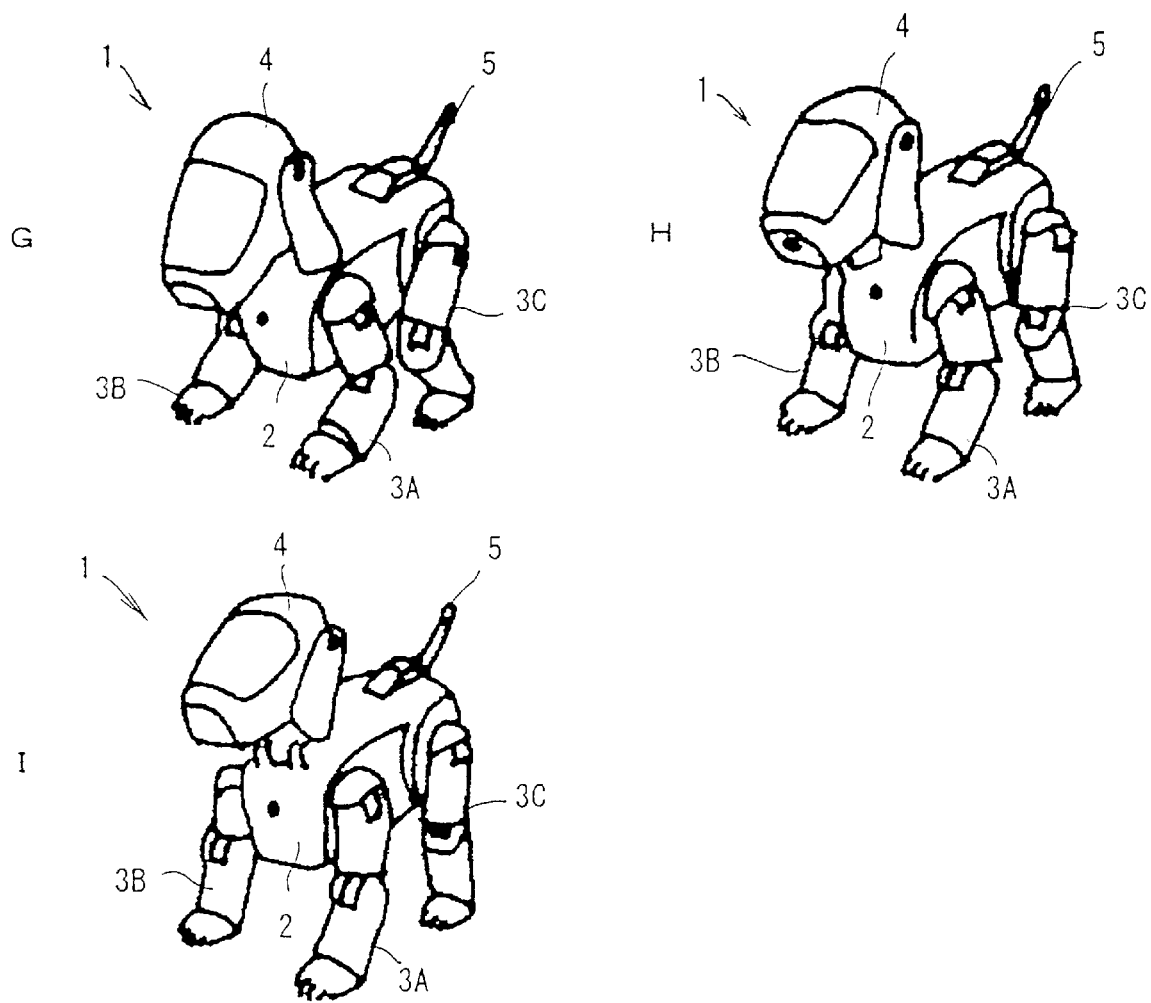
FIG. 18 is a schematic diagram illustrating the pet robot motion.
Figure 19:
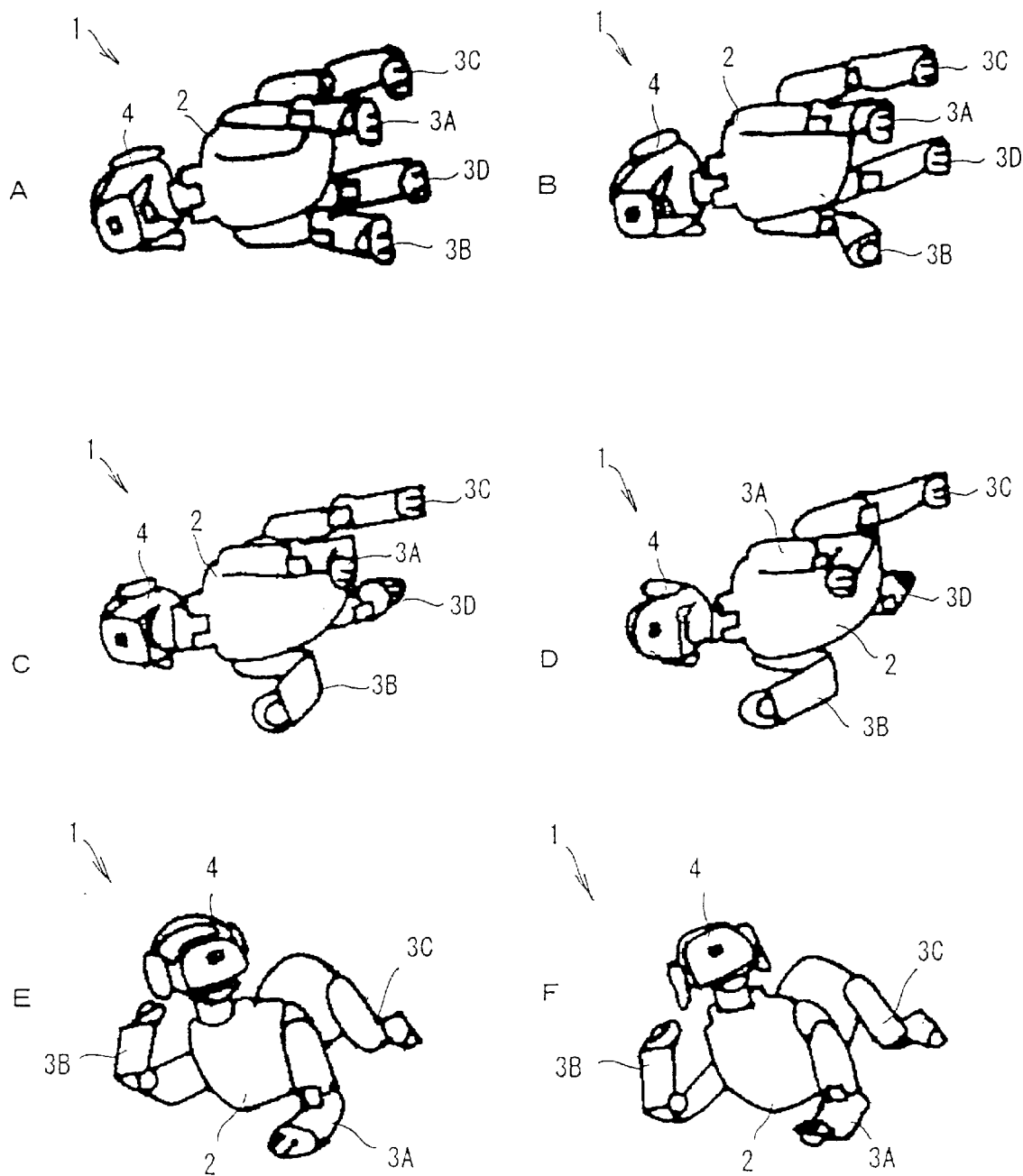
FIG. 19 is a schematic diagram illustrating the pet robot motion.
Figure 20:
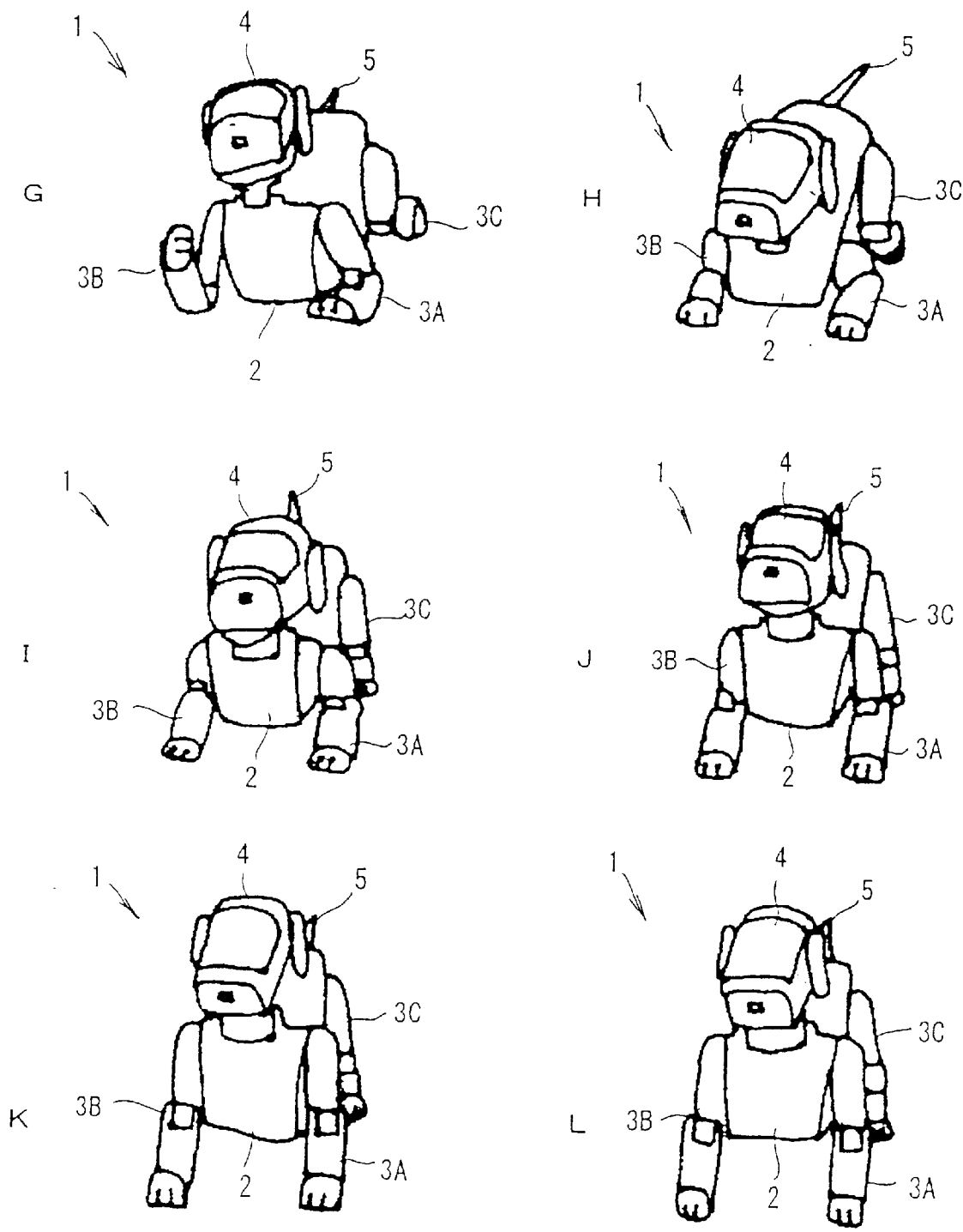
FIG. 20 is a schematic diagram illustrating the pet robot motion.

After it takes the basic upright position with the tumble recovery motion described above as shown in FIG. 17A, the pet robot 1 slightly bends the right and left forelegs 3B and 3A and right and left hind legs 3D and 3C as shown in FIG. 17B to take a lower position and turns the head 4 toward its front as shown in FIG. 17C to direct the head 4 downward.

Then the pet robot 1 turns the head 4 to the right and left a few times as shown in FIGS. 17D through 18A. Next, the robot straightens the right and left forelegs 3B and 3A and the right and left hind legs 3D and 3C to return to the basic upright position. This ends the motion.

Such a motion can produce a feeling that the pet robot 1 swings the head 4 to the right and left to refresh, thus giving the user a lovely impression.

(3-1-6) Other Tumble Recovery Motions

FIGS. 19A through 20F show the flow of a tumble recovery motion with which the pet robot 1 stands up after it tumbles rightward. The tumble recovery motion is the same as the first tumble recovery motion except that the former is opposite in direction to the latter.

(3-2) Robot Language Motions

Robotlike actions will be described below which the pet robot 1 performs when the condition recognizing mechanism 30 (FIG. 3) in the controller 10 (FIG. 2) does not provide a specific recognition result (such actions are hereinafter called robot language motions).

(3-2-1) First Robot Language Motion

First, a first robot language motion will be described below. When the pet robot 1 is in a basic down position, it produces the first robot language motion.

Figure 21:
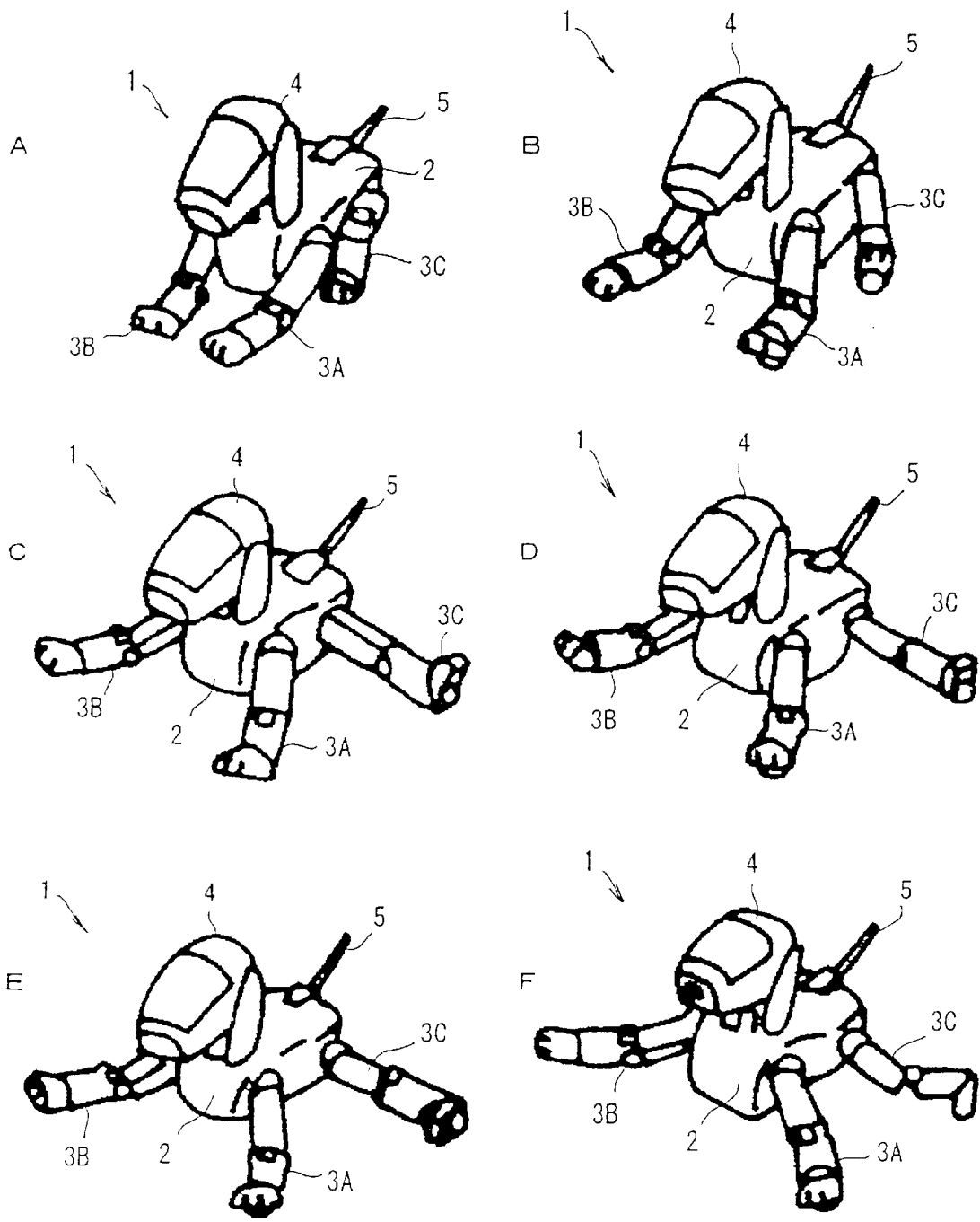
FIG. 21 is a schematic diagram illustrating the pet robot motion.
Figure 22:
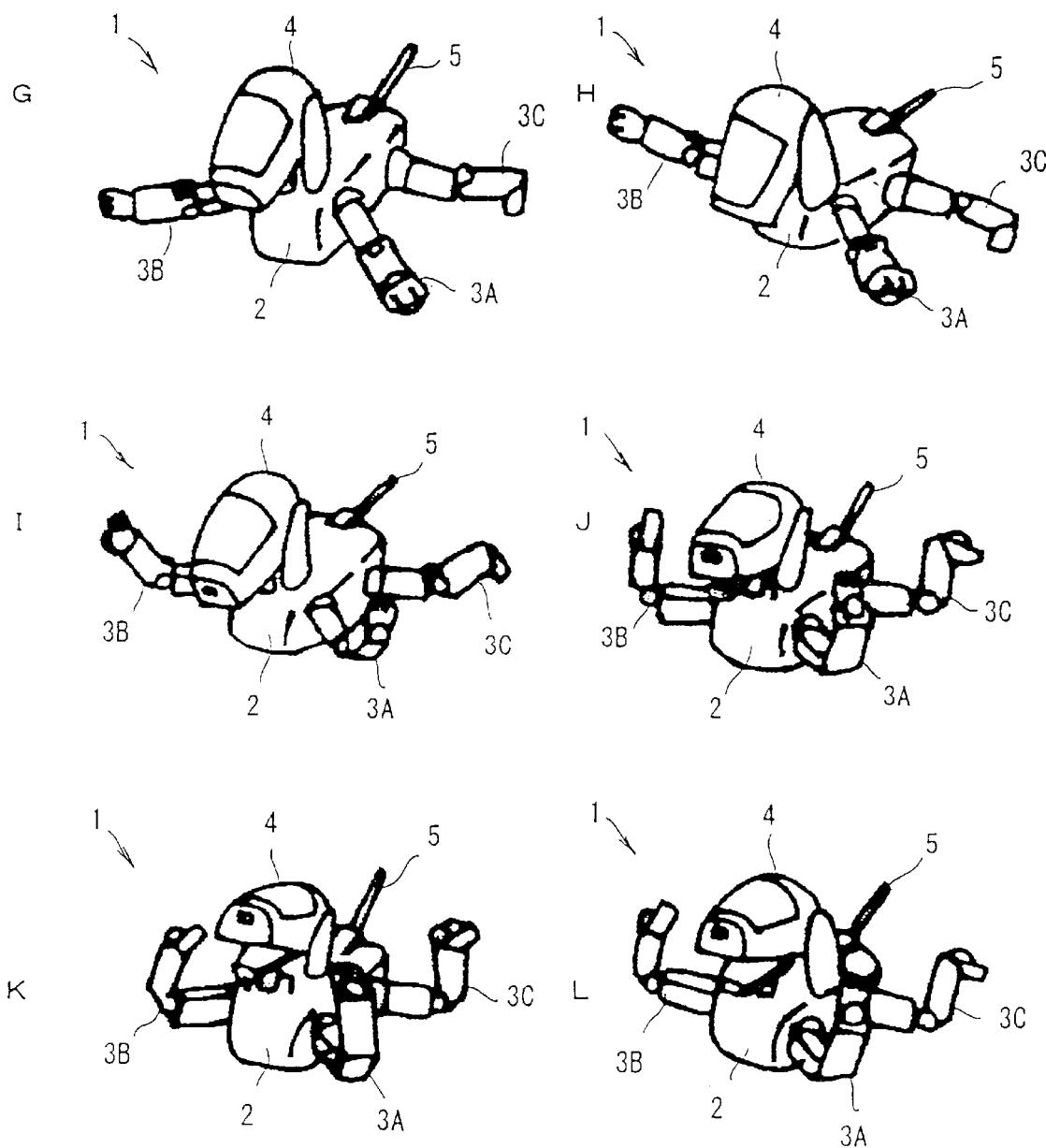
FIG. 22 is a schematic diagram illustrating the pet robot motion.

When the pet robot 1 is in a down position, with the right and left forelegs 3B and 3A extended toward its front, as shown in FIG. 21A, the robot turns the right and left forelegs 3B and 3A in such directions that the legs open apart, as shown in FIGS. 21B and 21C. In addition, as shown in FIGS. 21B through 21E, the pet robot 1 extends the right and left hind legs 3D and 3C toward the front and then turns these legs toward its rear to radially extend them. As a result, the pet robot 1 takes such a position that the right and left forelegs 3B and 3C and right and left hind legs 3A and 3D form a cross, as shown in FIG. 21F. When the right and left hind legs 3D and 3C open apart until they are almost parallel to each other, the pet robot 1 turns the right and left hind legs 3D and 3C approximately 180° about their pitch axes.

Then as shown in FIGS. 22A through 22E, the pet robot 1 lifts the right and left forelegs 3B and 3A and the right and left hind legs 3D and 3C above itself, while bending these legs. In parallel, the pet robot 1 bends the head 4 toward its rear to lift the head 4, opens the mouth, and lifts the tail 5 above itself to bend the entire body.

Figure 23:
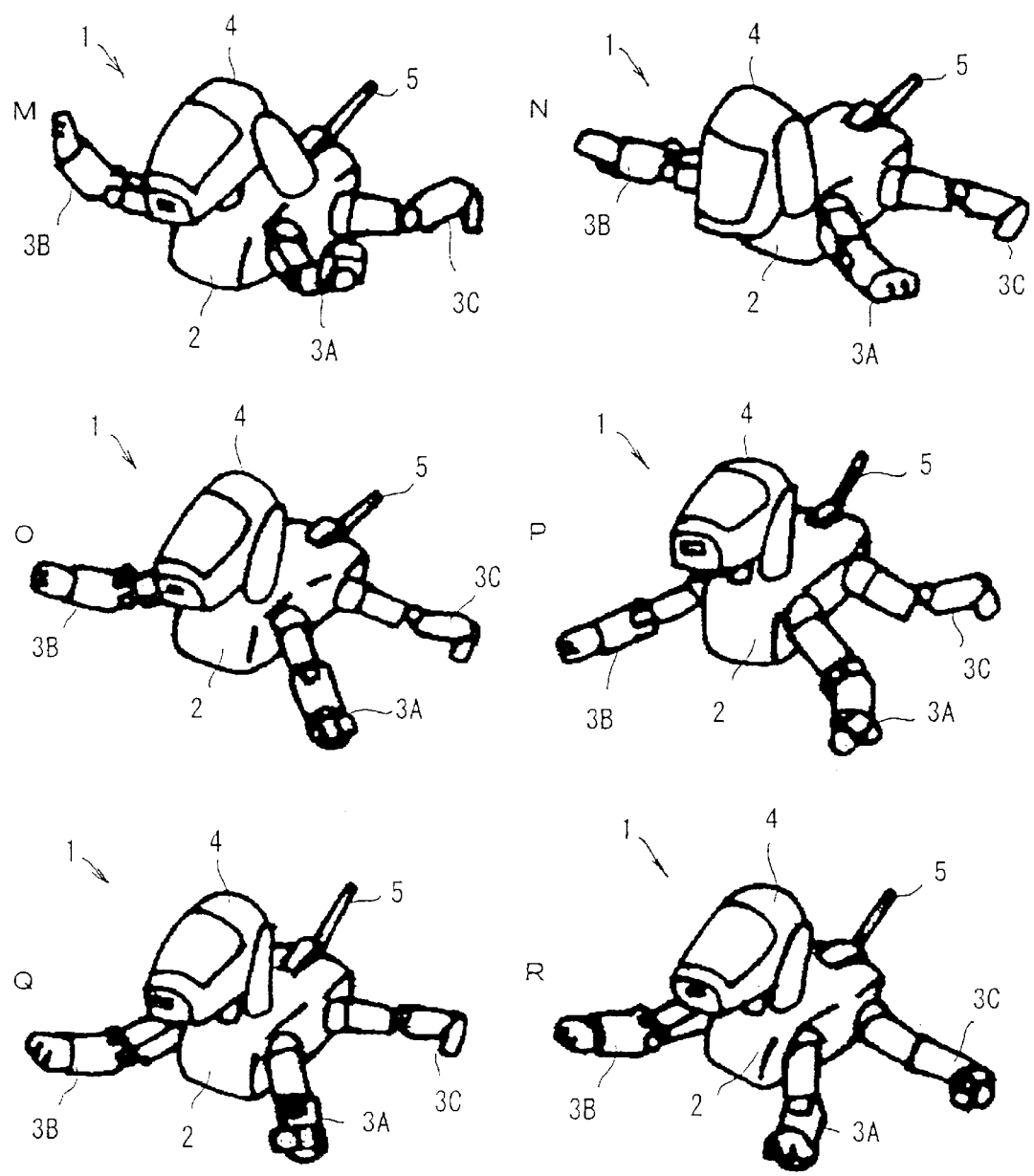
FIG. 23 is a schematic diagram illustrating the pet robot motion.
Figure 24:
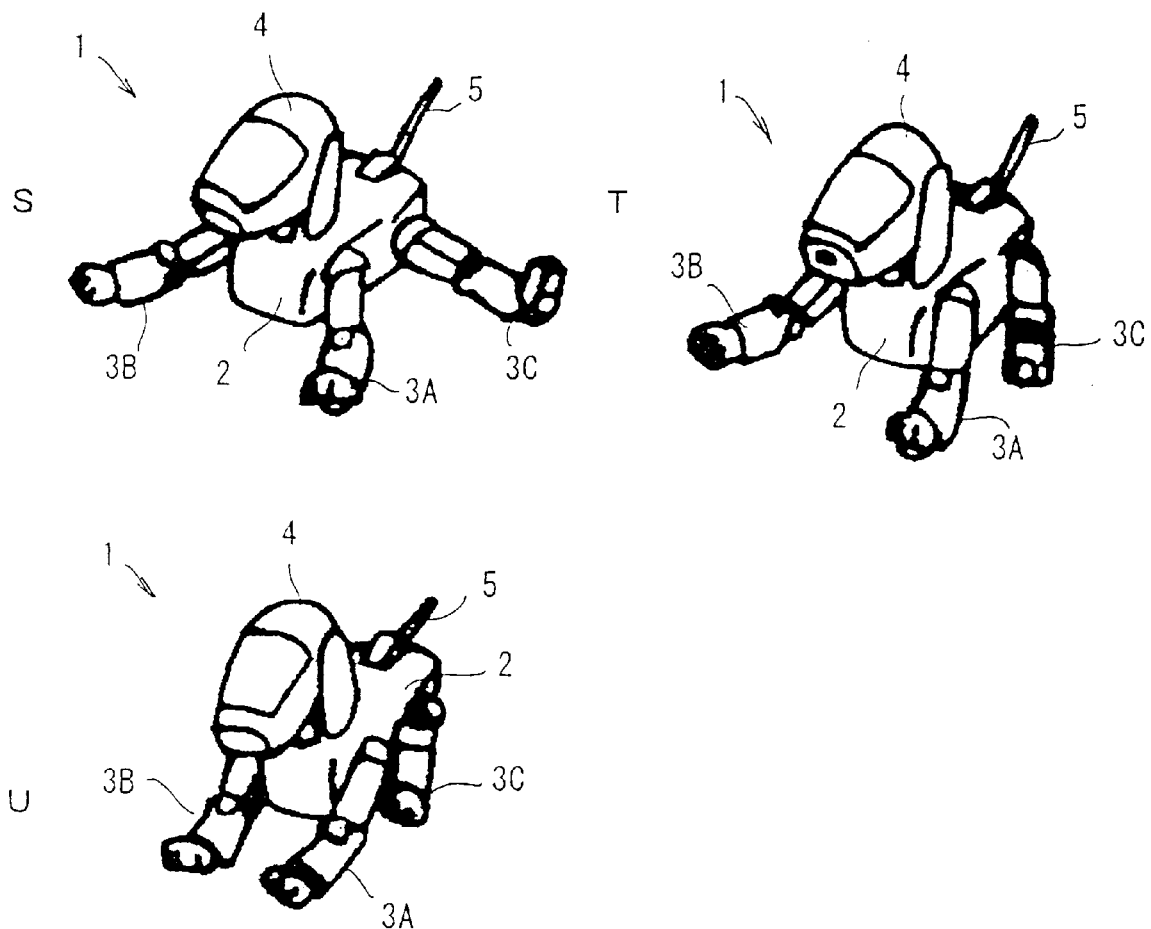
FIG. 24 is a schematic diagram illustrating the pet robot motion.

Then as shown in FIGS. 22F through 23D, the pet robot 1 performs the reverse of the actions in FIGS. 21F through 22E to return to its original position as shown in FIG. 23D. Next, the pet robot 1 performs the same action as in FIGS. 21F through 23D twice or three times.

Then as shown in FIGS. 23E through 24C, the pet robot 1 performs the reverse of the actions in FIGS. 21A through 21E to return to the down position. This ends the motion.

Such a motion shows a touch of a robot.

(3-2-2) Second Robot Language Motion

Next, a second robot language motion will be described below. When the pet robot 1 is in a basic down position as shown in FIG. 25A, it produces the second robot language motion.

Figure 25:
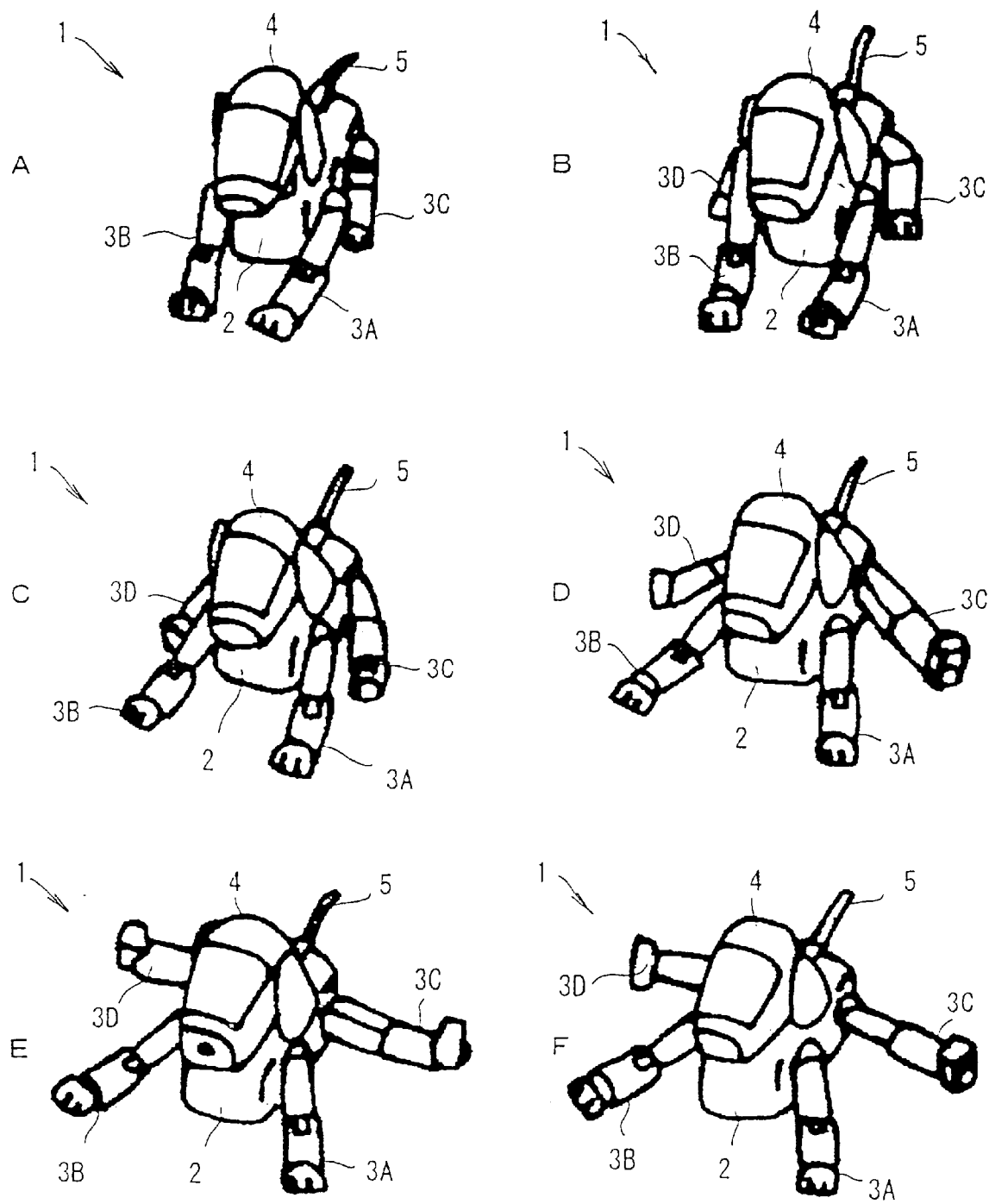
FIG. 25 is a schematic diagram illustrating the pet robot motion.
Figure 26:
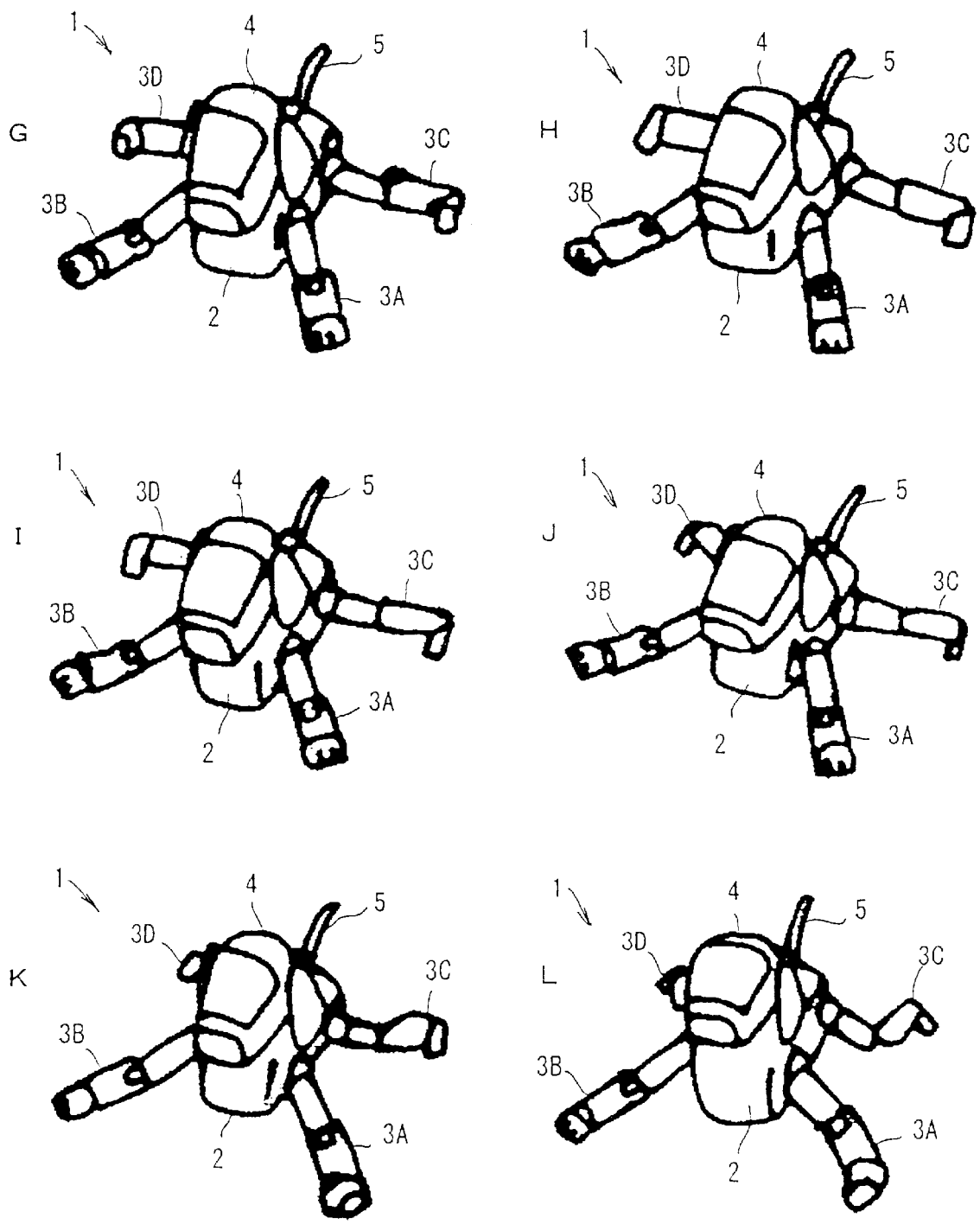
FIG. 26 is a schematic diagram illustrating the pet robot motion.
Figure 27:
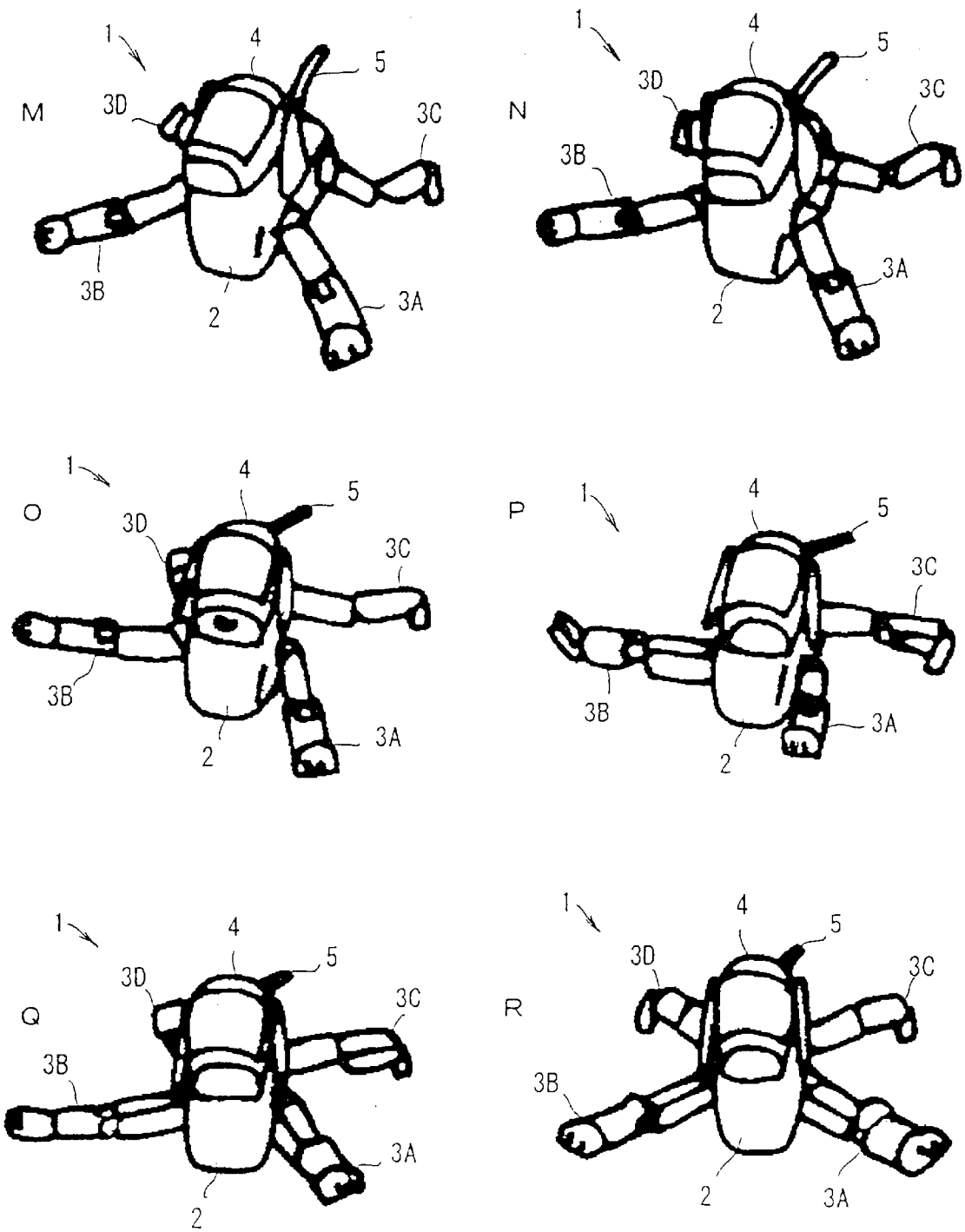
FIG. 27 is a schematic diagram illustrating the pet robot motion.
Figure 28:
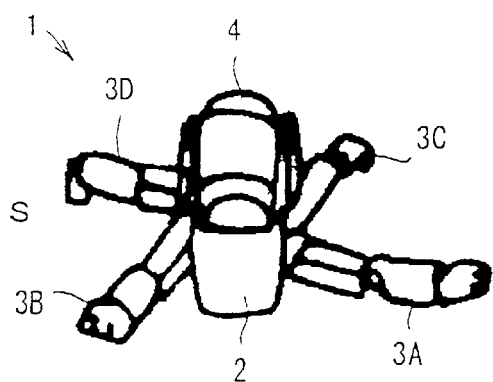
FIG. 28 is a schematic diagram illustrating the pet robot motion.
Figure 28:
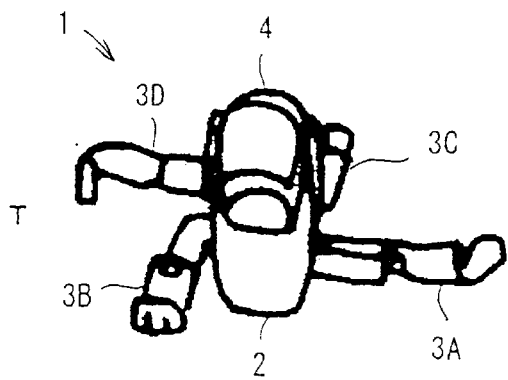
Figure 28:
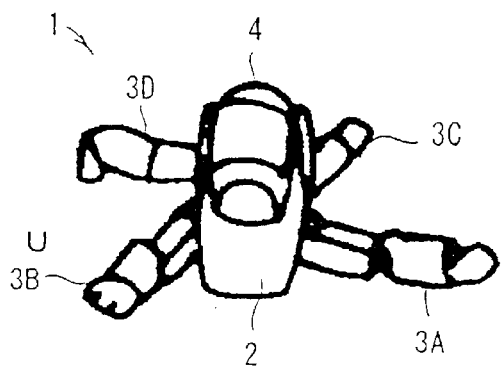
Figure 28:
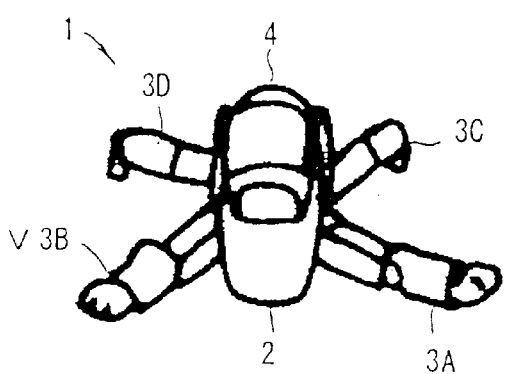
Figure 28:
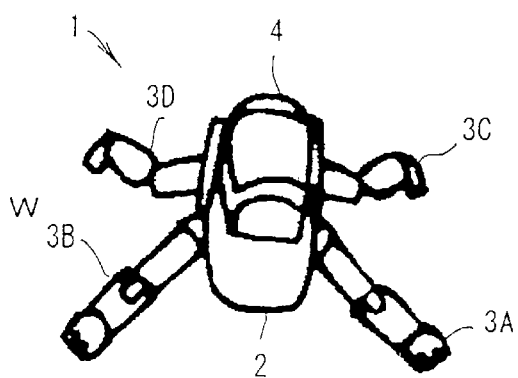
Figure 28:
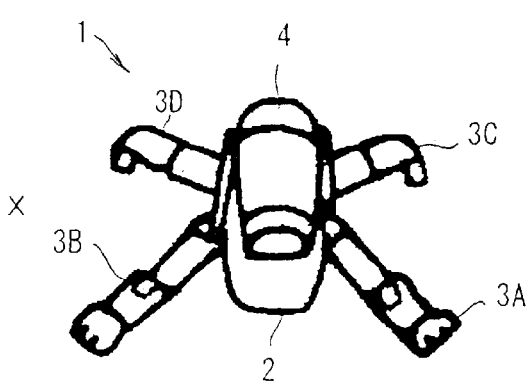
Figure 29:
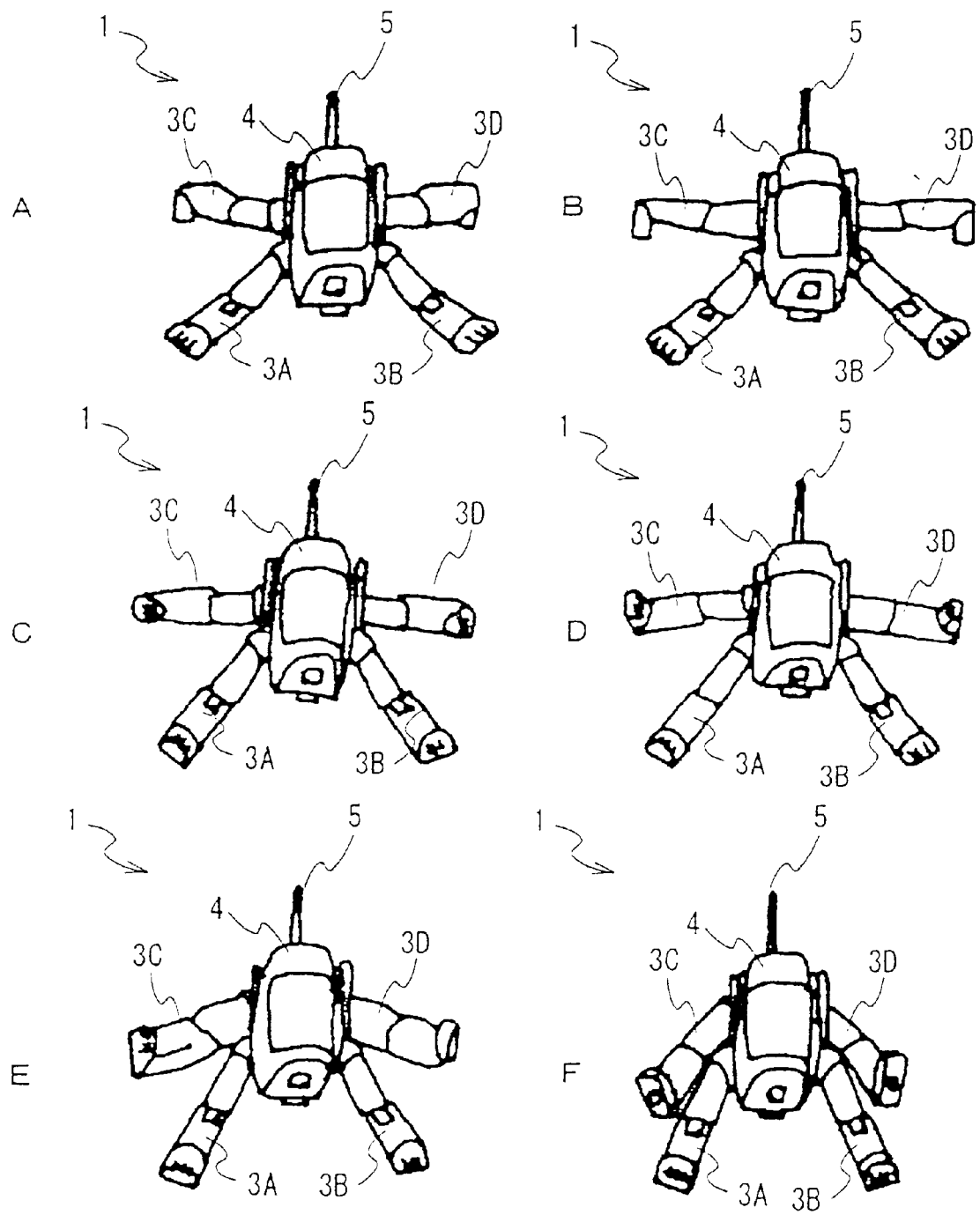
FIG. 29 is a schematic diagram illustrating the pet robot motion.
Figure 30:
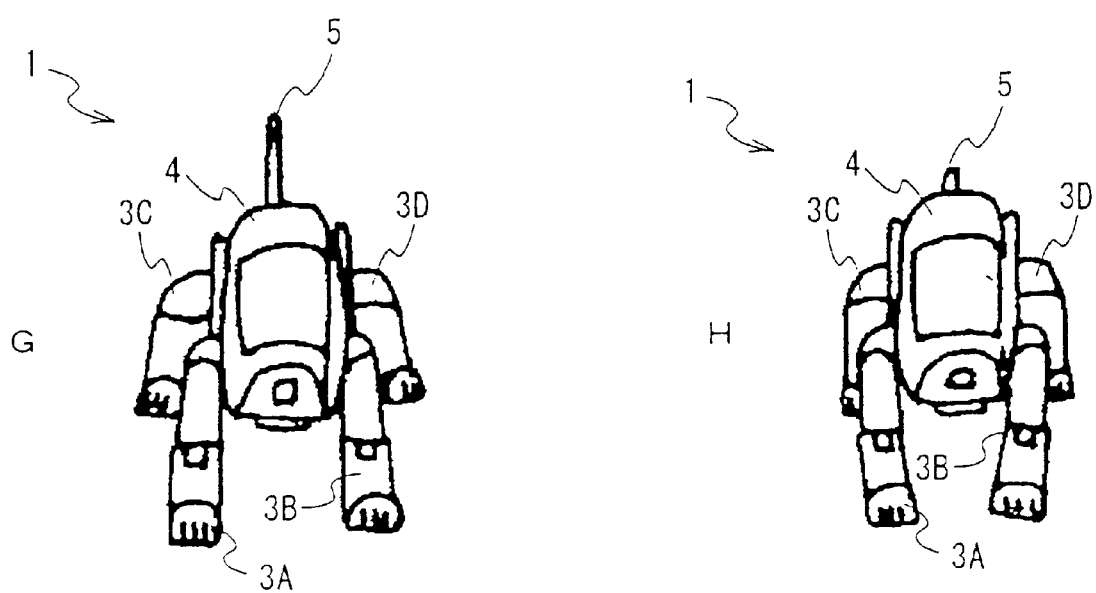
FIG. 30 is a schematic diagram illustrating the pet robot motion.

When it is in the down position as shown in FIG. 25A, the pet robot 1 acts as shown in FIGS. 25A through 27A as is the case with the first robot language motion illustrated in FIGS. 21A through 21F to take such a position that the right foreleg 3B and the left hind leg 3C and the left foreleg 3A and the right hind legs 3D form a cross, as shown in FIG. 27A.

Then as shown in FIGS. 27B through 28D, the pet robot 1 alternately turns a combination of the right foreleg 3B and the right hind leg 3C and a combination of the left foreleg 3A and the right hind leg 3D through a predetermined angle a few times so that the angle does not change which is made by a straight line formed by the right foreleg 3B and the left hind leg 3C and one formed by the left foreleg 3A and the right hind leg 3D.

When the combination of the right foreleg 3B and the left hind leg 3C and that of the left foreleg 3A and the right hind leg 3D takes the position in FIG. 27A as shown in FIG. 28F after the action is completed, the pet robot 1 performs the reverse of the actions in FIGS. 25A through 27A as shown in FIGS. 29A through 30B to return to the original down position. This ends the motion.

Such a motion shows a touch of a robot.

(3-2-3) Third Robot Language Motion

A third robot language motion will be described below. The pet robot 1 produces the third robot language motion as performance in response to a direction from the user.

Figure 31:
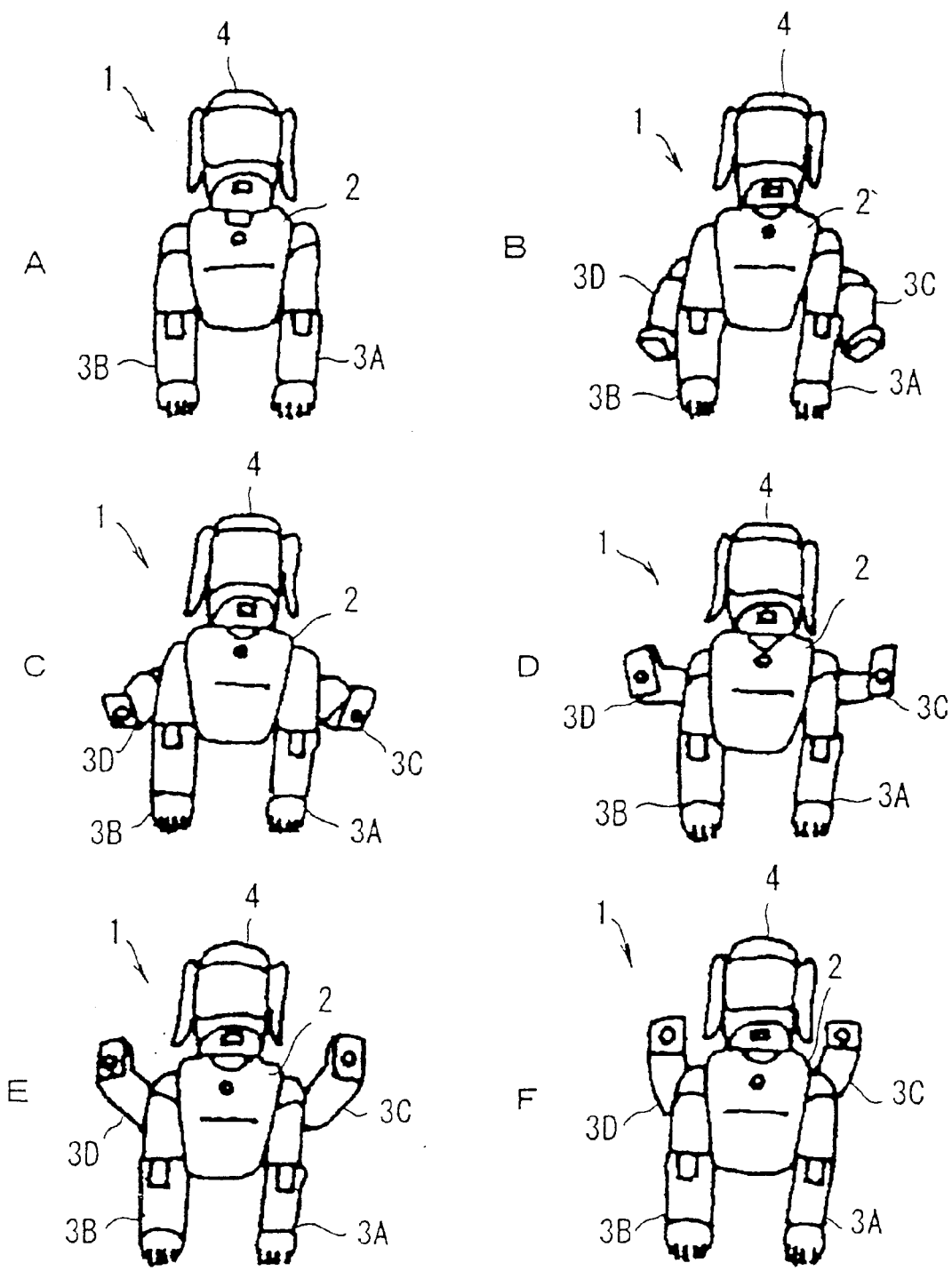
FIG. 31 is a schematic diagram illustrating the pet robot motion.
Figure 32:
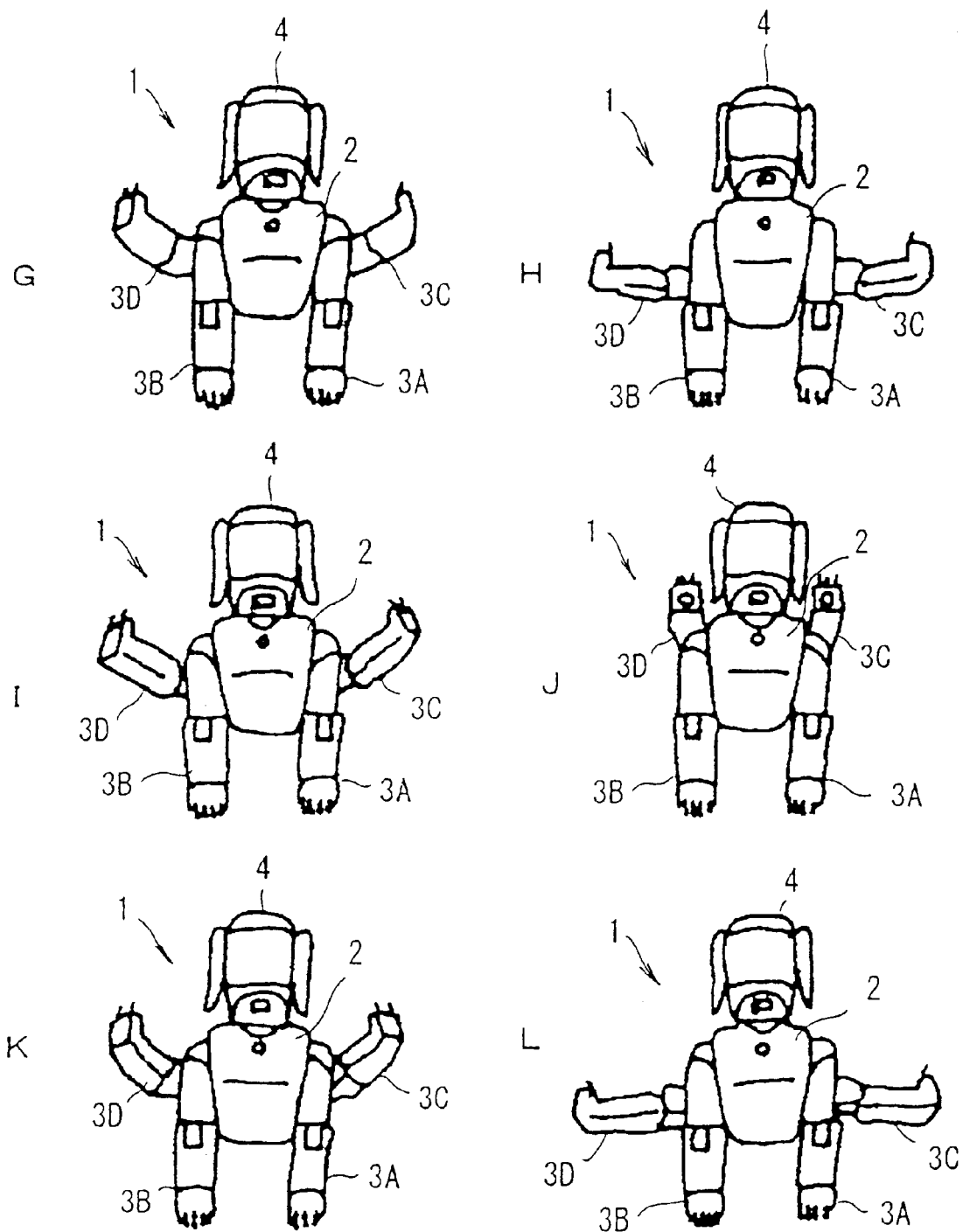
FIG. 32 is a schematic diagram illustrating the pet robot motion.

When it is in the basic down position as shown in FIG. 31A, the pet robot 1 slightly opens the right and left hind legs 3D and 3C apart outside as shown in FIG. 31B and then lifts the right and left hind legs 3D and 3C to the extent that the ends of these legs are a little above the shoulders as shown in FIGS. 31C through 31F.

Then as shown in FIGS. 32A through 32F, the pet robot 1 turns the right and left hind legs 3D and 3C one after the other a plurality of times in such directions that the legs open and close to swing the right and left hind legs 3D and 3C a plurality of times.

Figure 33:
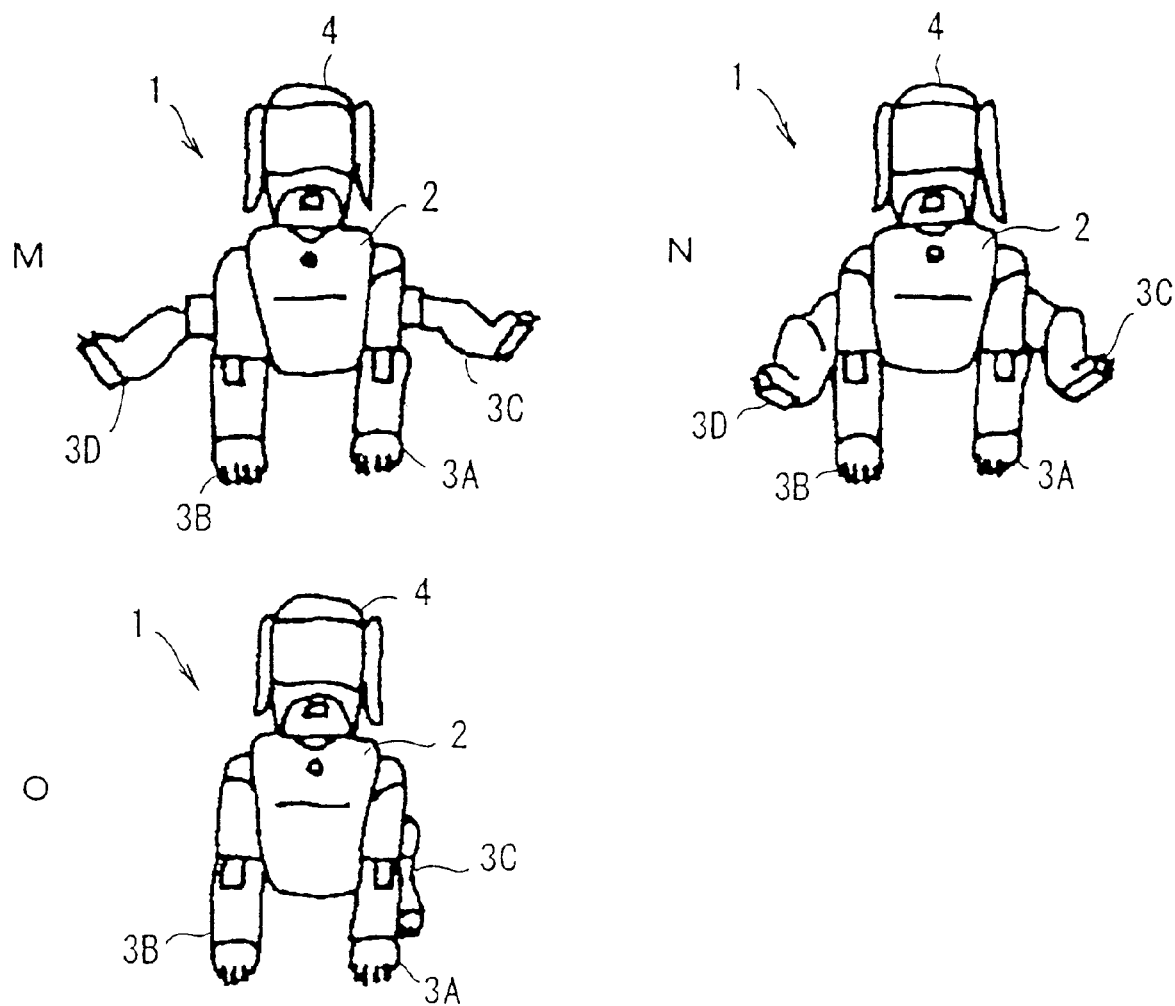
FIG. 33 is a schematic diagram illustrating the pet robot motion.
Figure 34:
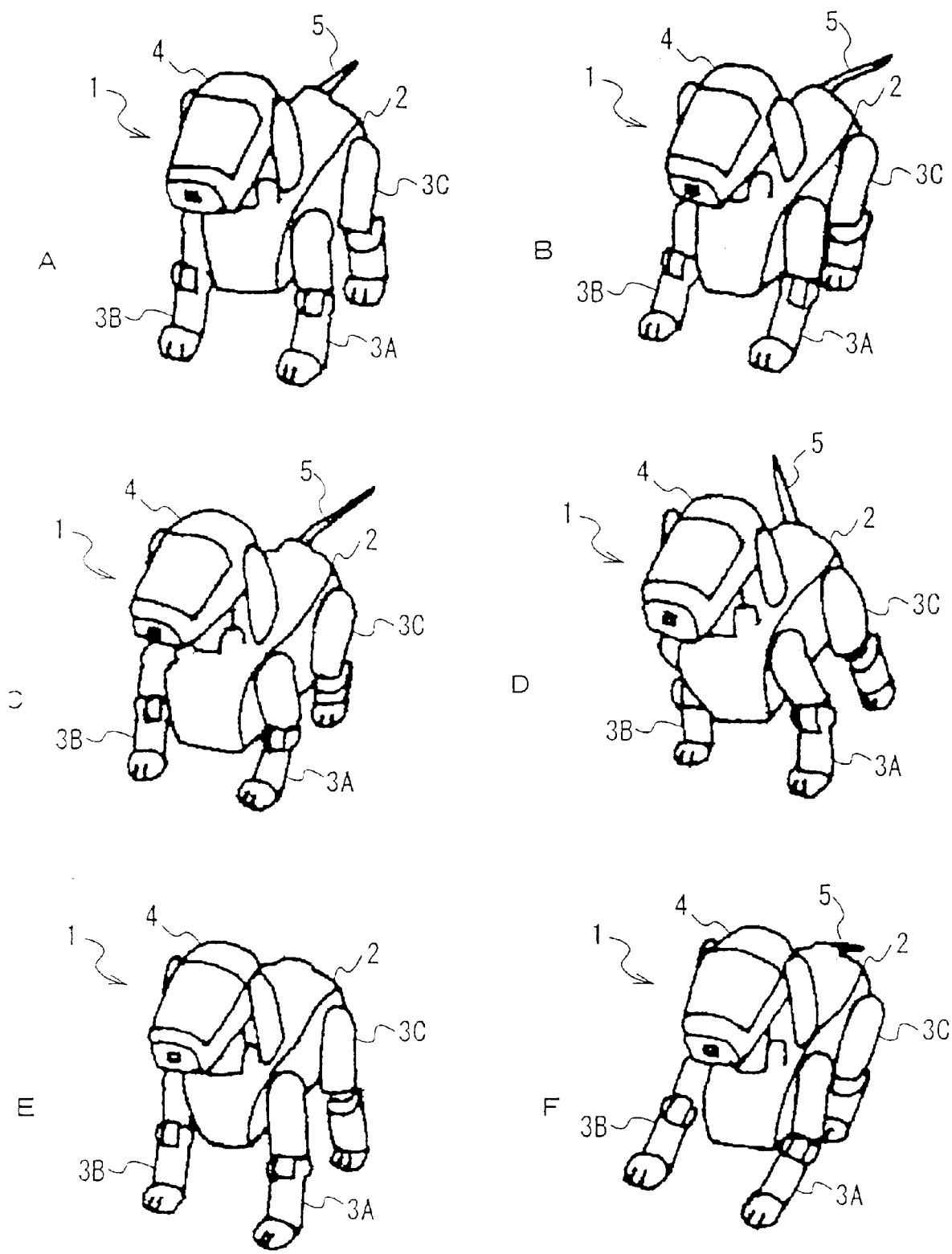
FIG. 34 is a schematic diagram illustrating the pet robot motion.
Figure 35:
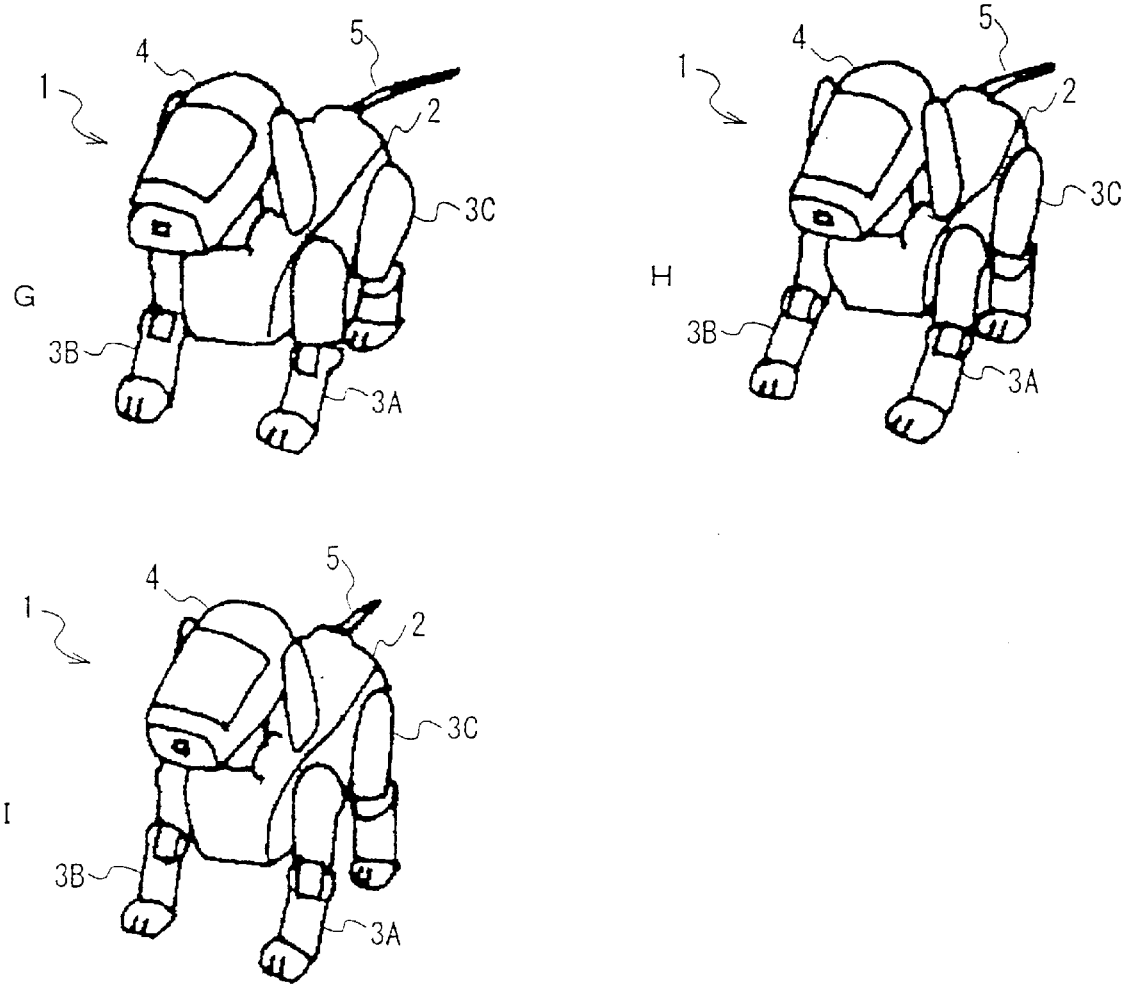
FIG. 35 is a schematic diagram illustrating the pet robot motion.
Figure 36:
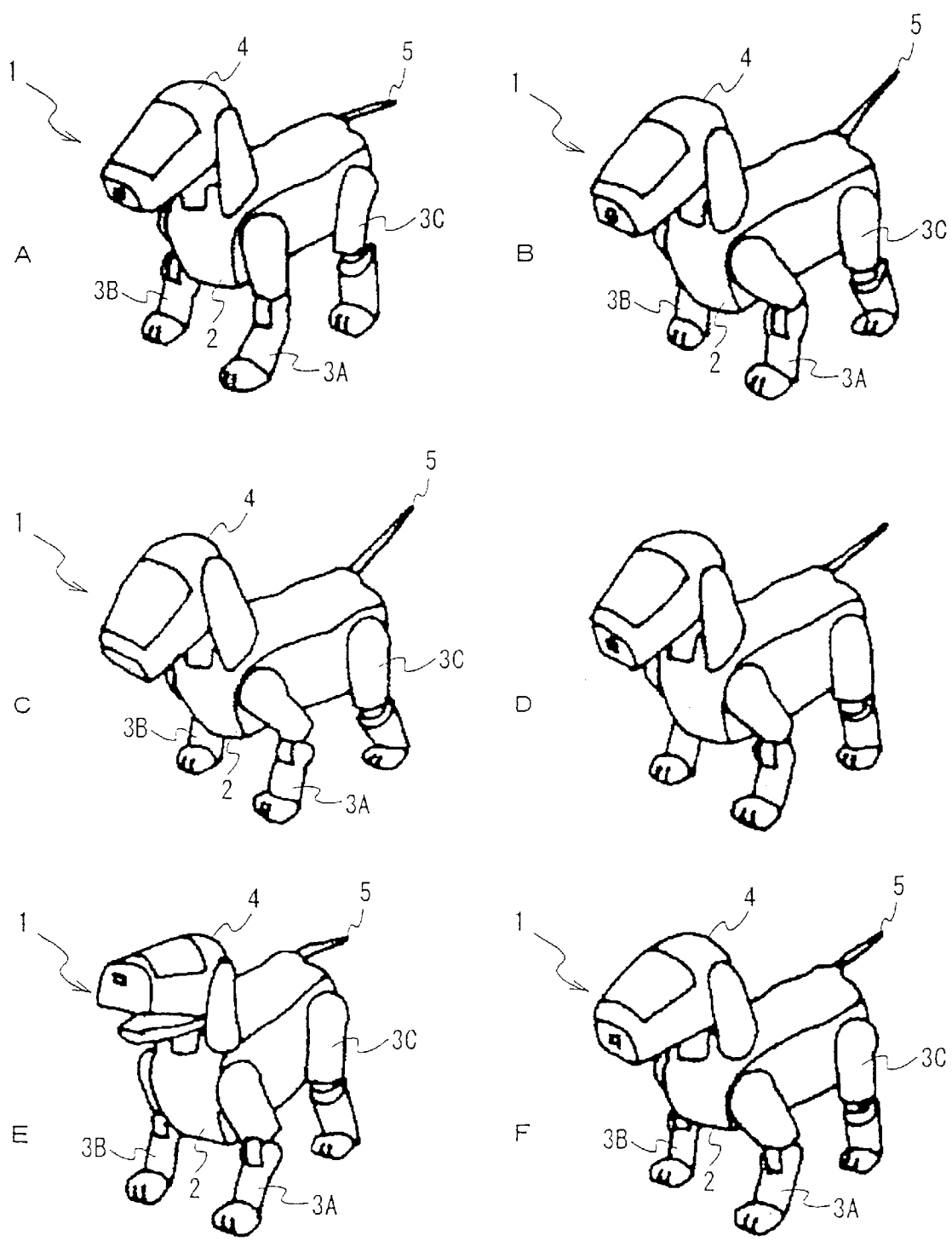
FIG. 36 is a schematic diagram illustrating the pet robot motion.
Figure 37:
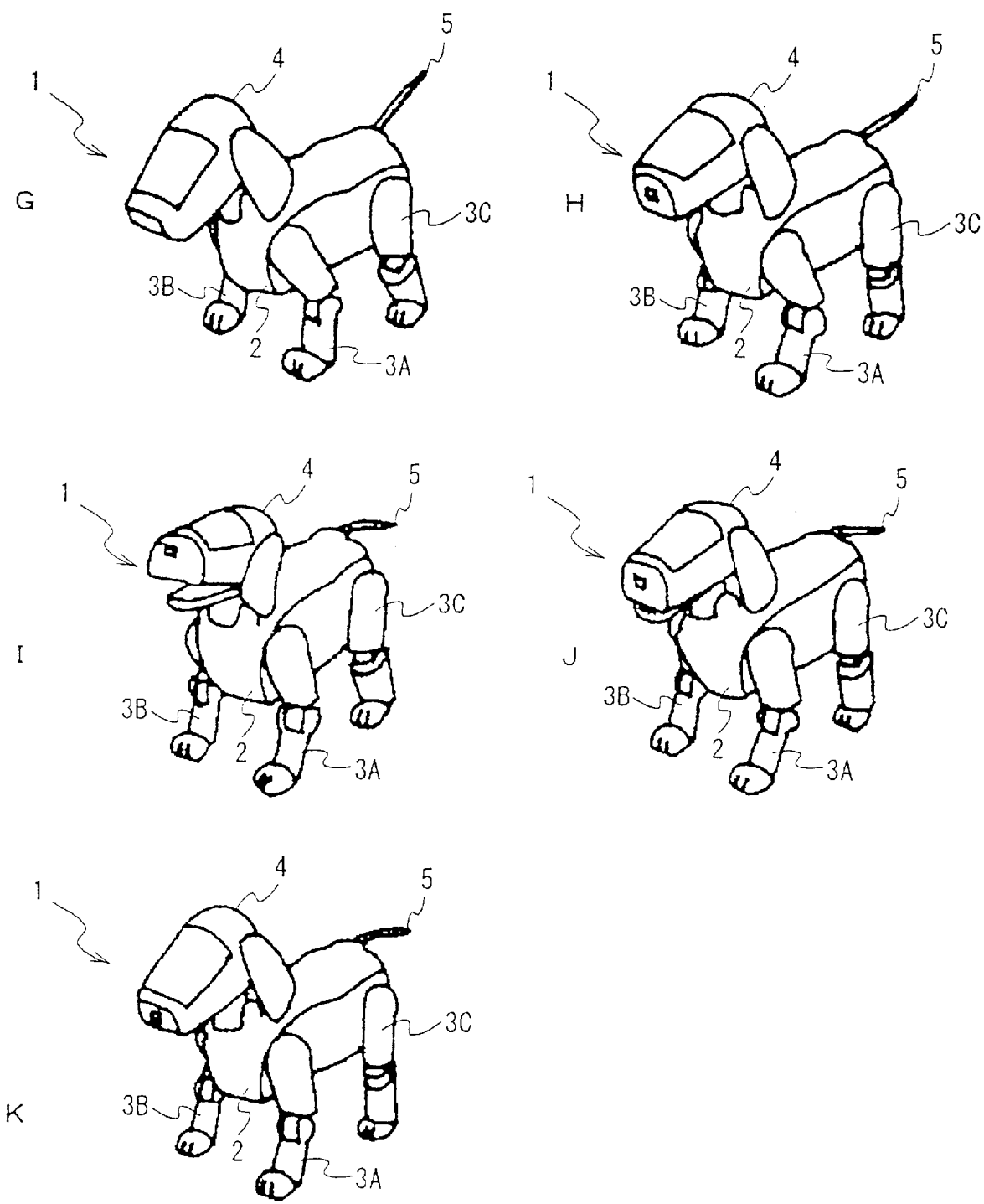
FIG. 37 is a schematic diagram illustrating the pet robot motion.
Figure 38:
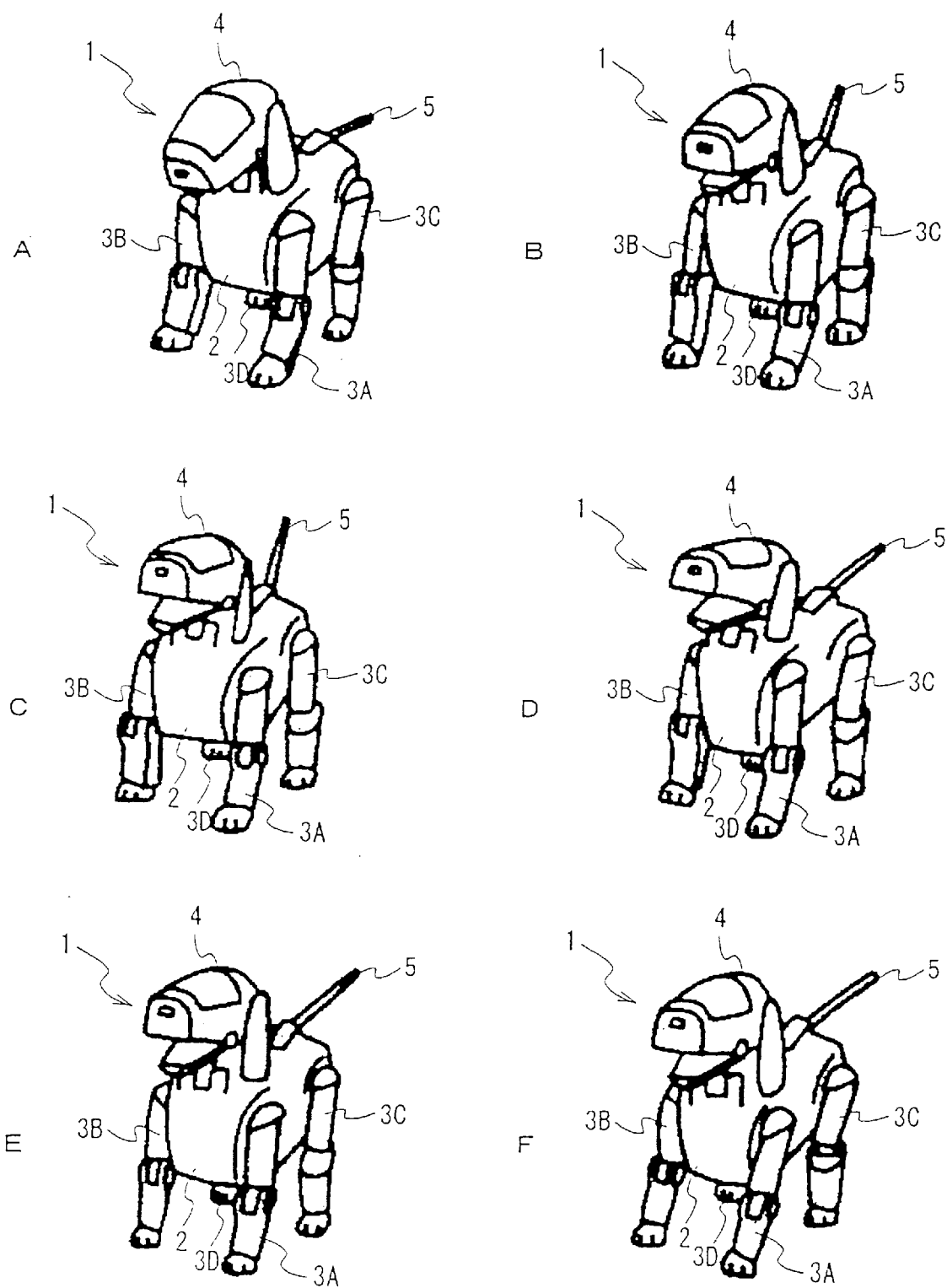
FIG. 38 is a schematic diagram illustrating the pet robot motion.
Figure 39:
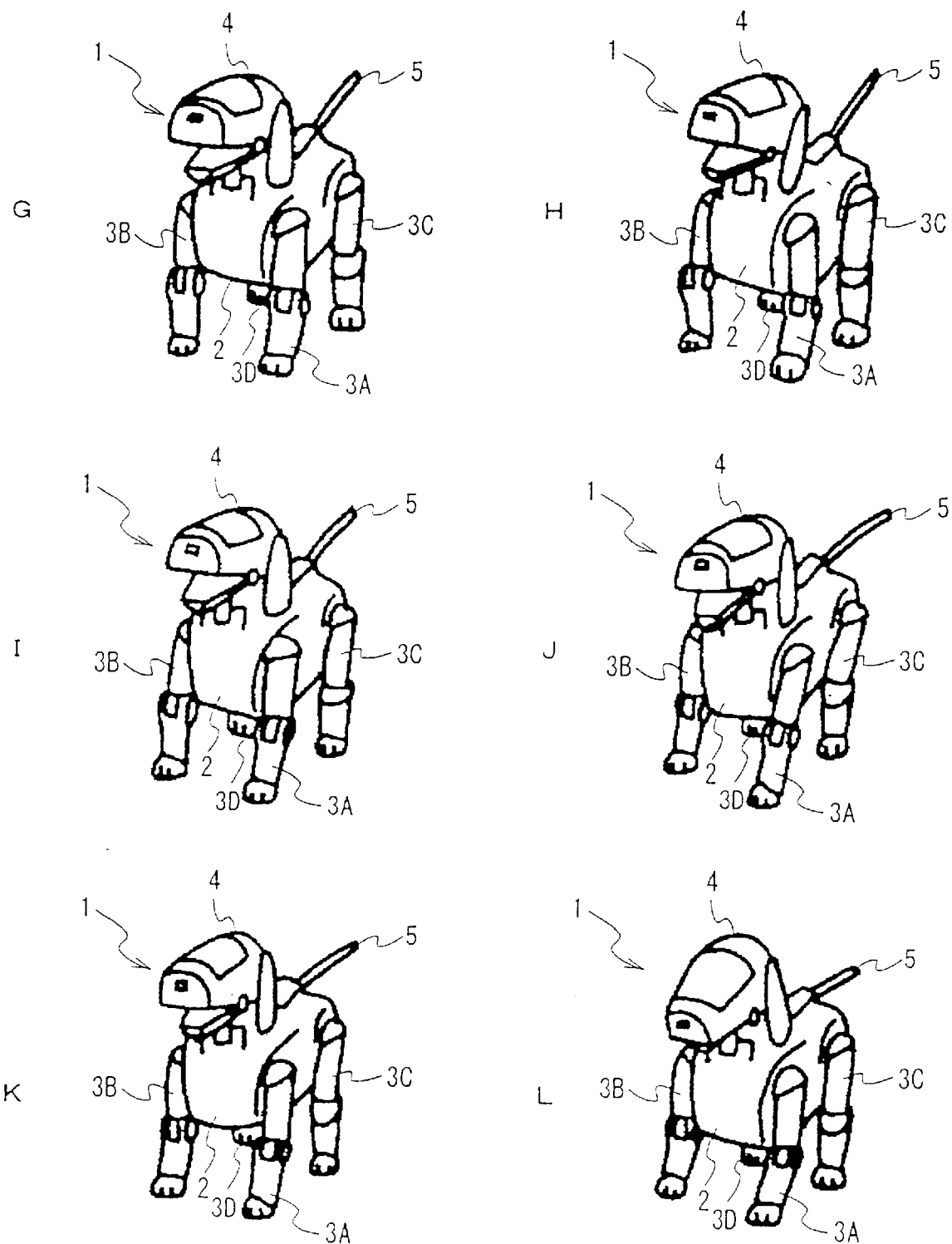
FIG. 39 is a schematic diagram illustrating the pet robot motion.
Figure 40:
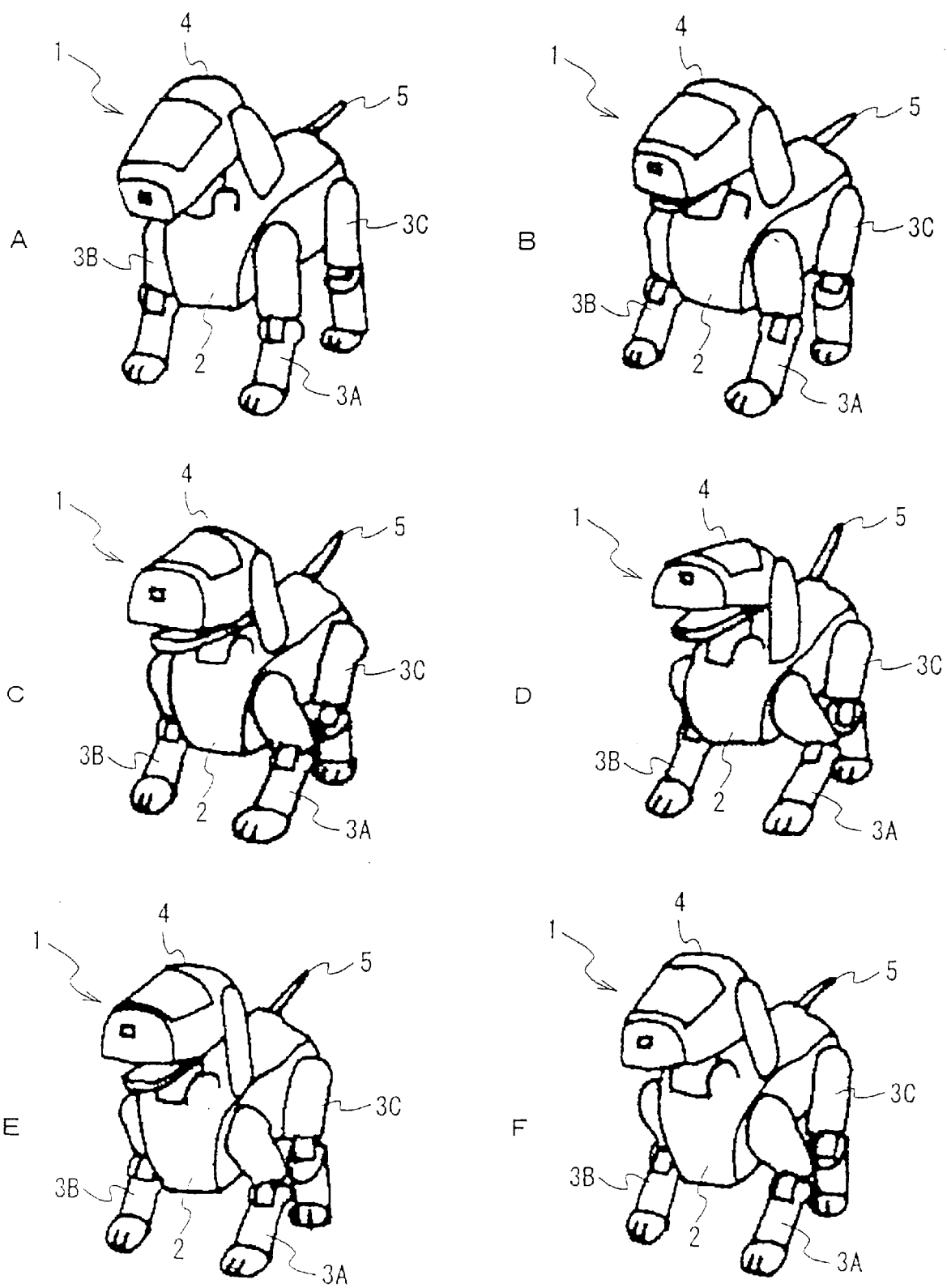
FIG. 40 is a schematic diagram illustrating the pet robot motion.
Figure 41:
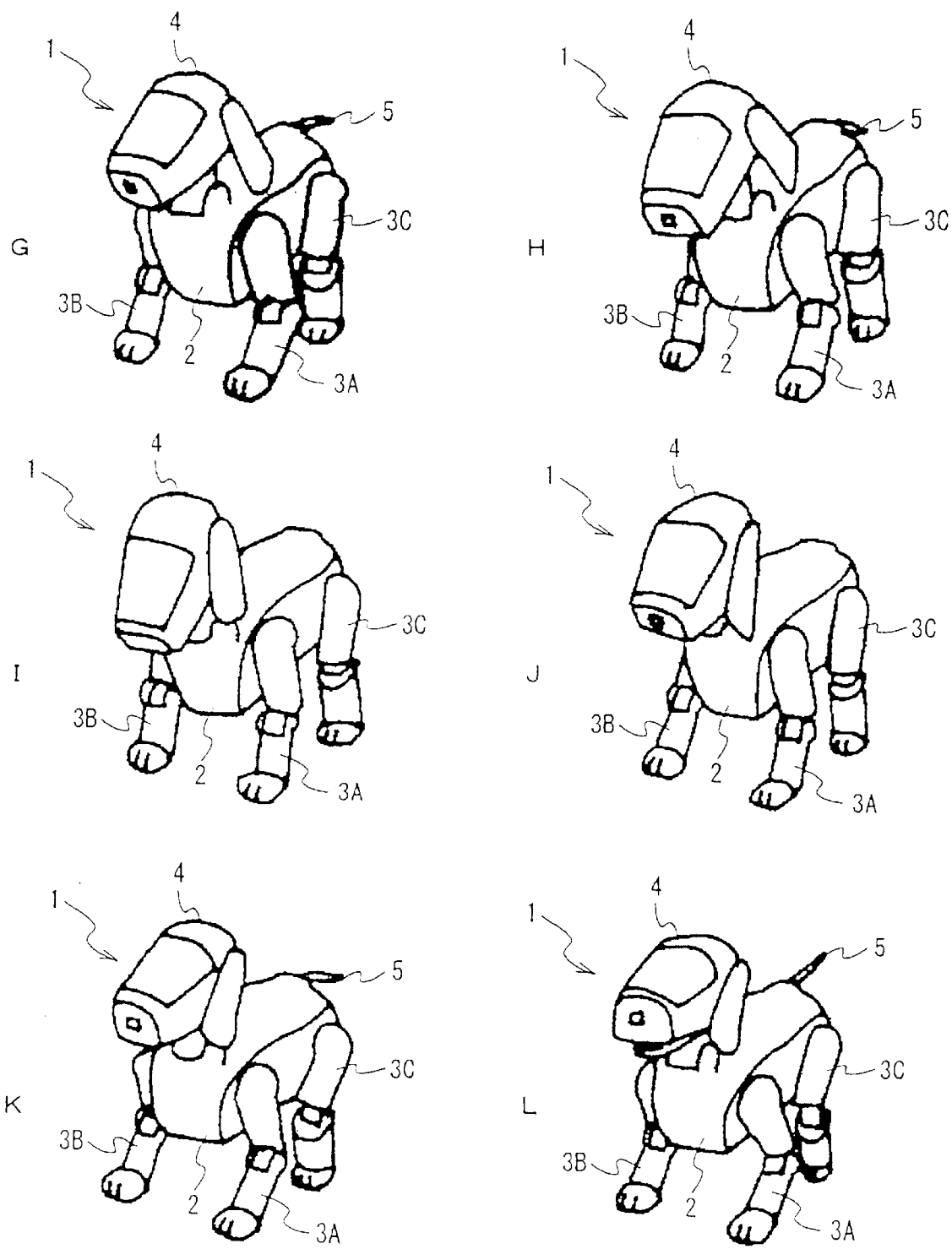
FIG. 41 is a schematic diagram illustrating the pet robot motion.
Figure 42:
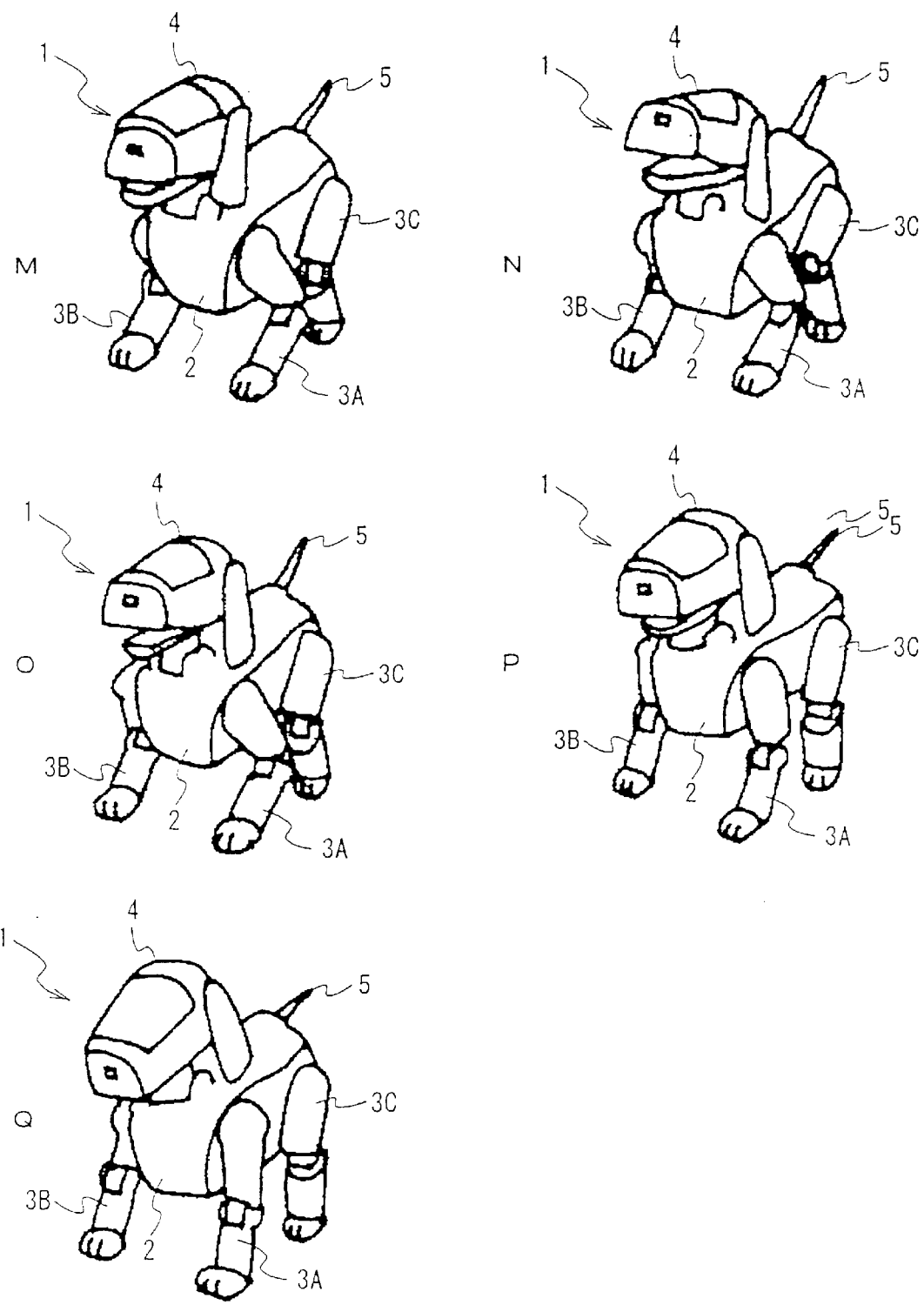
FIG. 42 is a schematic diagram illustrating the pet robot motion.

After this action is completed, the pet robot 1 lowers the right and left hind legs 3D and 3C until they are extended forward as shown in FIGS. 33A through 33C and then removes the legs inside to return to the original down position. This ends the motion.

Such a motion shows a touch of a robot.

(3-2-4) Other Robot Language Motions

FIGS. 34A through 35C, 36A through 37E, 38A through 39F, and 40A through 42E show other robot language motions, that is, fourth, fifth, sixth, and seventh robot language motions, respectively.

(3-3) Dog Motions

Next, doglike motions will be described below which the pet robot 1 makes when the condition recognizing mechanism 30 (FIG. 3) in the controller 10 (FIG. 2) does not provide a specific recognition result (these motions are hereinafter called dog motions).

(3-3-1) First Dog Motion

Figure 43:
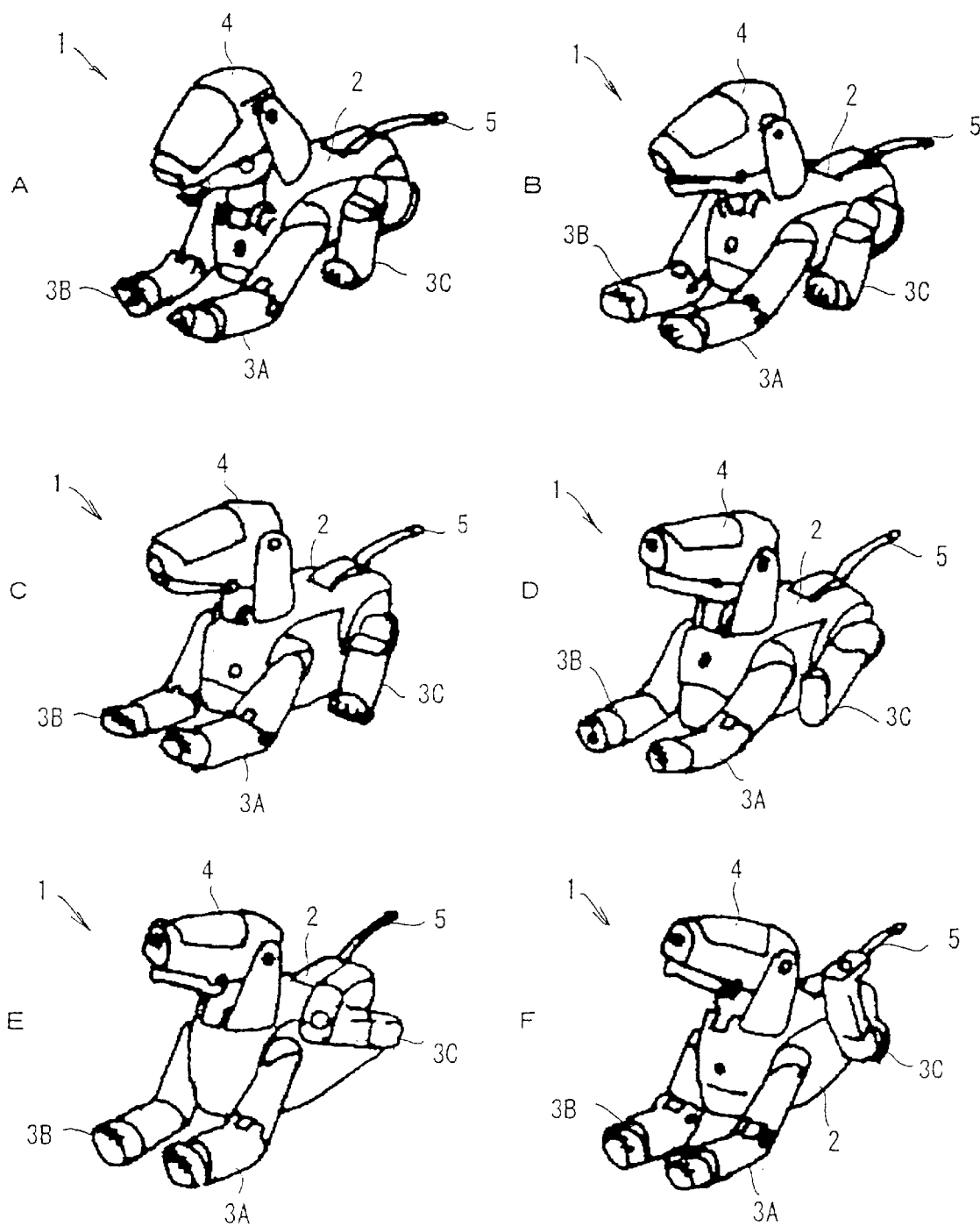
FIG. 43 is a schematic diagram illustrating the pet robot motion.
Figure 44:
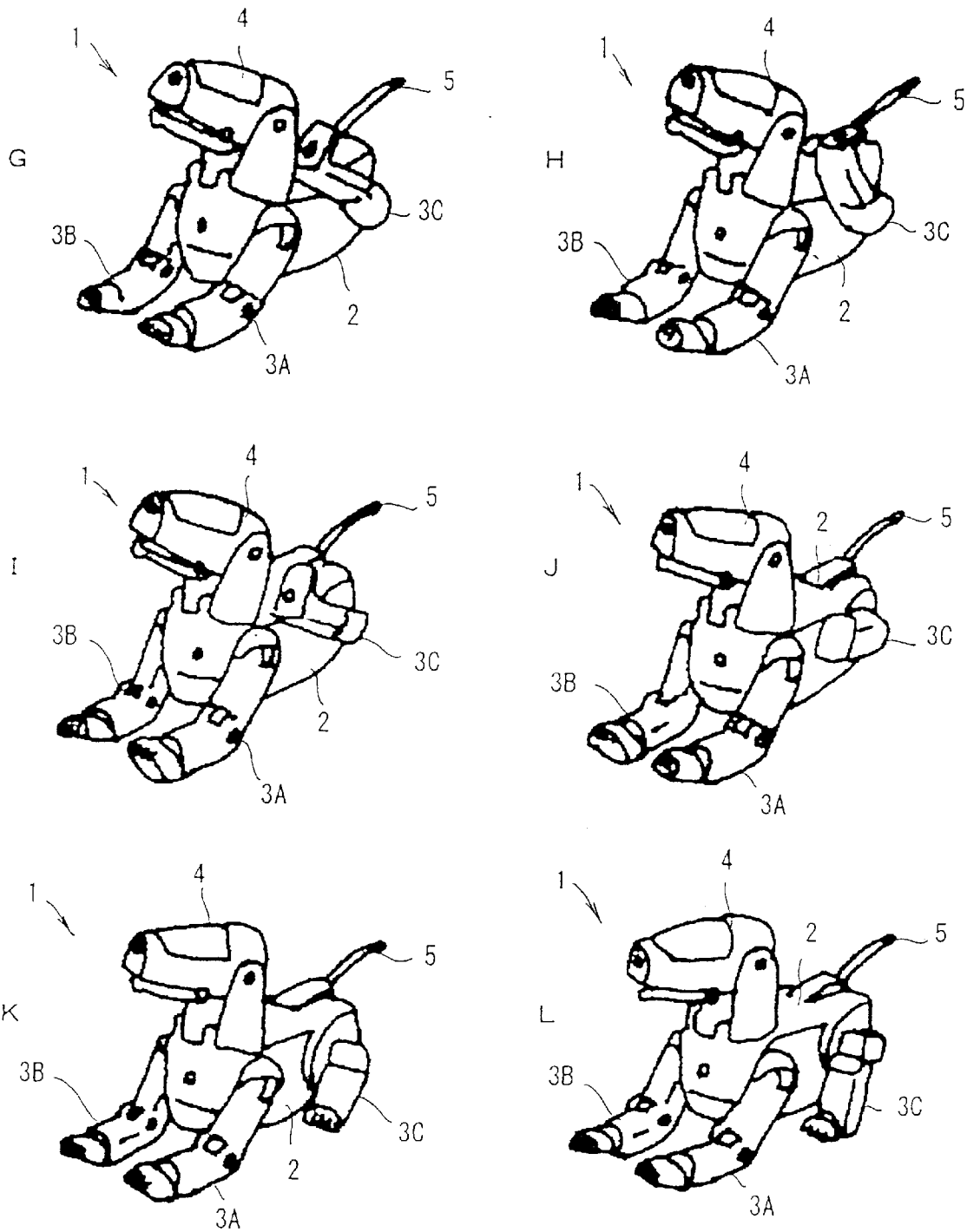
FIG. 44 is a schematic diagram illustrating the pet robot motion.
Figure 45:
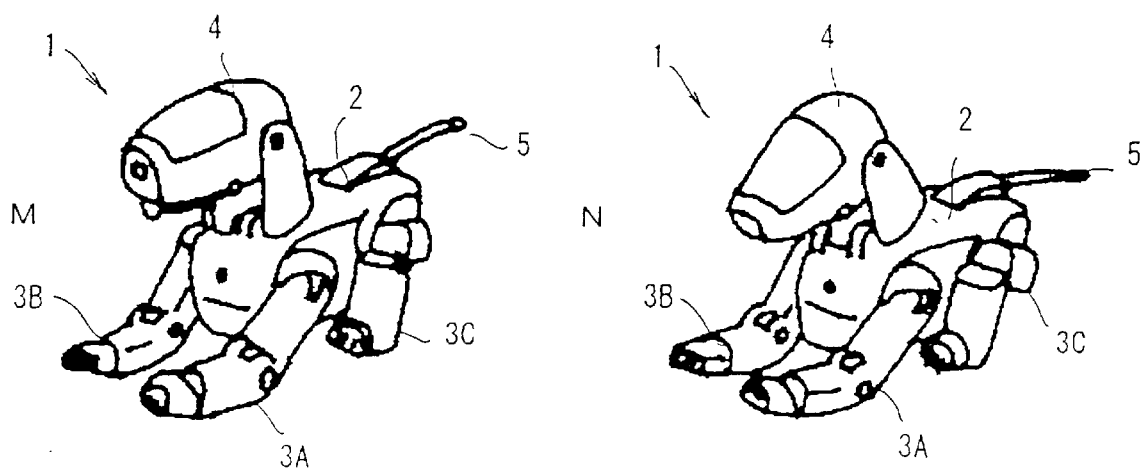
FIG. 45 is a schematic diagram illustrating the pet robot motion.

A first dog motion will be described below. When the pet robot 1 is in a basic down position as shown in FIG. 43A, it produces the first dog motion.

When it is in the down position, with the right and left forelegs 3B and 3A extended forward as shown in FIG. 43A, the pet robot 1 slightly moves the left hind leg 3C (or the right hind leg 3D) outside as shown in FIGS. 43B and 43C to open it and then lifts the left hind leg 3C (or the right hind leg 3D) as shown in FIGS. 43D through 43F. In parallel, the pet robot 1 turns the head 4 to direct it off to the upper right forward (or off to the upper left forward).

Then when the contact surface of the left hind leg 3C (or the right hind leg 3D) has risen to the back of the head 4, the pet robot 1 vertically turns the left hind leg 3C (or the right hind leg 3D) twice or three times as shown in FIGS. 43F through 44C to scratch the back of the head 4 with the left hind leg 3C (or the right hind leg 3D).

Next, the pet robot lowers the left hind leg 3C (or the right hind leg 3D) as shown in FIGS. 44D through 44F and then moves the left hind leg 3C (or the right hind leg 3D) to return it inside, thus taking the original down position. This ends the motion.

Such a motion can produce a feeling that the pet robot 1 scratches the back of the head 4, thus giving the user a doglike impression.

(3-3-2) Second Dog Motion

Figure 46:
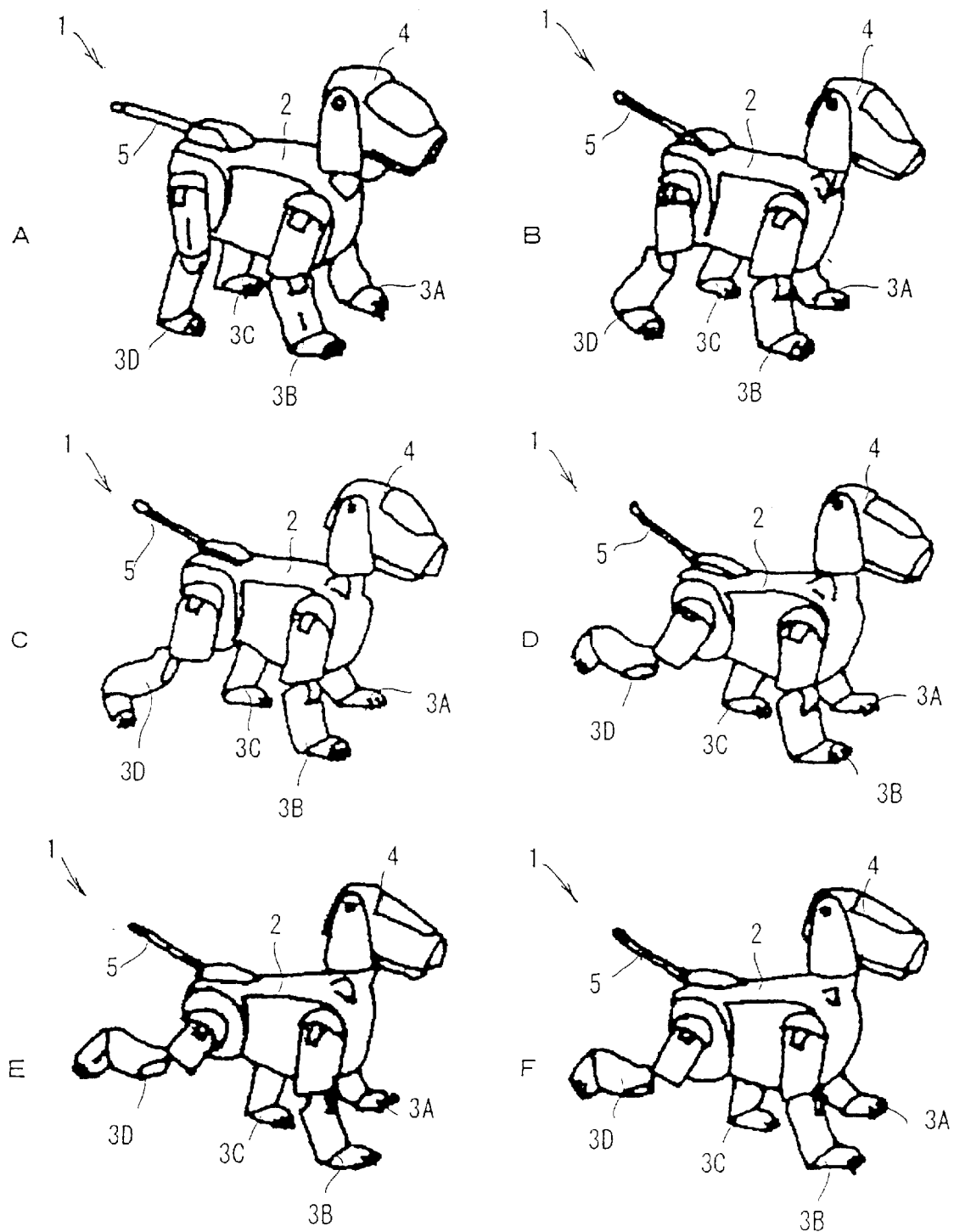
FIG. 46 is a schematic diagram illustrating the pet robot motion.
Figure 47:
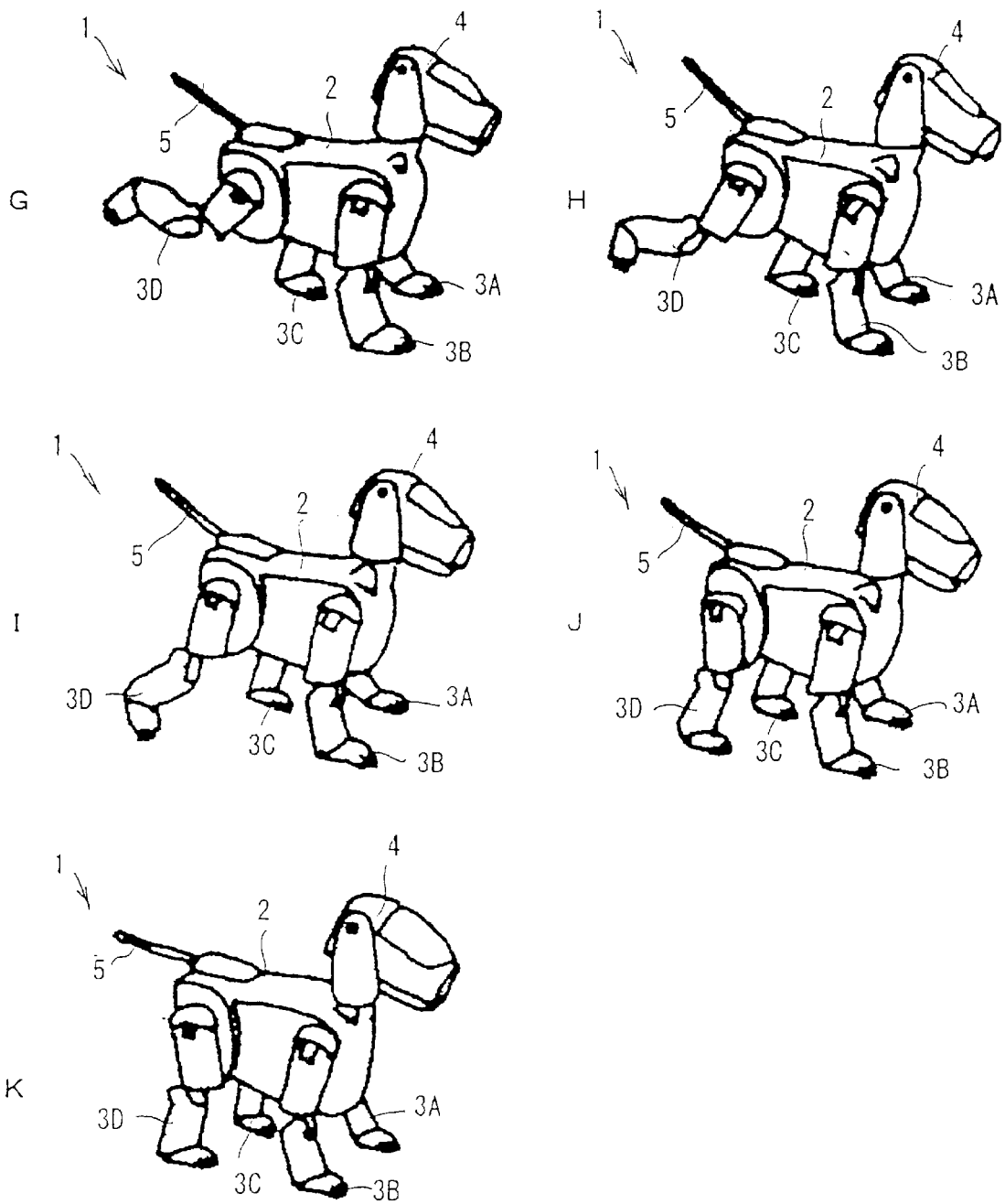
FIG. 47 is a schematic diagram illustrating the pet robot motion.
Figure 48:
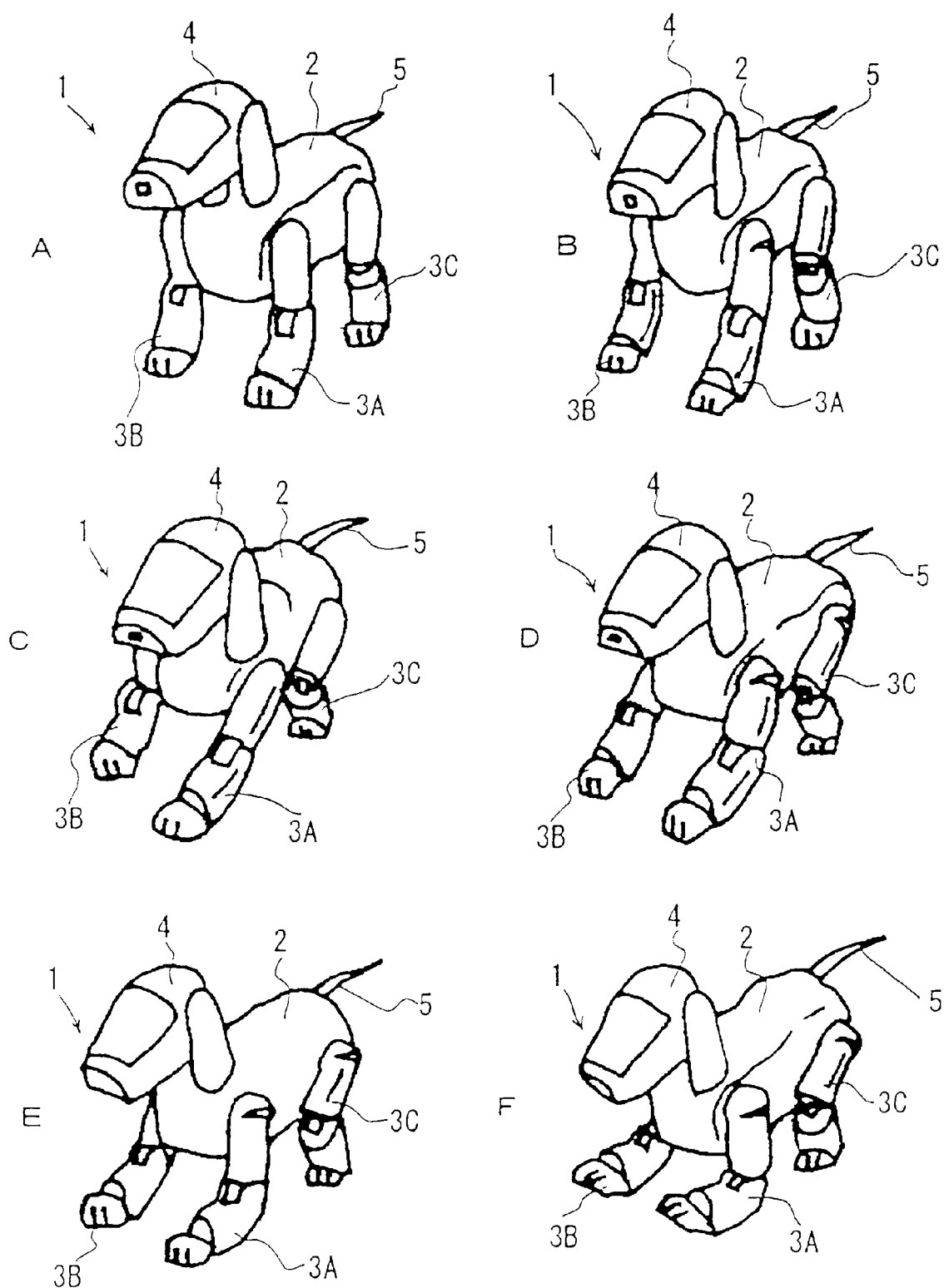
FIG. 48 is a schematic diagram illustrating the pet robot motion.
Figure 49:
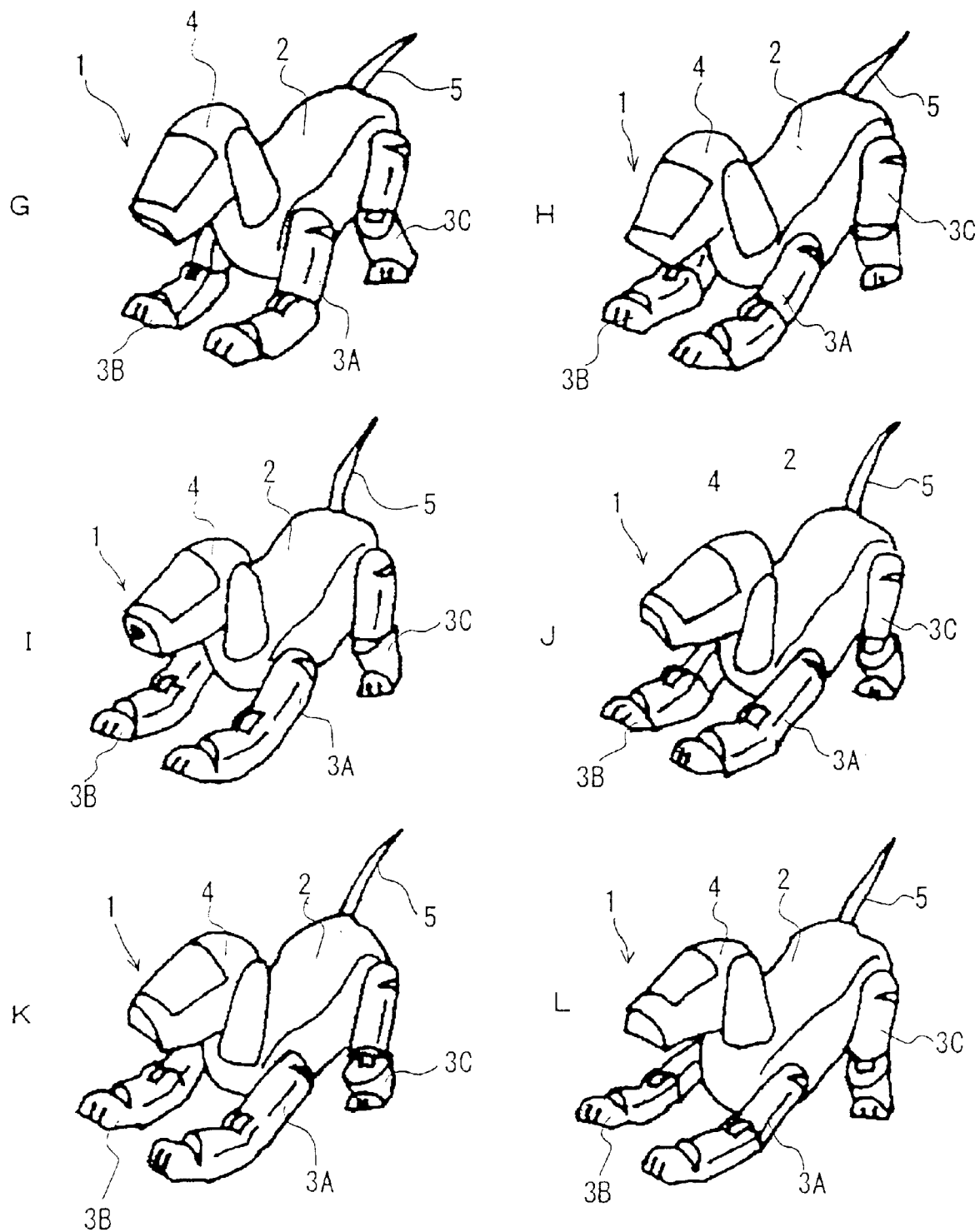
FIG. 49 is a schematic diagram illustrating the pet robot motion.
Figure 50:
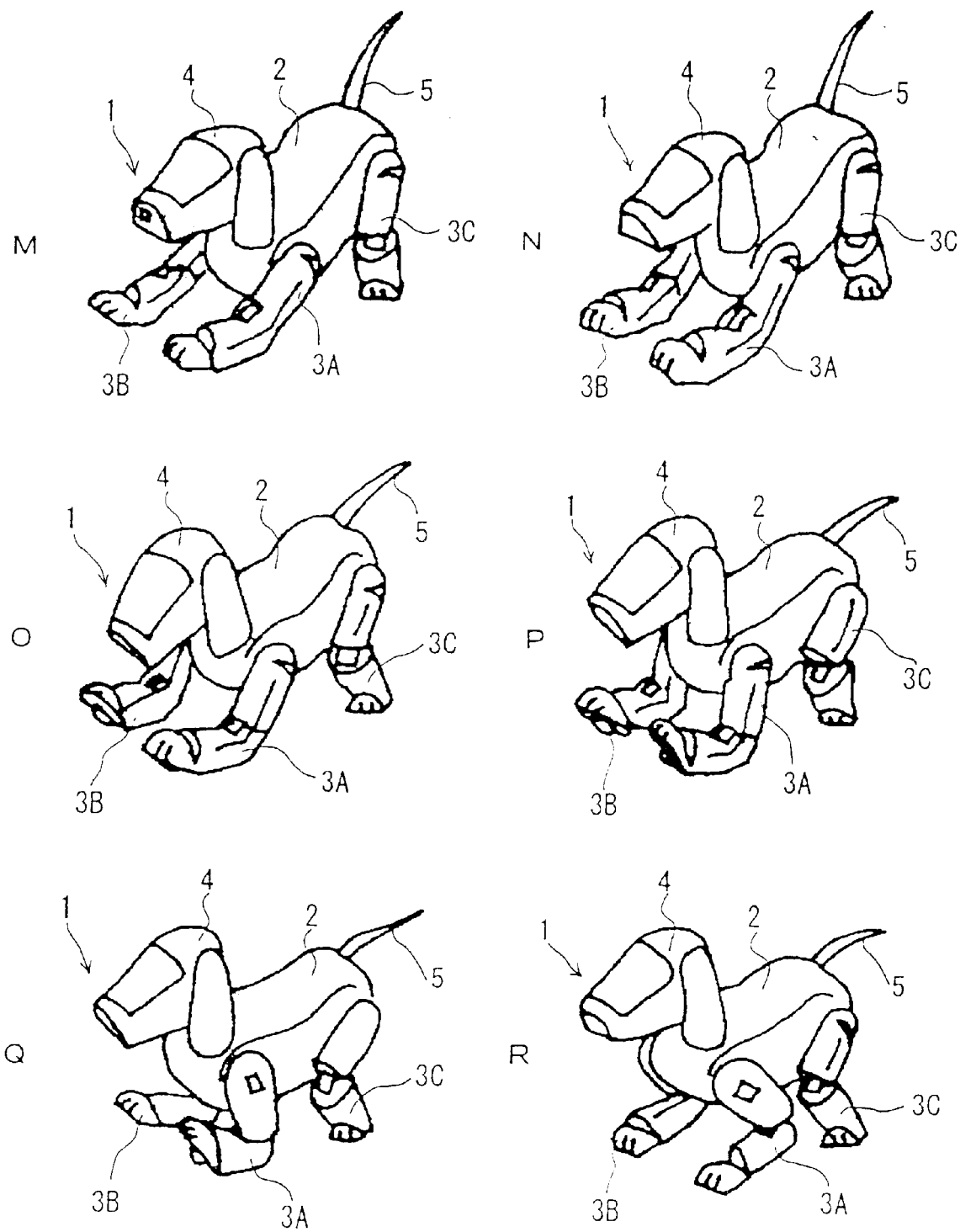
FIG. 50 is a schematic diagram illustrating the pet robot motion.
Figure 51:
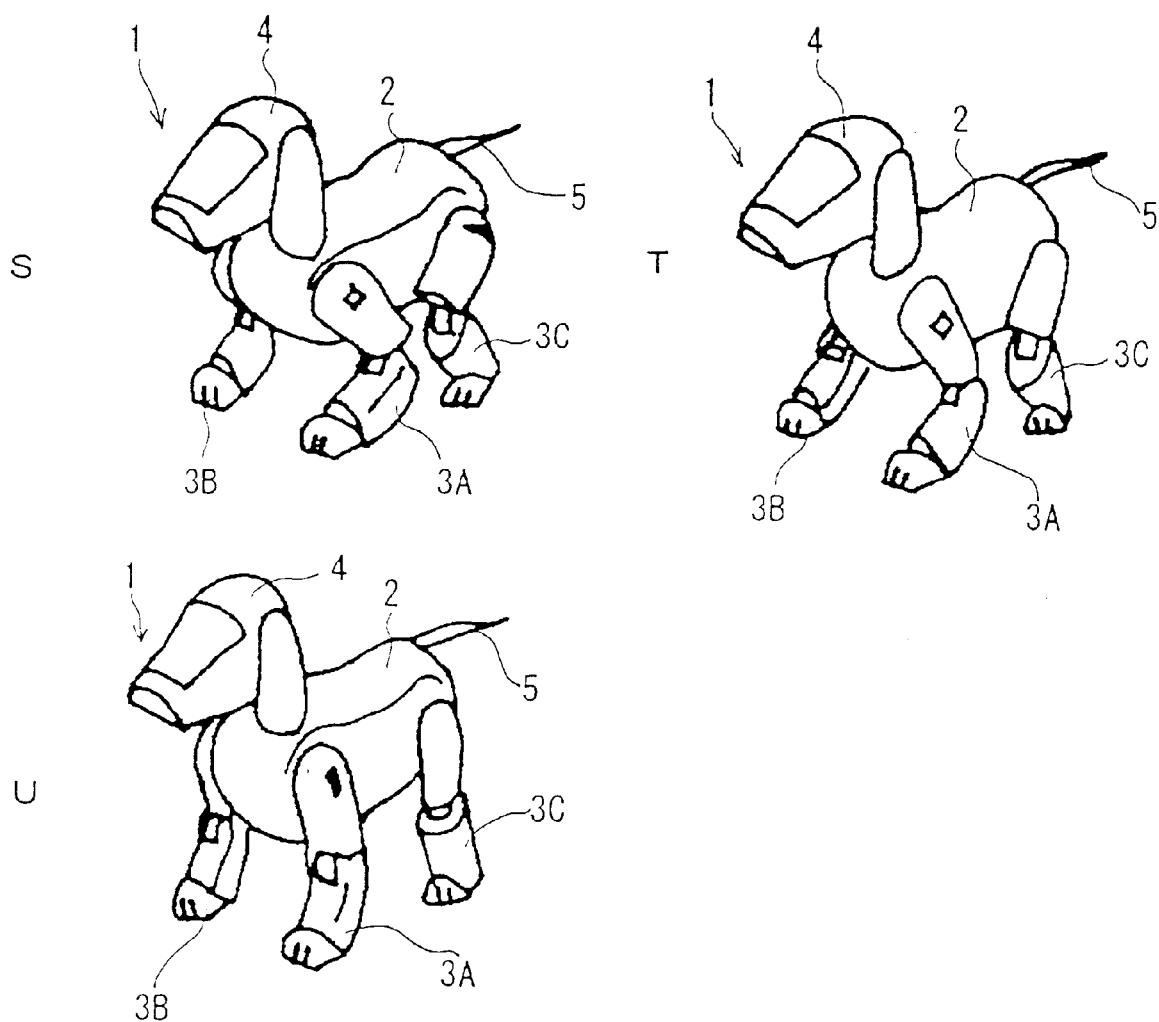
FIG. 51 is a schematic diagram illustrating the pet robot motion.
Figure 52:
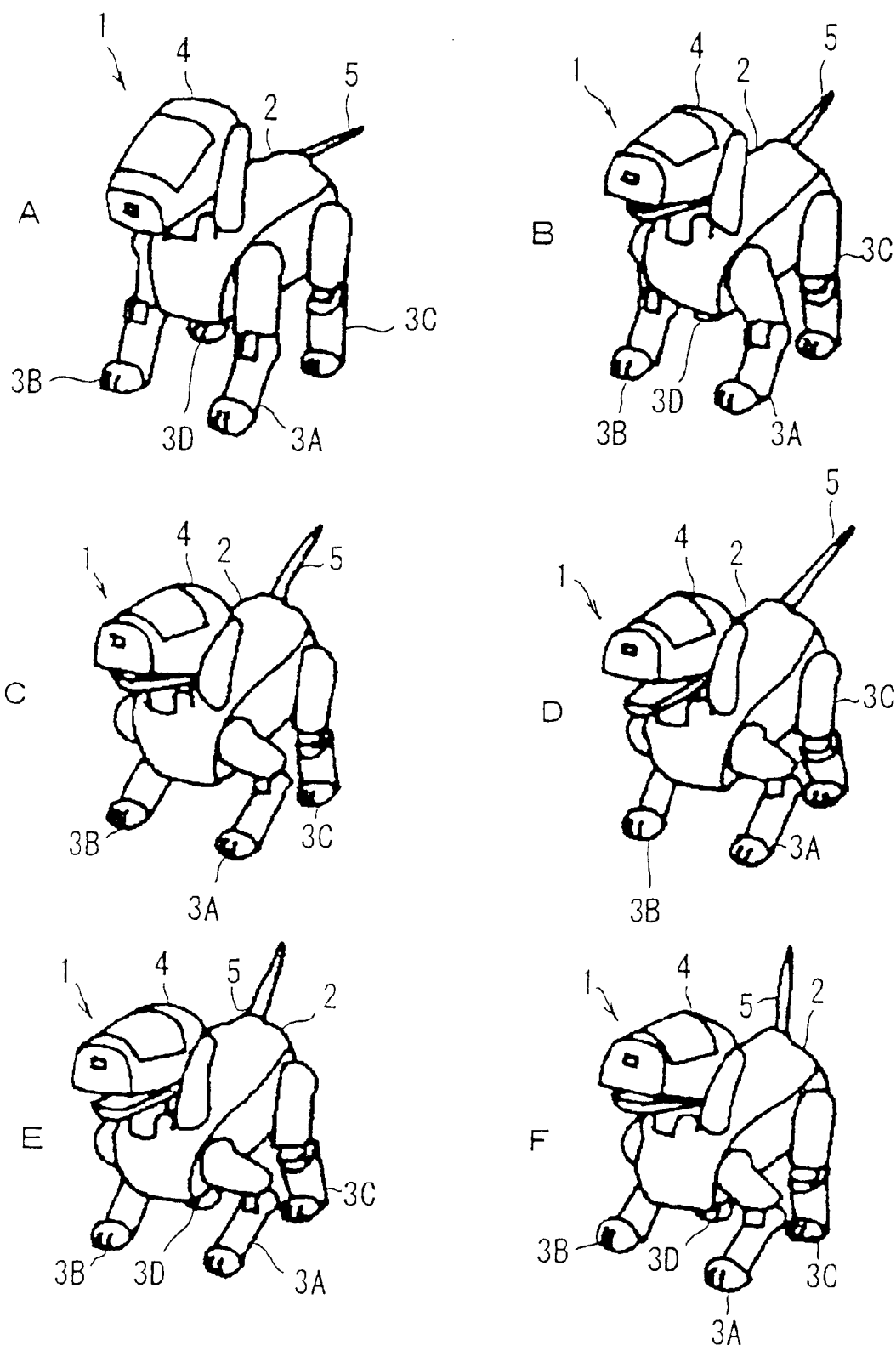
FIG. 52 is a schematic diagram illustrating the pet robot motion.
Figure 53:
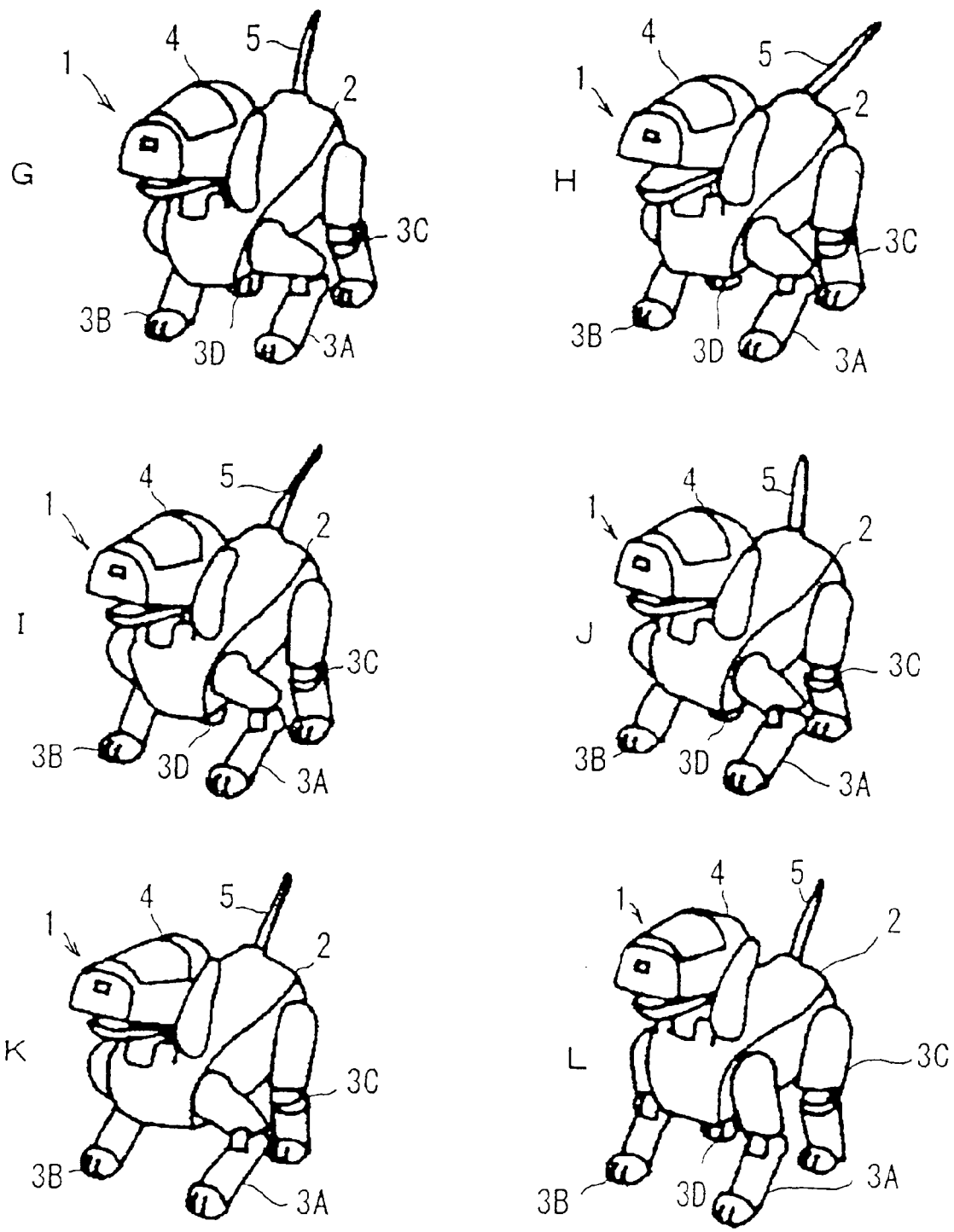
FIG. 53 is a schematic diagram illustrating the pet robot motion.
Figure 54:
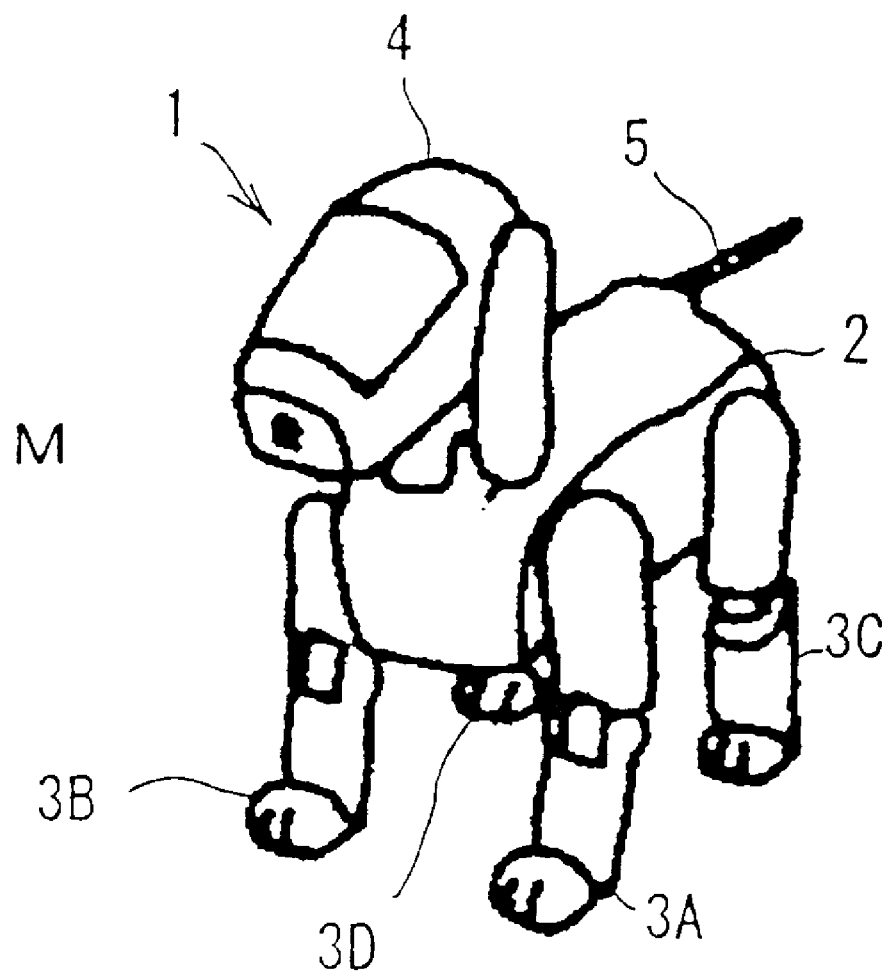
FIG. 54 is a schematic diagram illustrating the pet robot motion.
Figure 55:
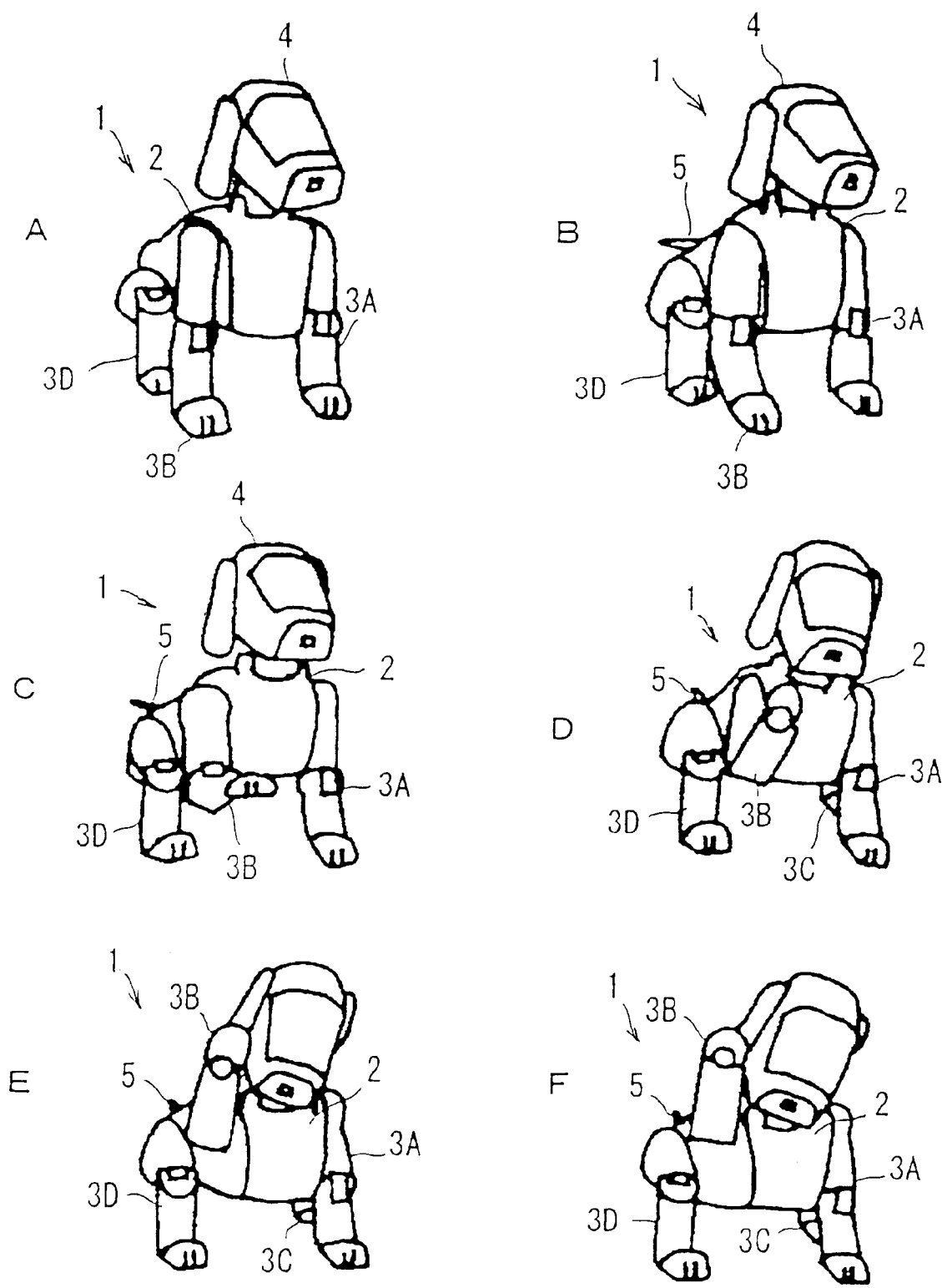
FIG. 55 is a schematic diagram illustrating the pet robot motion.
Figure 56:
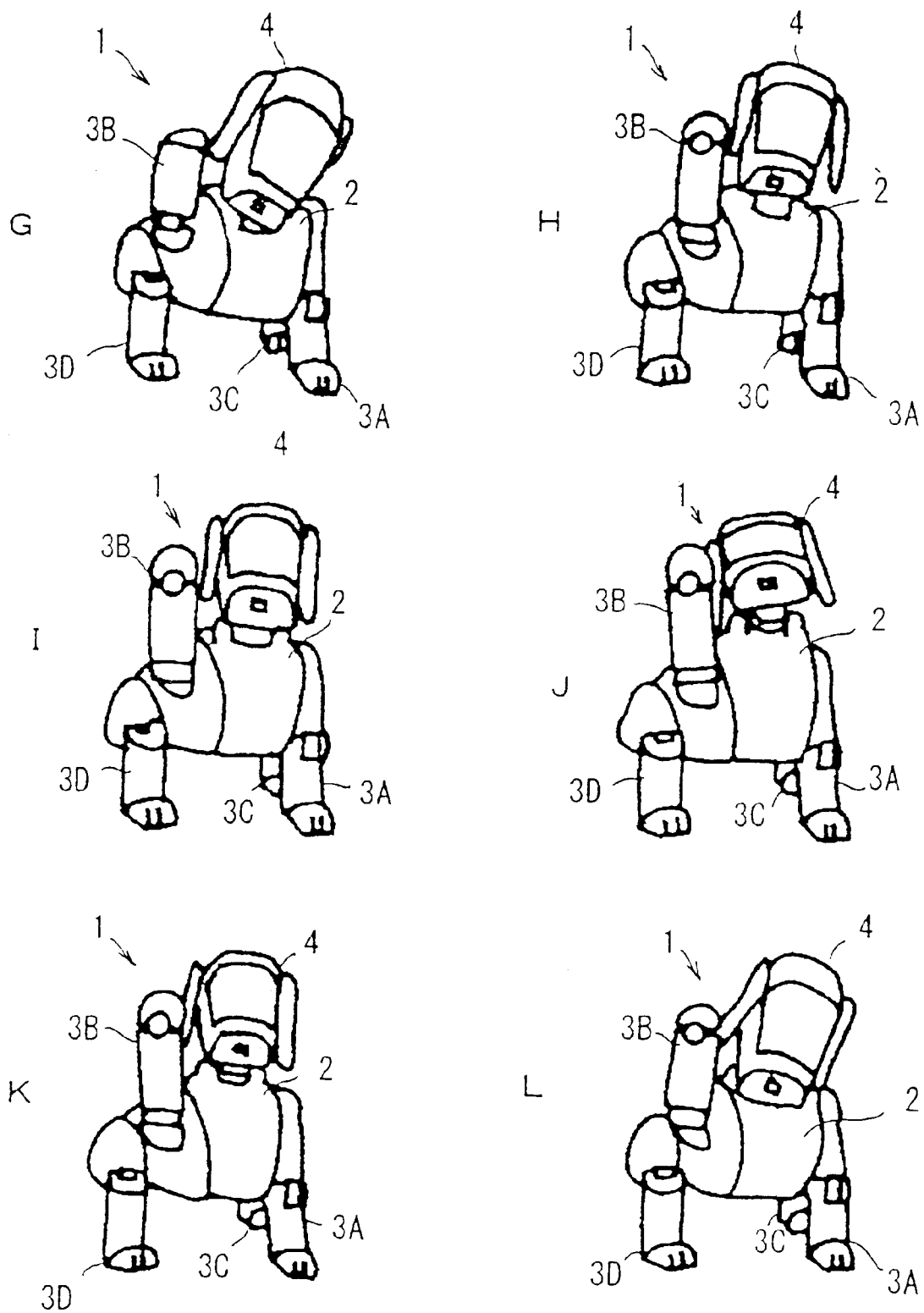
FIG. 56 is a schematic diagram illustrating the pet robot motion.
Figure 57:
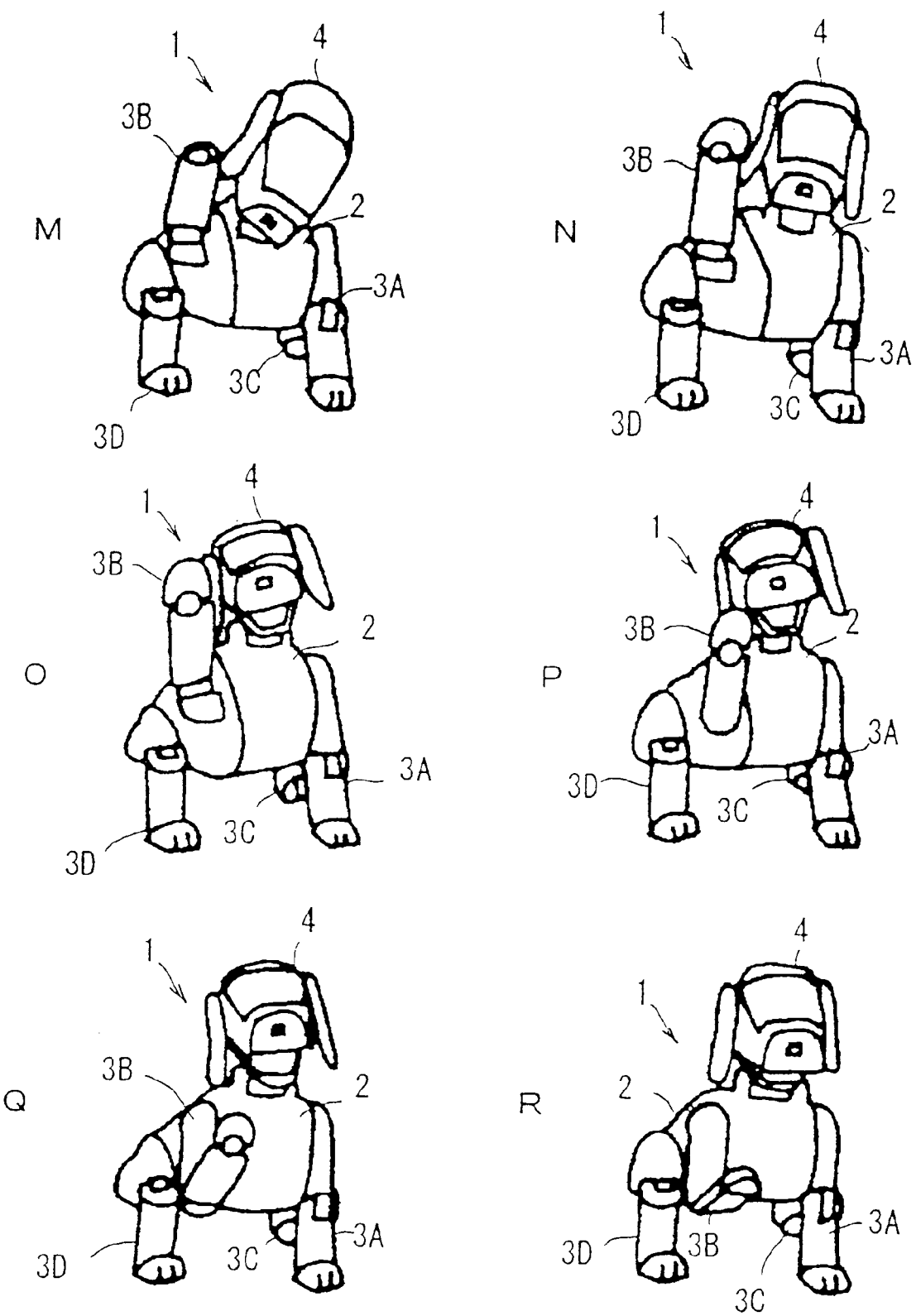
FIG. 57 is a schematic diagram illustrating the pet robot motion.
Figure 58:
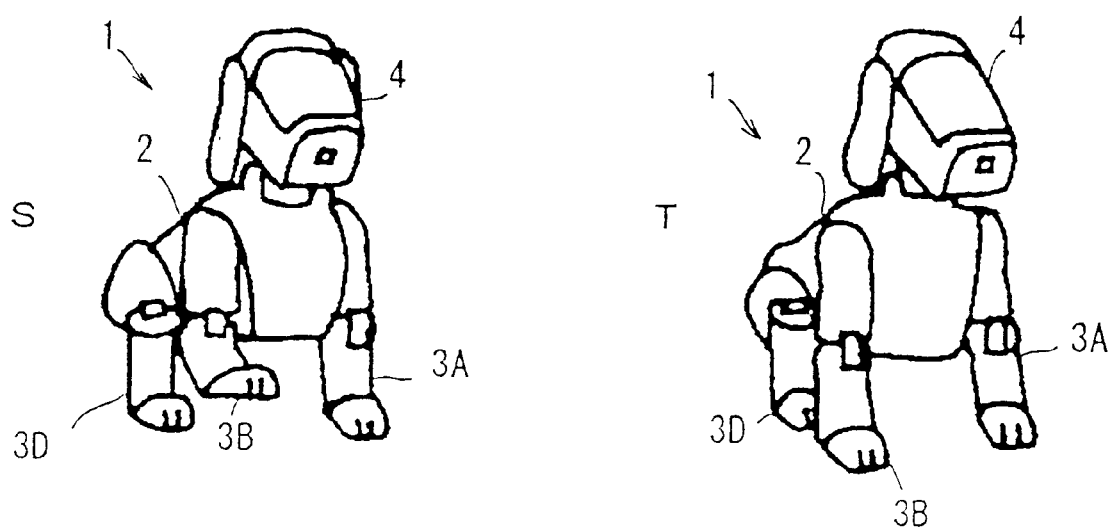
FIG. 58 is a schematic diagram illustrating the pet robot motion.
Figure 59:
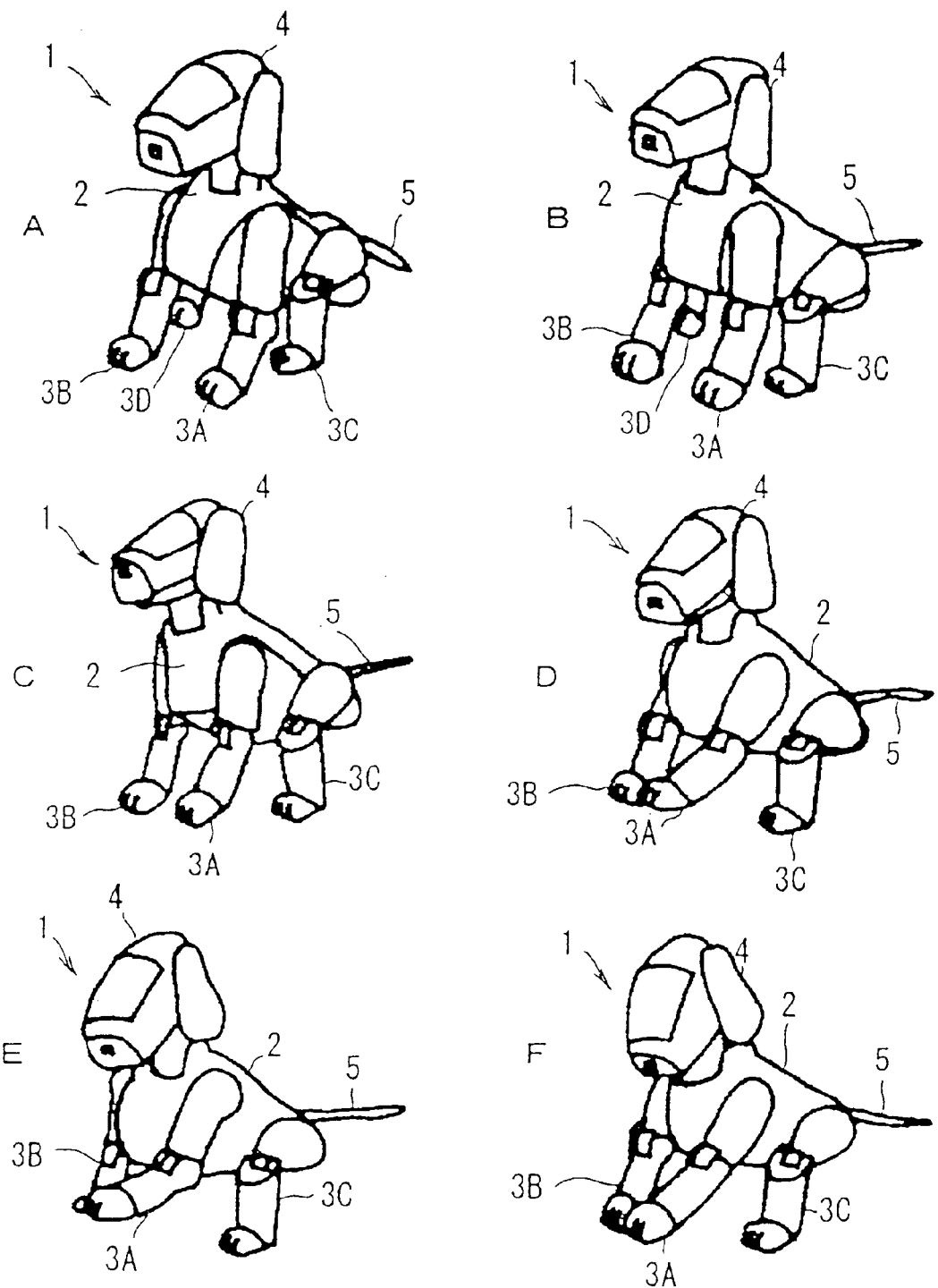
FIG. 59 is a schematic diagram illustrating the pet robot motion.
Figure 60:
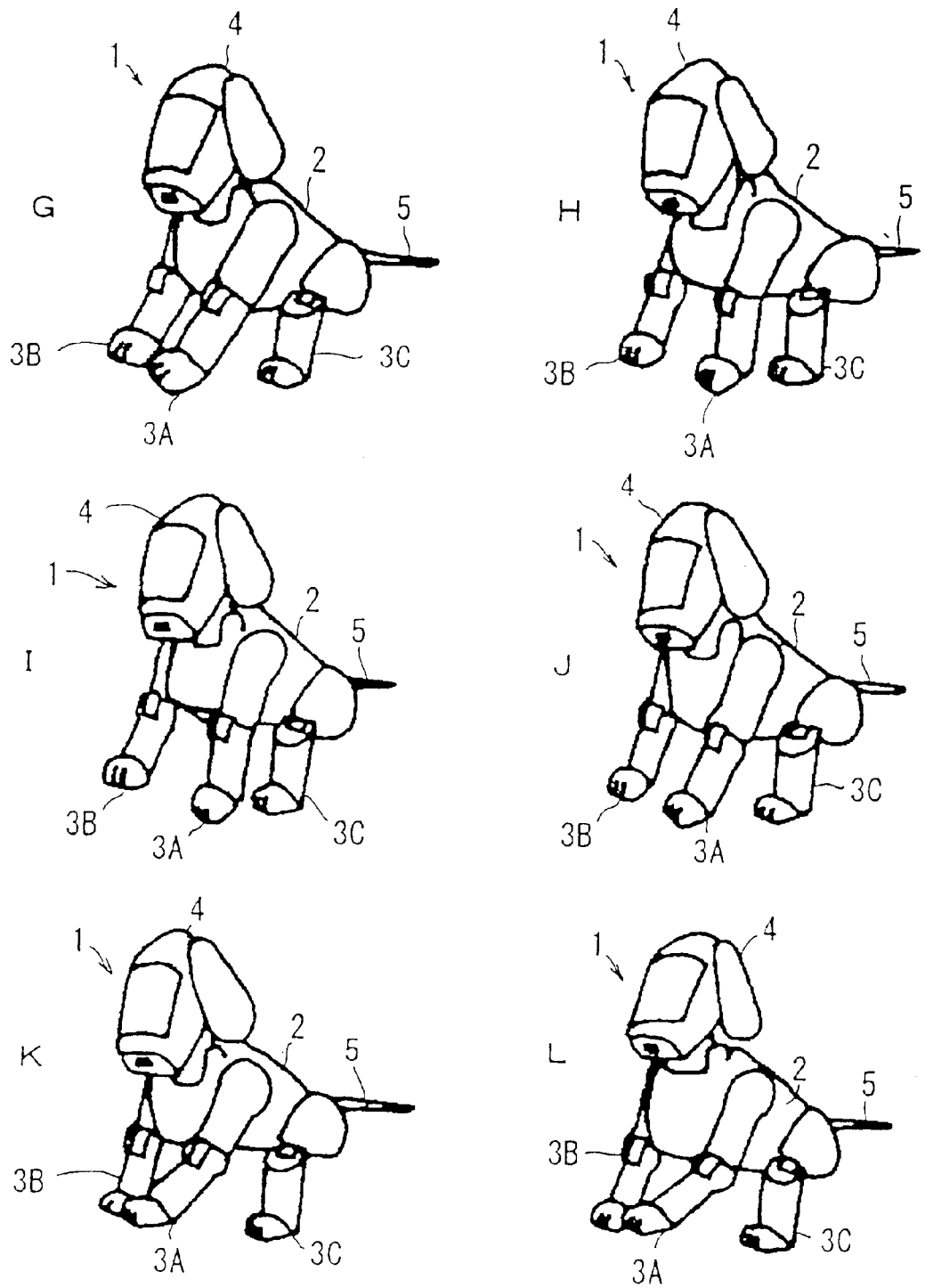
FIG. 60 is a schematic diagram illustrating the pet robot motion.
Figure 61:
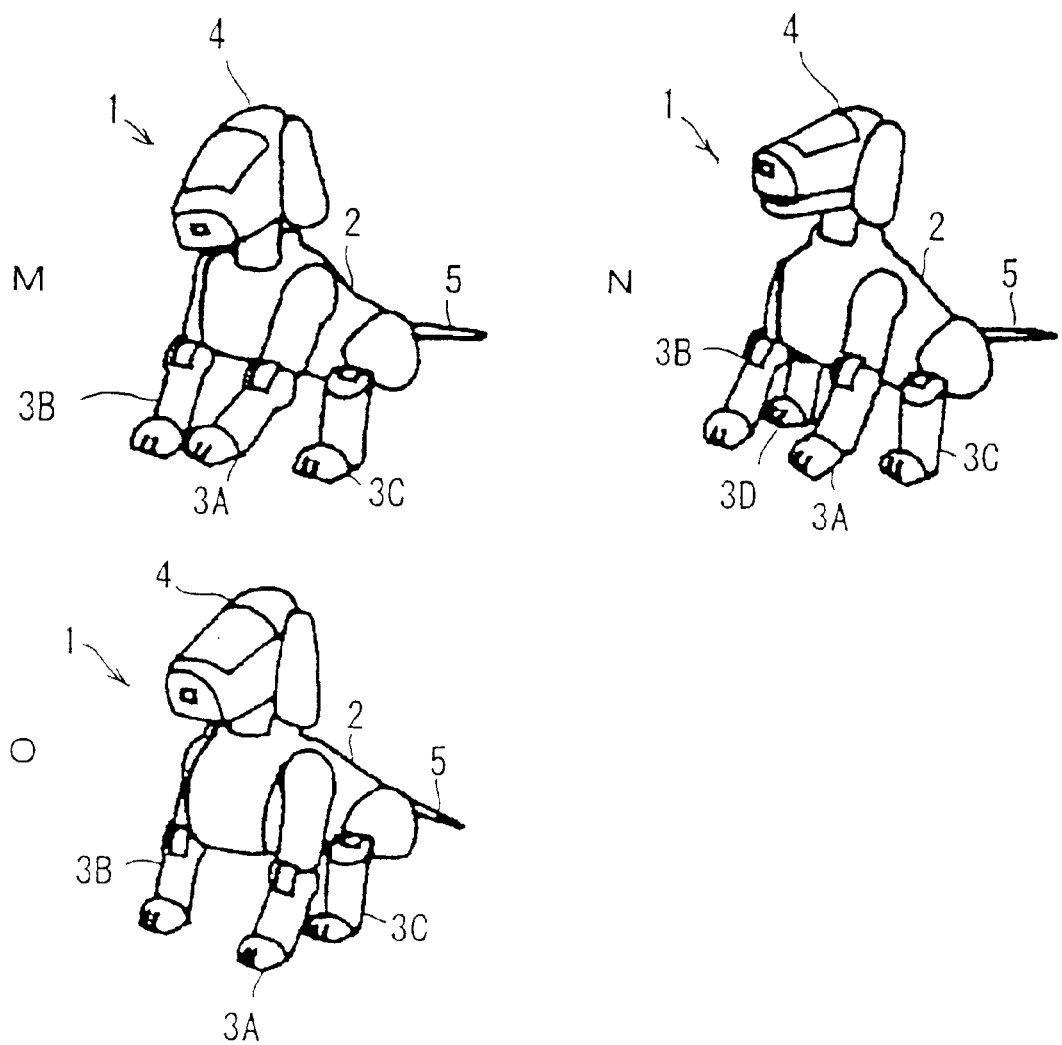
FIG. 61 is a schematic diagram illustrating the pet robot motion.

Next, a second dog motion will be described below. When the pet robot 1 is in an upright position as shown in FIG. 46A, it produces the second dog motion.

As shown in FIG. 46B, the pet robot 1 moves the center of gravity so that its weight does not act on the right hind leg 3D (or the left hind leg 3C). Next, the pet robot 1 slightly moves the right hind leg 3D (or the left hind leg 3C) outside to open the leg and then lifts the right hind leg 3D (or the left hind leg 3C) above the robot itself. When doing so, the pet robot 1 bends the knee 3DY (or 3CY) in the right hind leg 3D (or the left hind leg 3C) to the extent that the thighs 3DX (or 3CY) and shank 3DY (or 3CY) are at right angles to each other.

After sound of running water is output from the speaker 20 (FIG. 2) for two to three seconds, the pet robot 1 performs the reverse of the actions in FIGS. 46A through 47A as shown in FIGS. 47B through 47E to take the original upright position. This ends the motion.

Such a motion can produce a feeling that the pet robot 1 piddles, thus giving the user a doglike impression.

(3-3-3) Other Dog Motions

FIGS. 48A through 51C, 52A through 54A, 55A through 58A, and 59A through 61C show the flow of other dog motions, that is, third, fourth, fifth, and sixth dog motions, respectively.

(3-4) Ball Response Motions

Motions which the pet robot 1 produces when it finds a fall will be described below (these motions are hereinafter called ball response motions).

(3-4-1) First Ball Response Motion

A first ball response motion will be described below. When the pet robot 1 finds a ball, it produces the first ball response motion.

Figure 62:
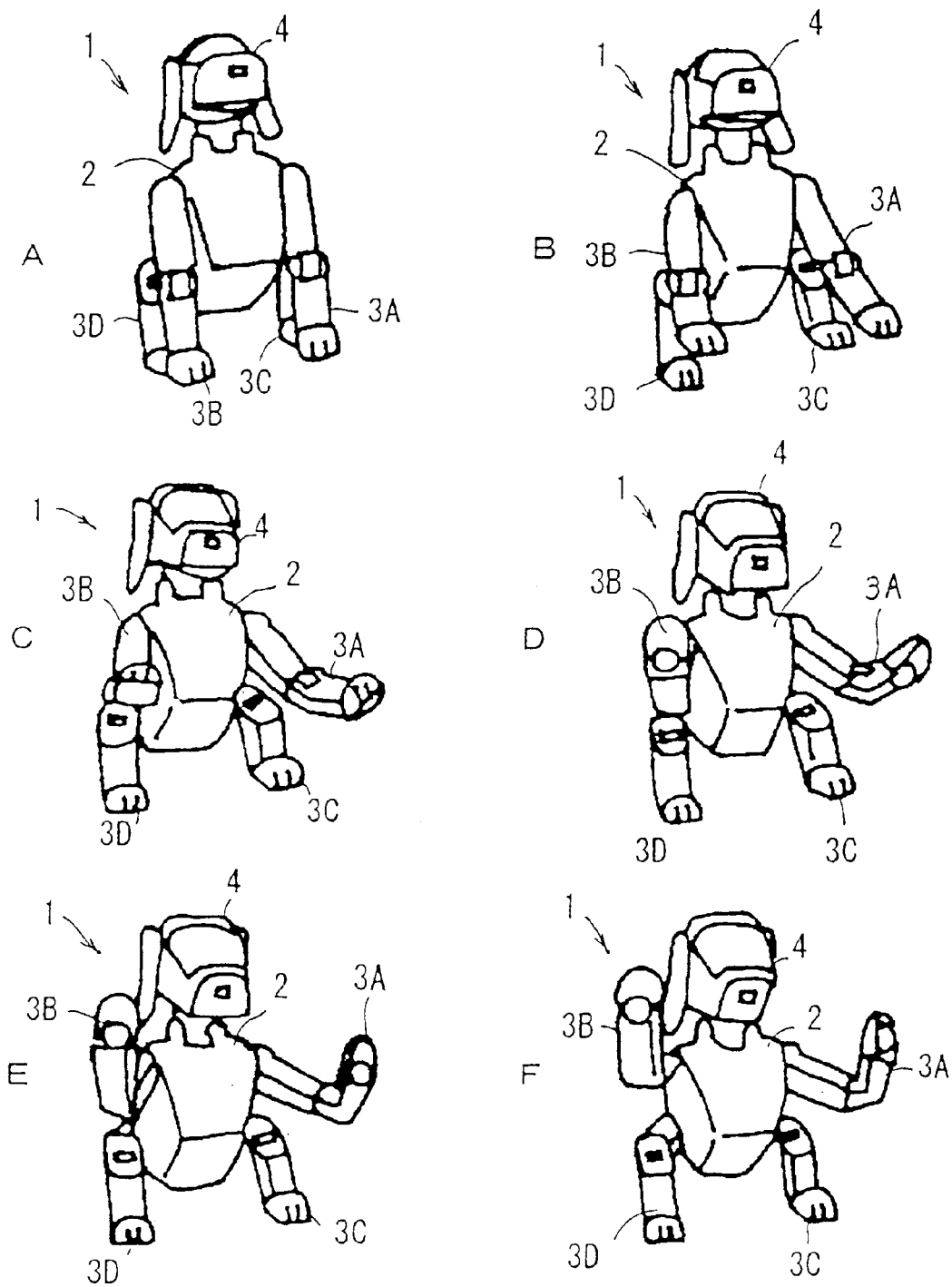
FIG. 62 is a schematic diagram illustrating the pet robot motion.
Figure 63:
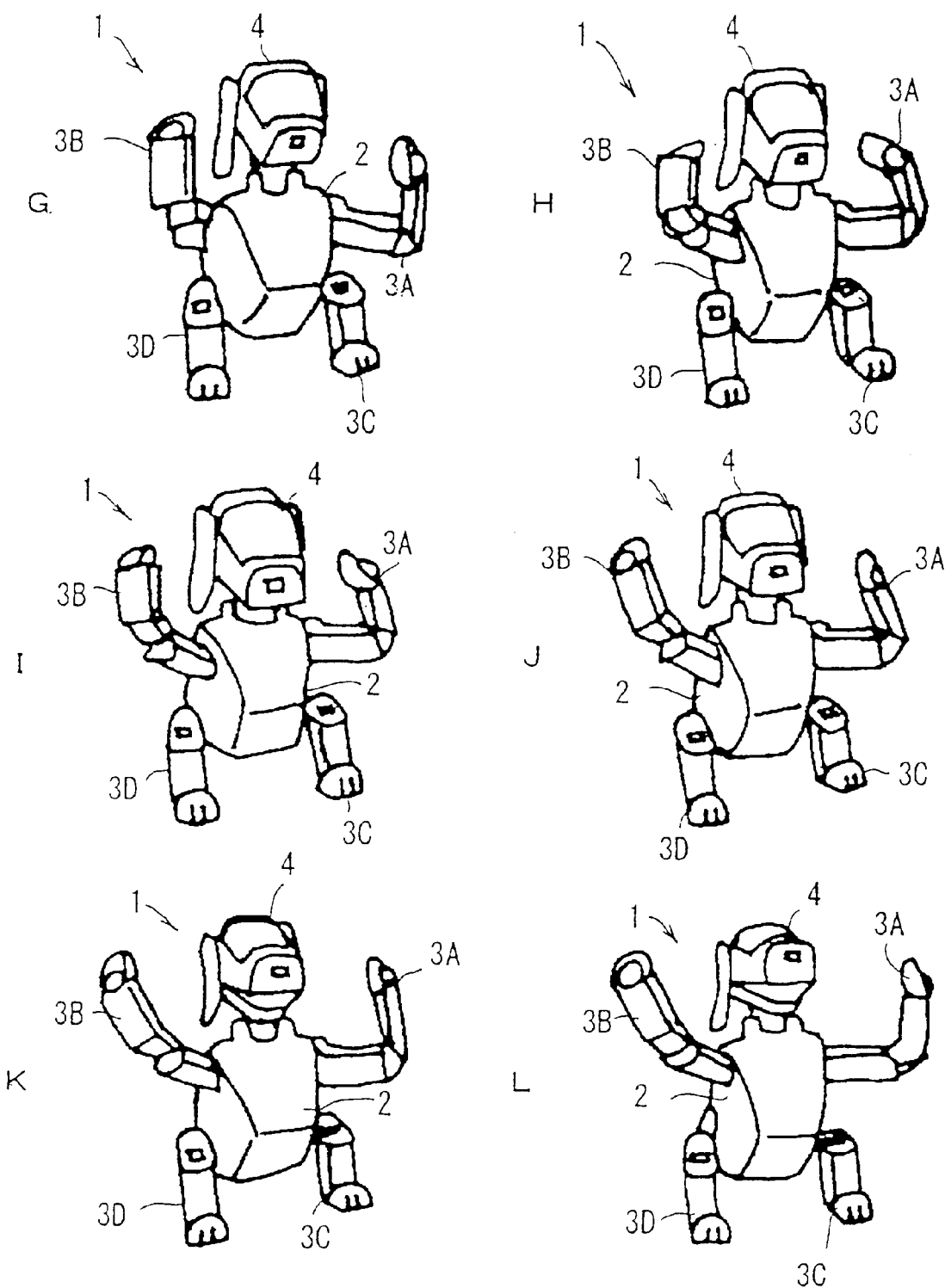
FIG. 63 is a schematic diagram illustrating the pet robot motion.
Figure 64:
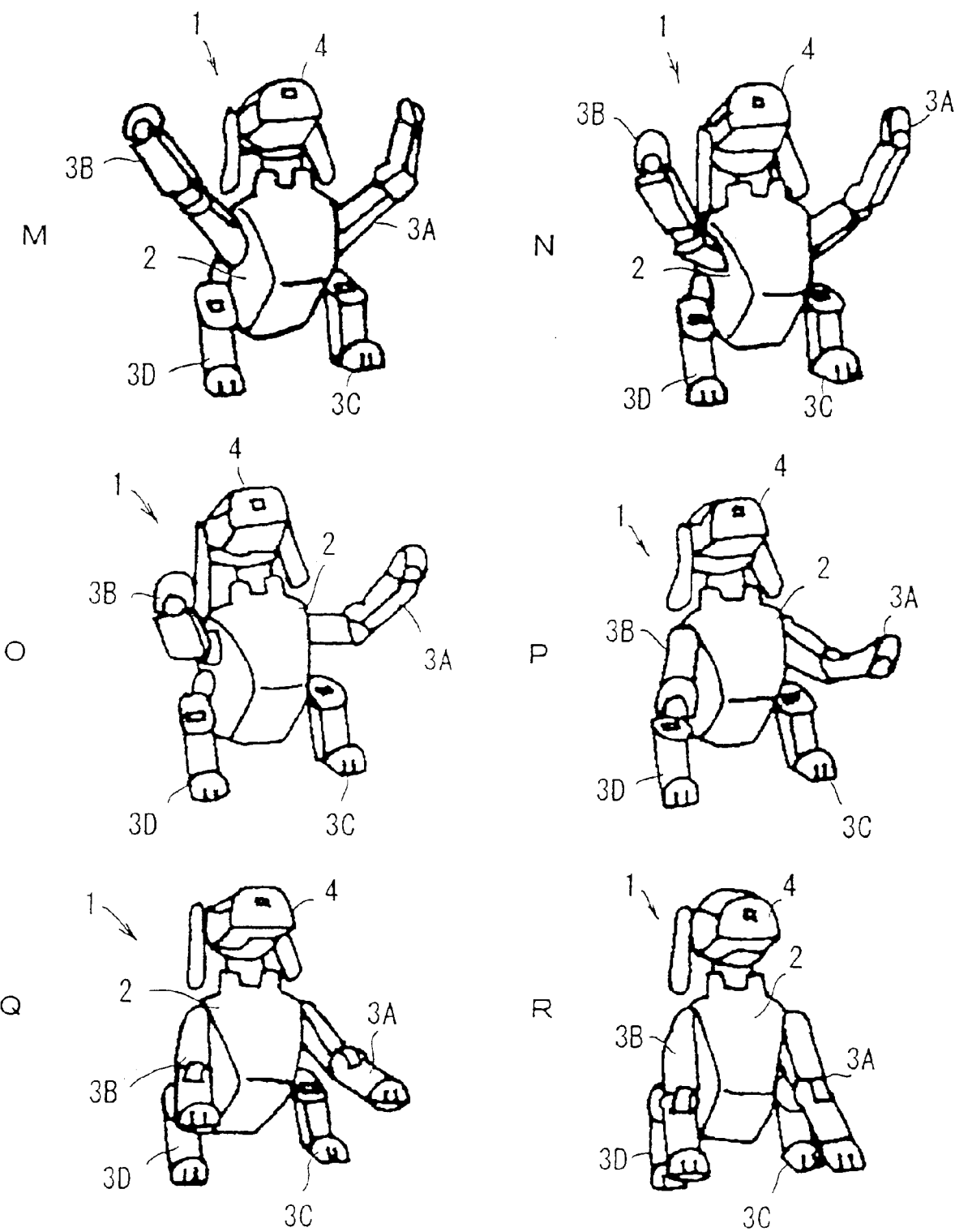
FIG. 64 is a schematic diagram illustrating the pet robot motion.

When it finds a ball, the pet robot 1 walks close to the ball to the extent that the ball is just in front of the left foreleg 3A (or the right foreleg 3B) and then takes an upright position as shown in FIG. 62A.

Next, as shown in FIG. 62B, the pet robot 1 moves the center of gravity so that its weight does not act on the left foreleg 3A (or the right foreleg 3B) and then turns the left foreleg 3A (or the right foreleg 3B) through a predetermined angle toward the rear as shown in FIGS. 62C through 62F to bring the left foreleg 3A (or the right foreleg 3B) close to the left hind leg 3C (or the right hind leg 3D). In parallel, the pet robot 1 inclines the head 4 toward a position just in front of the left foreleg 3A (or the right foreleg 3B) as if to look at the ball.

The pet robot 1 dynamically turns the left foreleg 3A (or the right foreleg 3B) toward the front, while extending the withdrawn left foreleg 3A (or right foreleg 3B), as shown in FIGS. 63A through 63D. Next, as shown in FIGS. 63E through 64B, the pet robot 1 lowers the left foreleg 3A (or the right foreleg 3B) to return it to the original position and then straightens the bent right foreleg 3B (or left foreleg 3A), right hind leg 3D, and left hind leg 3C to take the upright position. This ends the motion.

Such a motion, with which the pet robot 1 can kick a ball, can produce a feeling that the pet robot 1 plays with a ball.

(3-4-2) Second Ball Response Motion

Next, a second ball response motion will be described below.

Figure 65:
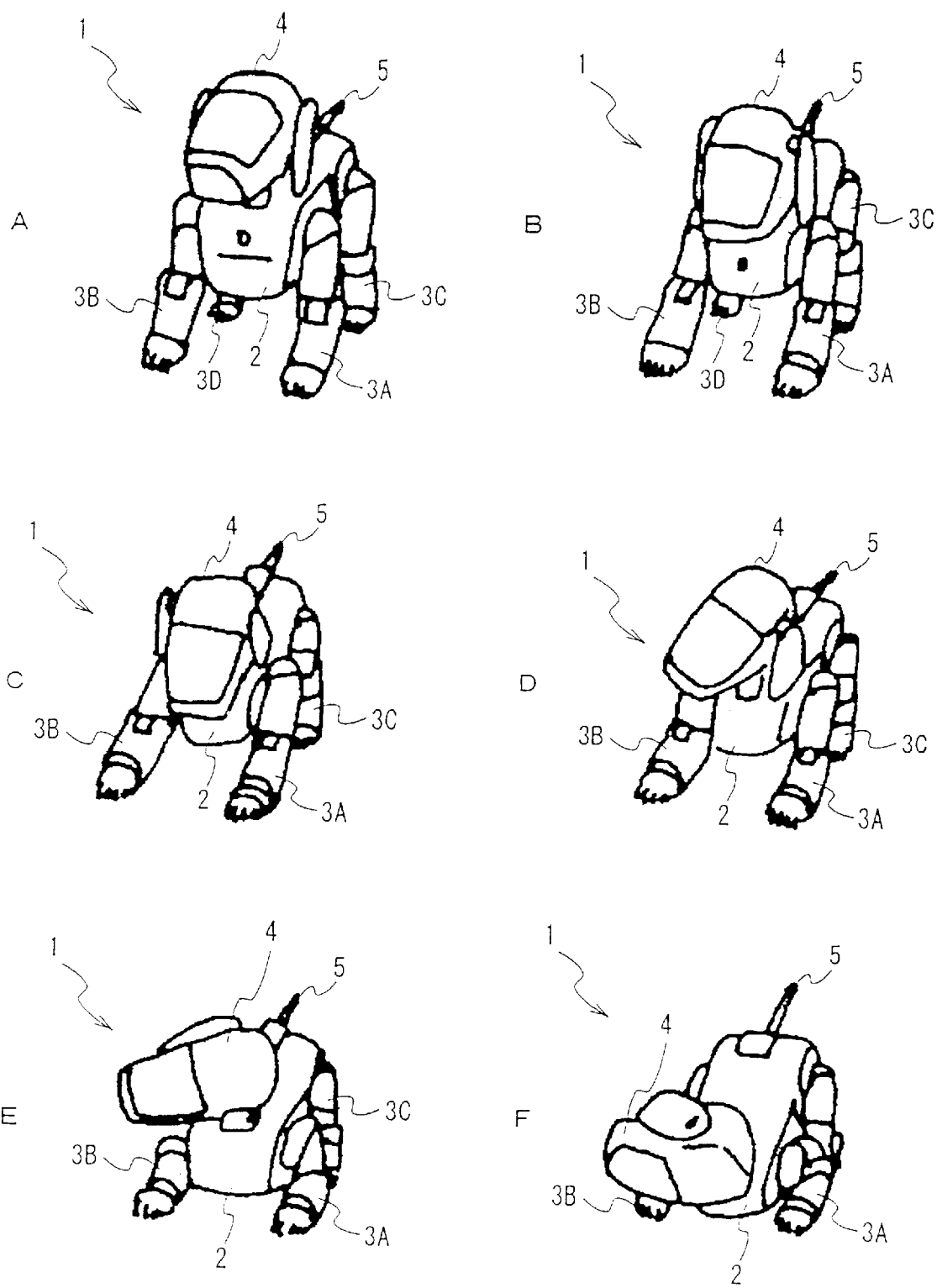
FIG. 65 is a schematic diagram illustrating the pet robot motion.
Figure 66:
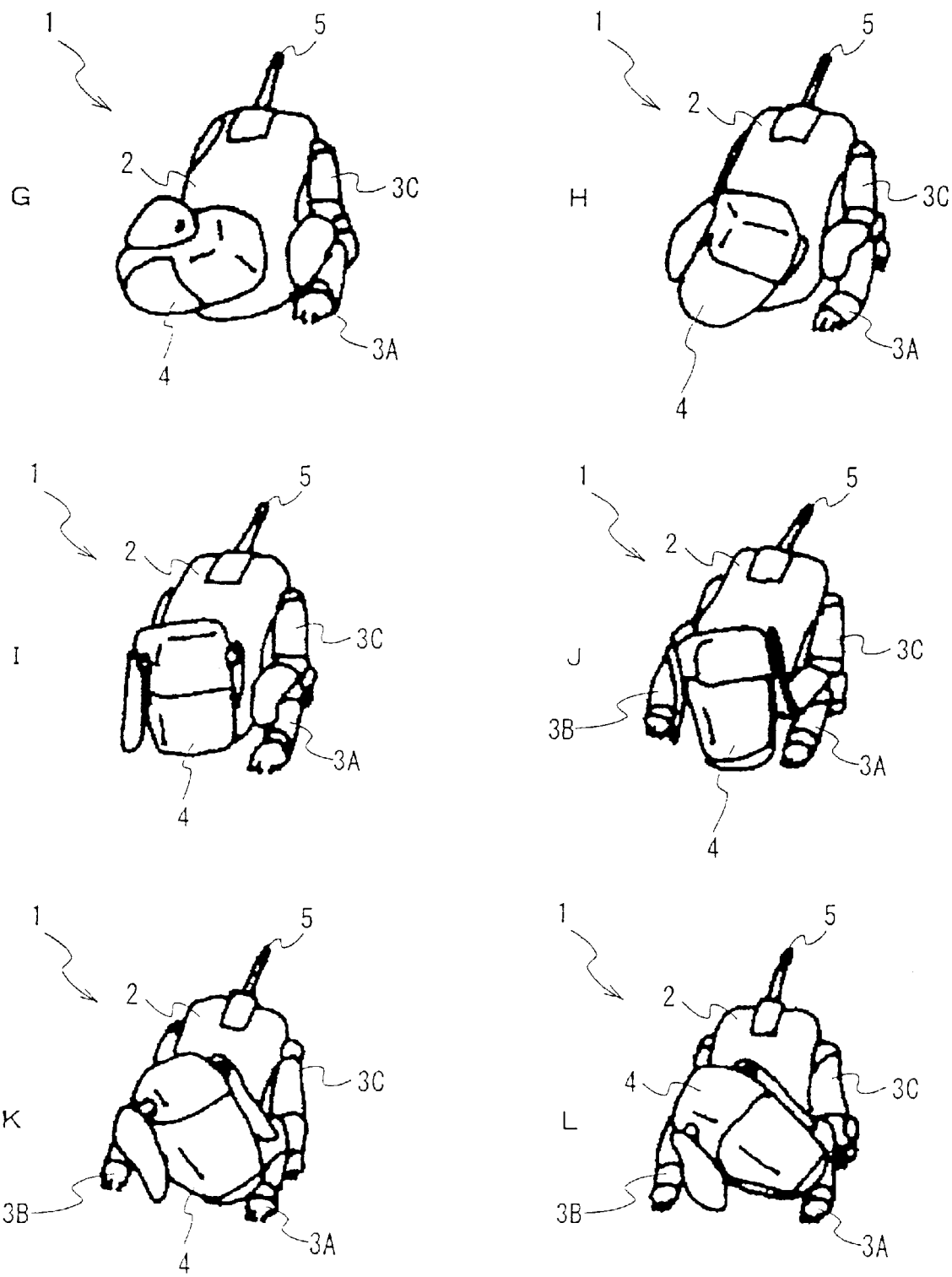
FIG. 66 is a schematic diagram illustrating the pet robot motion.
Figure 67:
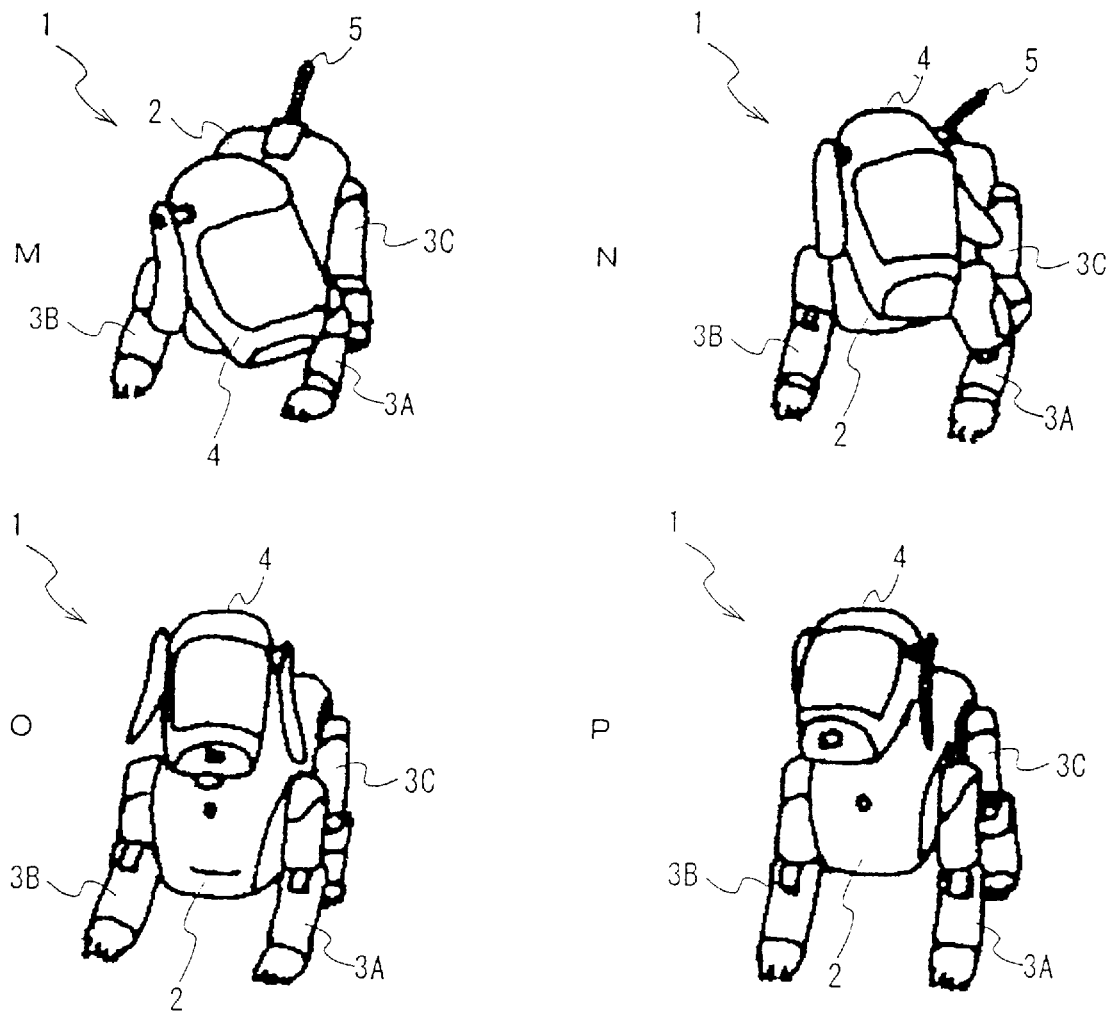
FIG. 67 is a schematic diagram illustrating the pet robot motion.

When it finds a ball in the surroundings, the pet robot 1 walks close to the ball until the ball is slightly off the front to the left (or the right) and then takes a basic upright position as shown in FIG. 65A.

Then the pet robot 1 bends the right and left forelegs 3B and 3A and right and left hind legs 3D and 3C as shown in FIGS. 65B and 65C to take a lower position and turns the head 4 toward the front to direct the head 4 downward.

Next, the pet robot turns the head 4 to the right (or the left), while drawing the chin and then dynamically turns the head 4 off to the left (or right) forward, where the ball is, as shown in FIGS. 65F through 67B. Finally, as shown in FIGS. 67C and 67D, while adjusting the head 4 so that it faces the front, the pet robot 1 straightens the bent right and left forelegs 3B and 3A and the bent right and left hind legs 3D and 3C to return to the original upright position. This ends the motion.

Such a motion, with which the pet robot can head a ball, can produce a feeling that the pet robot 1 plays with a ball.

(3-4-3) Third Ball Response Motion

Next, a second ball response motion will be described below. When the pet robot 1 finds a ball, it produces the third ball response motion.

Figure 68:
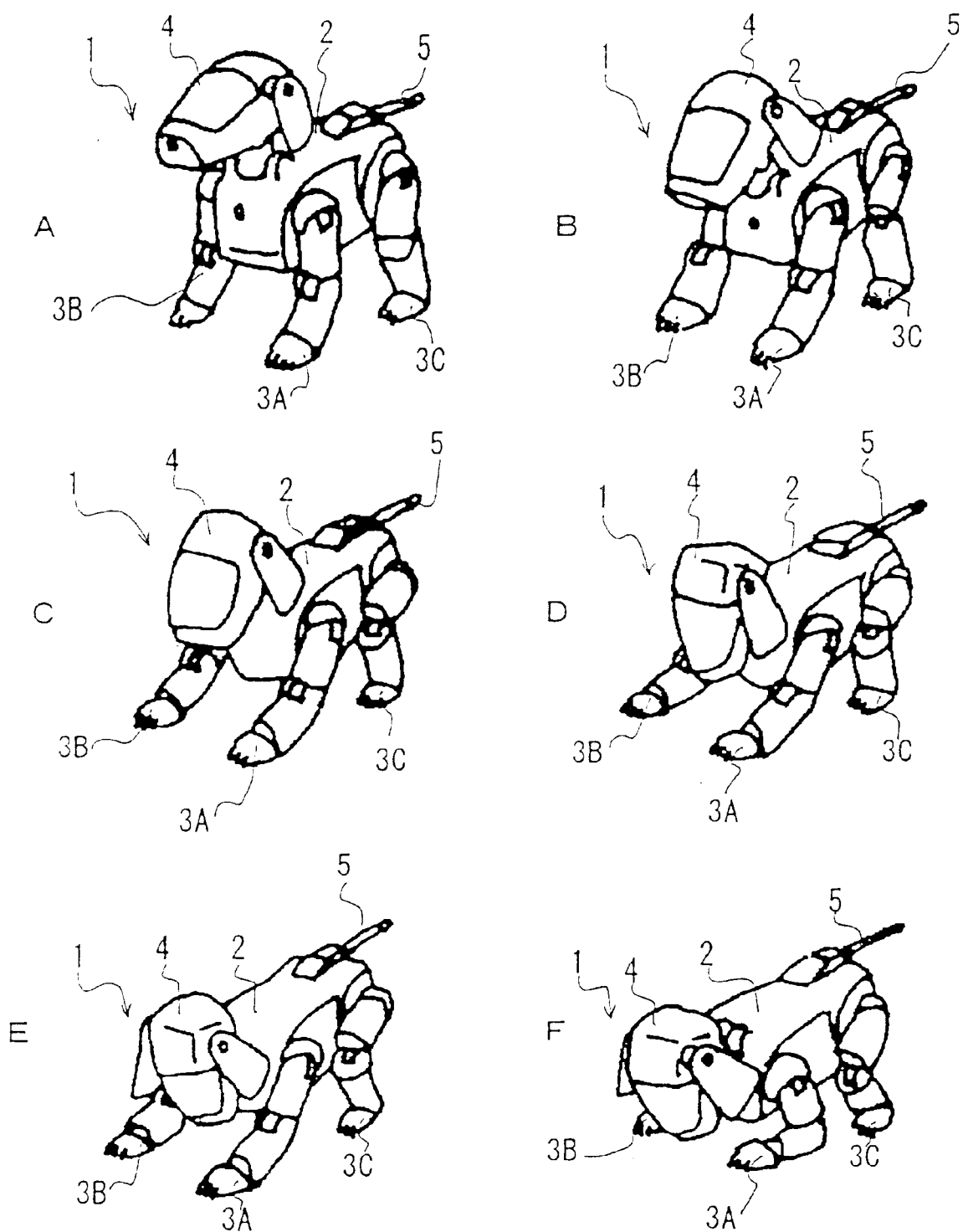
FIG. 68 is a schematic diagram illustrating the pet robot motion.

When it finds a ball, the pet robot 1 walks close to a position immediately behind the ball and then takes a basic upright position as shown in FIG. 68A.

Next, the pet robot 1 draws back its entire body, while lowering itself by bending the right and left hind legs 3D and 3C, as shown in FIG. 68B. In parallel, the pet robot 1 turns the head 4 from the rear to the front to lower the head 4 sharply until the top of the head 4 faces forward.

In addition, while bending the knees, the pet robot 1 turns the right and left forelegs 3B and 3A toward the rear to squeeze itself. Then as shown in FIGS. 69A through 69E, the pet robot 1 turns the head 4 toward the rear to push the ball forward, while dynamically extending the bent right and left hind legs 3D and 3C to slightly move the entire body forward.

Figure 69:
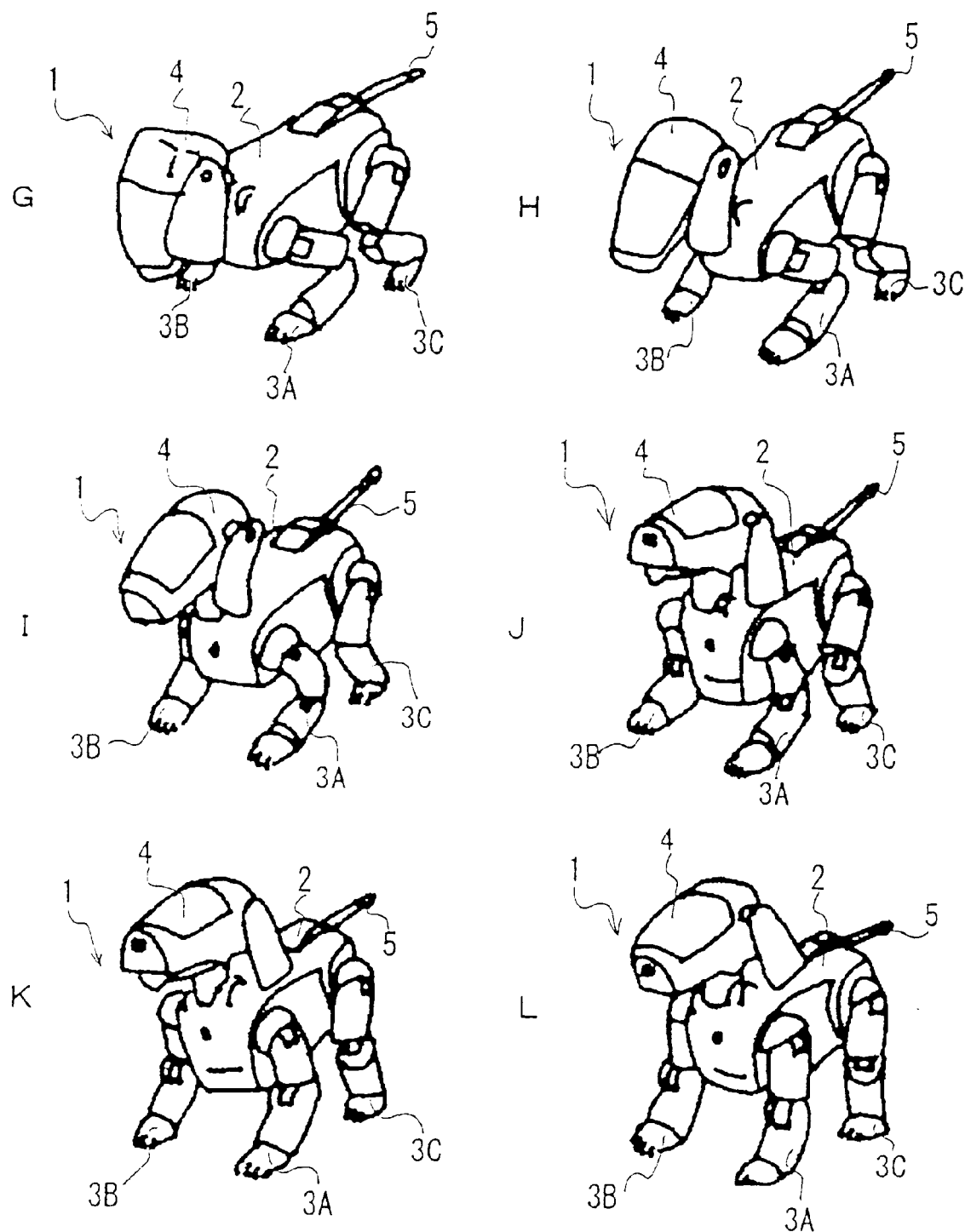
FIG. 69 is a schematic diagram illustrating the pet robot motion.

Finally, the pet robot 1 slightly straightens the right and left forelegs 3B and 3A and the right and left hind legs 3D and 3C as shown in FIG. 69F to return to the original upright position. This ends the motion.

Such a motion, with which the pet robot 1 can head a ball, can produce a feeling that the pet robot 1 plays with a ball.

(3-4-4) Fourth Ball Response Motion

Next, a fourth ball response motion will be described below.

Figure 70:
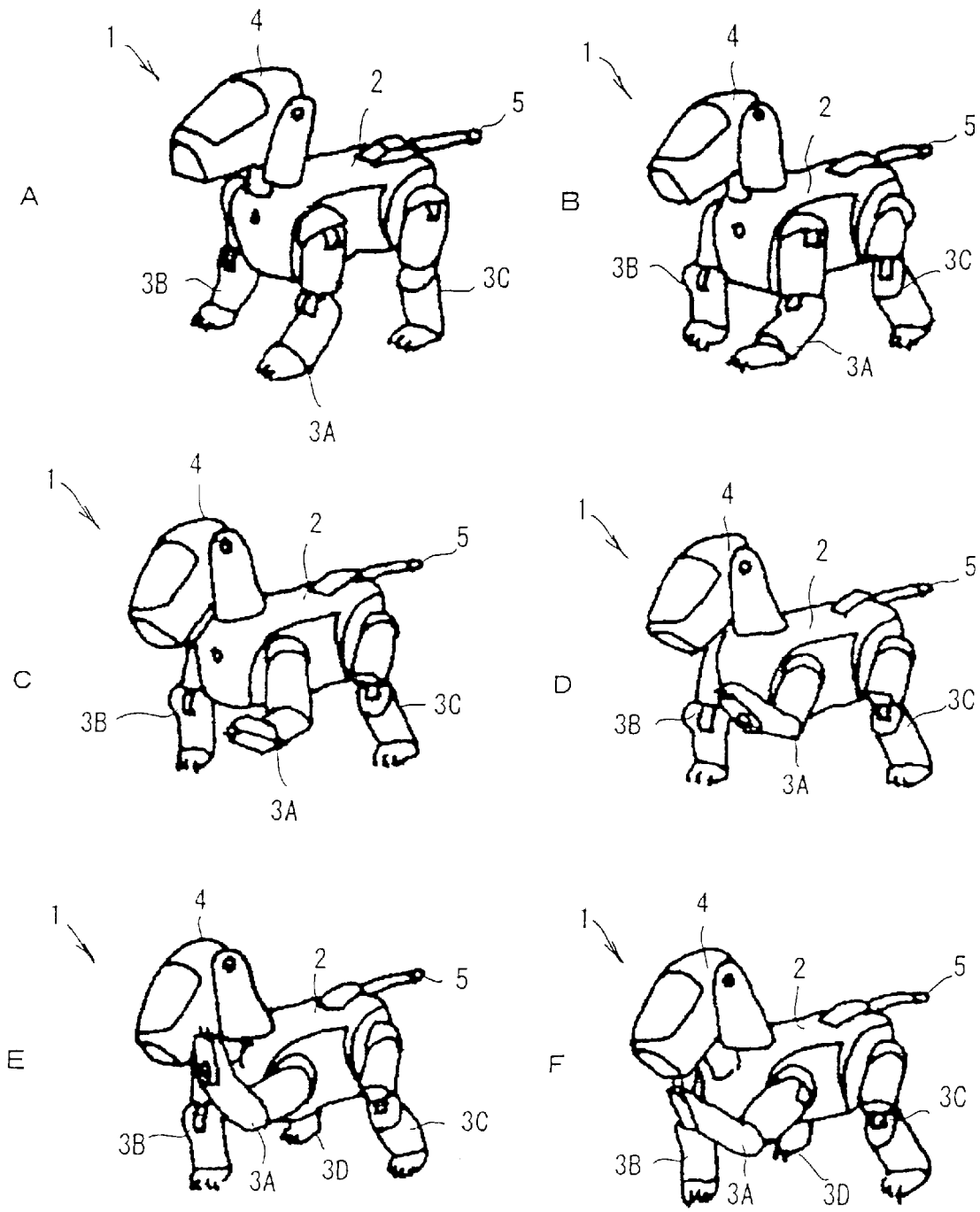
FIG. 70 is a schematic diagram illustrating the pet robot motion.
Figure 71:
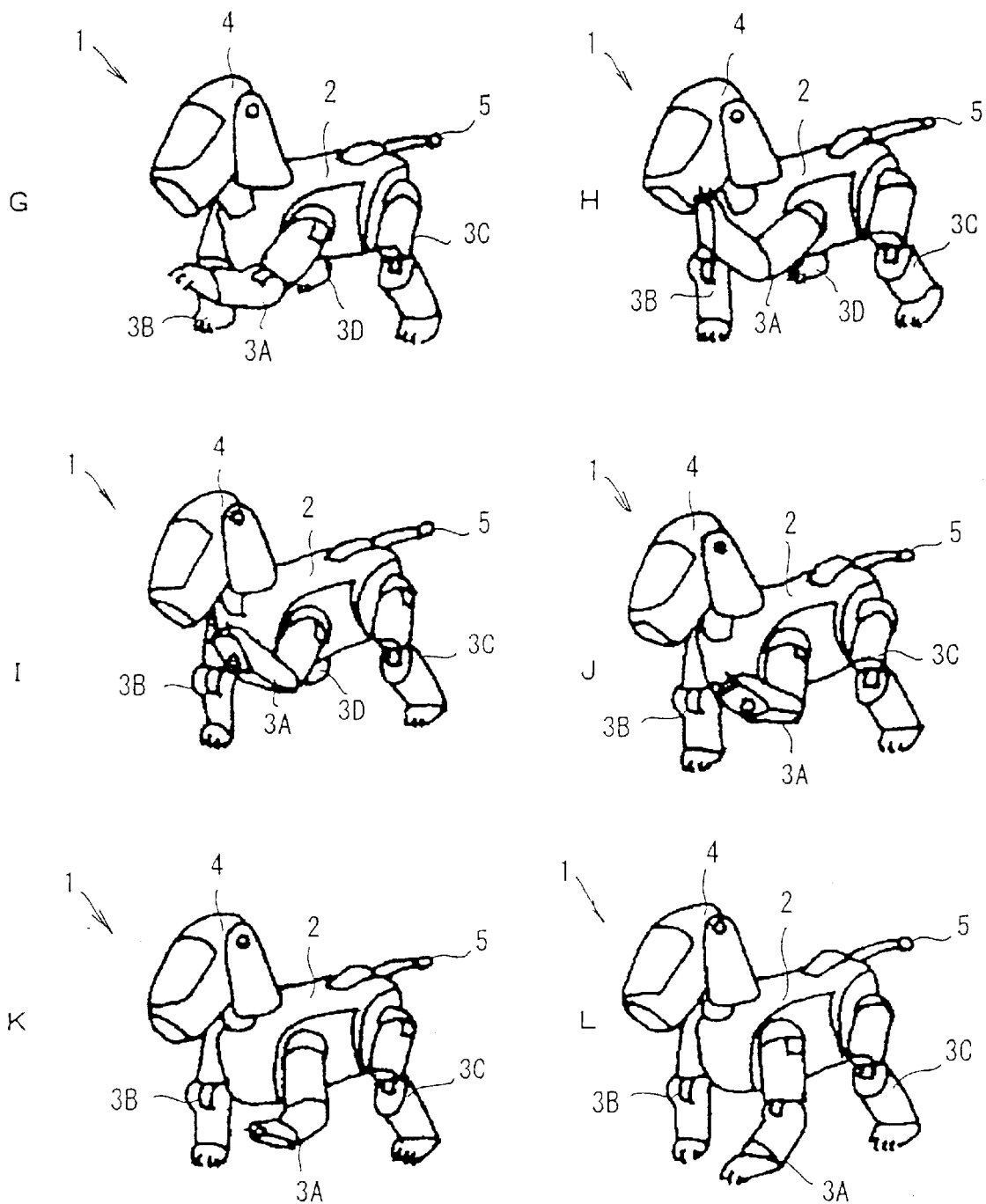
FIG. 71 is a schematic diagram illustrating the pet robot motion.
Figure 72:
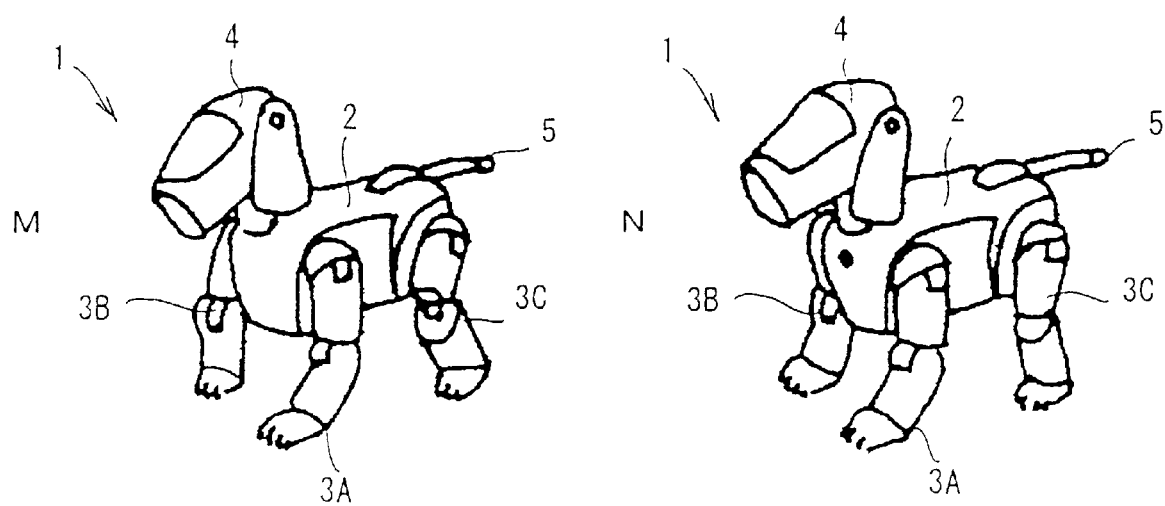
FIG. 72 is a schematic diagram illustrating the pet robot motion.
Figure 73:
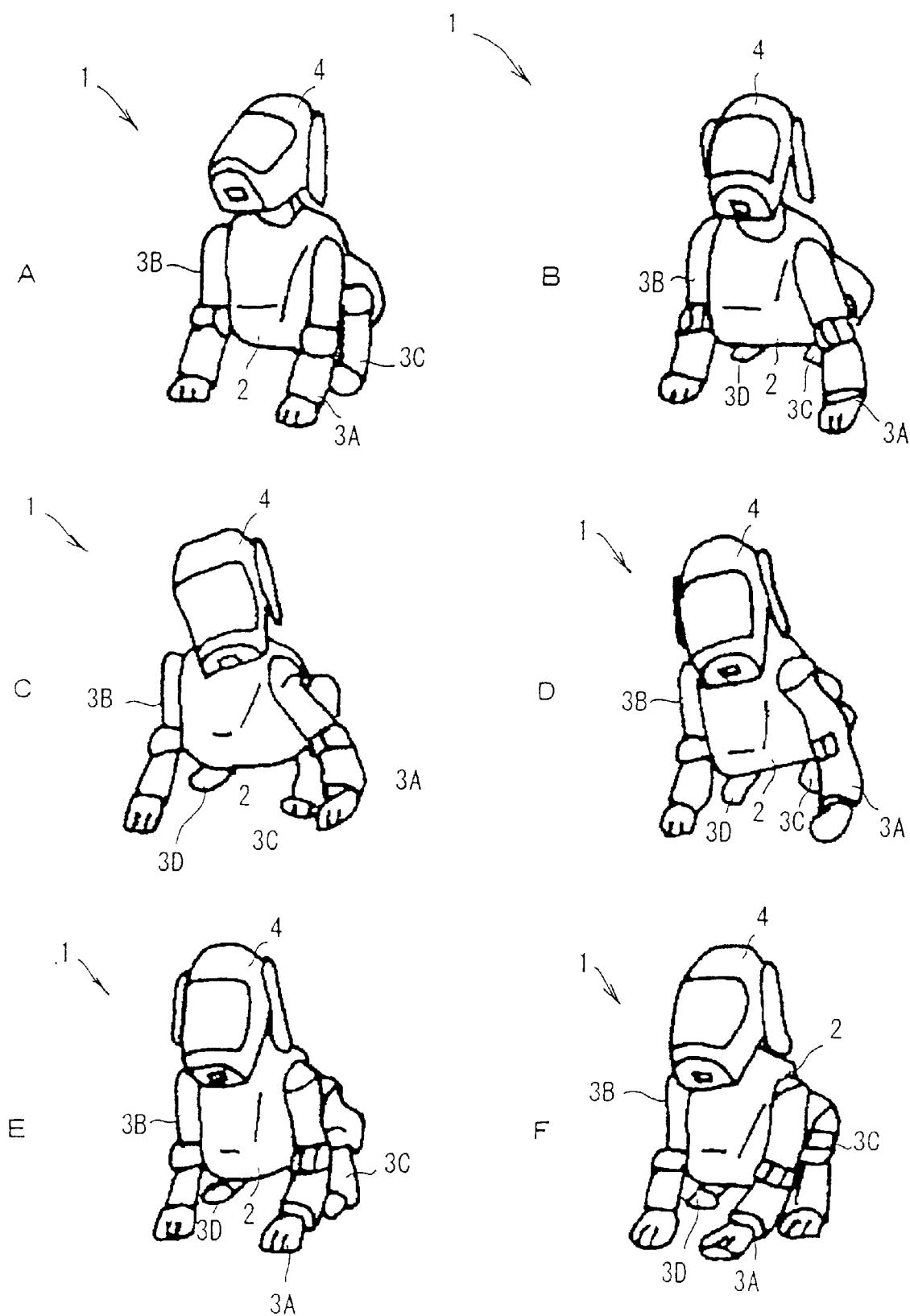
FIG. 73 is a schematic diagram illustrating the pet robot motion.
Figure 74:
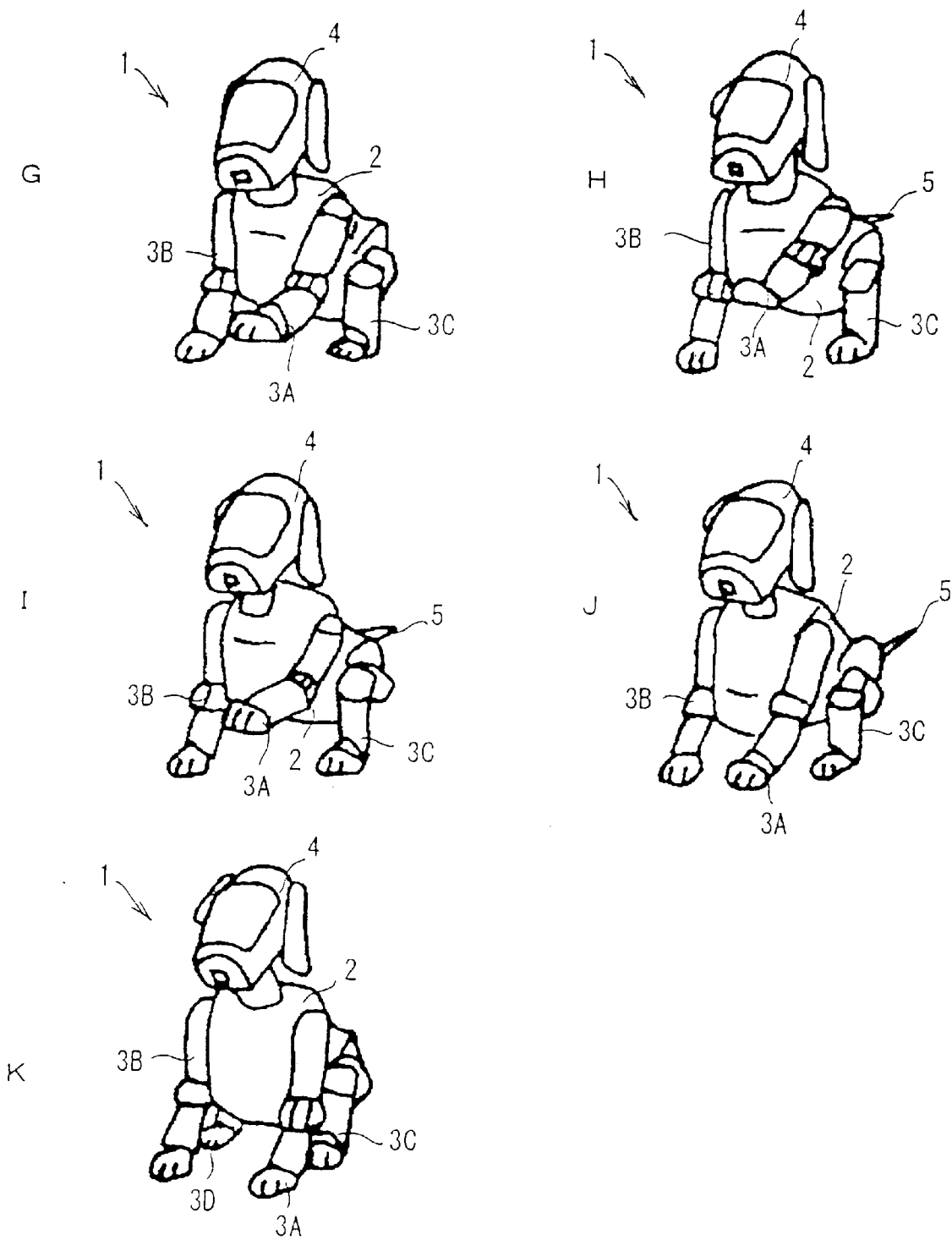
FIG. 74 is a schematic diagram illustrating the pet robot motion.
Figure 75:
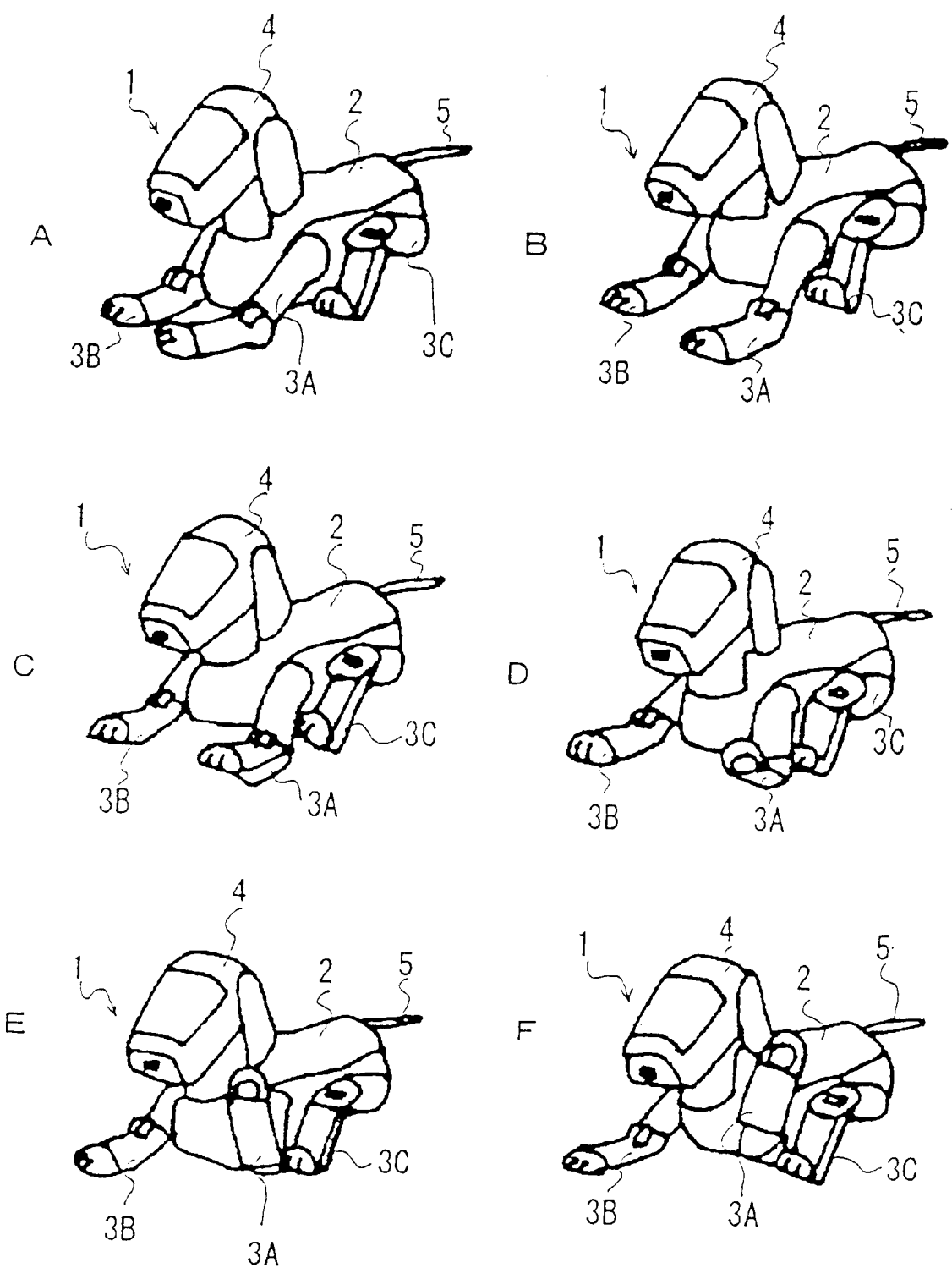
FIG. 75 is a schematic diagram illustrating the pet robot motion.
Figure 76:
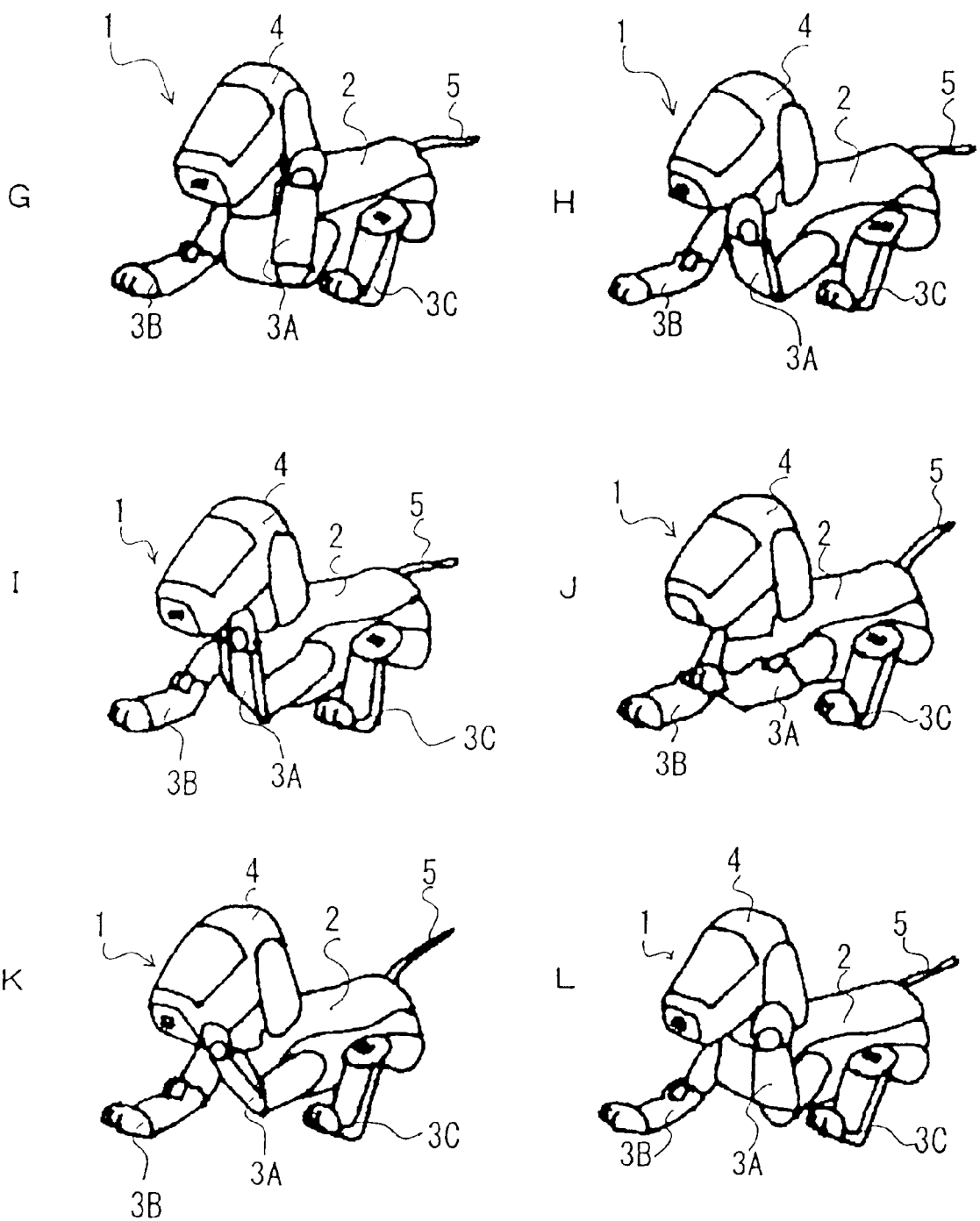
FIG. 76 is a schematic diagram illustrating the pet robot motion.
Figure 77:
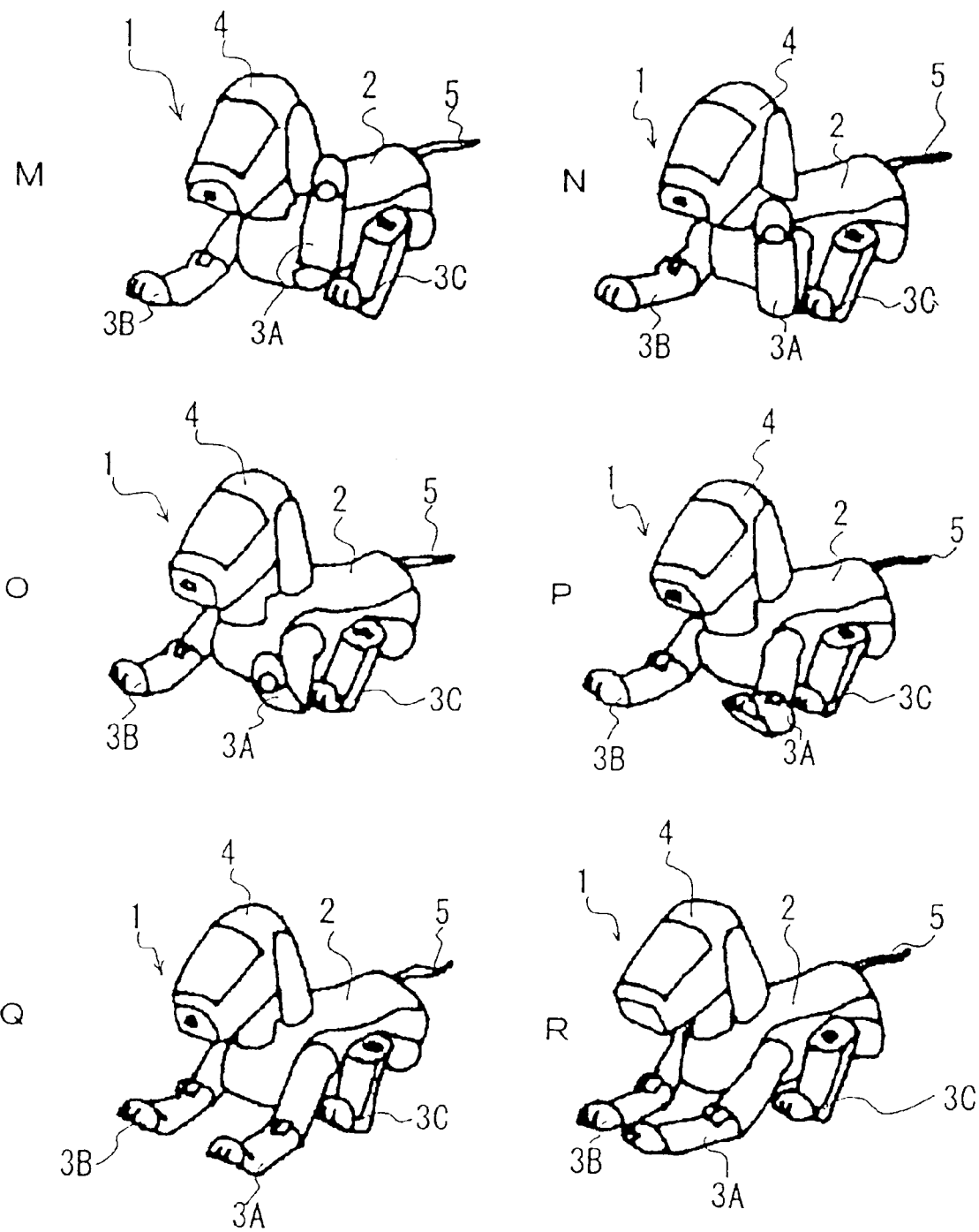
FIG. 77 is a schematic diagram illustrating the pet robot motion.
Figure 78:
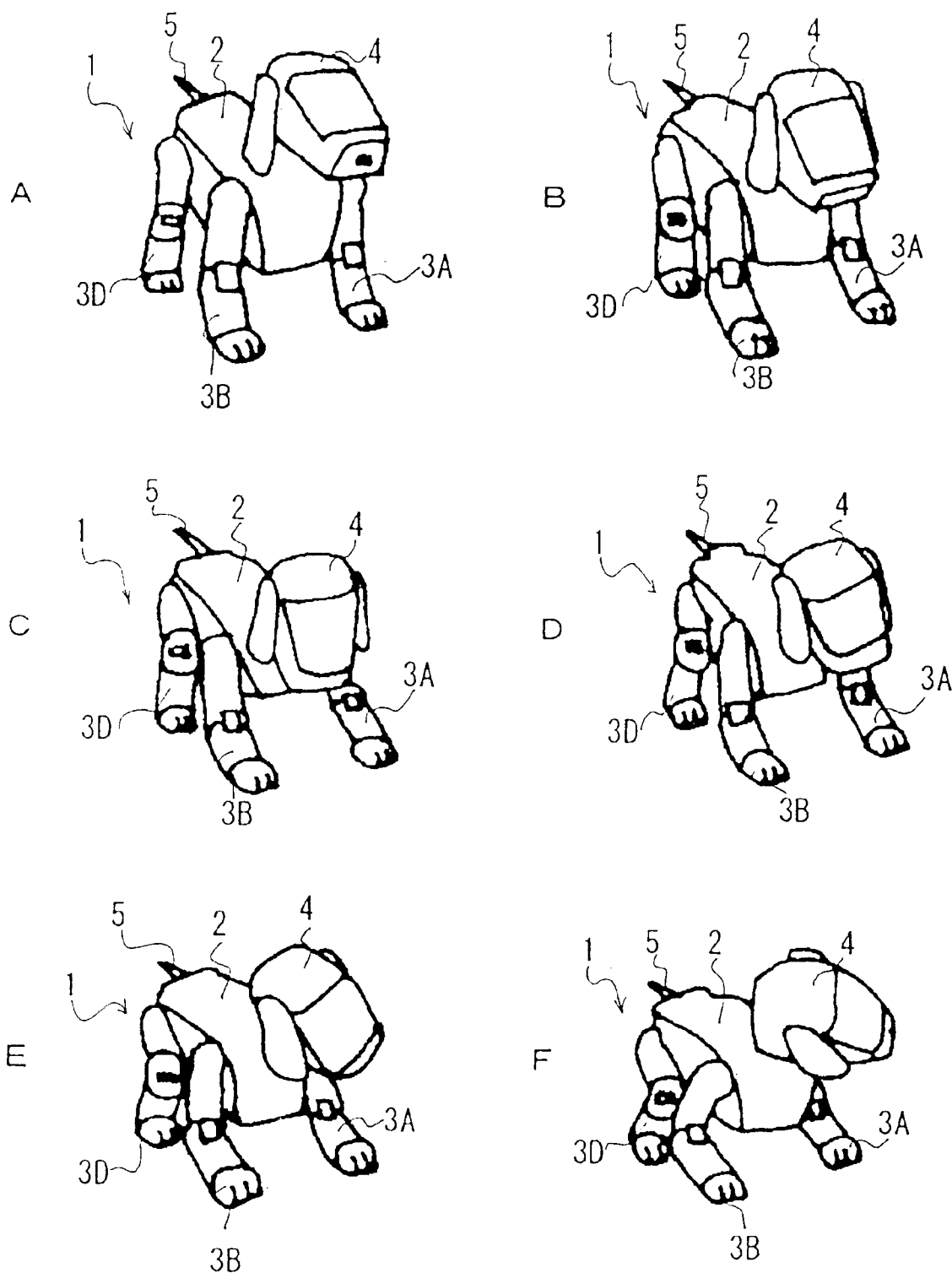
FIG. 78 is a schematic diagram illustrating the pet robot motion.
Figure 79:
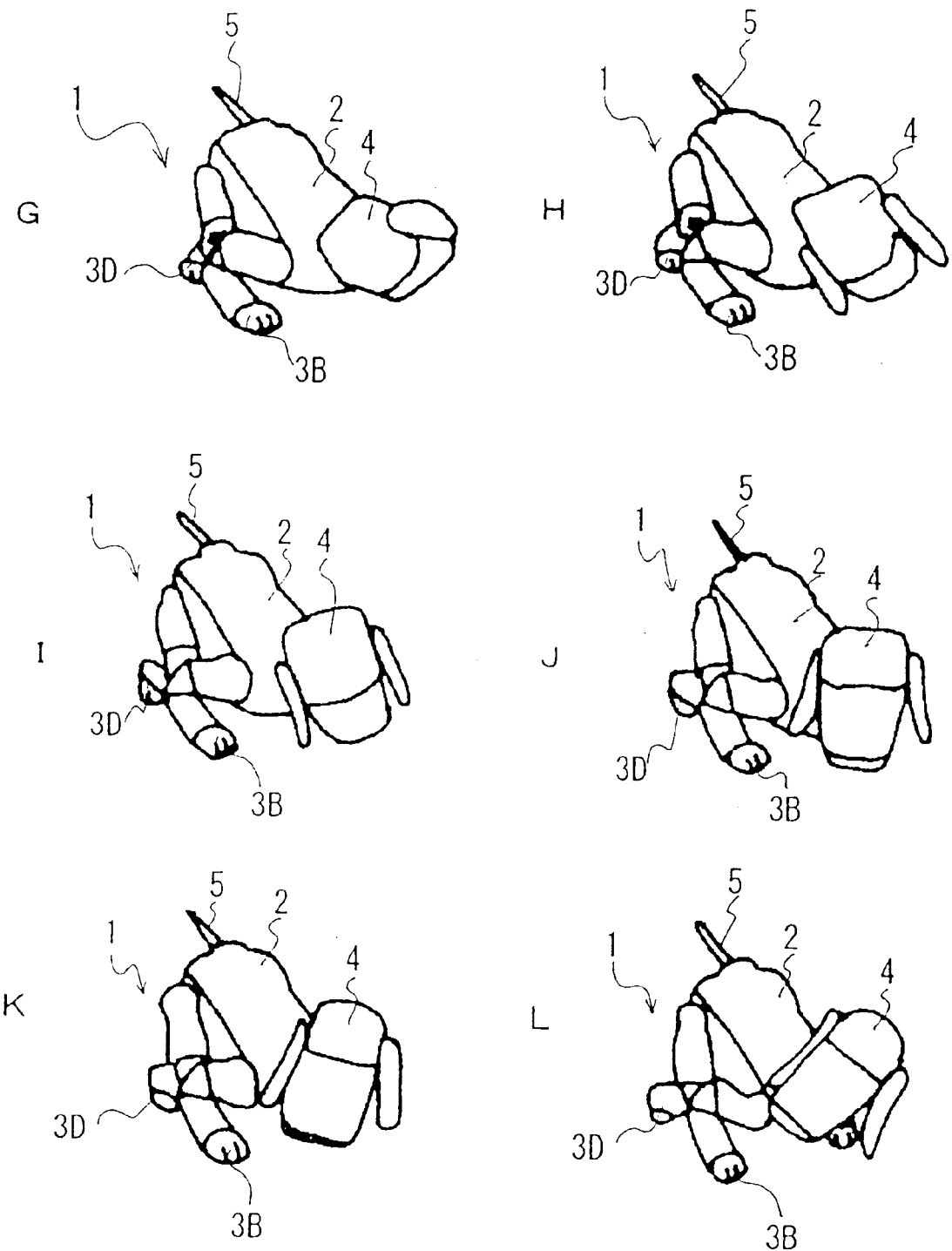
FIG. 79 is a schematic diagram illustrating the pet robot motion.
Figure 80:
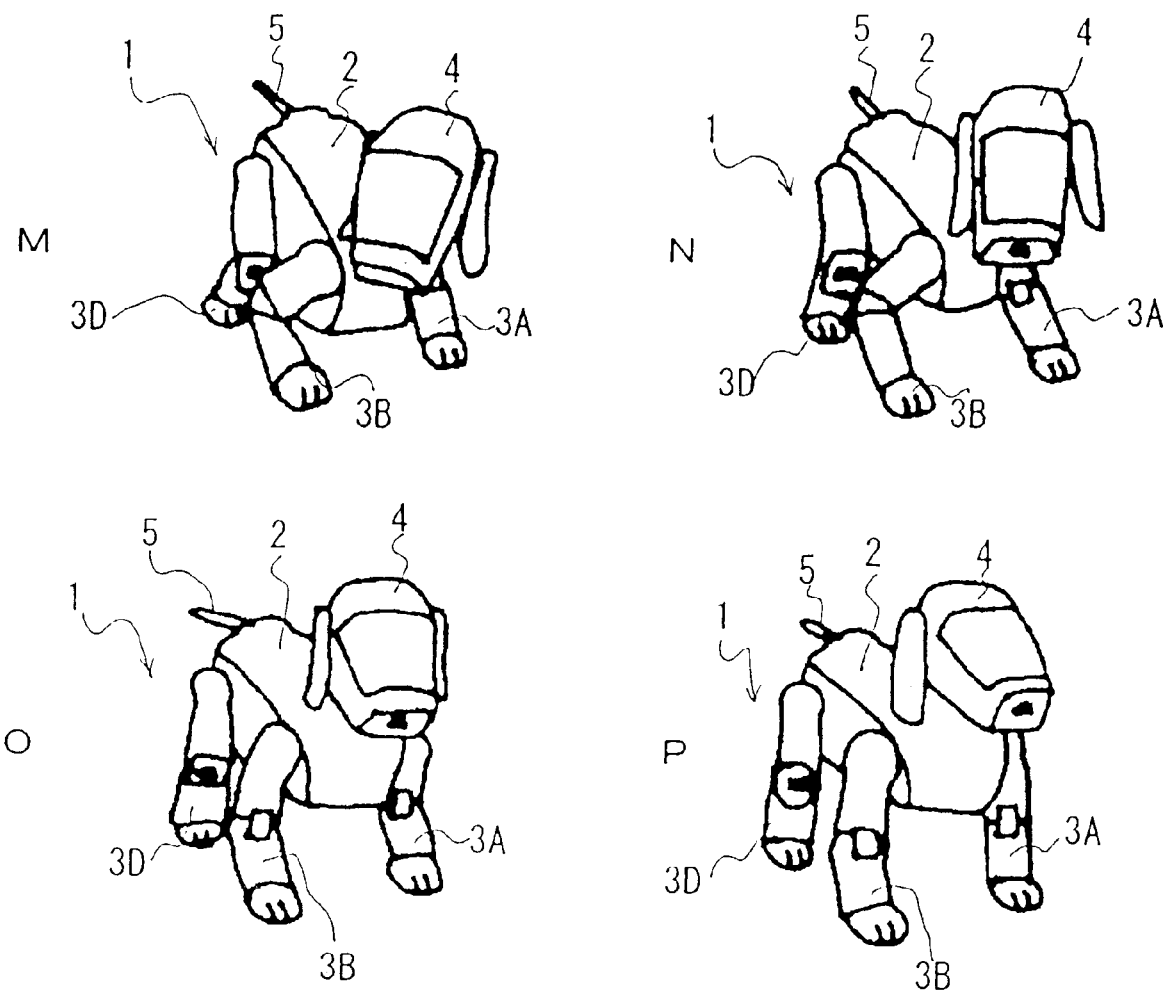
FIG. 80 is a schematic diagram illustrating the pet robot motion.
Figure 81:
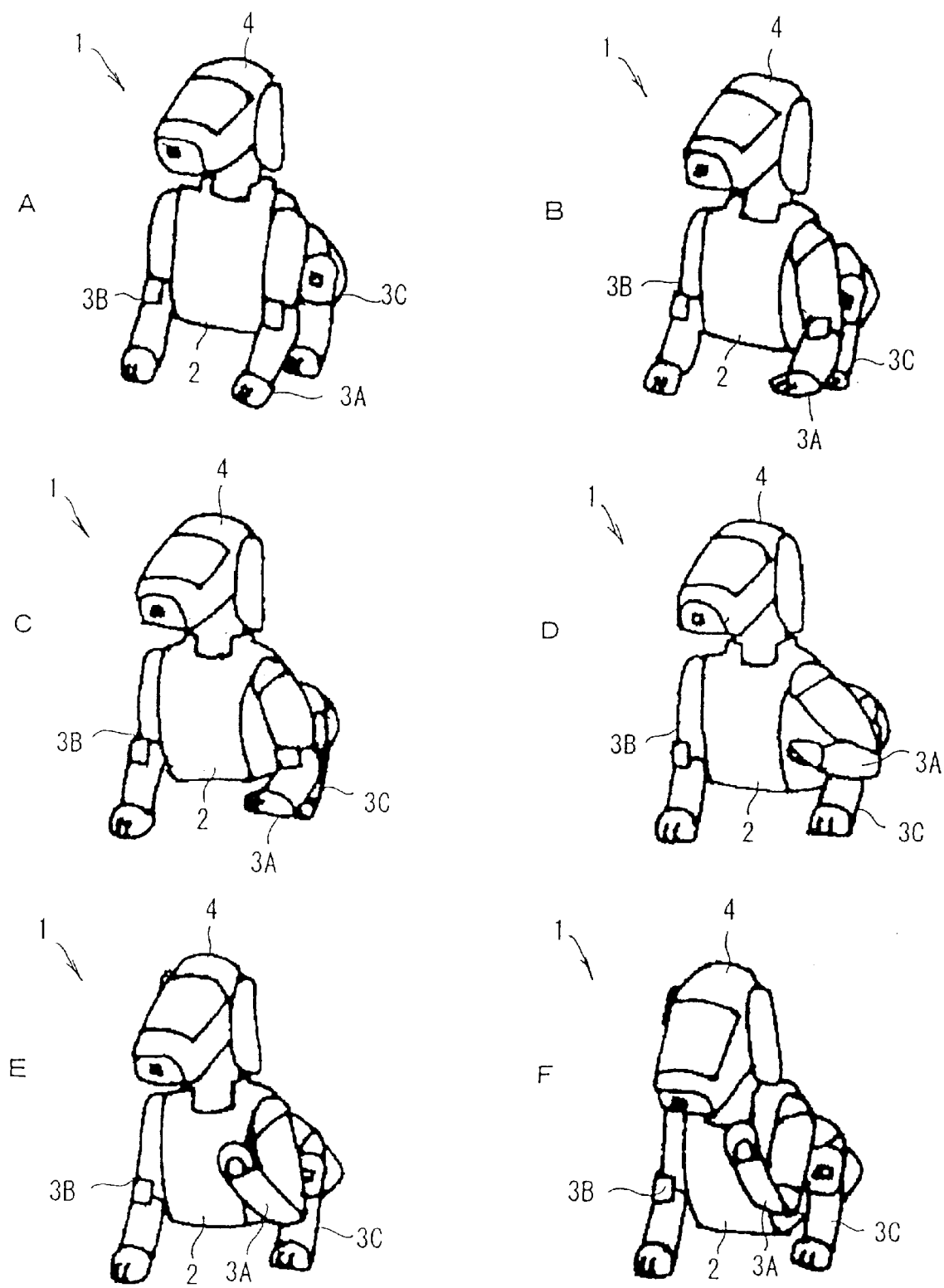
FIG. 81 is a schematic diagram illustrating the pet robot motion.
Figure 82:
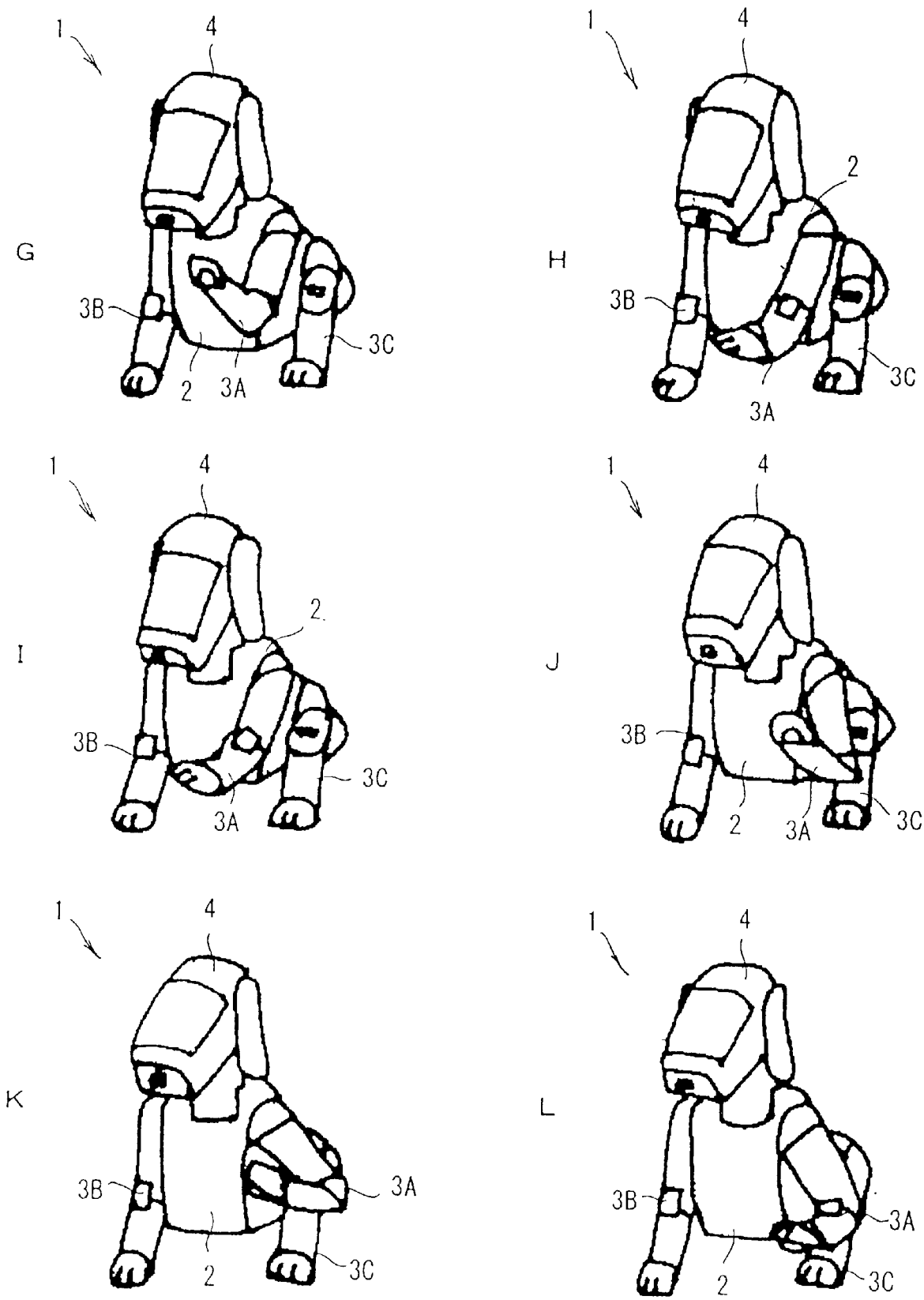
FIG. 82 is a schematic diagram illustrating the pet robot motion.
Figure 83:
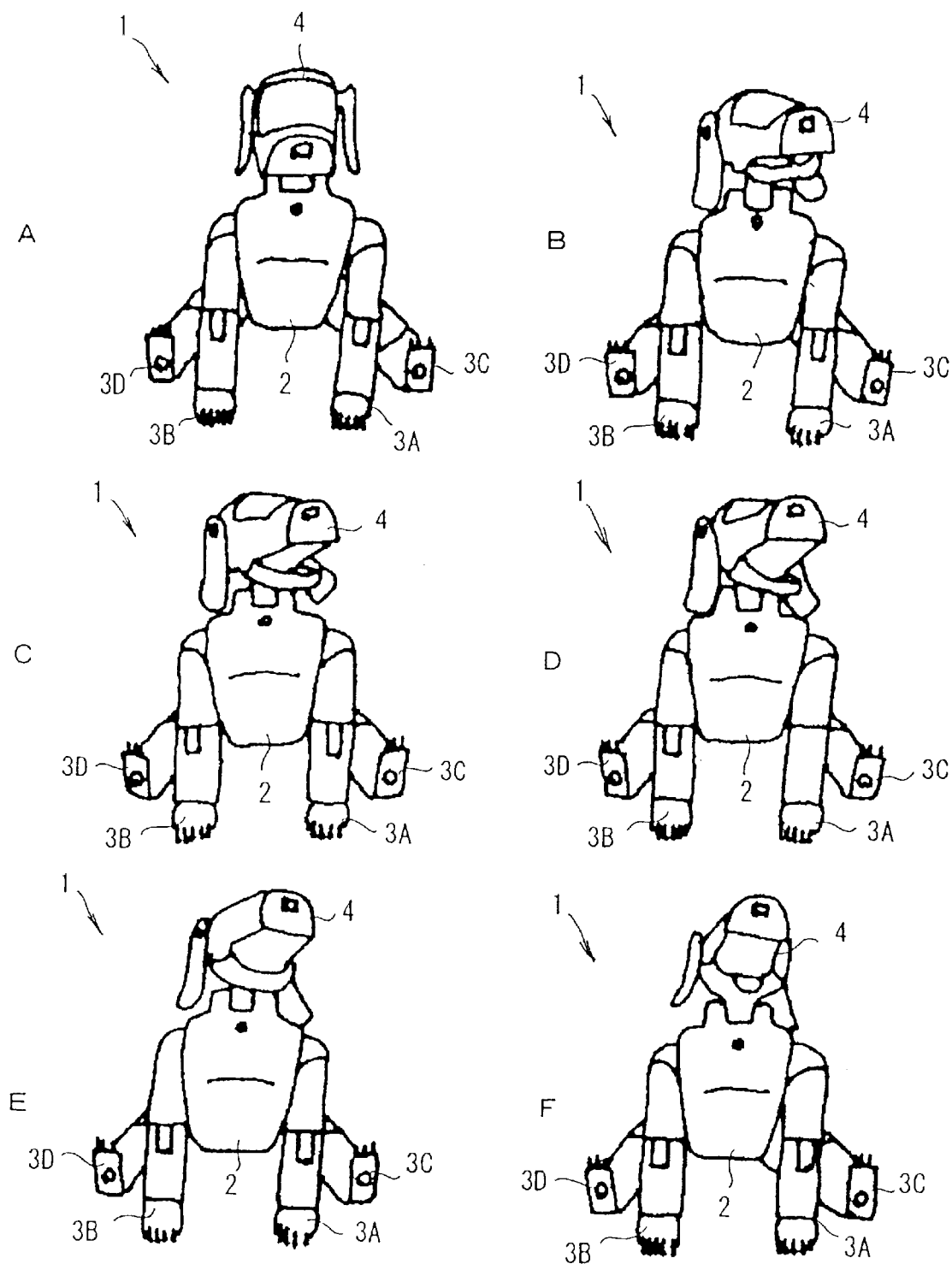
FIG. 83 is a schematic diagram illustrating the pet robot motion.

When it finds a ball, the pet robot 1 walks close to the ball until the ball is just in front of the robot and then takes a basic upright position as shown in FIG. 70A.

Next, the pet robot 1 moves the center of gravity so that its weight does not act on the left foreleg 3A and then positions the contact surface of the left foreleg 3A a little above the ball by lifting the left foreleg 3A so that the end of the leg draws an arc outward.

Then the pet robot 1 brings the contact surface of the left foreleg 3A in contact with the ball from above by turning the shank in the left foreleg 3A downward. Finally, the pet robot 1 performs the reverse of the actions in FIGS. 70A through 70F as shown in FIGS. 71B through 72B to return to the original down position. This ends the motion.

Such a motion can produce a feeling that the pet robot 1 plays with a ball with interest, thus giving the user a lifelike impression.

(3-4-5) Other Ball Response Motions

FIGS. 73A through 74E, 75A through 77F, 78A through 80D, and 81A through 83B show other ball response motions, that is, fifth, sixth, seventh, and eighth ball response motions, respectively.

(3-5) Emotion Expression Motion

Next, motions with which the pet robot 1 expresses emotion will be described below (these motions are hereinafter called emotion expression motions).

(3-5-1) First Emotion Expression Motion

A first emotion expression motion will be described below. The pet robot 1 produces the first emotion expression motion when it is down, with the right and left hind legs 3D and 3C straightened forward, and, for example, a loud sound occurs in the neighborhood, or an object suddenly appears before the robot.

Figure 84:
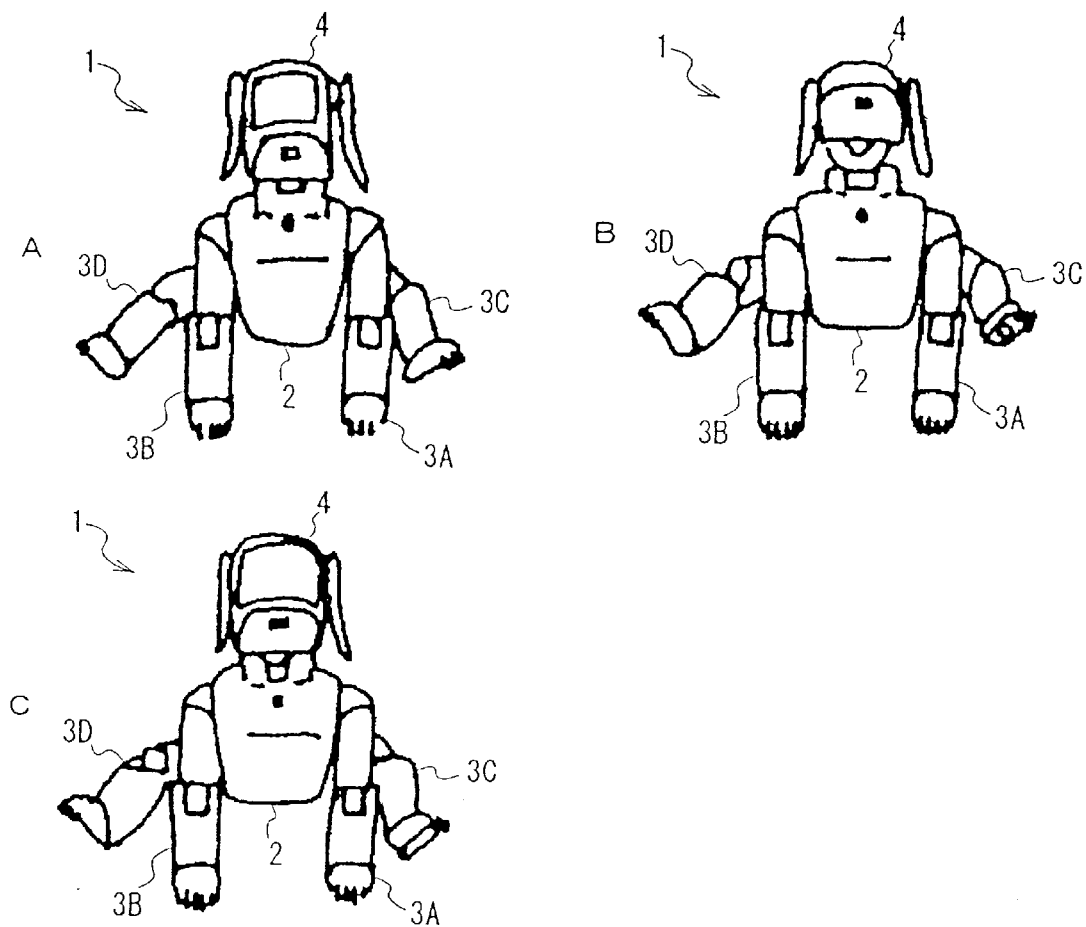
FIG. 84 is a schematic diagram illustrating the pet robot motion.

That is, when the pet robot 1 is down as shown in FIG. 84A, and, for example, a loud sound occurs in the neighborhood, or an object suddenly appears before the robot, it lifts the right and left hind legs 3D and 3C slightly for an instant. In parallel, the pet robot 1 turns the head 4 back for an instant, bending the head 4, opens the mouth, and stands the tail 5 for an instant. Then the pet robot 1 returns to the original down position as shown in FIG. 84C.

Such a motion can produce a feeling that the pet robot 1 is startled, thus expressing an emotion of surprise.

(3-5-2) Second Emotion Expression Motion

Next, a second emotion expression motion will be described below. The pet robot 1 produces the second emotion expression motion when it expresses an emotion of anger.

Figure 85:
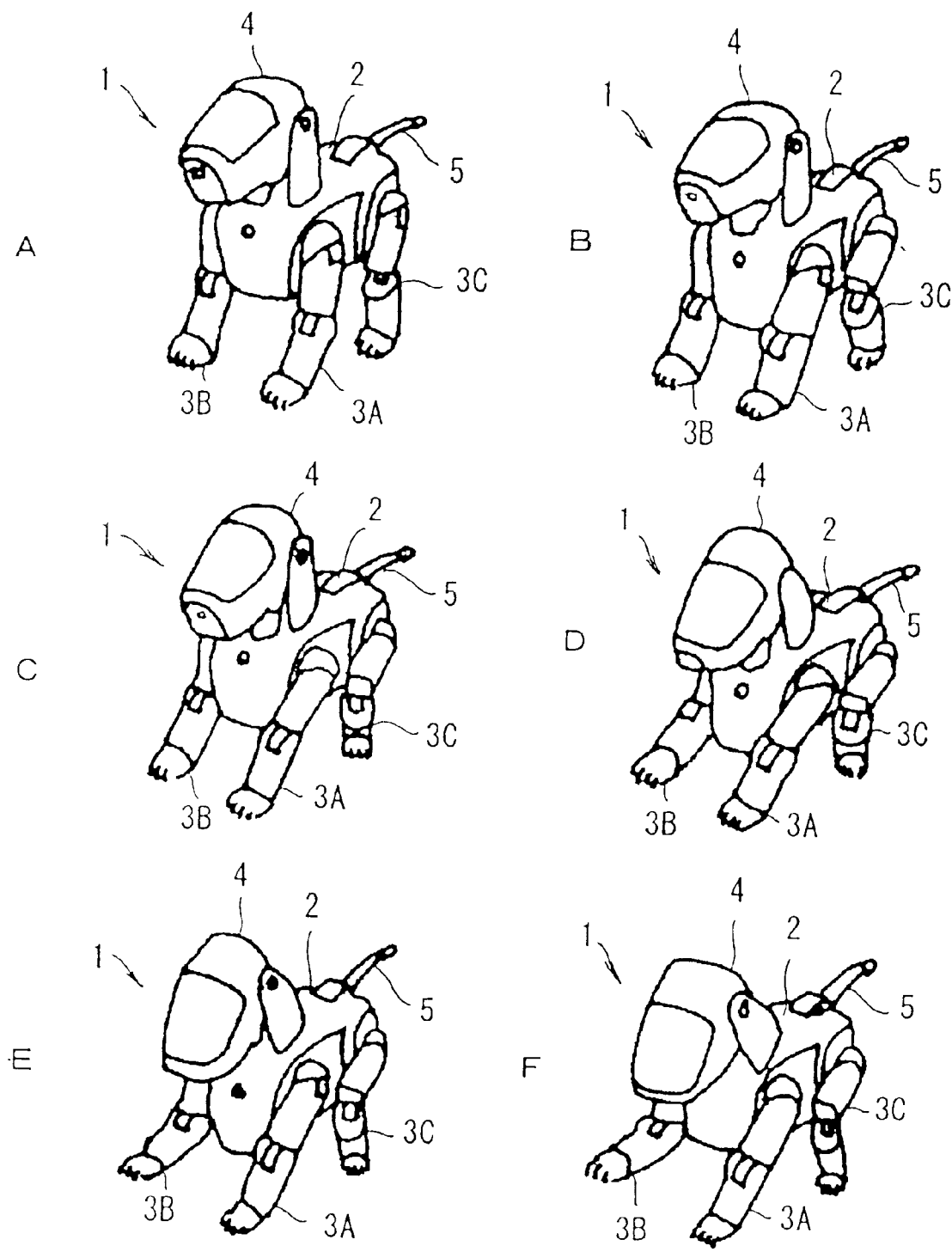
FIG. 85 is a schematic diagram illustrating the pet robot motion.
Figure 86:
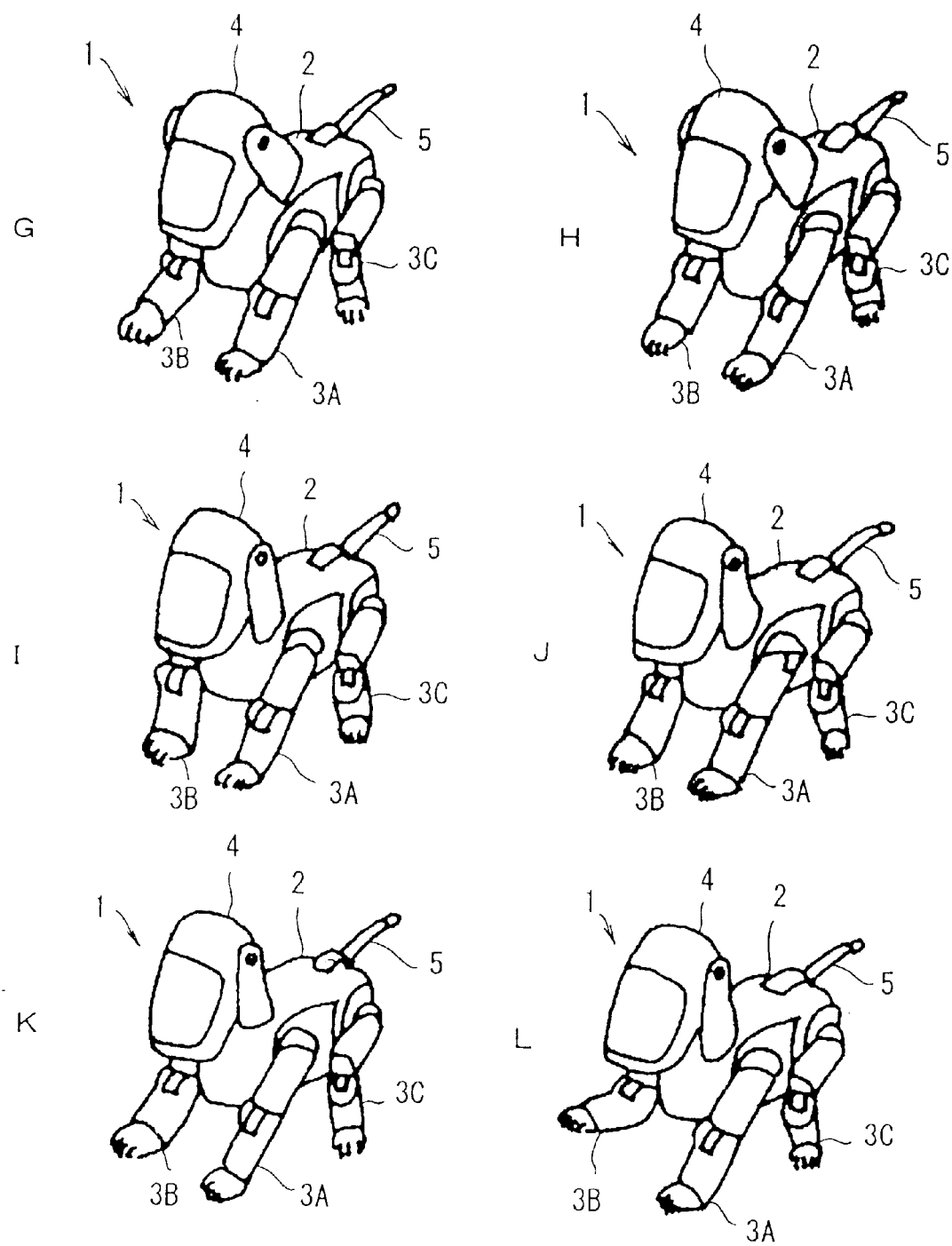
FIG. 86 is a schematic diagram illustrating the pet robot motion.
Figure 87:
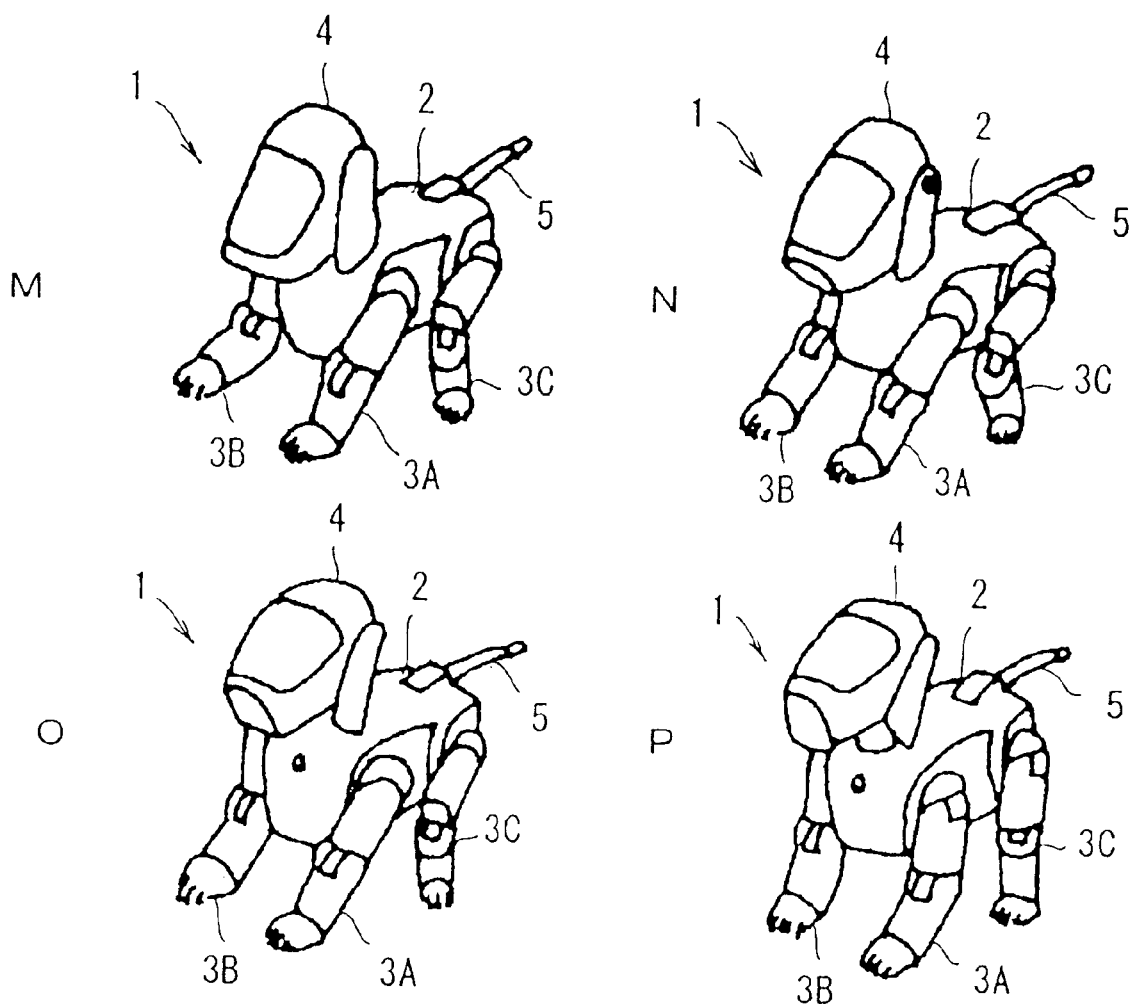
FIG. 87 is a schematic diagram illustrating the pet robot motion.

When it is in a basic upright position as shown in FIG. 85A, the pet robot 1 moves the center of gravity so that its weight does not act on the right foreleg 3B (or the left foreleg 3A), as shown in FIGS. 85B and 85C and then swing the entire right foreleg 3B (or left foreleg 3A) back and forth of the pet robot, and in concert with this swings the shank 3BY (3AY) in the right foreleg 3B (or the left foreleg 3A) back and forth as shown in FIGS. 85D through 86F to act as if it scratches the floor a few times. In parallel, the pet robot 1 directs the head 4 downward, generating a feeling that it looks at the floor and flashes on and off a red LED, which has a shape appearing to express anger and functions as an eye.

After this action is completed, the pet robot 1 performs the reverse of the actions in FIGS. 85A through 85C as shown in FIGS. 87A through 87D to return to the original upright position. This ends the motion.

Such a motion can produce a feeling that the pet robot 1 scratches the ground with anger, thus expressing an emotion of anger.

(3-5-3) Third Emotion Expression Motion

Next, a third emotion expression motion will be described below. The pet robot 1 produces the third emotion expression motion when it feels a dislike.

Figure 88:
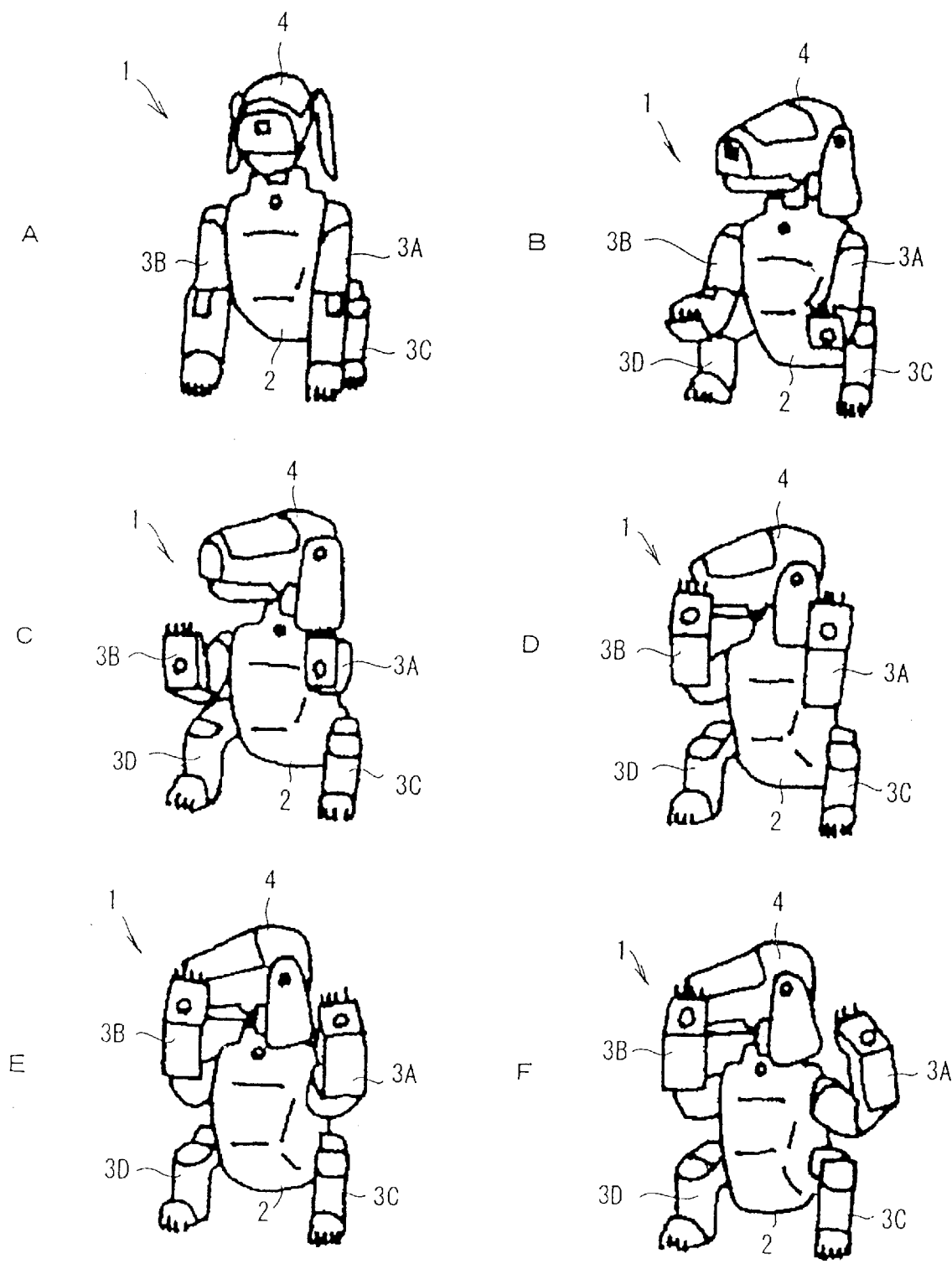
FIG. 88 is a schematic diagram illustrating the pet robot motion.
Figure 89:
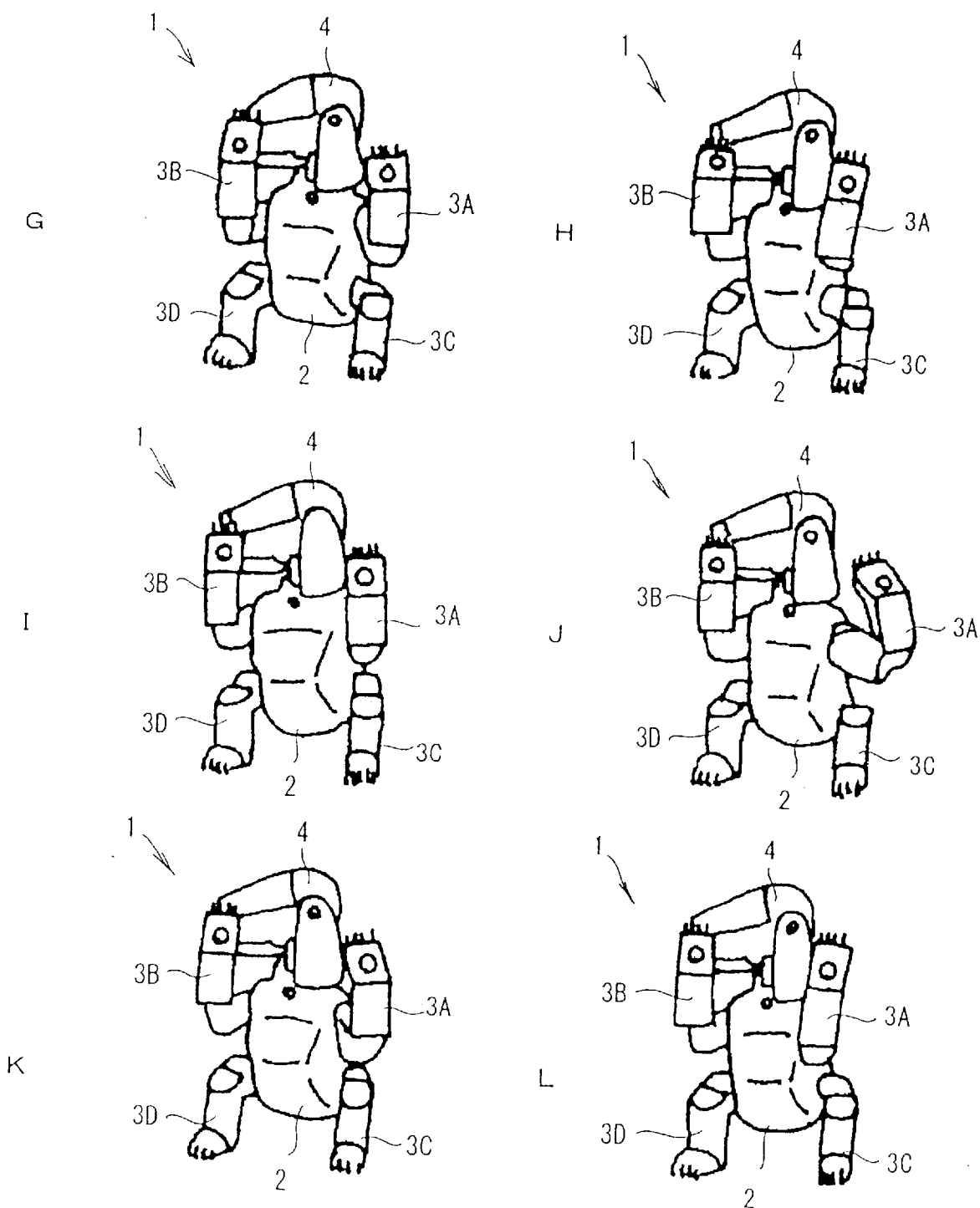
FIG. 89 is a schematic diagram illustrating the pet robot motion.
Figure 90:
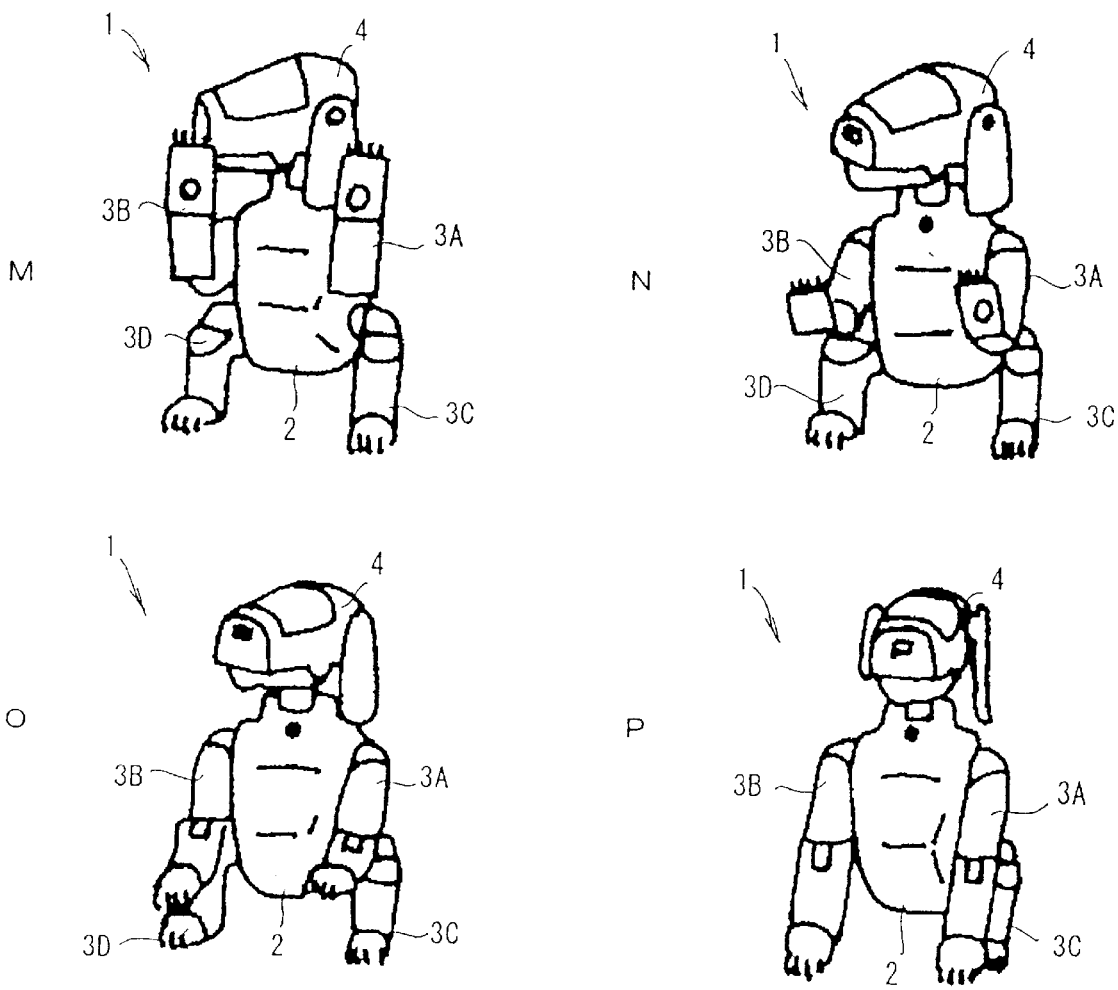
FIG. 90 is a schematic diagram illustrating the pet robot motion.
Figure 91:
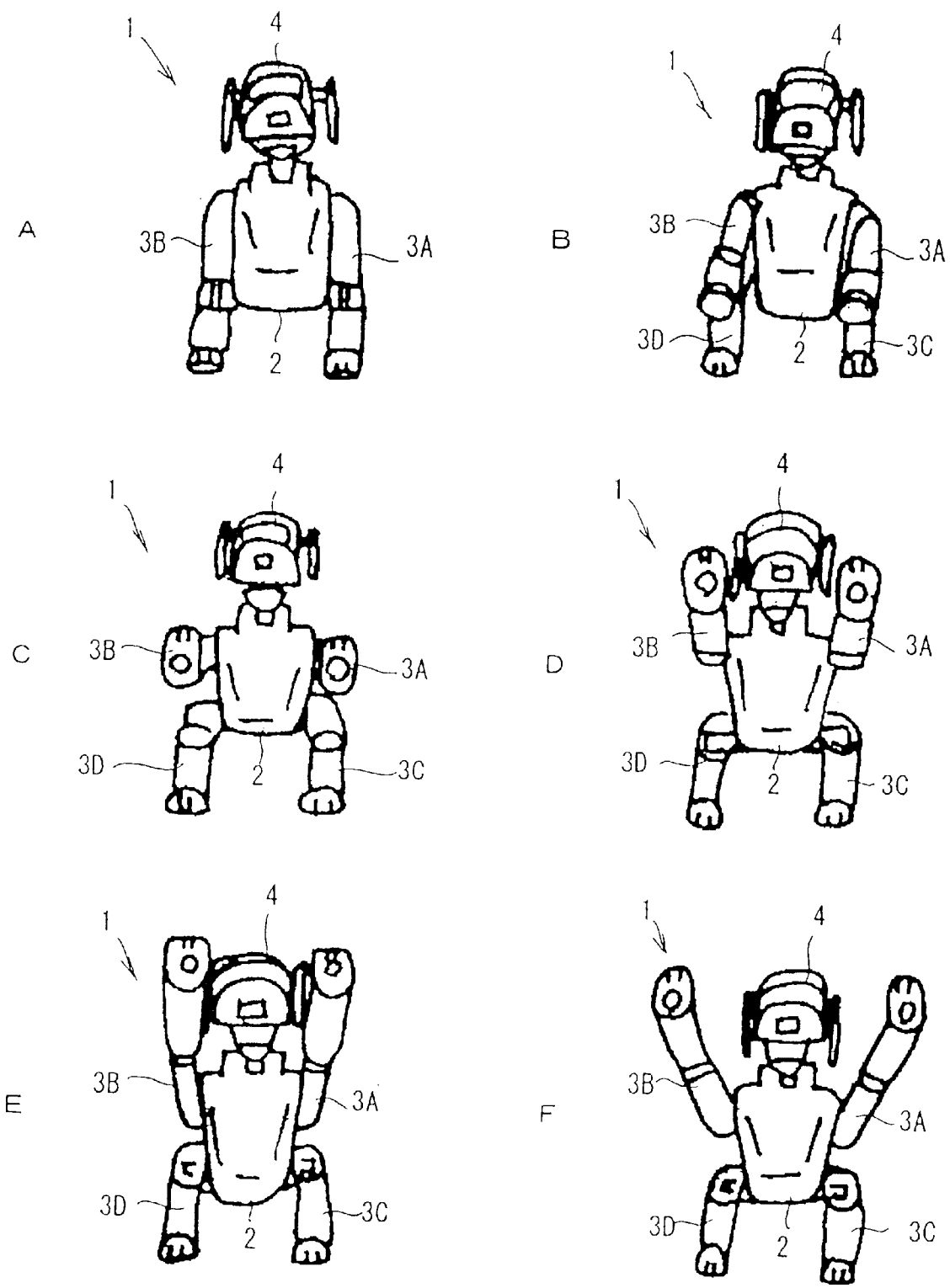
FIG. 91 is a schematic diagram illustrating the pet robot motion.
Figure 92:
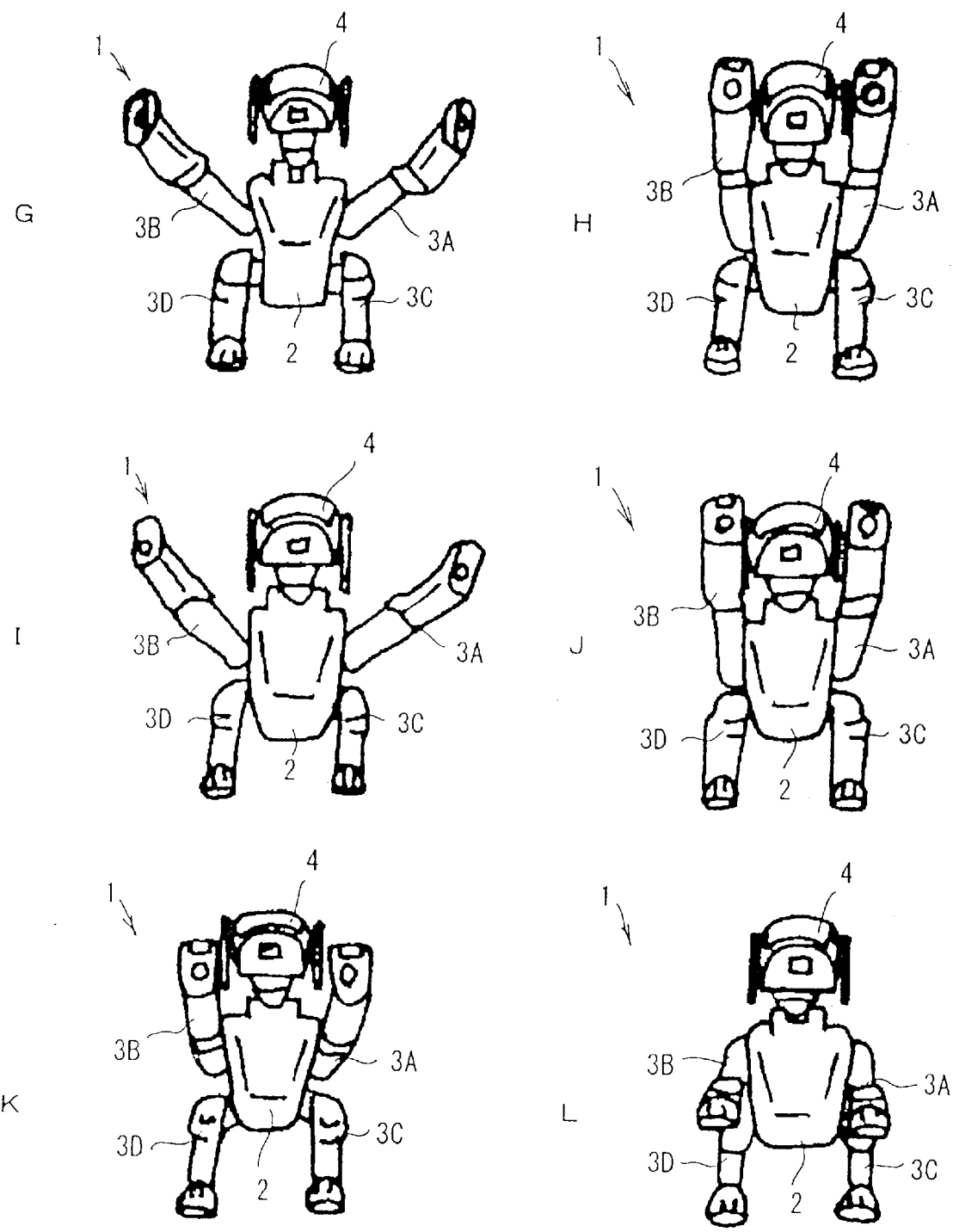
FIG. 92 is a schematic diagram illustrating the pet robot motion.
Figure 93:
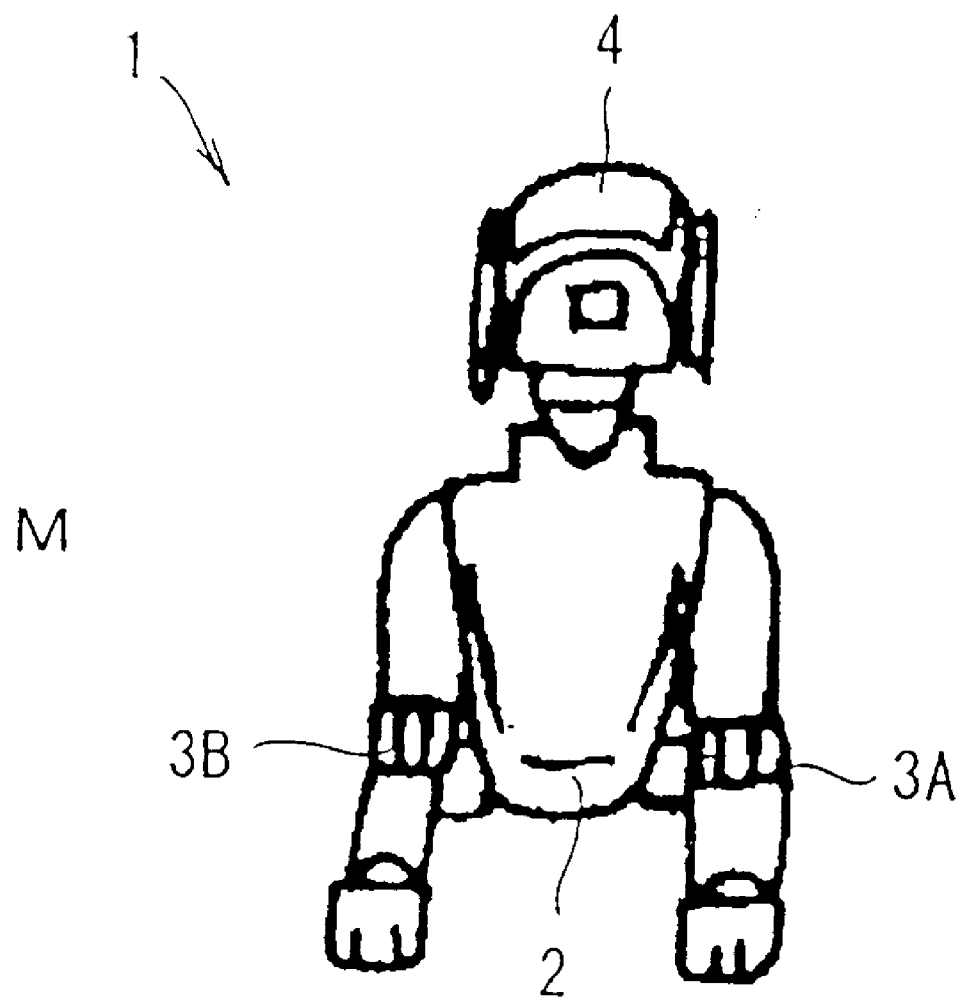
FIG. 93 is a schematic diagram illustrating the pet robot motion.
Figure 94:
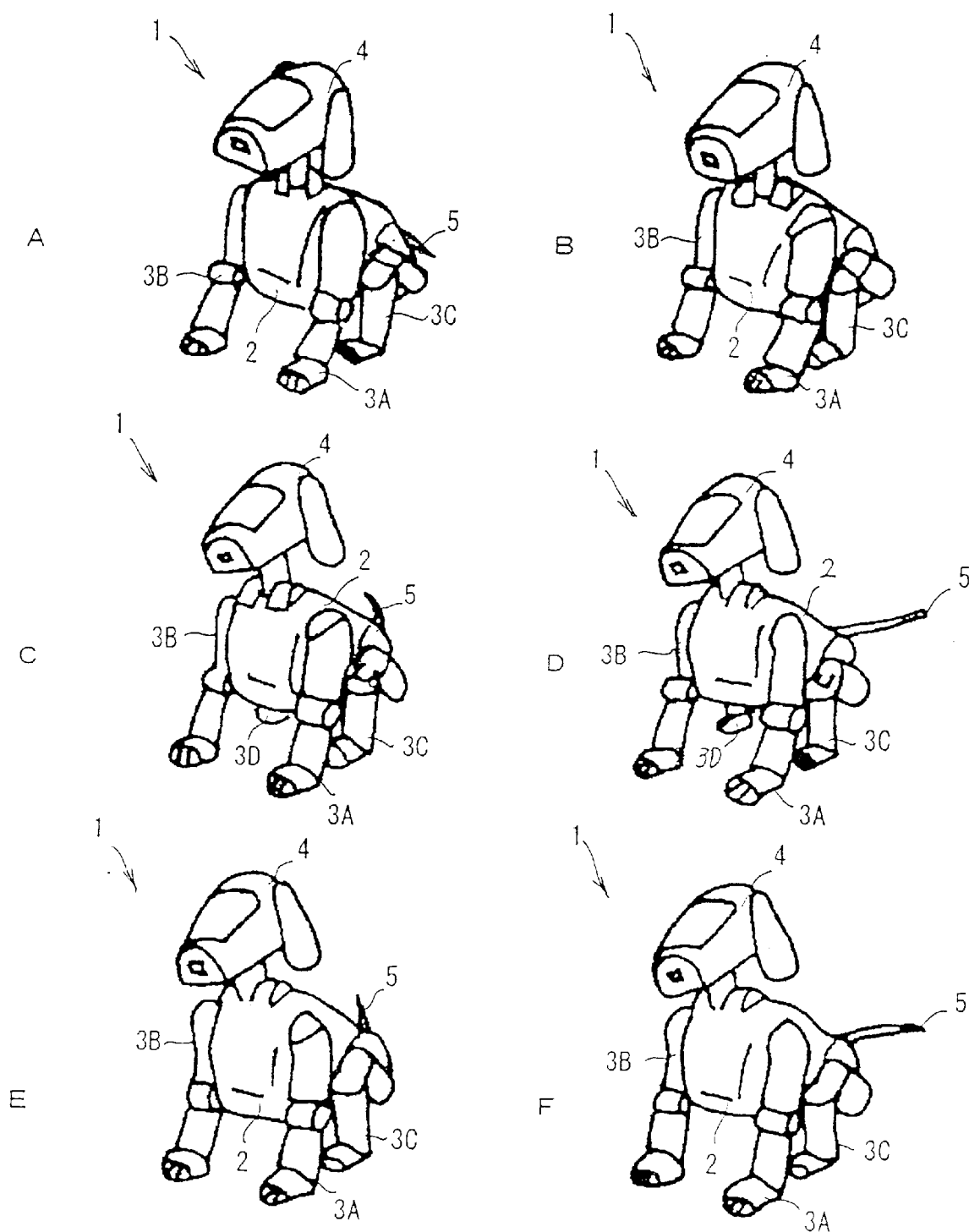
FIG. 94 is a schematic diagram illustrating the pet robot motion.
Figure 95:
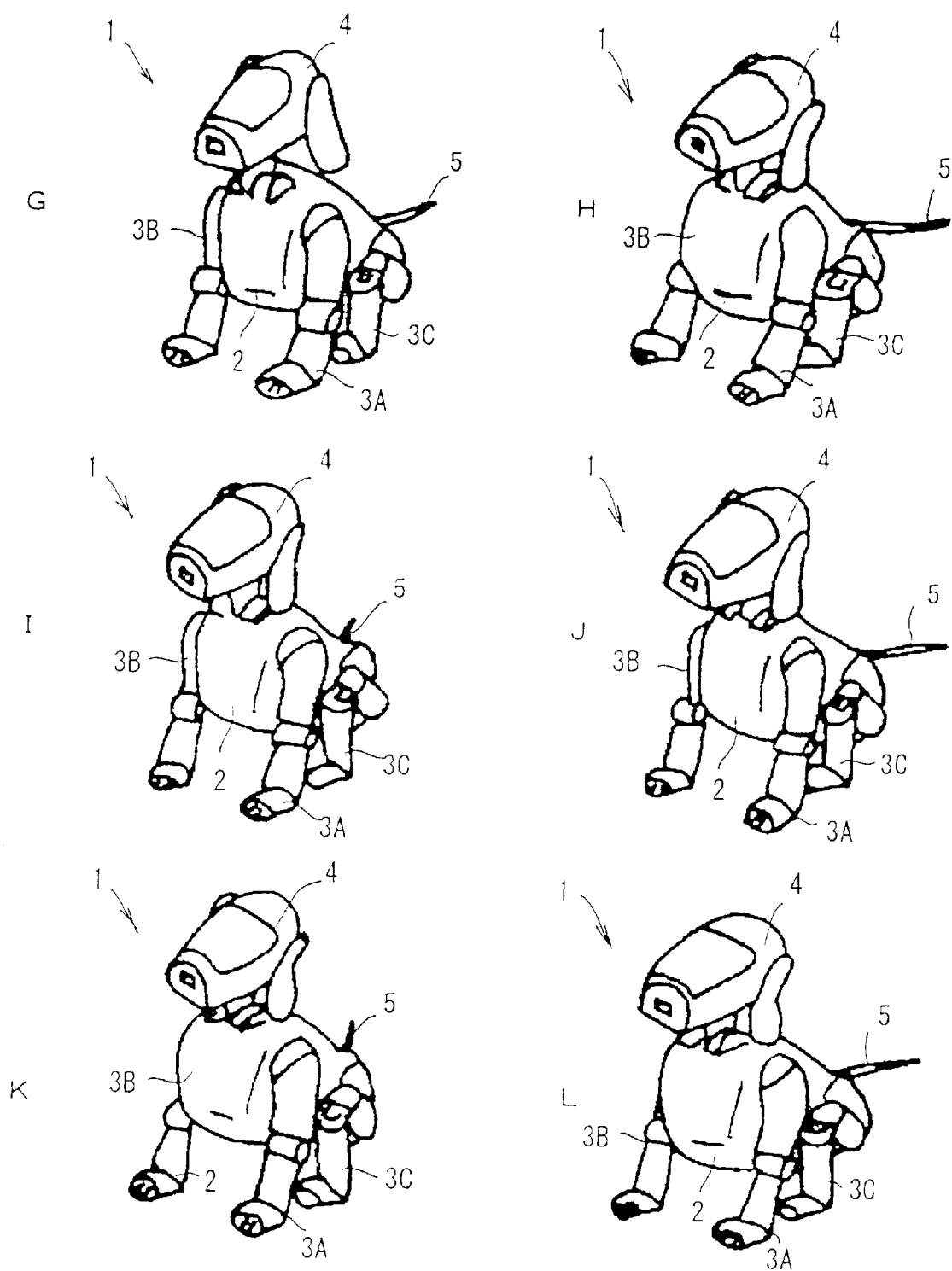
FIG. 95 is a schematic diagram illustrating the pet robot motion.
Figure 96:
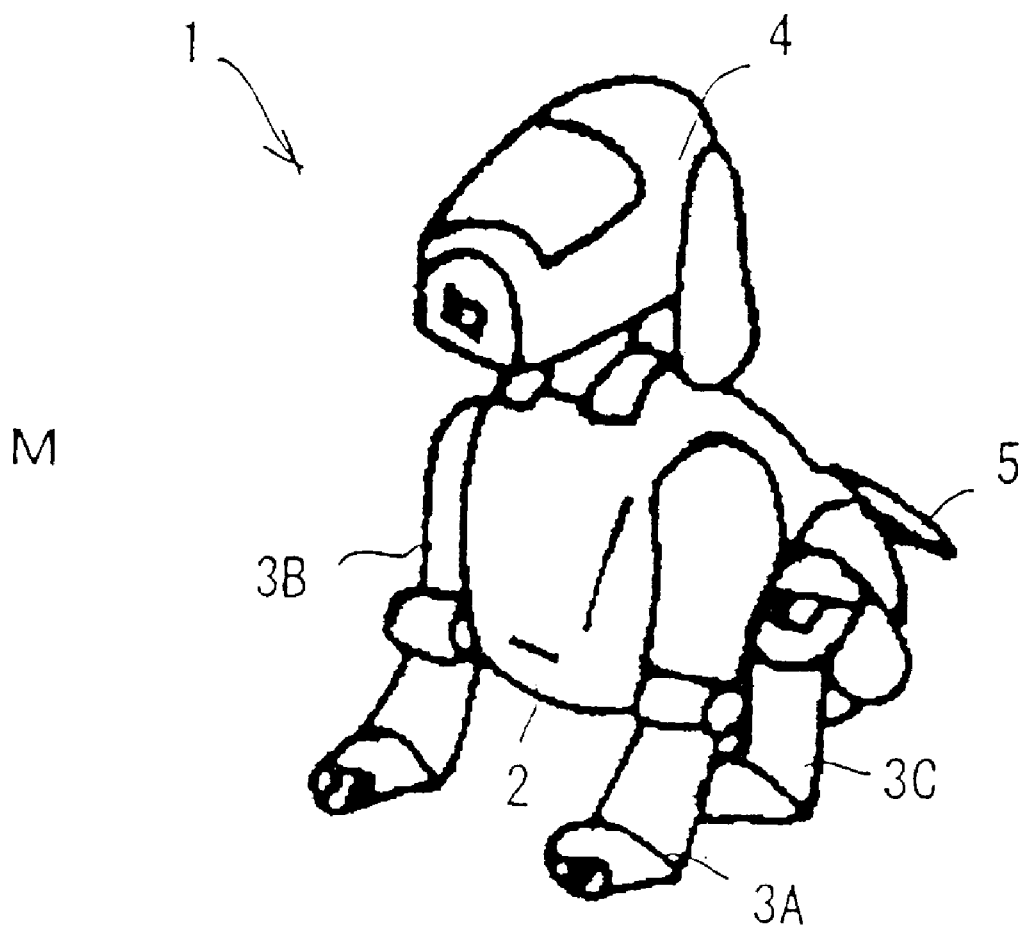
FIG. 96 is a schematic diagram illustrating the pet robot motion.
Figure 97:
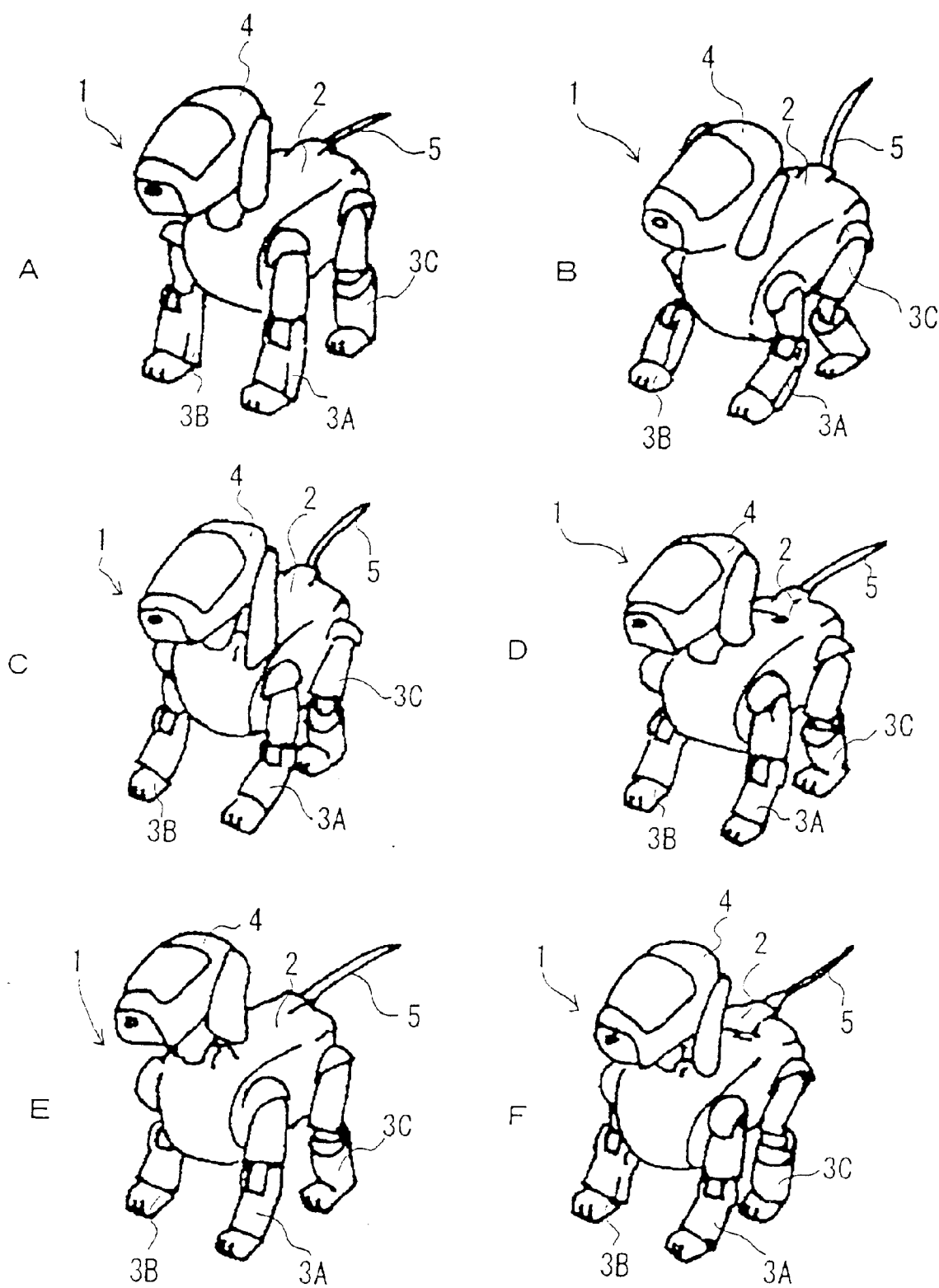
FIG. 97 is a schematic diagram illustrating the pet robot motion.
Figure 98:
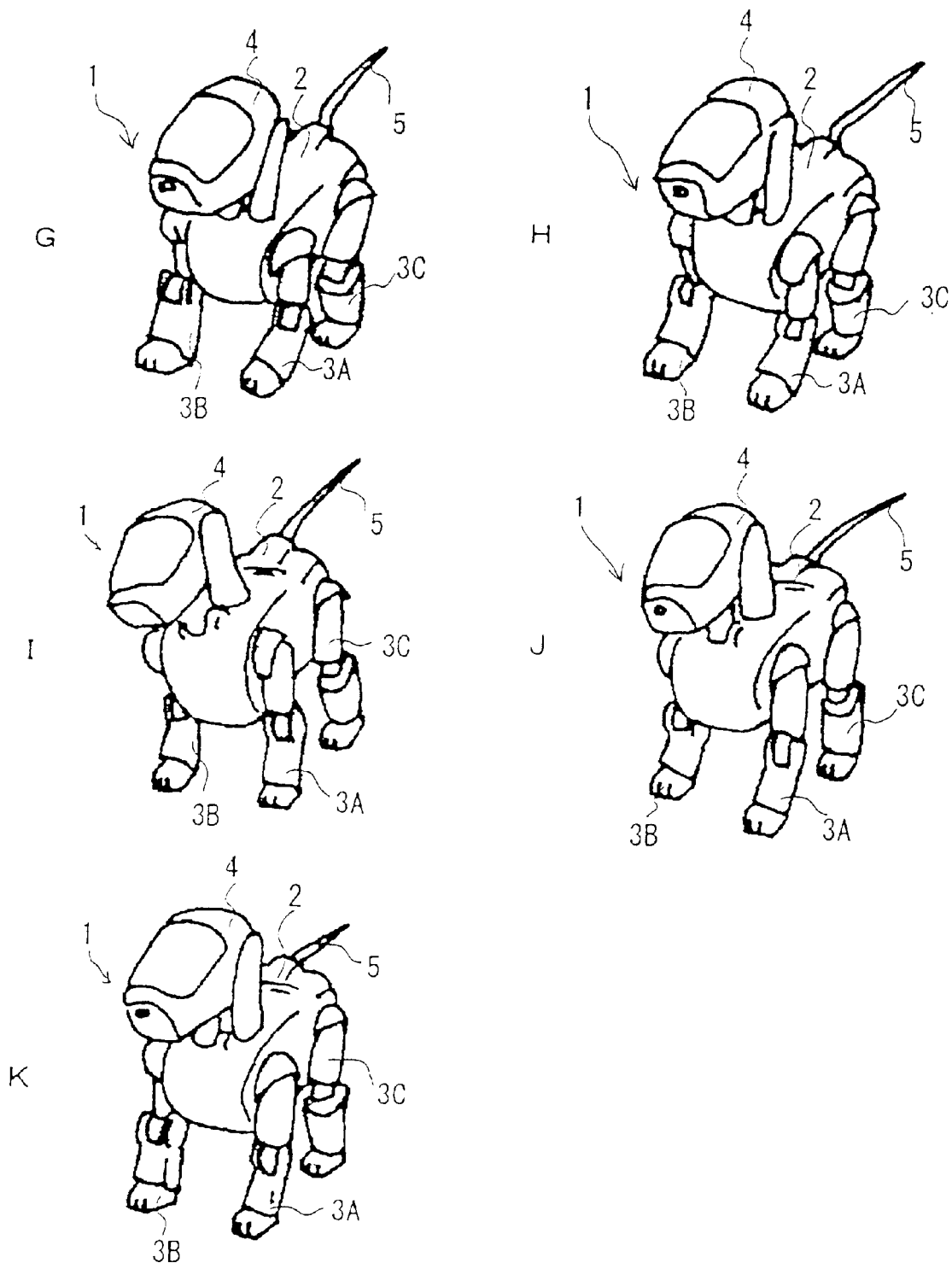
FIG. 98 is a schematic diagram illustrating the pet robot motion.
Figure 99:
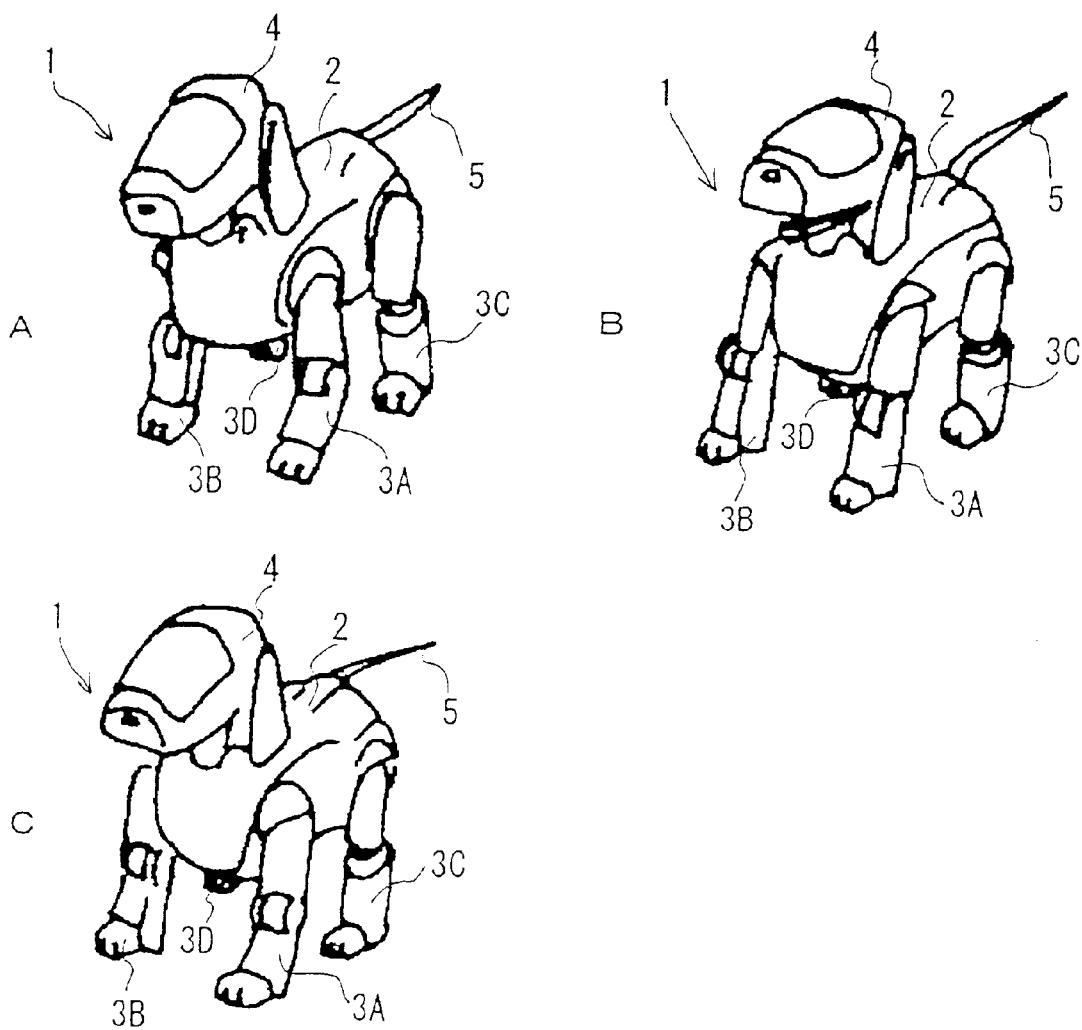
FIG. 99 is a schematic diagram illustrating the pet robot motion.
Figure 100:
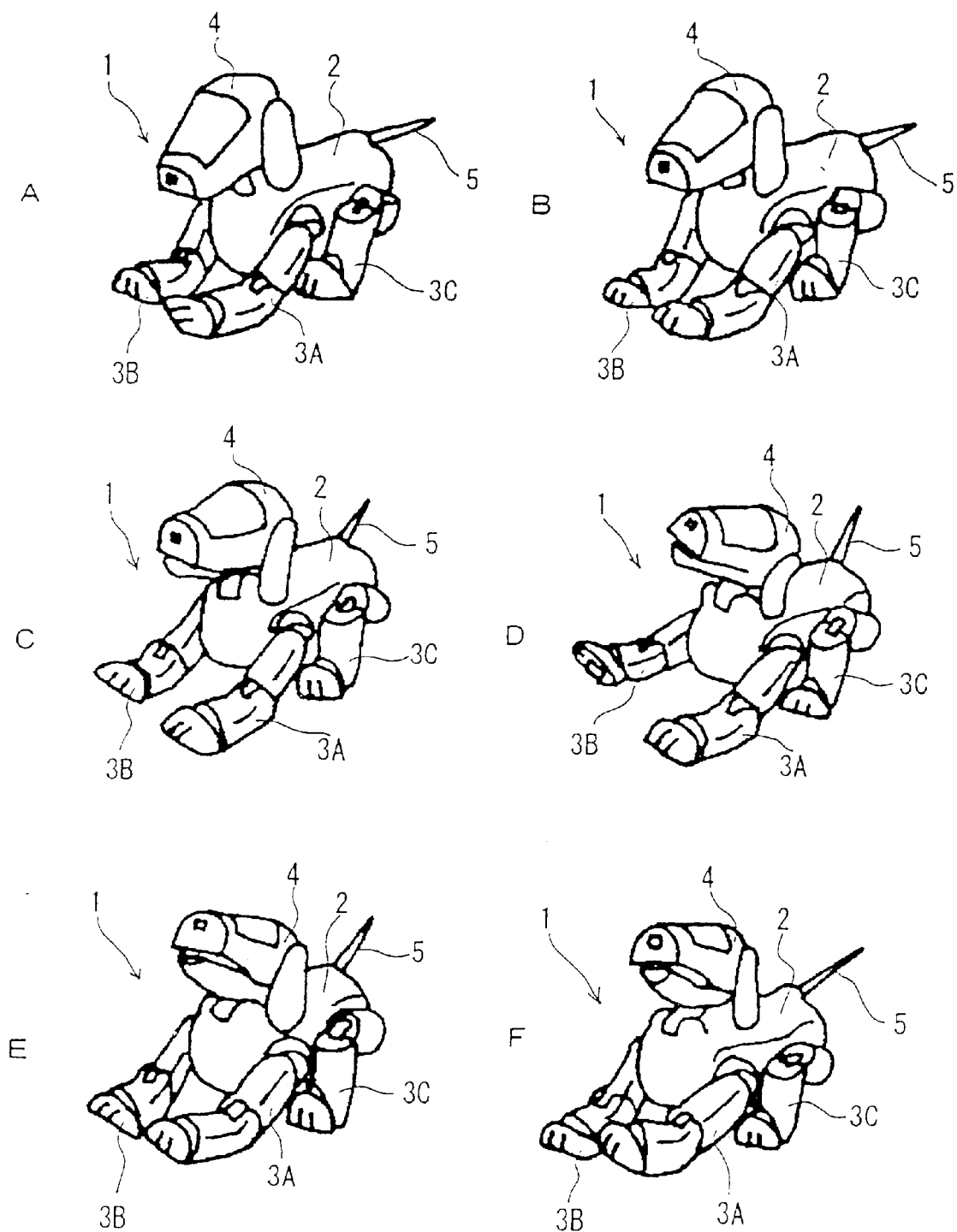
FIG. 100 is a schematic diagram illustrating the pet robot motion.
Figure 101:
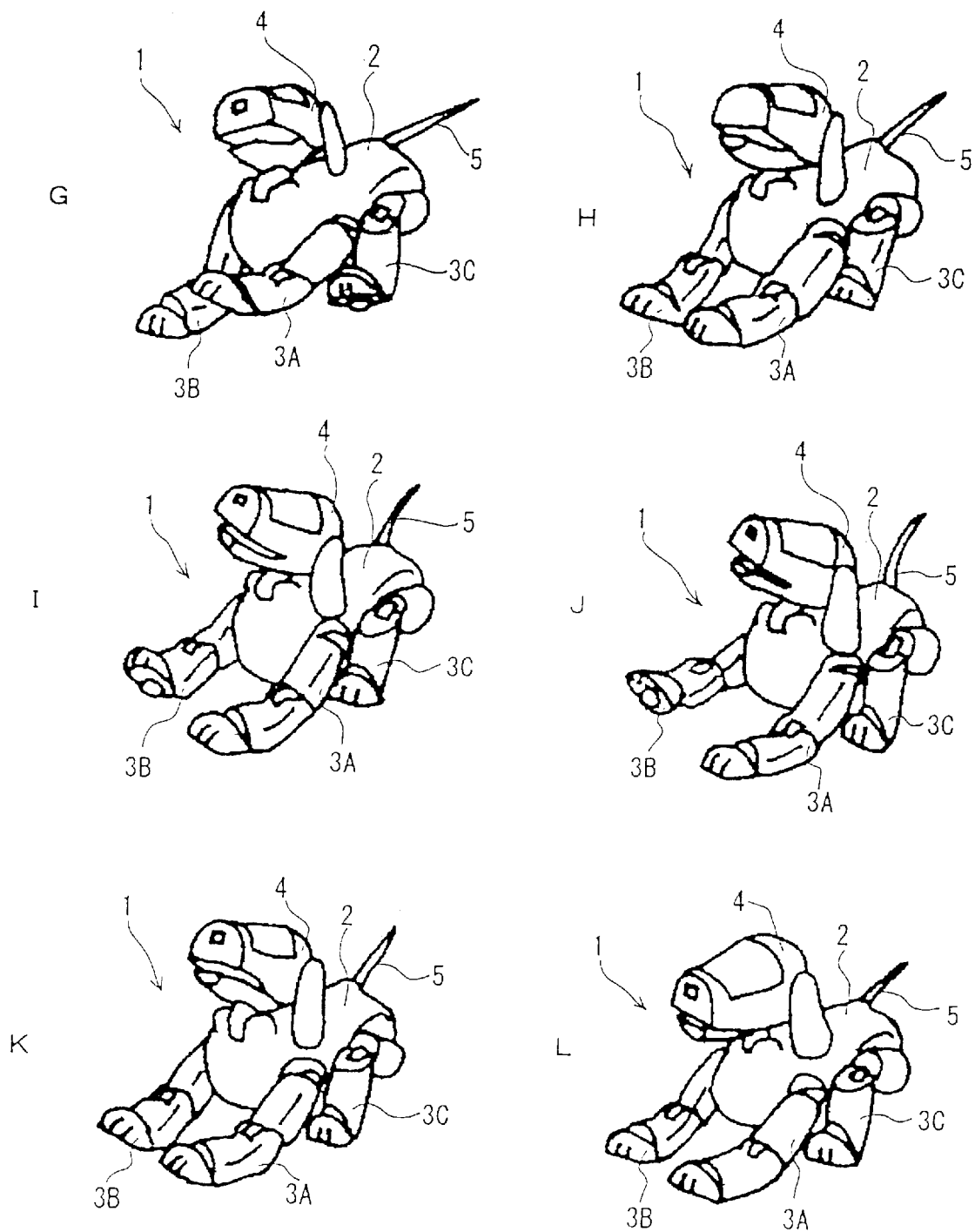
FIG. 101 is a schematic diagram illustrating the pet robot motion.
Figure 102:
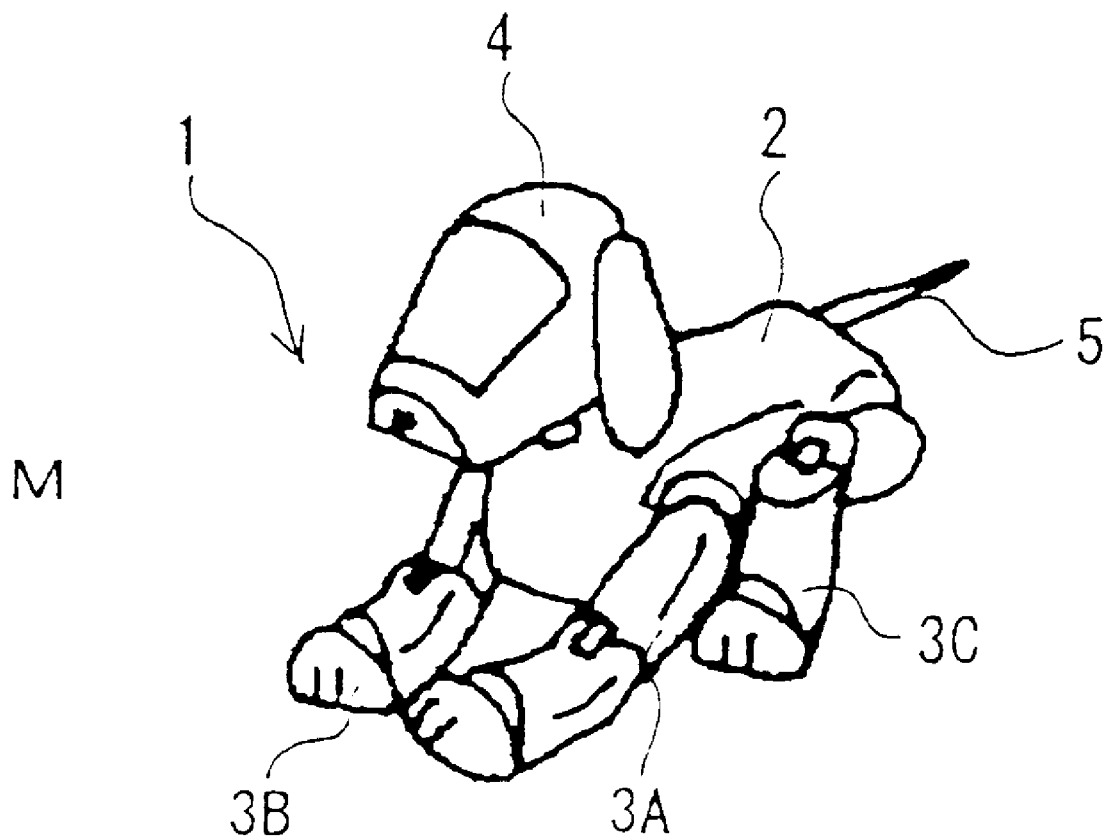
FIG. 102 is a schematic diagram illustrating the pet robot motion.
Figure 103:
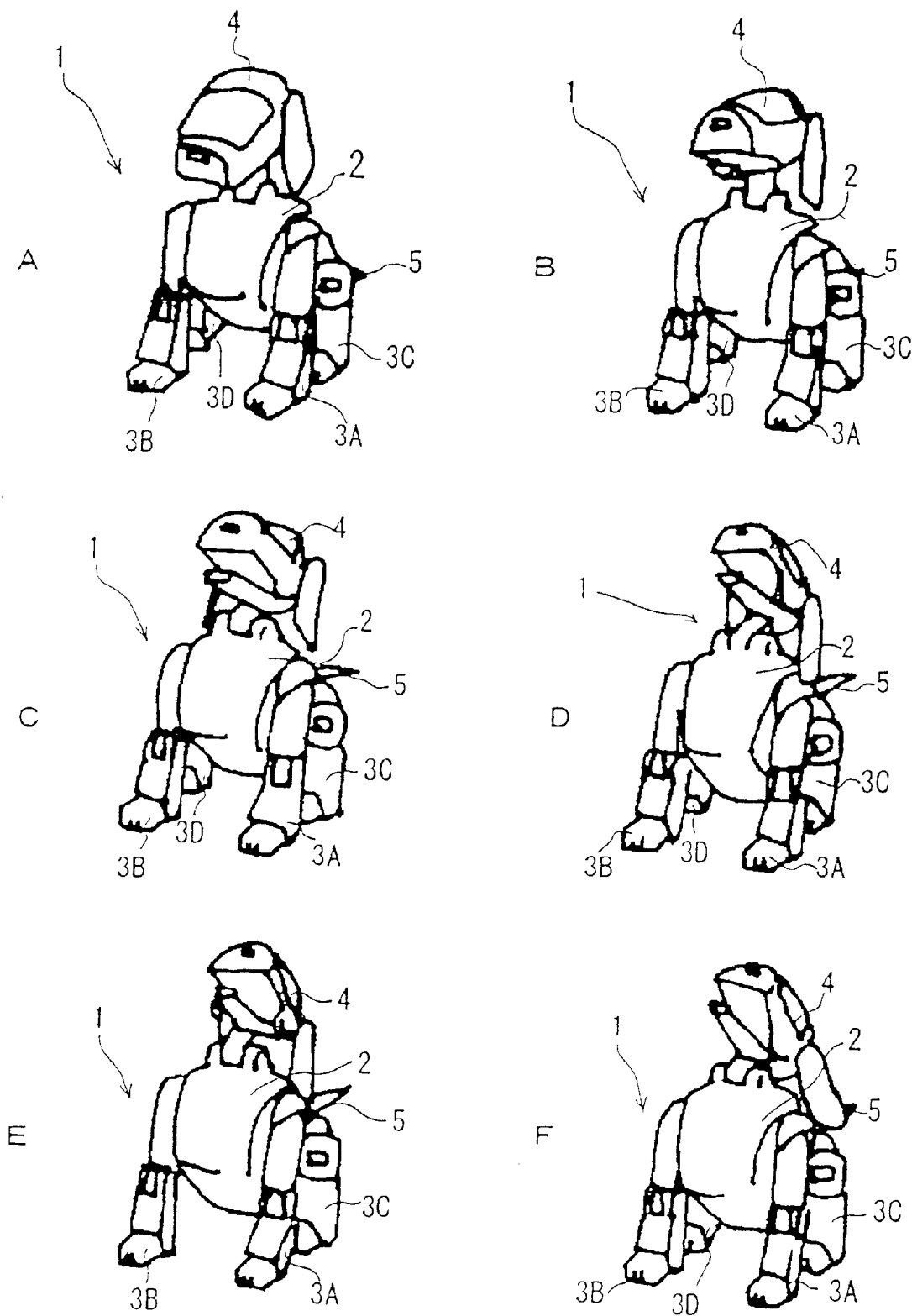
FIG. 103 is a schematic diagram illustrating the pet robot motion.
Figure 104:
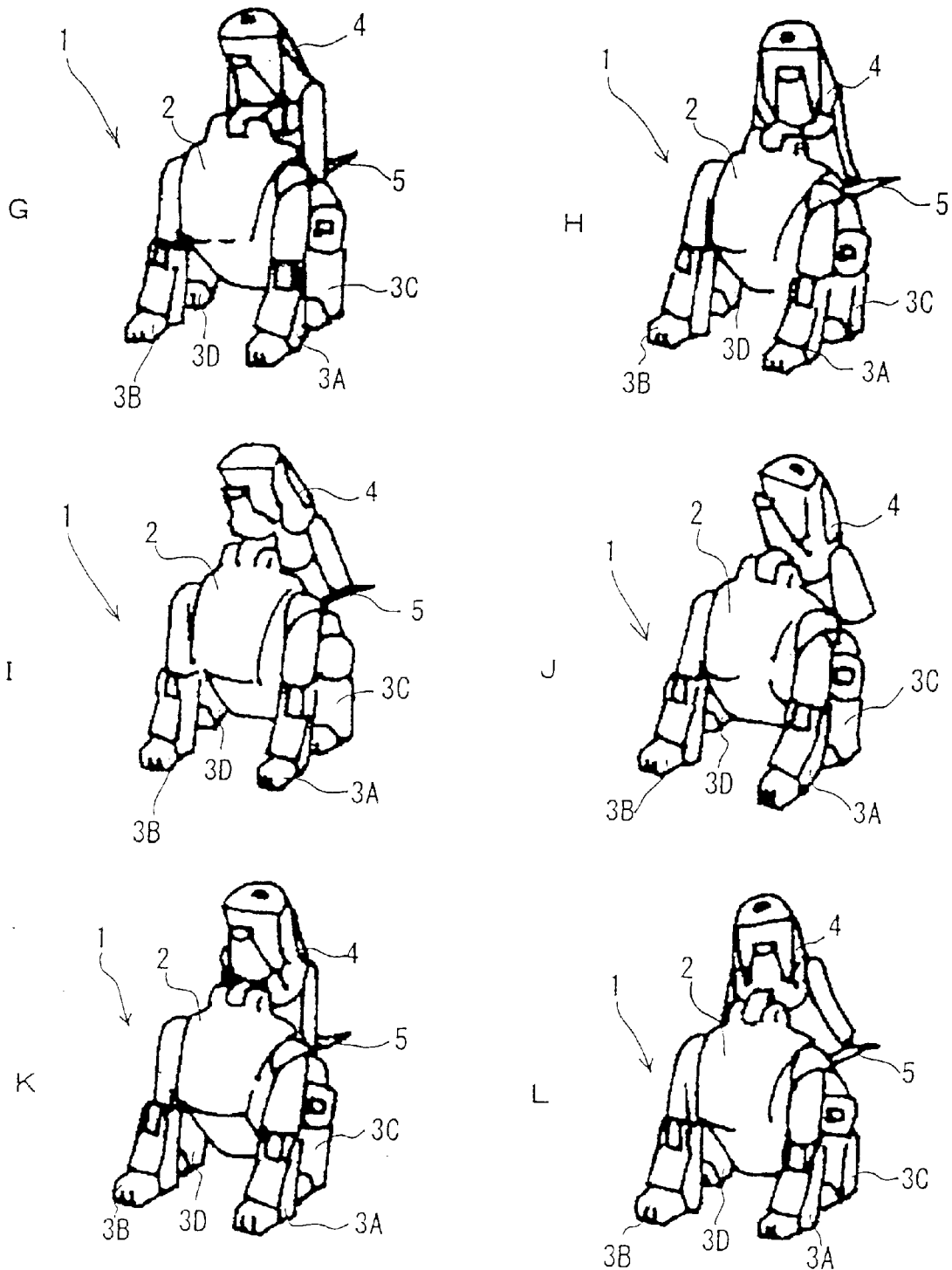
FIG. 104 is a schematic diagram illustrating the pet robot motion.
Figure 105:
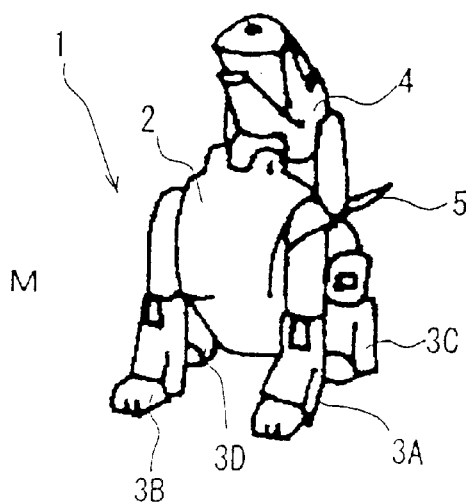
FIG. 105 is a schematic diagram illustrating the pet robot motion.
Figure 105:
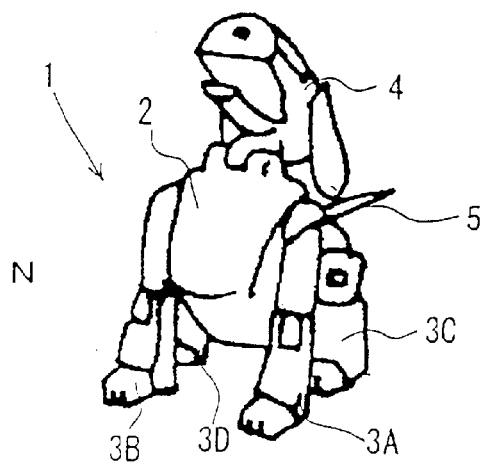
Figure 105:
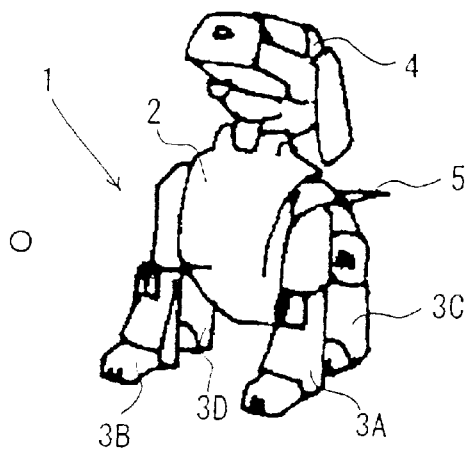
Figure 105:
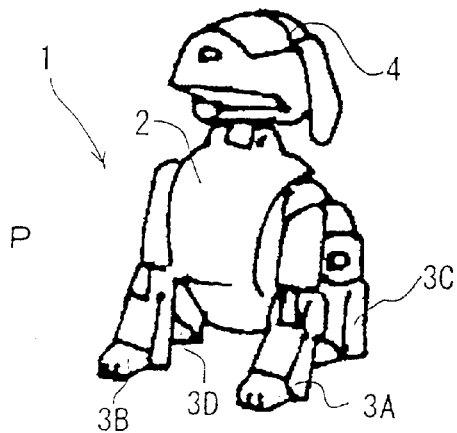
Figure 105:
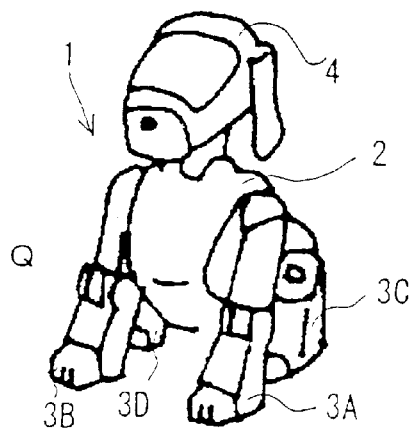
Figure 106:
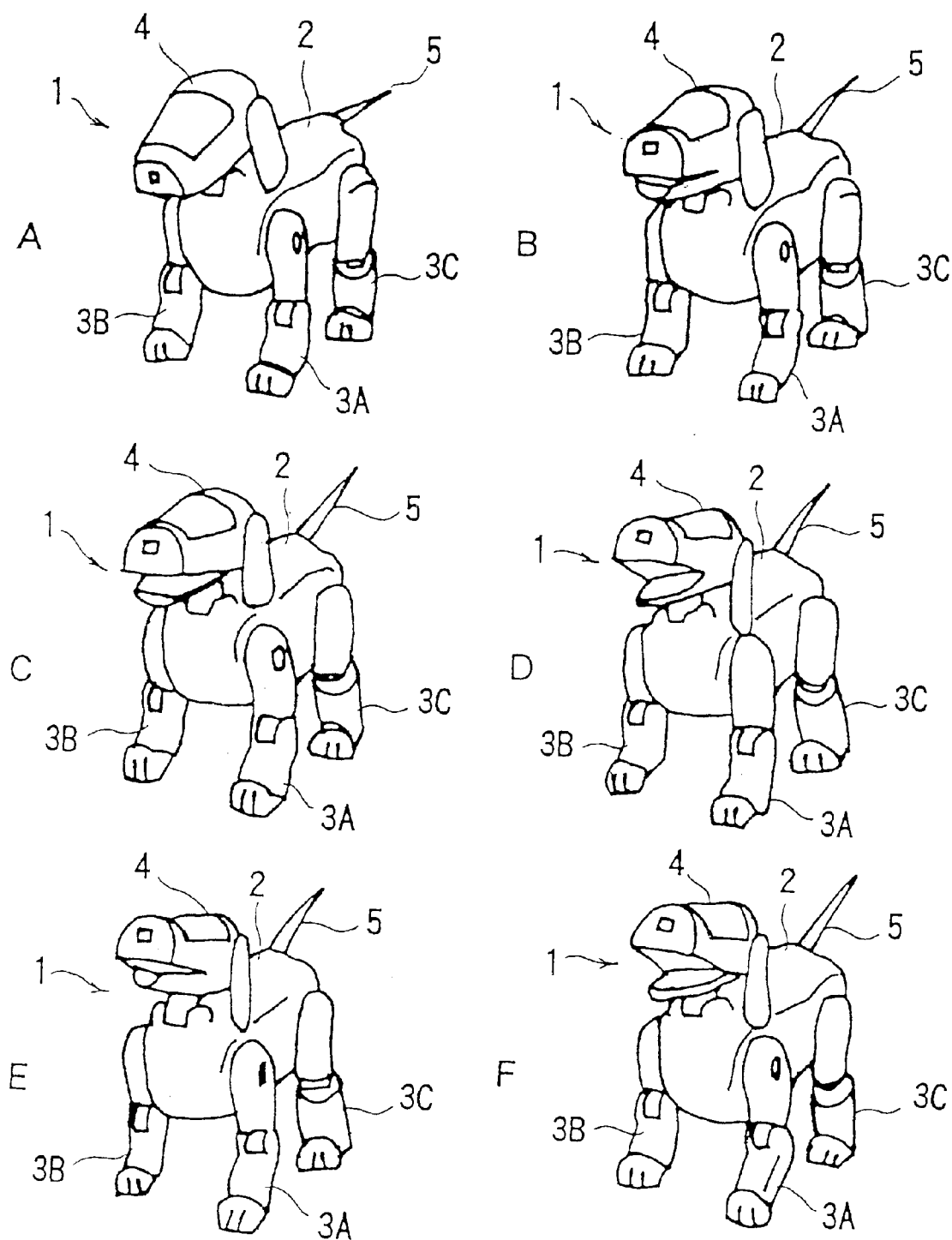
FIG. 106 is a schematic diagram illustrating the pet robot motion.
Figure 107:
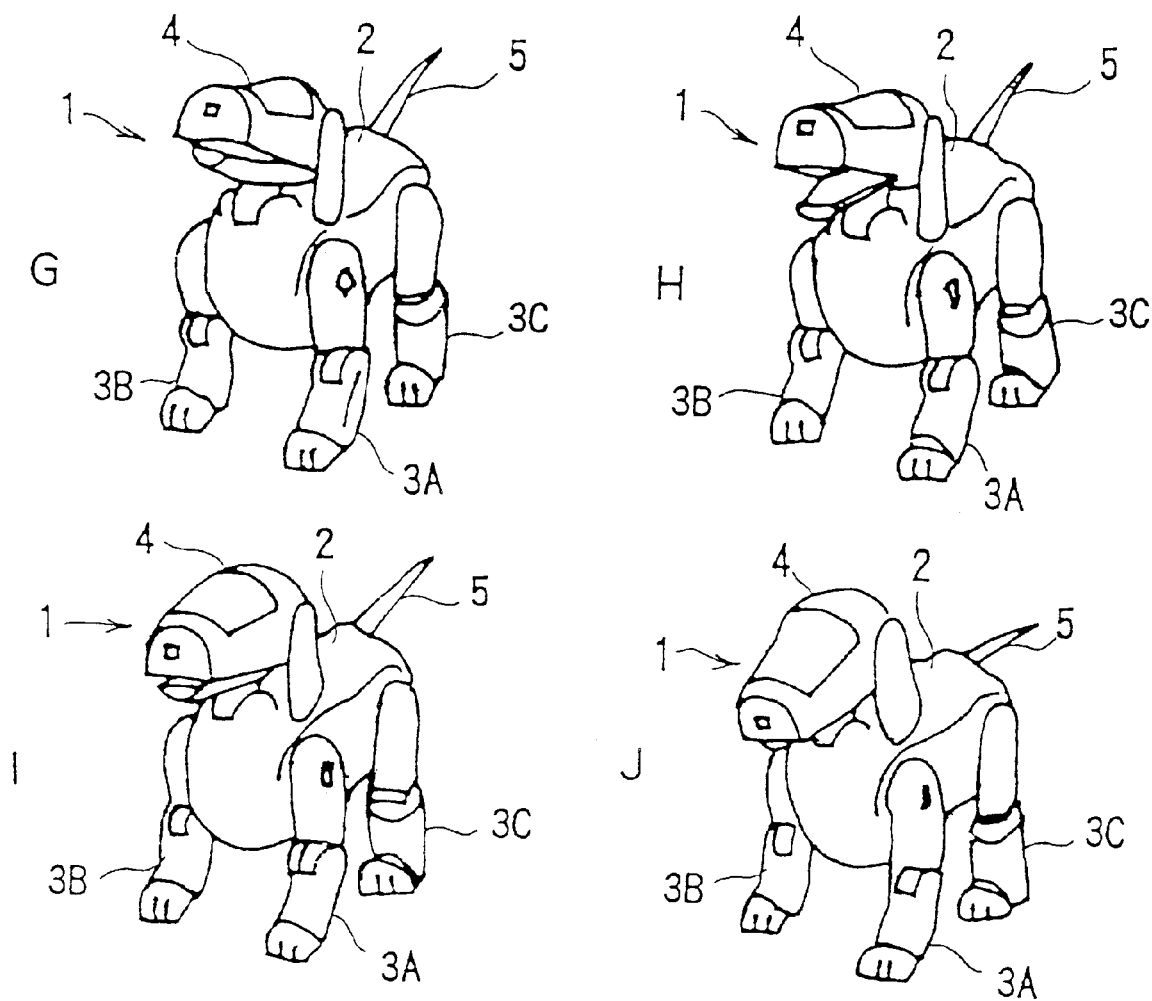
FIG. 107 is a schematic diagram illustrating the pet robot motion.

When the pet robot 1 is in a basic down position as shown in FIG. 88A, it lifts the right and left forelegs 3B and 3A as shown in FIGS. 88B through 88D so that the thighs 3BX and 3AX nearly level and turns the head 4 to the right (or left) to direct it to the right (or left). Here the pet robot 1 bends the knee 3BY to the extent that the contact surface of the right foreleg 3B faces forward and bends the knee 3AY in the left foreleg 3A more sharply than the knee 3BY.

Then the pet robot 1 turns the left foreleg 3A (or the right foreleg 3B) as it is from side to side a plurality of times as if to swing the leg, as shown in FIGS. 88E through 90A. After this action is completed, the pet robot 1 performs the reverse of the actions in FIGS. 88A through 88D as shown in FIGS. 90B through 90D to return to the original down position. This ends the motion.

Such a motion can produce a feeling that the pet robot 1 shows a dislike, thus giving the user a lifelike impression.

(3-5-4) Other Emotion Expression Motions

FIGS. 91A through 93A, 94A through 96A, 97A through 98E, 99A through 99C, 100A through 102A, 103A through 105E, and 106A through 107D show the flow of other emotion expression motions, that is, fourth, fifth, sixth, seventh, eighth, ninth, and tenth emotion expression motions, respectively.

(3-6) Idleness Motions

Next, motions will be described below which the pet robot 1 produces when the condition recognizing mechanism 30 (FIG. 3) in the controller 10 (FIG. 2) does not provide a specific recognition result (these motions are hereinafter called idleness motions).

(3-6-1) First Idleness Motion

A first idleness motion will be described below. The pet robot 1 produces the first idleness motion when it is in a basic down position as shown in FIG. 108A.

Figure 108:
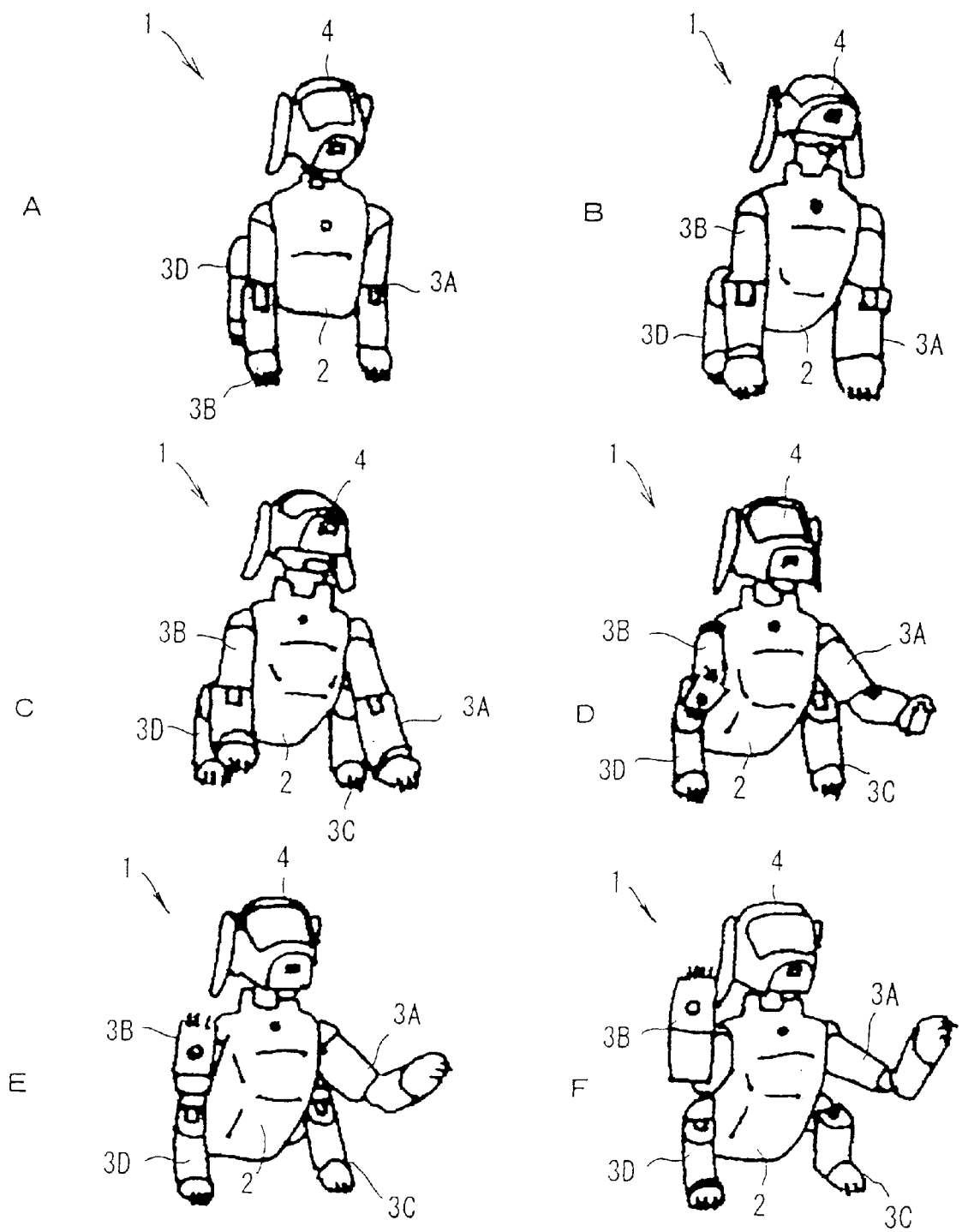
FIG. 108 is a schematic diagram illustrating the pet robot motion.
Figure 109:
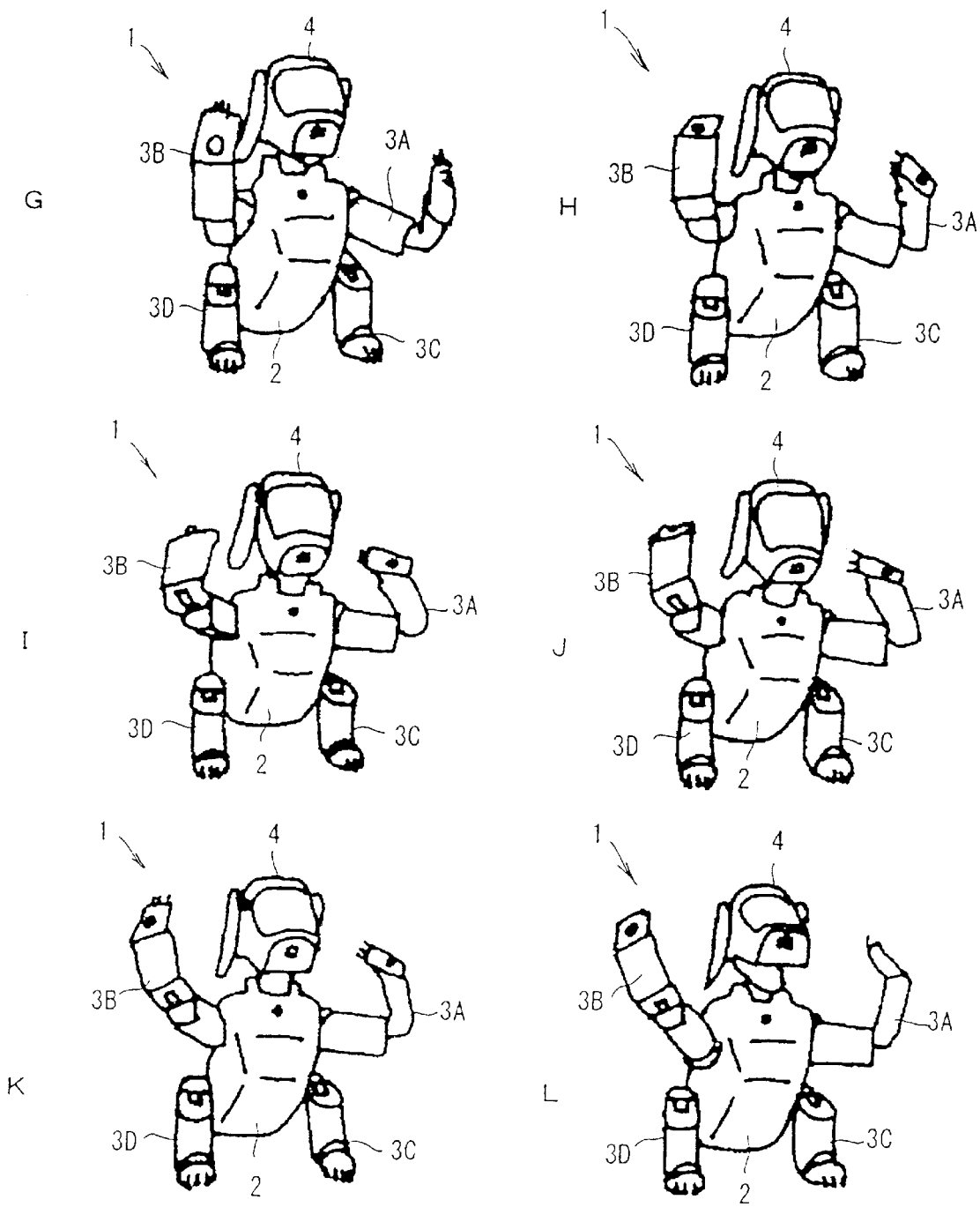
FIG. 109 is a schematic diagram illustrating the pet robot motion.
Figure 110:
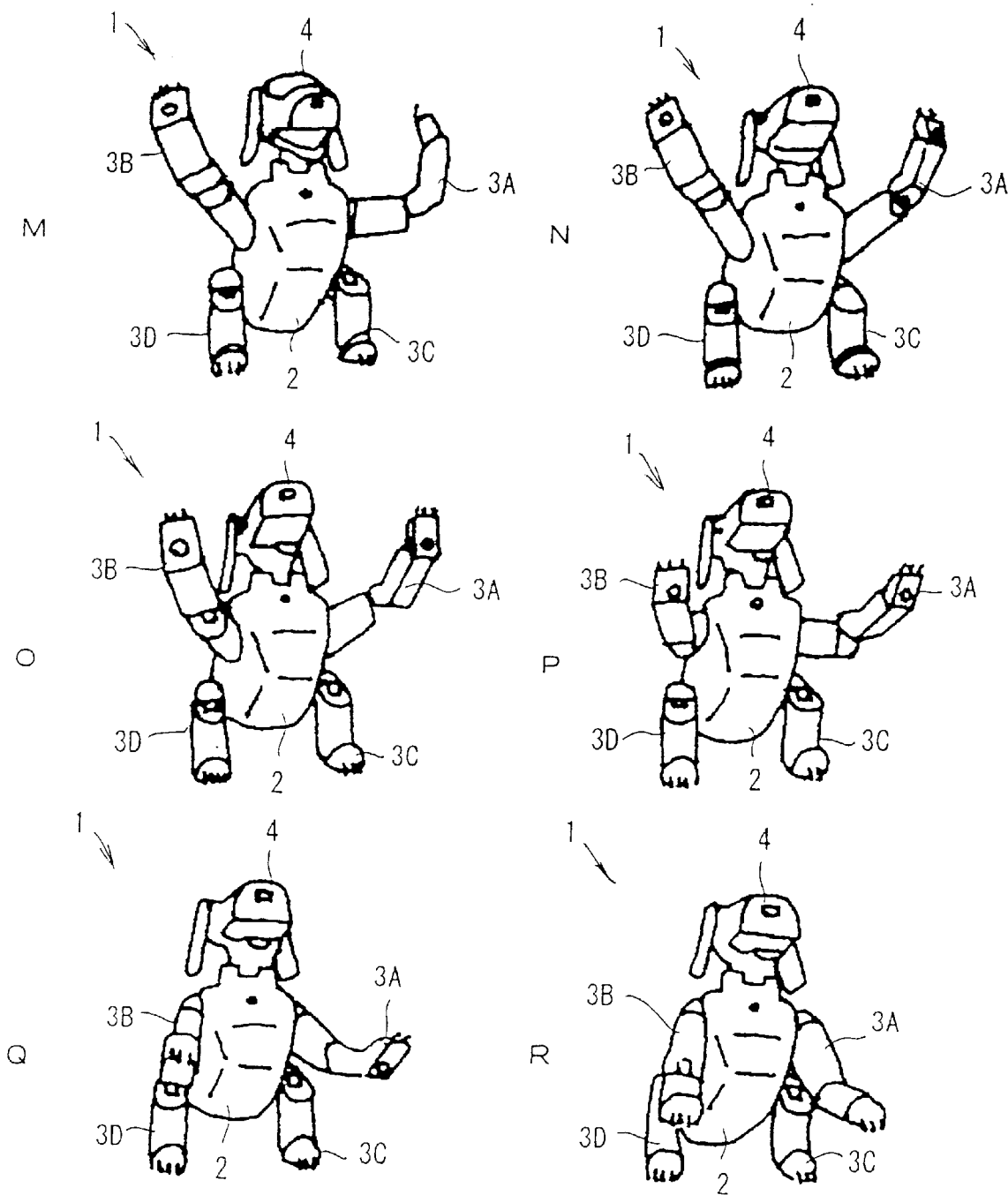
FIG. 110 is a schematic diagram illustrating the pet robot motion.
Figure 111:
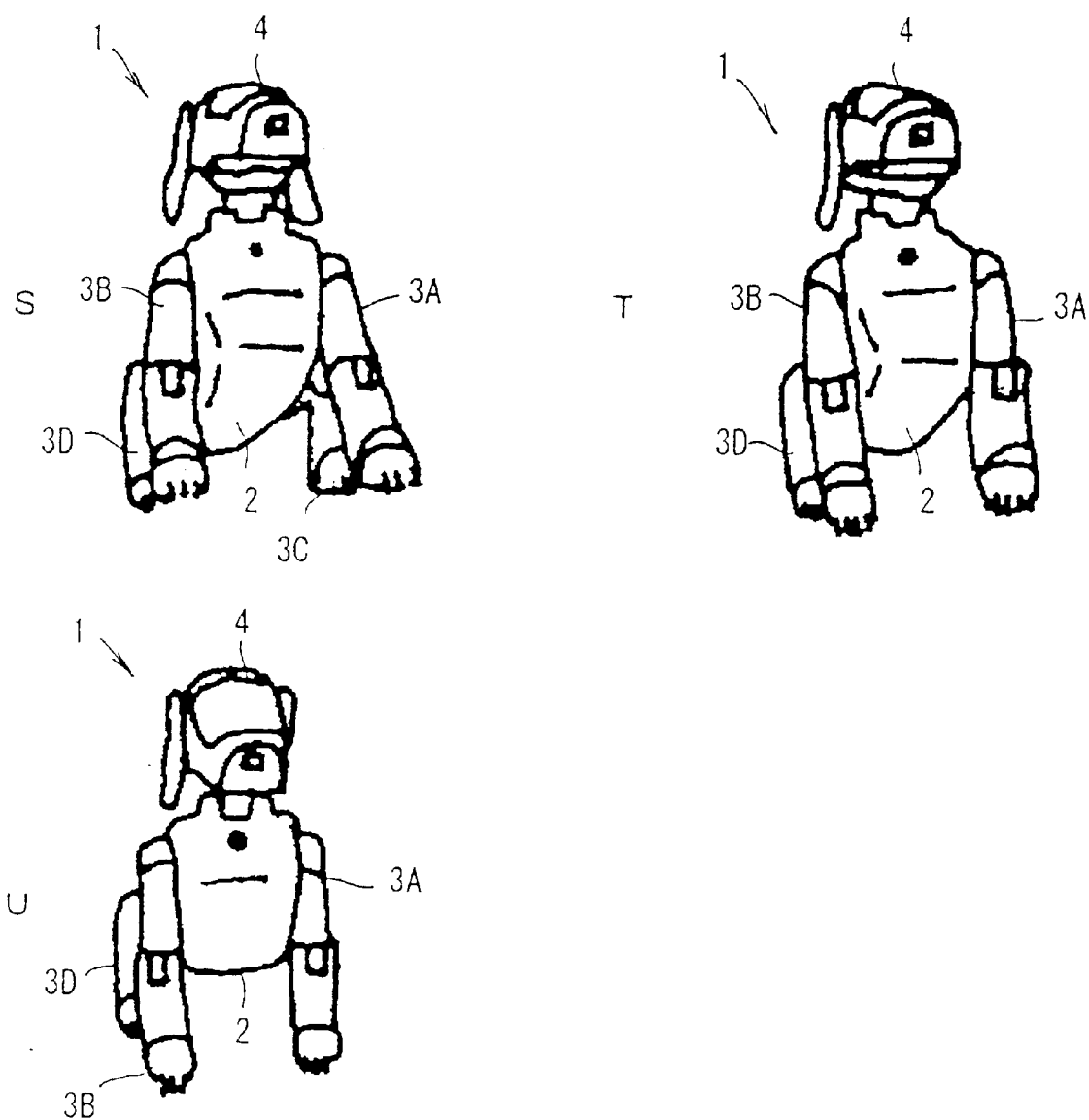
FIG. 111 is a schematic diagram illustrating the pet robot motion.

When the pet robot 1 is in the basic down position as shown in FIG. 108A, it slowly lifts the right and left forelegs 3B and 3A, while opening them apart outside, as shown in FIGS. 108B through 109C. In parallel, the pet robot 1 bends the right foreleg 3B and shank 3AY in the left foreleg 3A backward. Here the pet robot 1 is supported by the rear end of the stomach of the body 2 and right and left hind legs 3D and 3C.

After lifting the thighs 3BX and 3AX in the right and left forelegs 3B and 3A until they nearly level, as shown in FIG.

109C, the pet robot 1 opens the mouth, while bending the head 4 backward, as shown in FIGS. 109D through 111B. In parallel, while straightening the right and left forelegs 3B and 3A and moving them back in such directions that the legs close together, the pet robot 1 turns the legs down.

Then when the right and left forelegs 3B and 3A come in contact with the floor as shown in FIG. 111C, the pet robot 1 directs the head 4 forward to return to the original down position. This ends the motion.

Such a motion can produce a feeling that the pet robot 1 yawns, stretching itself, thus giving the user a lifelike impression.

(3-6-2) Second Idleness Motion

Next, a second idleness motion will be described below. The pet robot 1 produces the second idleness motion when it slightly opens the right and left hind legs 3D and 3C outward and straightens them forward as shown in FIG. 112A.

Figure 112:
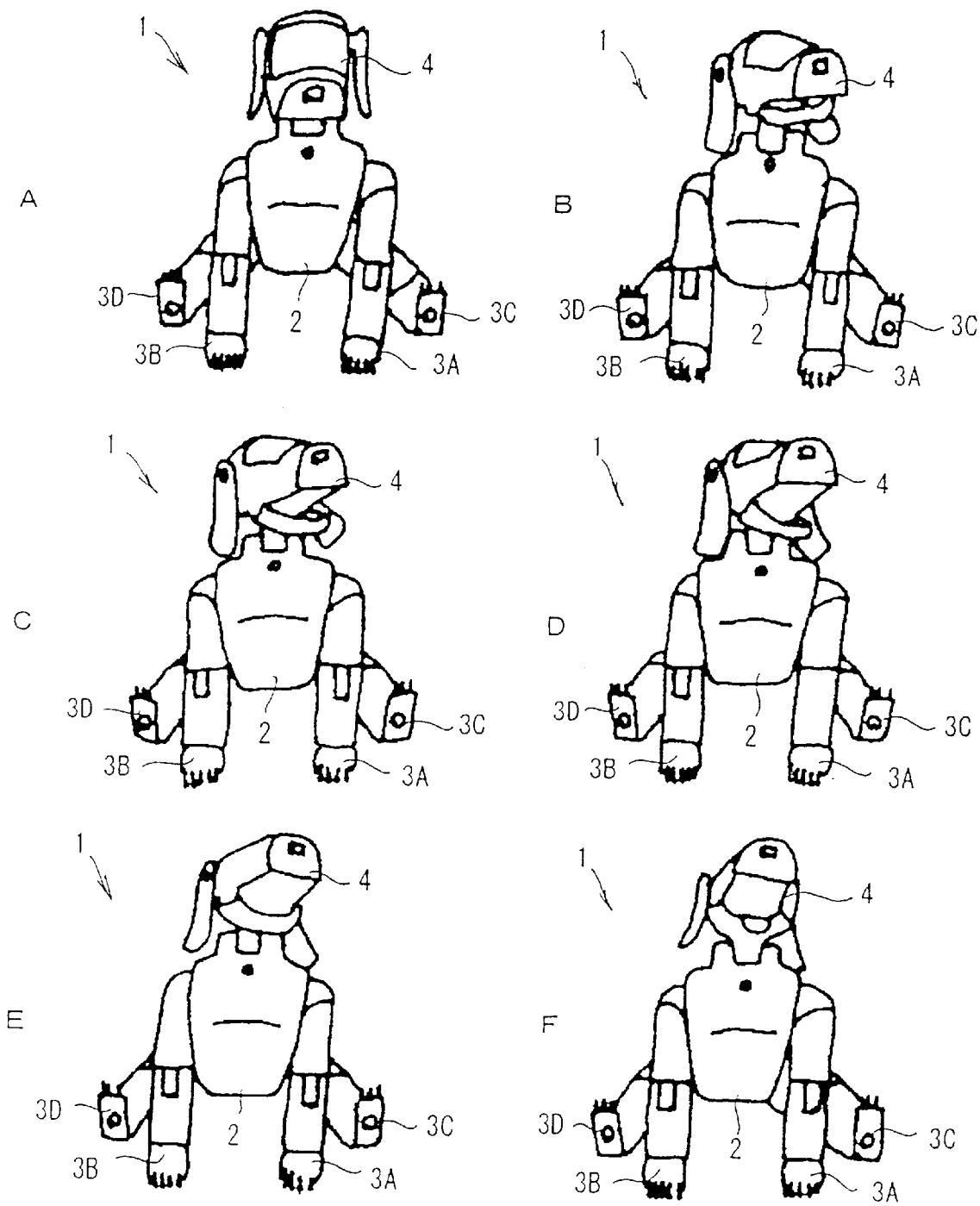
FIG. 112 is a schematic diagram illustrating the pet robot motion.
Figure 113:
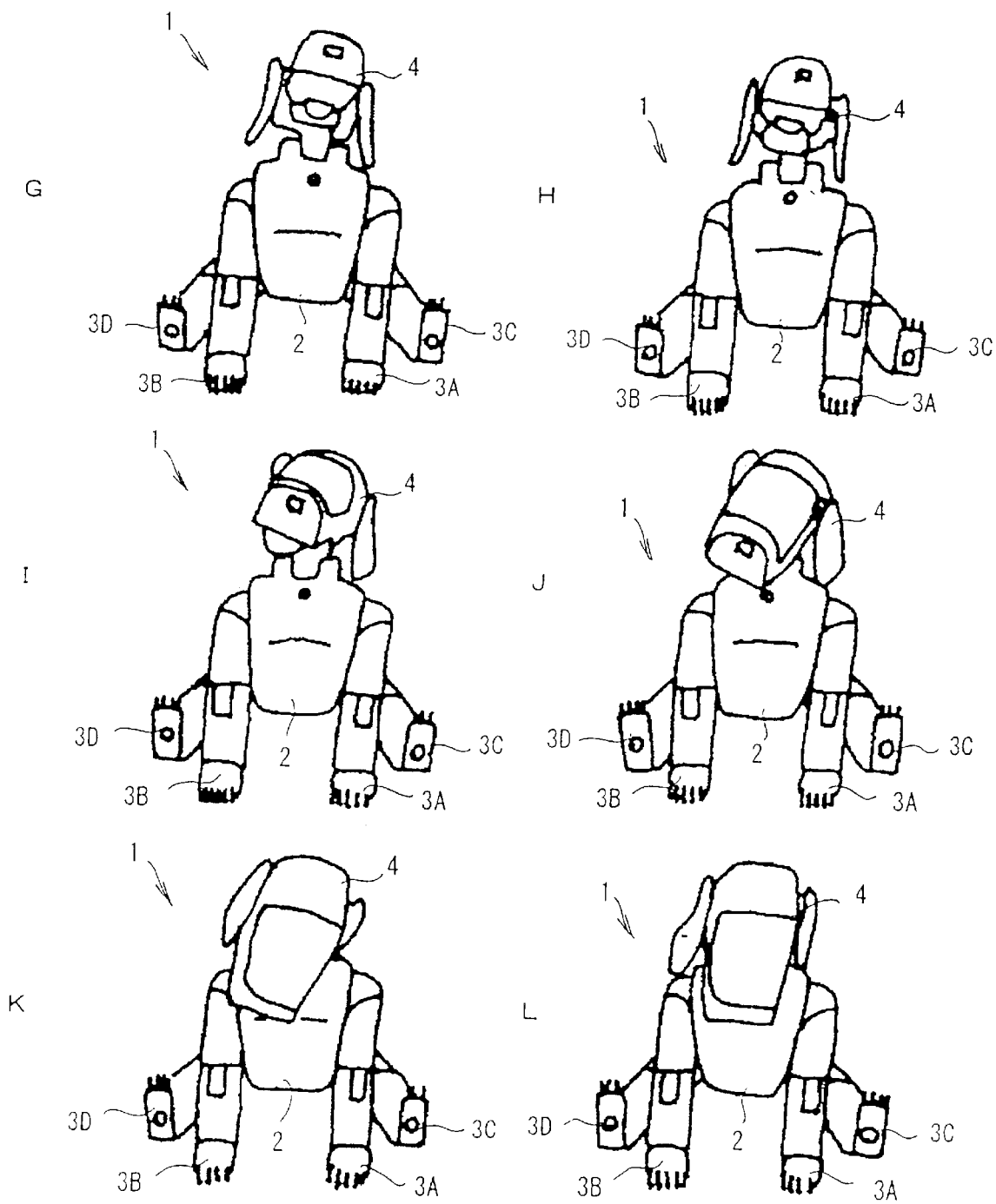
FIG. 113 is a schematic diagram illustrating the pet robot motion.
Figure 114:
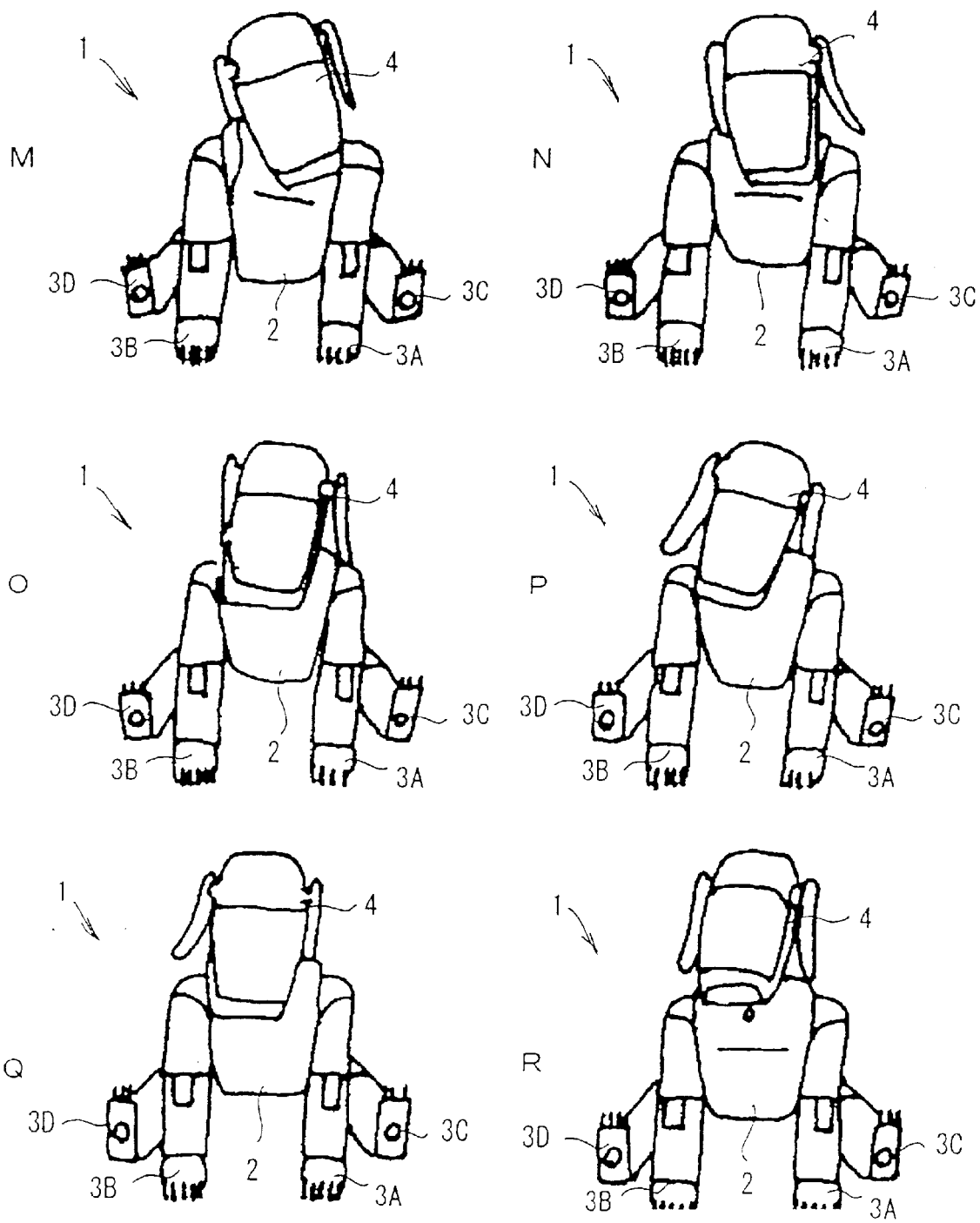
FIG. 114 is a schematic diagram illustrating the pet robot motion.
Figure 115:
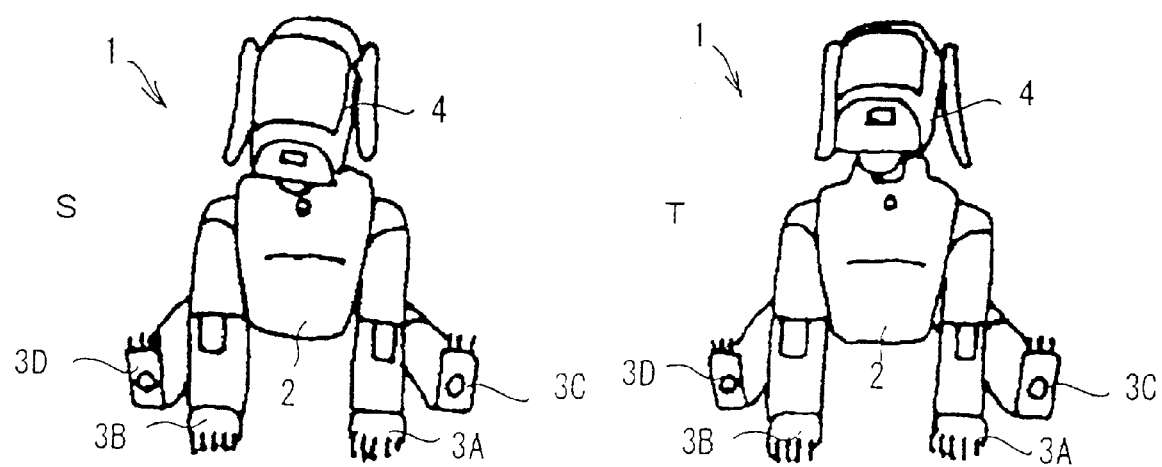
FIG. 115 is a schematic diagram illustrating the pet robot motion.
Figure 116:
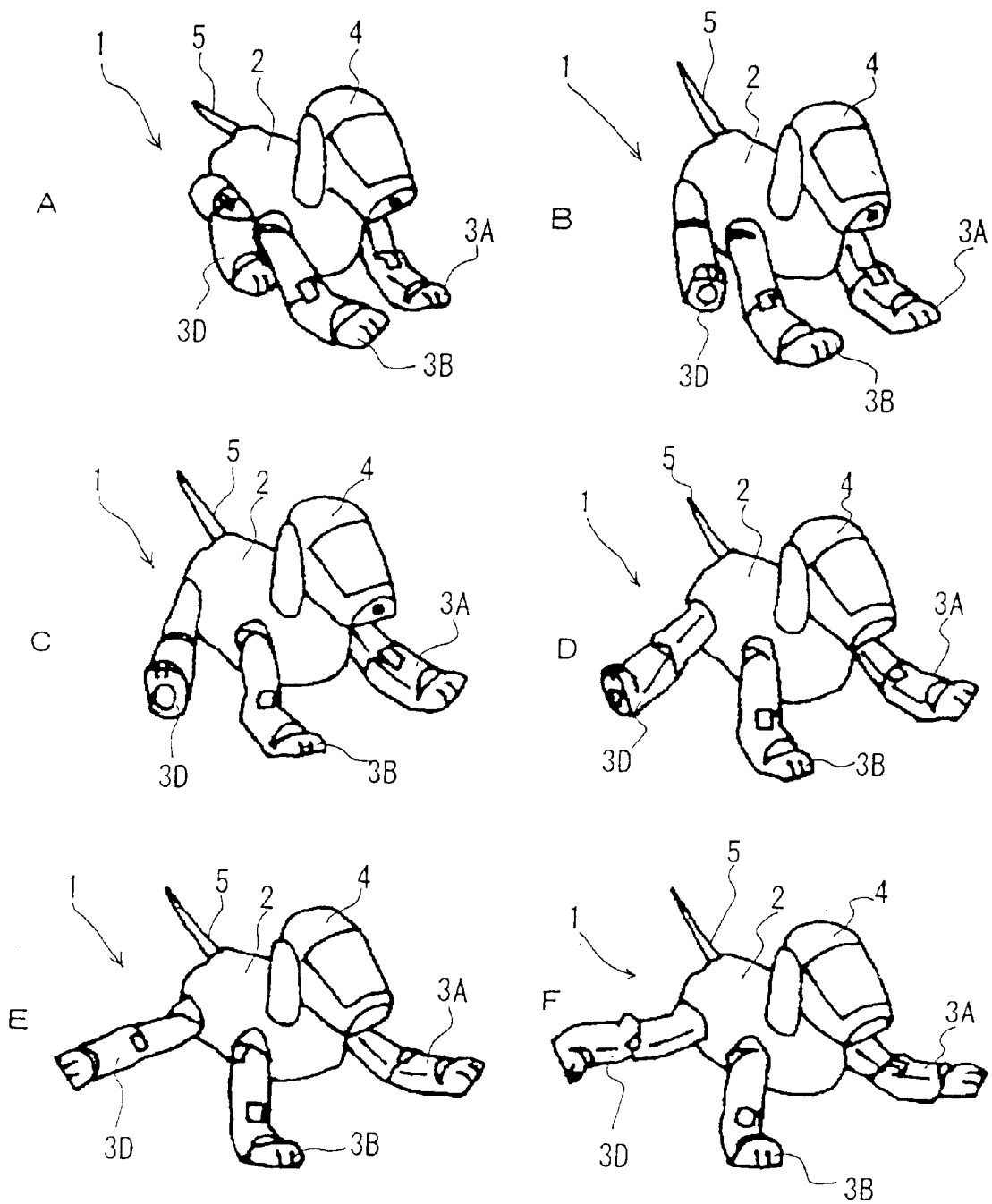
FIG. 116 is a schematic diagram illustrating the pet robot motion.
Figure 117:
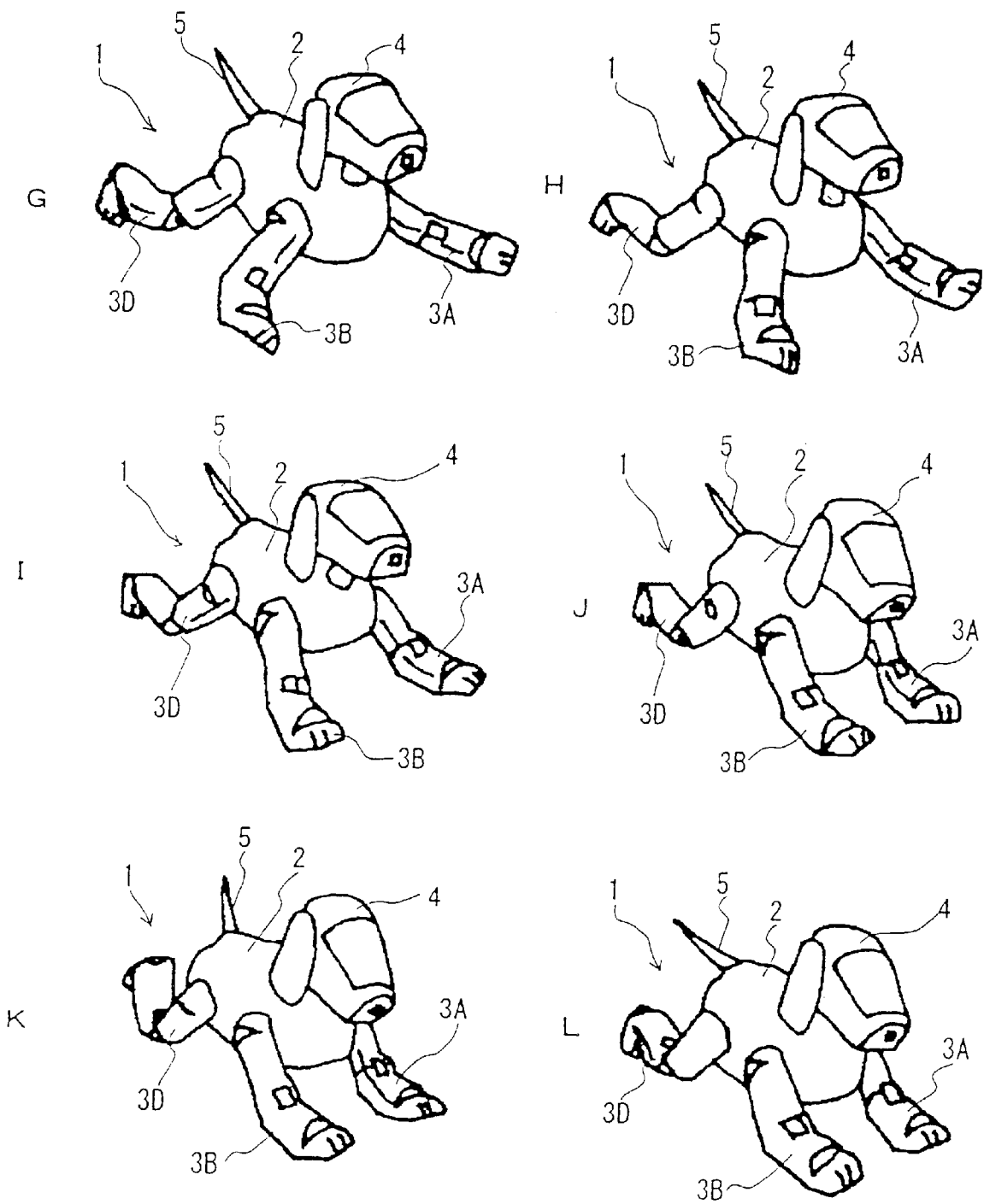
FIG. 117 is a schematic diagram illustrating the pet robot motion.
Figure 118:
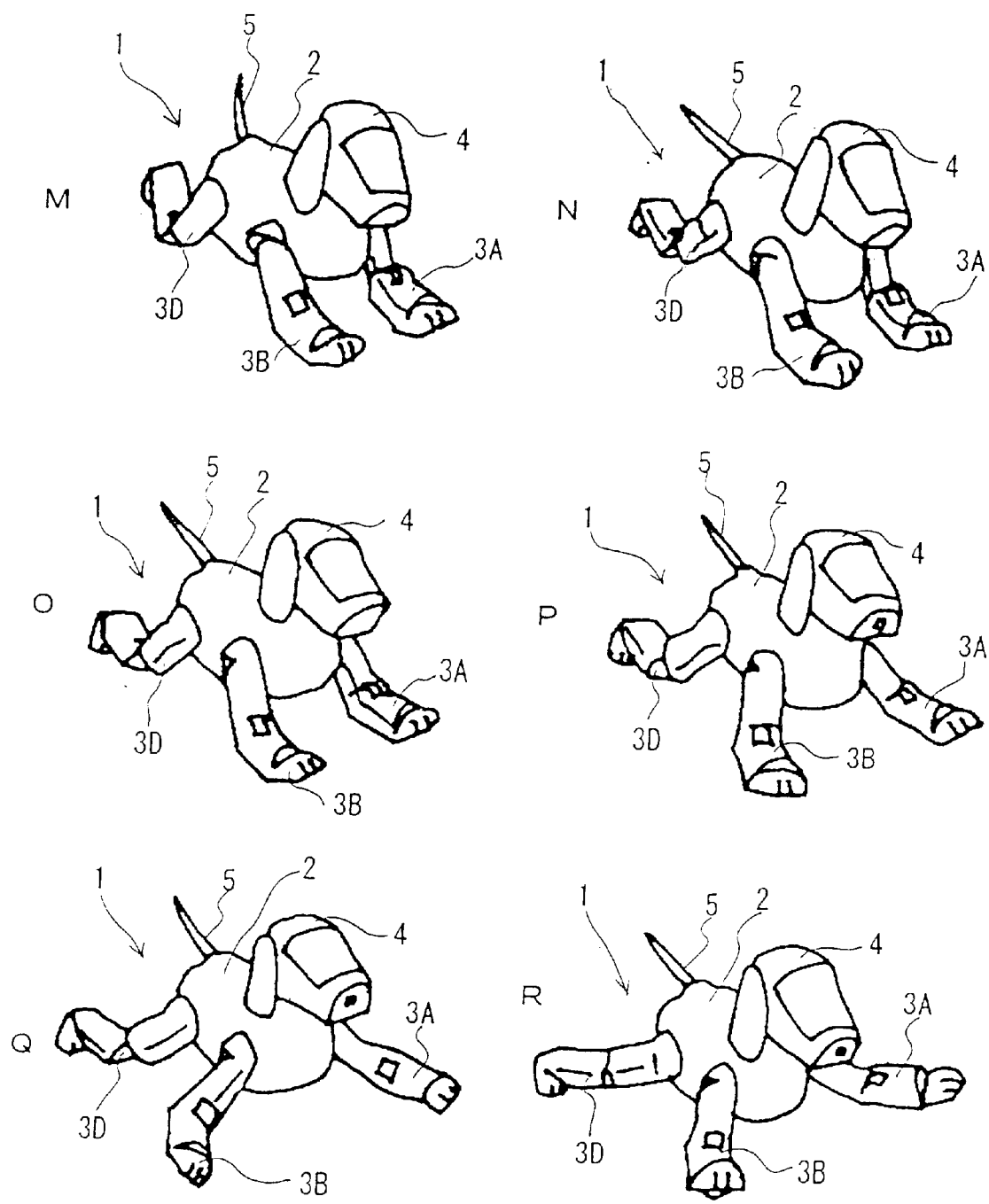
FIG. 118 is a schematic diagram illustrating the pet robot motion.
Figure 119:
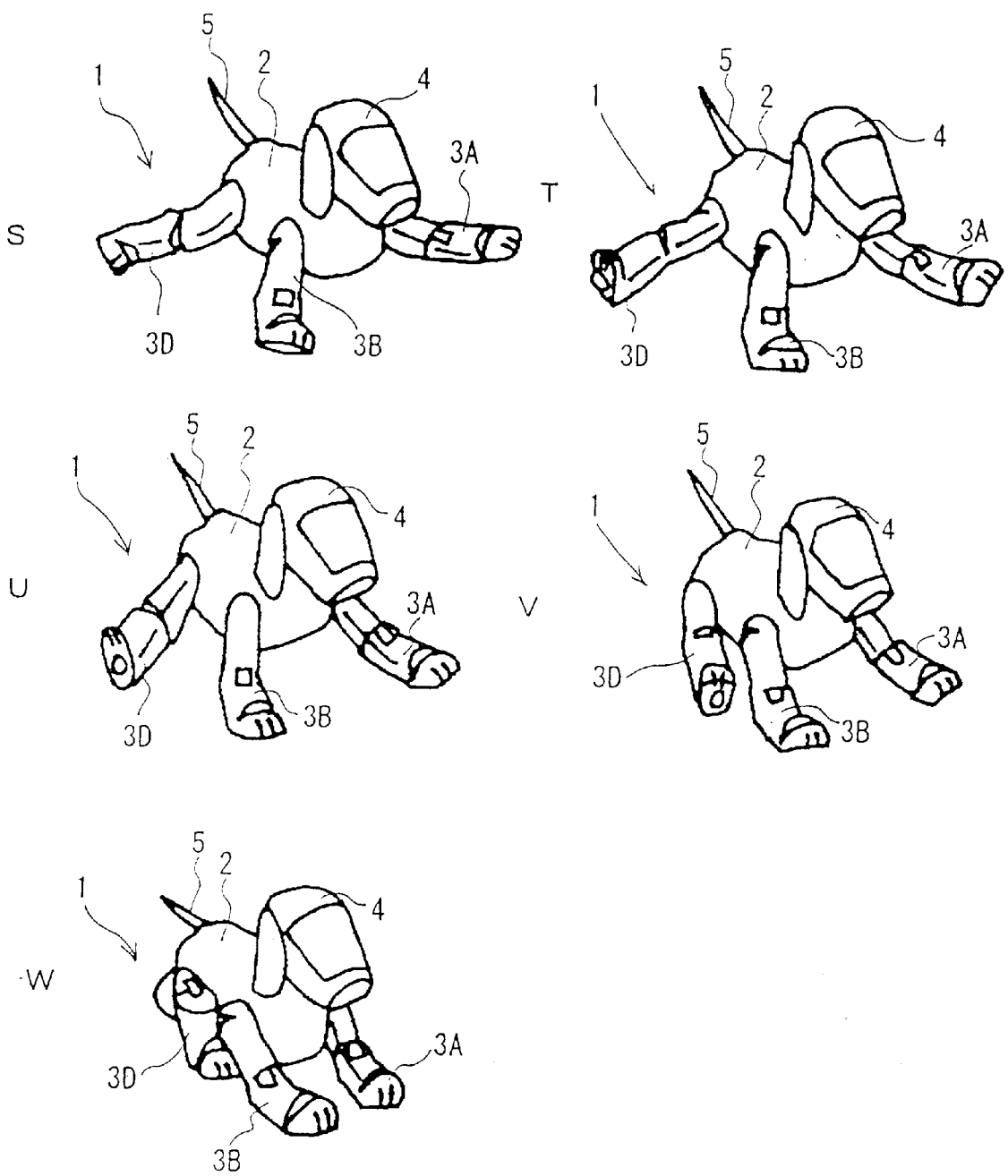
FIG. 119 is a schematic diagram illustrating the pet robot motion.
Figure 120:
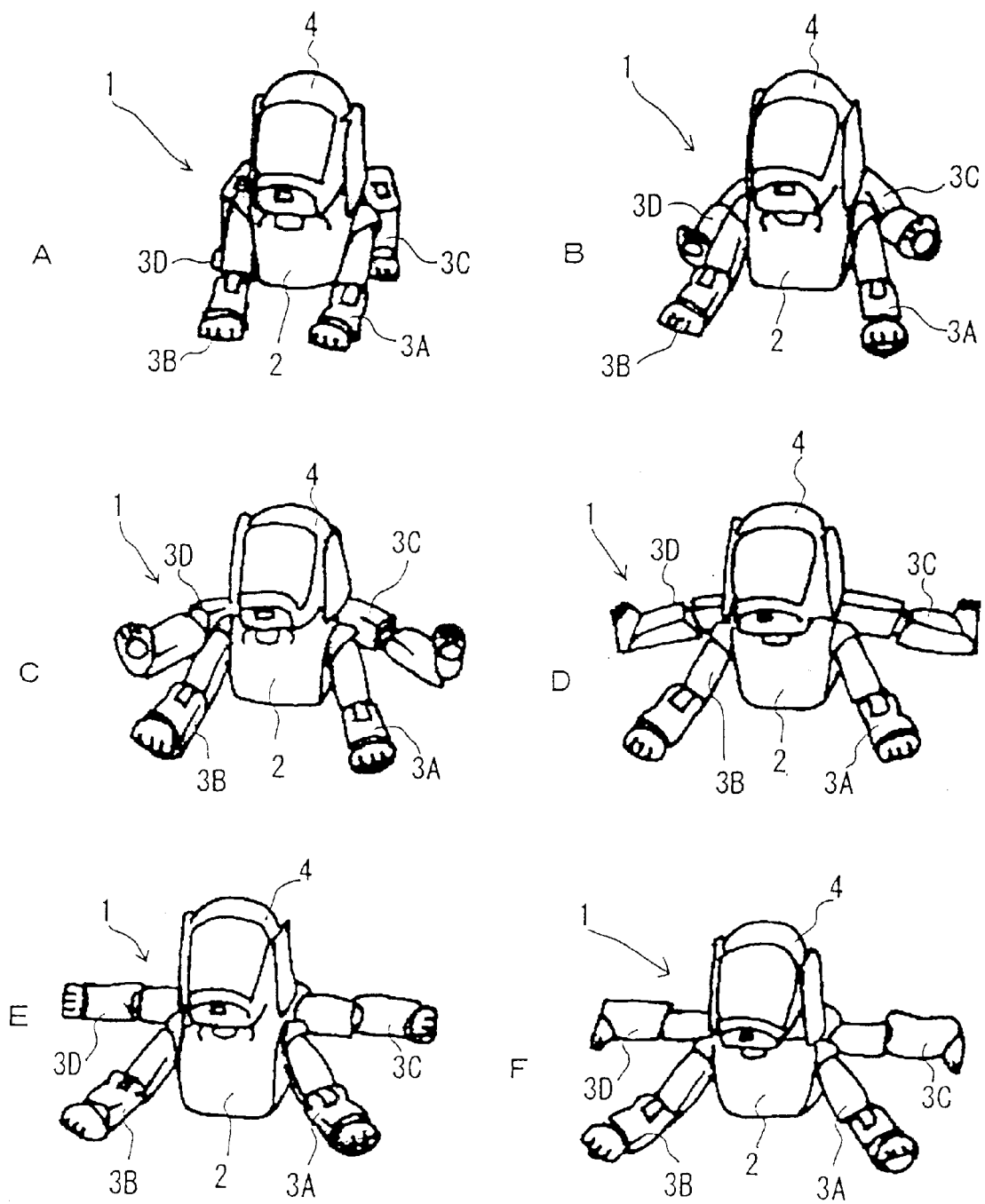
Figure 121:
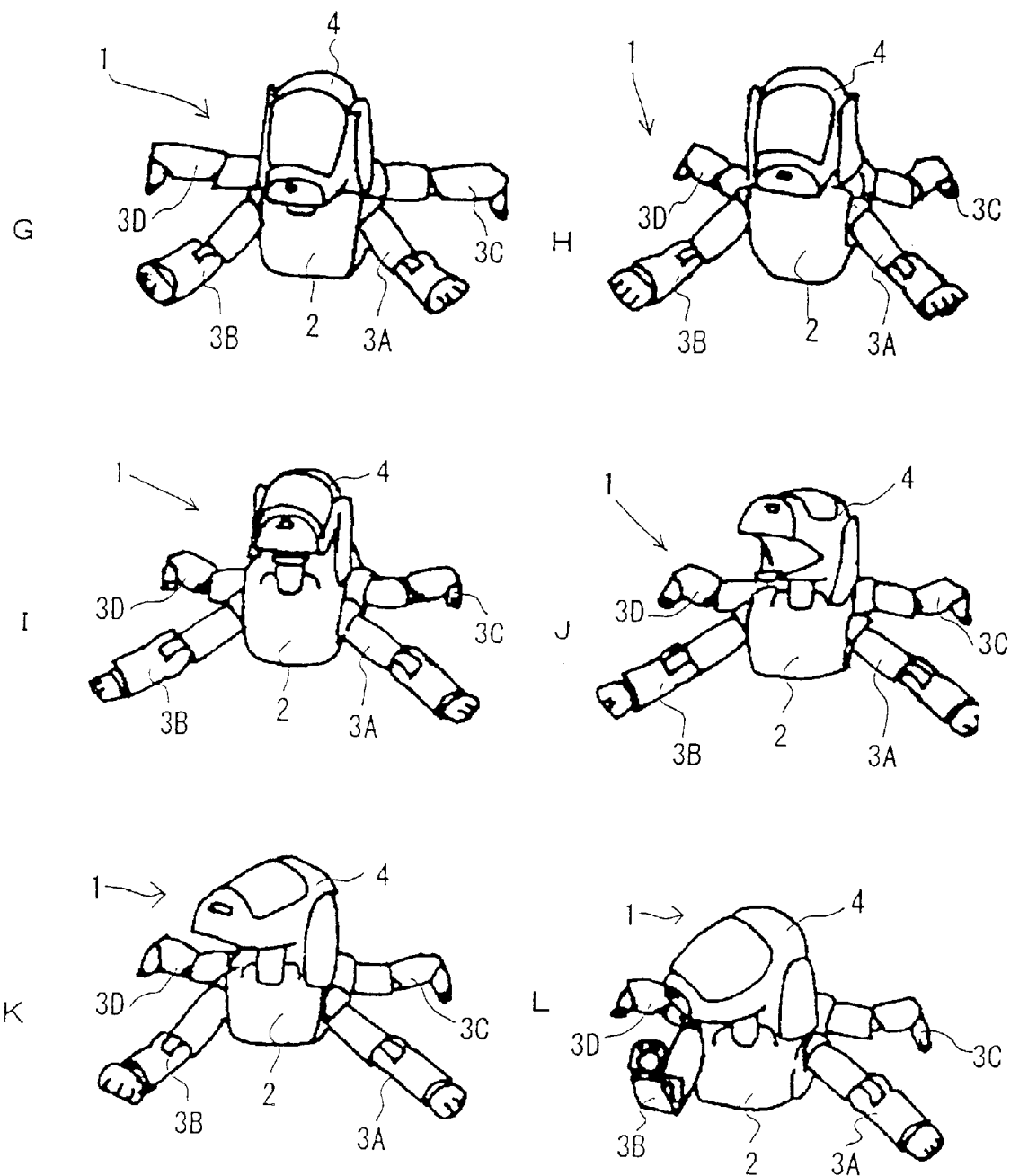
Figure 122:
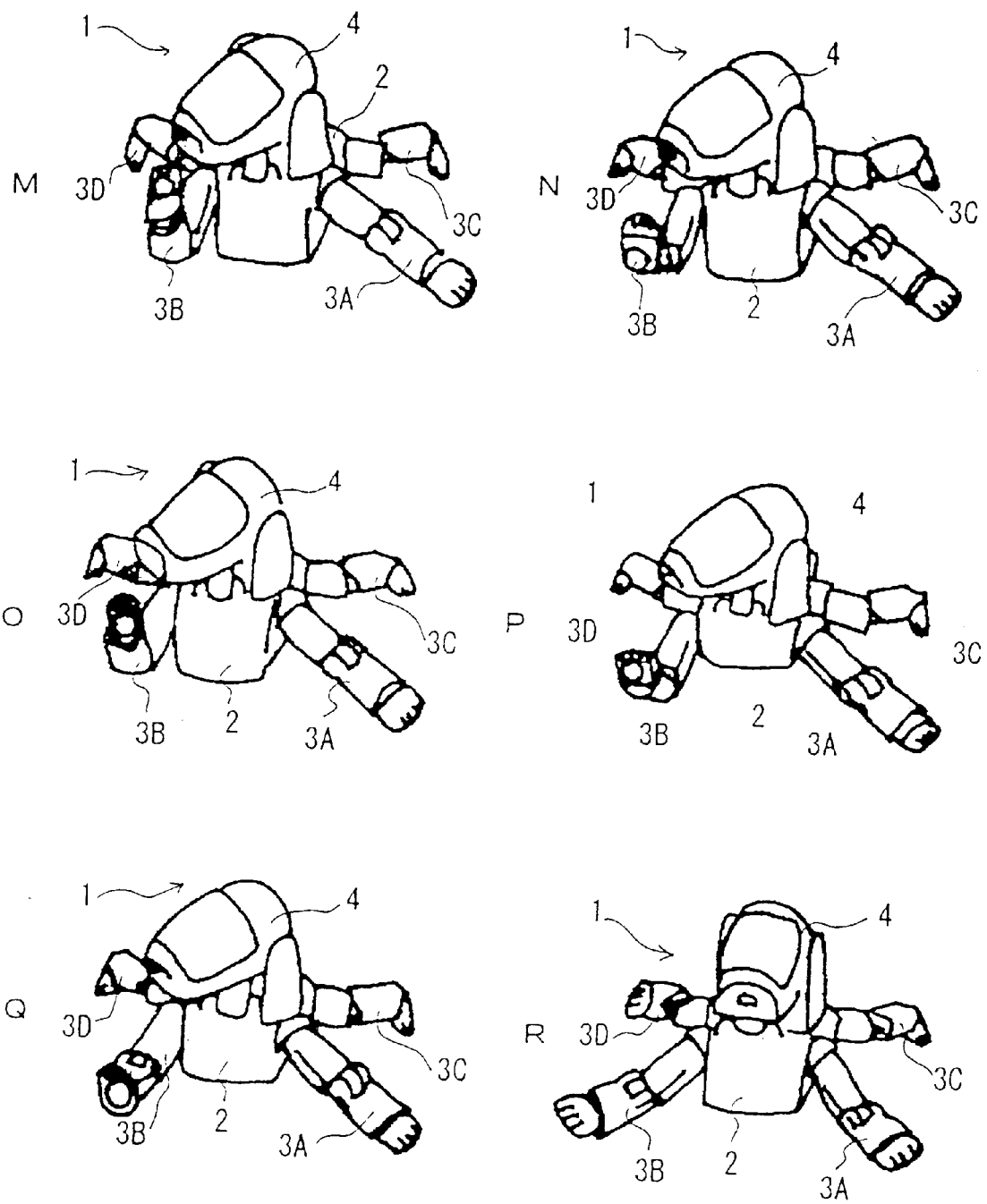
Figure 123:
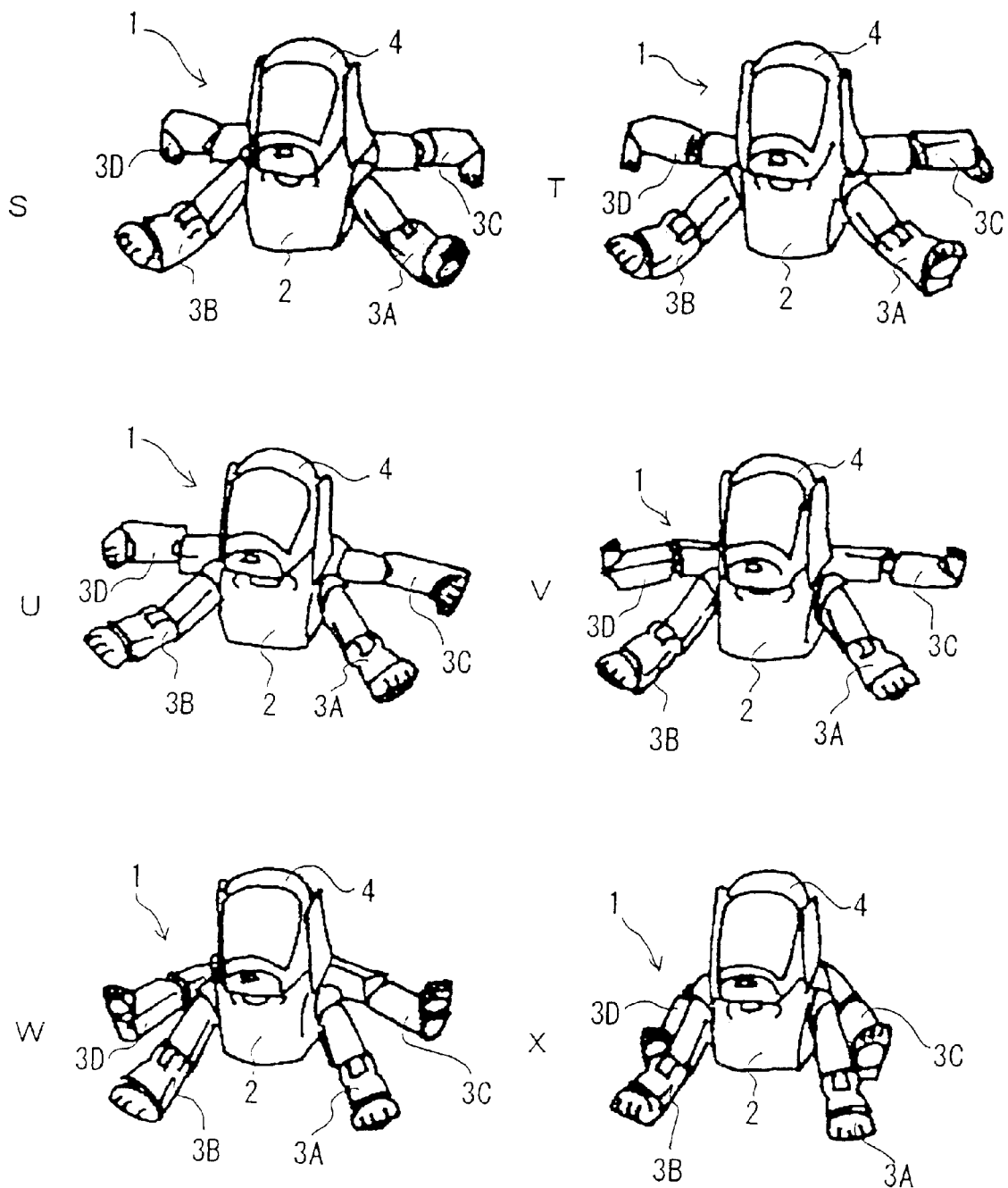
Figure 124:
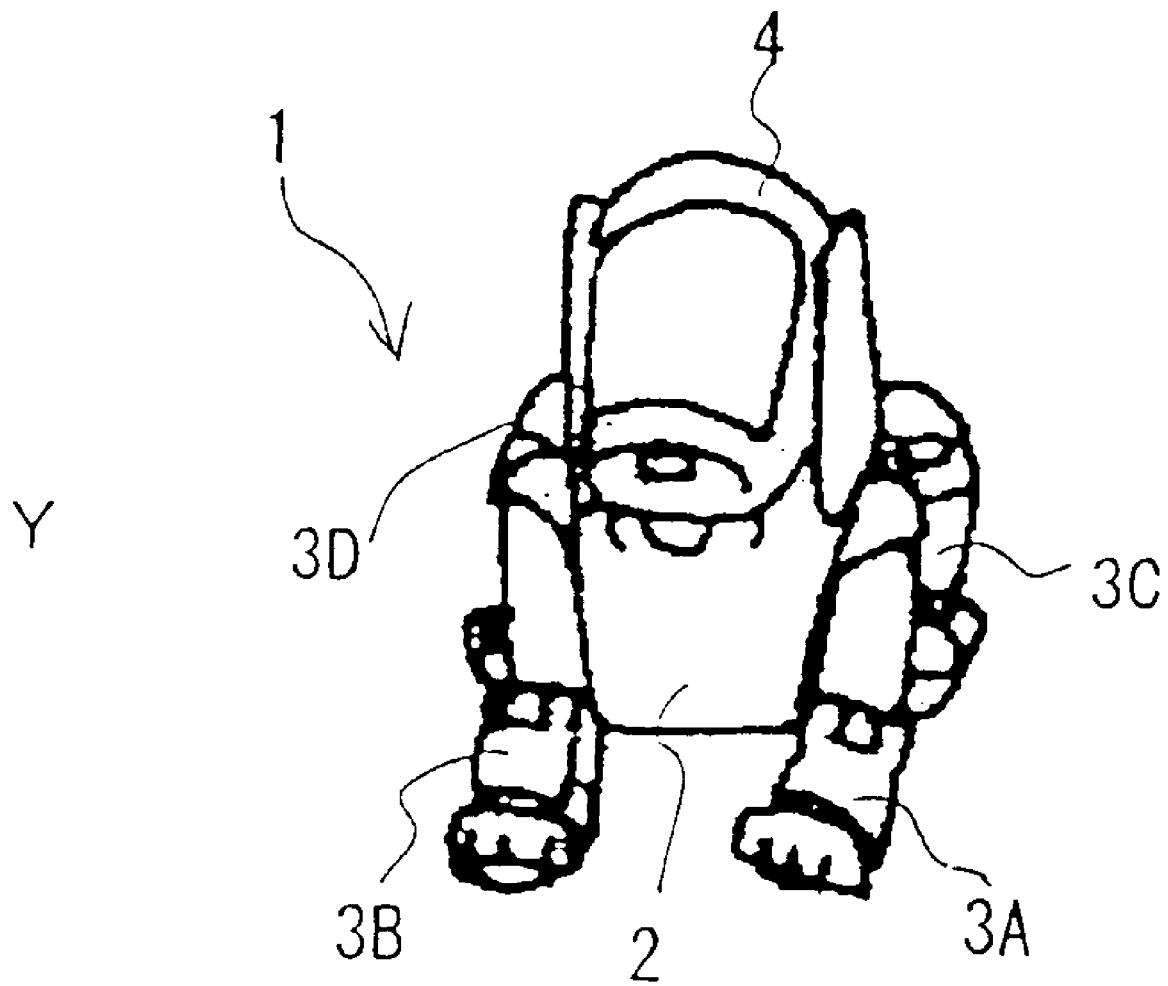
Figure 125:
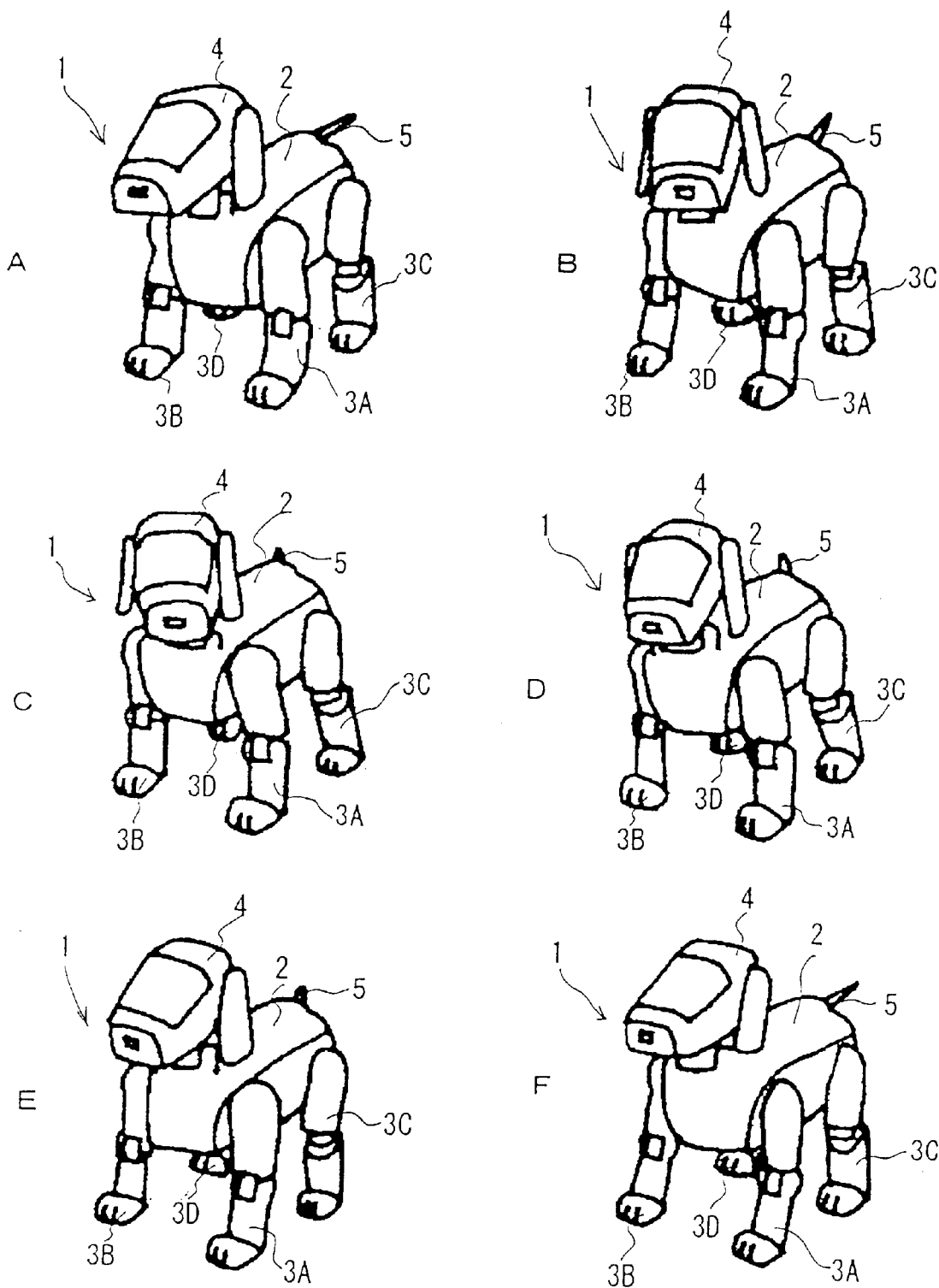
Figure 126:
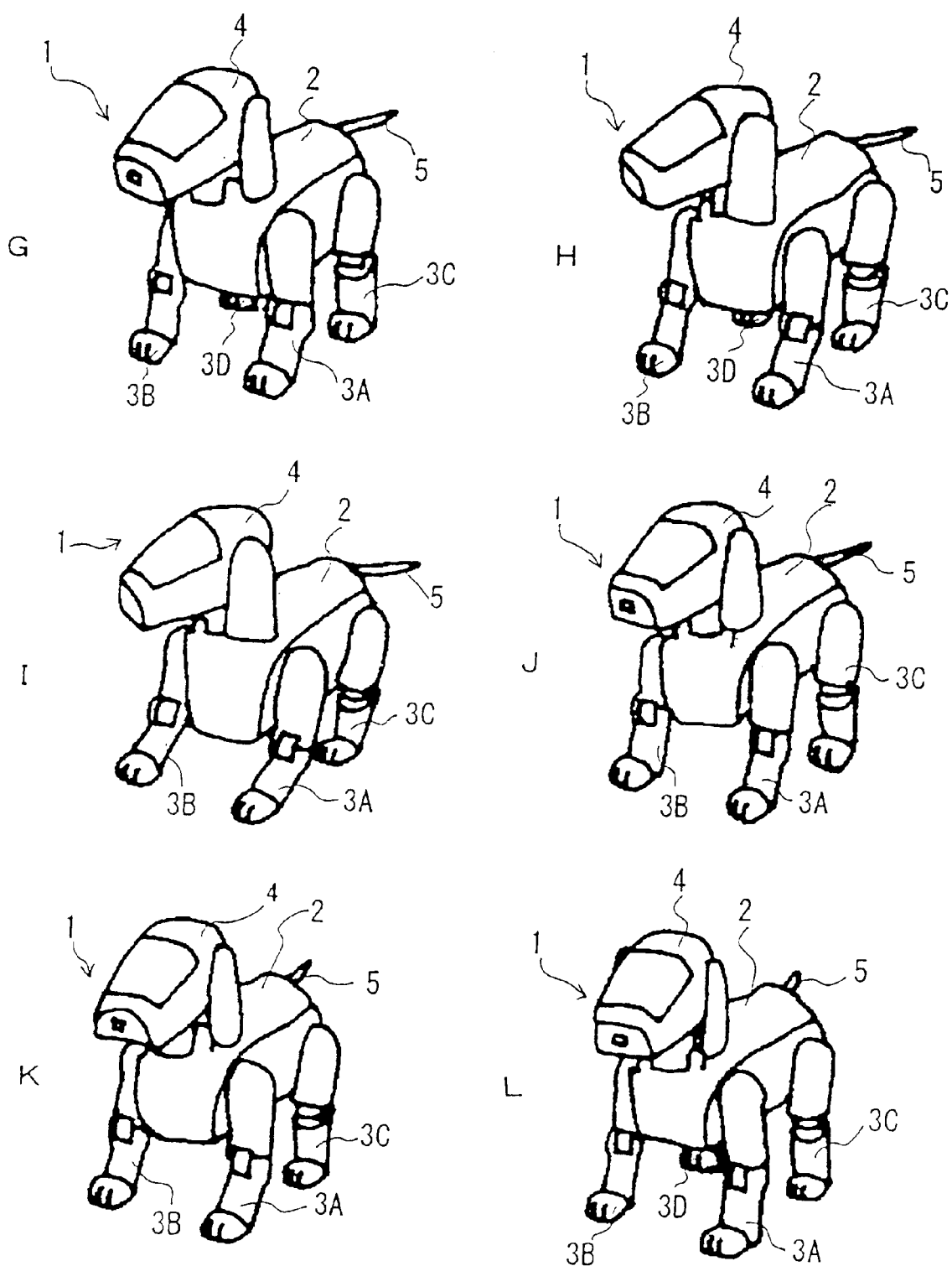
Figure 127:
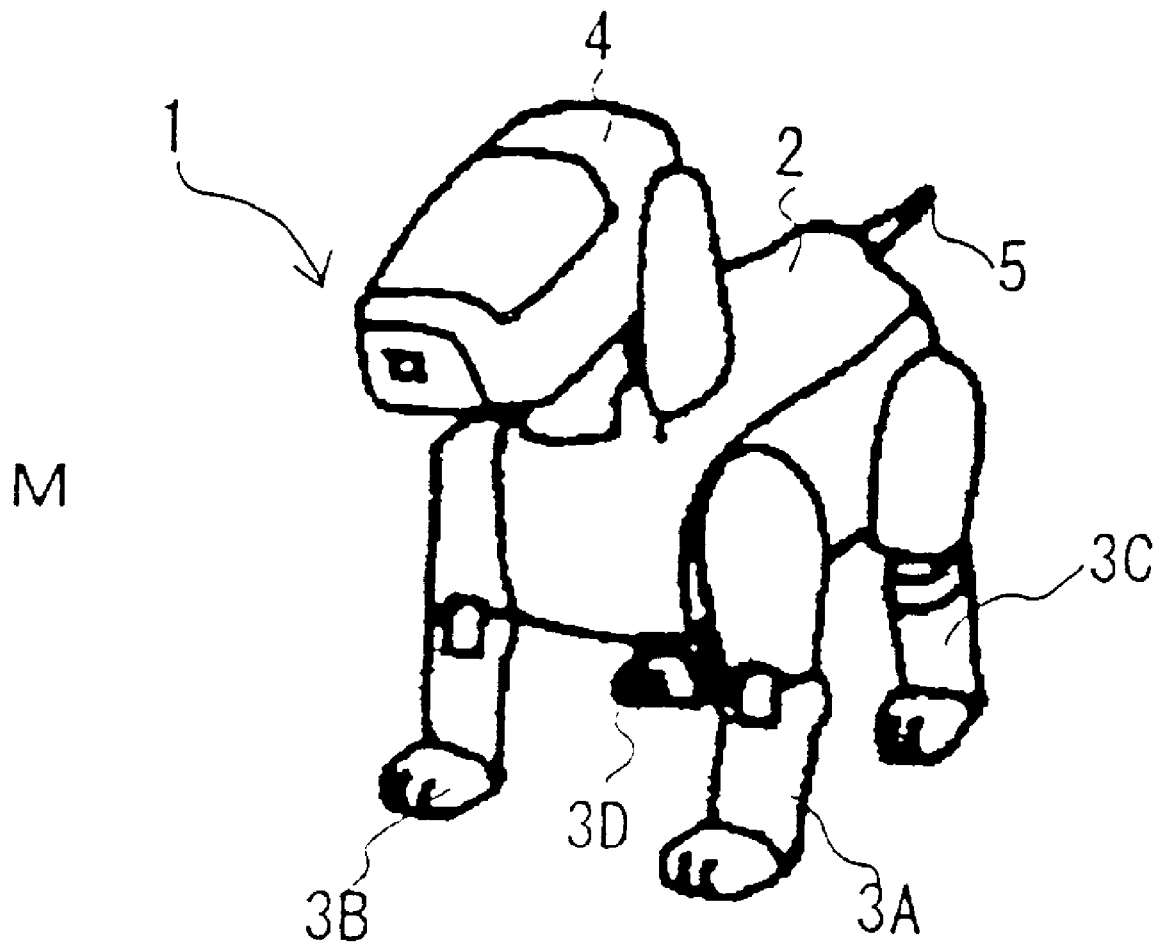
Figure 128:
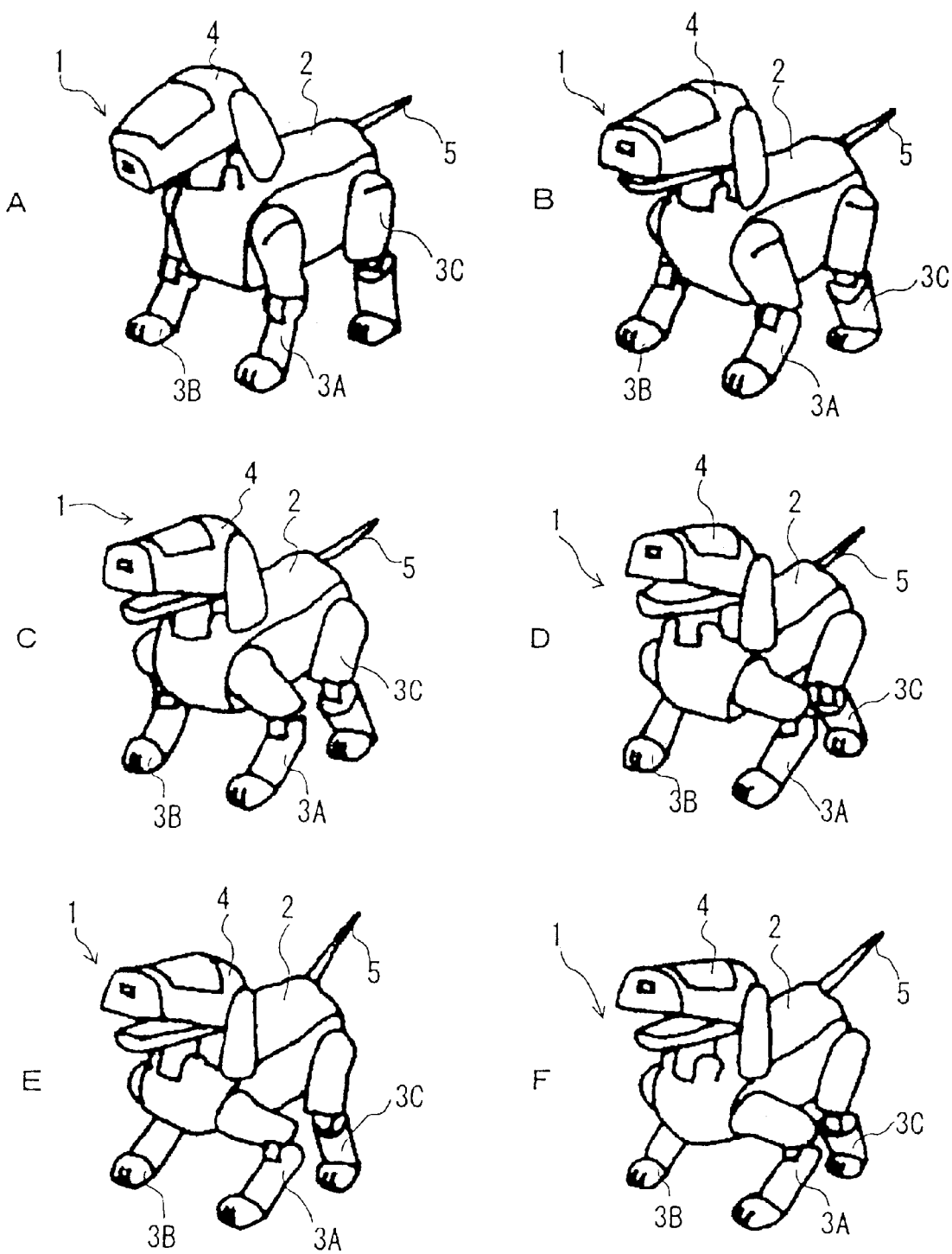
Figure 129:
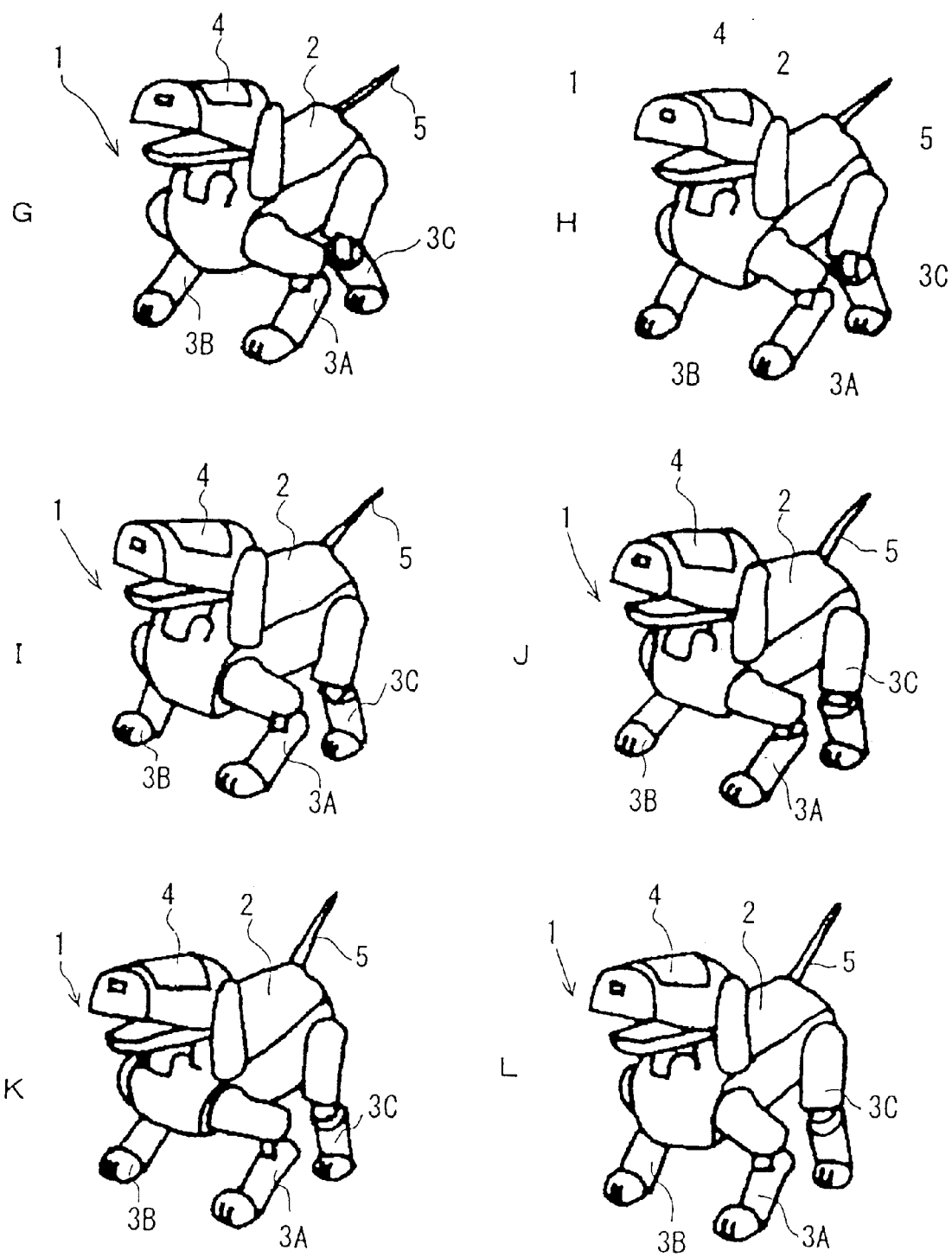
Figure 130:
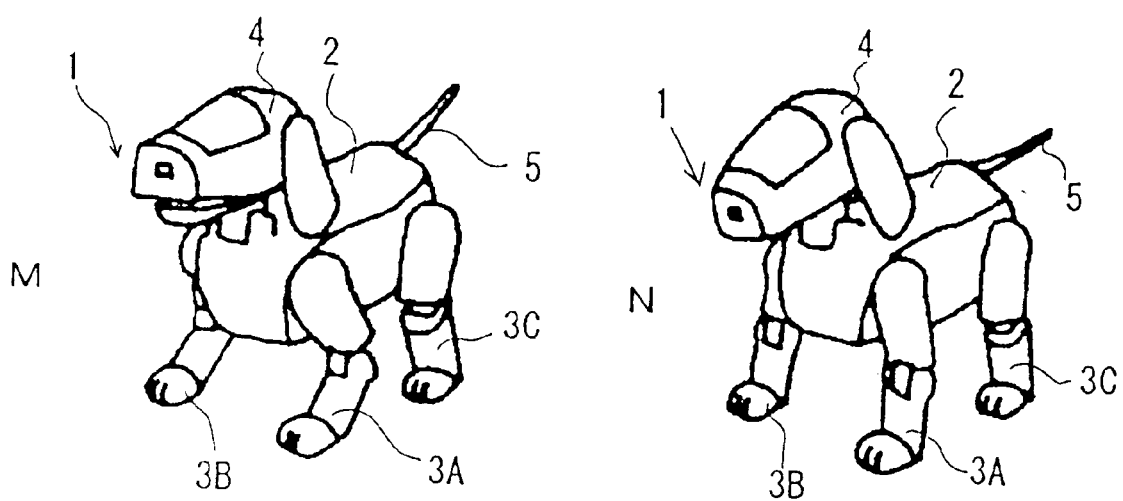
Figure 131:
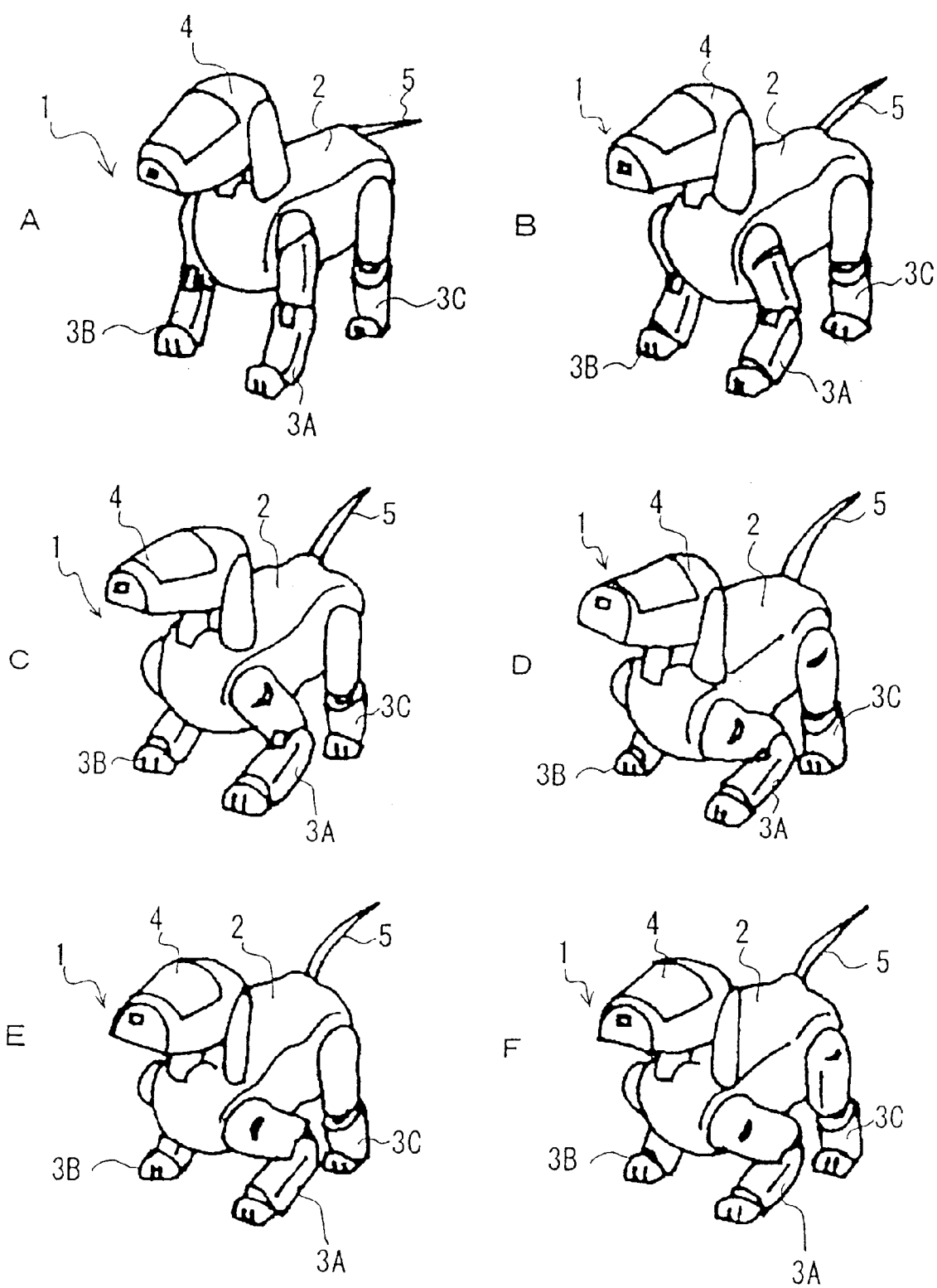

When the pet robot 1 is as shown in FIG. 112A, it turns the head 4 to draw a circle, as shown in FIGS. 112B through 113A. Here the mouth is open.

Once the head 4 faces slightly up forward as shown in FIG. 113B, the pet robot 1 dynamically turns the head 4 obliquely down as shown in FIGS. 113C through 113F. Here the speaker 20 (FIG. 2) outputs a sound of sneezing.

When the head 4 faces downward, the pet robot 1 swings the head 4 from side to side a few times. After completing the action, the pet robot 1 directs the head 4 as before to return to the original down position. This ends the motion.

Such a motion can produce a feeling that the pet robot 1 sneezes, thus giving the user a lifelike impression.

(3-6-3)

FIGS. 116A through 119E, 120A through 124A, 125A through 127A, 128A through 130B, 131A through 133A, and 134A through 136E show the flow of other idleness motions, that is, third, fourth, fifth, sixth, seventh, and eighth idleness motions, respectively.

(3-7) Language Motions

Next, language motions will be described below which the pet robot 1 produces when it wants to inform the user of something (these motions are hereinafter called language motions).

(3-7-1) First Language Motion

A first language motion will be described below. The pet robot 1 produces the first language motion when it is in a basic down position as shown in FIG. 137A.

When the pet robot 1 is in the basic down position in FIG. 137A, it lifts the right and left forelegs 3B and 3A almost to the level of the shoulders as shown in FIGS. 137B through 137E and then lowers the right and left forelegs 3B and 3A so that their ends draw an arc, as shown in FIGS. 137F through 138E.

Then after slightly inclining the head 4 to the left (or right) as shown in FIGS. 138F through 140B, the pet robot 1 moves the right and left forelegs 3B and 3A up and down a few times. After completing this action, the pet robot 1 brings the right and left forelegs 3B and 3A in contact with the floor to return to the original down position, as shown in FIG. 140C. This ends the motion.

With such a motion, the pet robot 1 can indicate a ball as shown in FIGS. 137B through 137E and express a want to convey a desire for a ball to the user.

(3-7-2) Other Language Motions

FIGS. 141A through 143A, 144A through 147E, 148A through 150F, 151A through 154A, 155A through 157A, and 158A through 161A show other language motions, that is, second, third, fourth, fifth, sixth, and seventh language motions, respectively.

(3-8) Other Motions

FIGS. 162A through 165A, 166A through 168E, 169A through 171F, 172A through 174D, and 175A through 177D show the flow of motions which the pet robot 1 produces when it grows up (these motions are hereinafter called growth motions), that is, first, second, third, fourth, and fifth growth motions, respectively, as examples of other motions.

(4) Effect of the Embodiment

With motions, the pet robot 1 arranged as described above recovers from a tumble and presents a touch of a living thing or a robot.

Thus the pet robot 1 eliminates the need for the user to stand the robot when it tumbles. In addition, the robot gives the user affection for, and curiosity about, it with motions.

Because the pet robot 1 is adapted so that it recovers from a tumble and presents a touch of a living thing or a robot with motions, the arrangement eliminates the need for the user to stand up the pet robot 1 when it tumbles and allows the pet robot 1 to give the user affection for, and curiosity about, the robot with motions, thus enhancing the amusing characteristics of the pet robot 1.

(5) Other Embodiments

In the above-described embodiment, the present invention is applied to the pet robot 1 arranged as shown in FIG. 1. However, the present invention is not limited to such an arrangement but can be applied to a variety of robots.

Industrial Applicability

The present invention can be applied to pet robots.

What is claimed is:

1. A four-legged robot having a body connected at the front right, front left, rear right, and rear left with legs, said robot comprising:

driving means for driving the legs separately from each other; and controlling means for controlling the driving means, and said controlling means controls the driving means so that when the robot tumbles sideward, the driving means turns the forelegs and hind legs under the body in such directions that the legs open apart from each other and then in such directions that they move away from the body.

2. A four-legged robot having a body connected at the front right, front left, rear right, and rear left with legs, said robot comprising:

driving means for driving the legs separately from each other; and controlling means for controlling the driving means, and said controlling means controls the driving means so that when the robot tumbles forward, the driving means turns the legs at the front of the body until they are parallel in front of the body and then turns the legs toward the rear of the body.

3. A four-legged robot having a body connected at the front right, front left, rear right, and rear left with legs, said robot comprising:

driving means for driving the legs separately from each other; and controlling means for controlling the driving means, and said controlling means controls the driving means so that when the robot tumbles backward, the driving means turns the legs at the rear of the body in such directions that the legs move away from the body until they are almost straight and then turns the legs toward the front of the body.

4. A four-legged robot having a body connected at the front right, front left, rear right, and rear left with legs, said robot comprising:

driving means for driving the legs separately from each other; and controlling means for controlling the driving means, and said controlling means controls the driving means so that the driving means opens the legs radially and then bends the legs above the body.

5. A four-legged robot having a body connected at the front right, front left, rear right, and rear left with legs and provided at the front with a head, said robot comprising:

driving means for driving the legs and head separately from each other; and controlling means for controlling the driving means, and said controlling means controls the driving means so that the end of one of said legs under the body moves up and down at the back of the head.

* * * * *